(12) United States Patent
Panopoulos et al.

(10) Patent No.: US 10,336,202 B2
(45) Date of Patent: Jul. 2, 2019

(54) DRONE ASSISTANCE APPARATUS WITH CHARGING SYSTEM AND METHOD

(71) Applicant: Peter J. Panopoulos, Hickory Hills, IL (US)

(72) Inventors: Peter J. Panopoulos, Hickory Hills, IL (US); Gordon Paul Ramsey, Frankfort, IL (US)

(*) Notice: Subject to any disclaimer, the term of this patent is extended or adjusted under 35 U.S.C. 154(b) by 216 days.

(21) Appl. No.: 15/442,728

(22) Filed: Feb. 27, 2017

(65) Prior Publication Data

US 2017/0166067 A1 Jun. 15, 2017

Related U.S. Application Data

(63) Continuation of application No. 14/450,877, filed on Aug. 4, 2014, now Pat. No. 9,629,220.

(Continued)

(51) Int. Cl.
| | |
|---|---|
| B60L 11/00 | (2006.01) |
| B60L 11/18 | (2006.01) |
| F21V 14/02 | (2006.01) |
| H05B 37/02 | (2006.01) |
| H05B 33/08 | (2006.01) |
| F21S 8/08 | (2006.01) |
| B64F 1/00 | (2006.01) |

(Continued)

(52) U.S. Cl.
CPC ............ *B60L 11/182* (2013.01); *B60L 53/12* (2019.02); *B64F 1/00* (2013.01); *F21S 8/085* (2013.01); *F21V 14/02* (2013.01); *H05B 33/0803* (2013.01); *H05B 37/0209* (2013.01); *H05B 37/0218* (2013.01); *H05B 37/0227* (2013.01); *H05B 37/0236* (2013.01); *H05B 37/0245* (2013.01); *H05B 37/0272* (2013.01); *B64C 39/024* (2013.01); *B64C 2201/042* (2013.01); *B64D 2203/00* (2013.01); *F21V 19/02* (2013.01); *F21V 21/15* (2013.01); *F21V 23/0442* (2013.01); *F21V 29/59* (2015.01); *F21W 2131/103* (2013.01); *F21Y 2105/10* (2016.08); *F21Y 2113/00* (2013.01); *F21Y 2115/10* (2016.08); *G08B 13/00* (2013.01); *H05B 33/0854* (2013.01); *Y02B 20/383* (2013.01); *Y02B 20/46* (2013.01); *Y02B 20/72* (2013.01)

(58) Field of Classification Search
None
See application file for complete search history.

(56) References Cited

U.S. PATENT DOCUMENTS

| 8,511,606 B1* | 8/2013 | Lutke | B64C 39/028 244/100 R |
|---|---|---|---|
| 8,630,755 B2* | 1/2014 | Ohtomo | B64C 39/024 348/144 |

(Continued)

*Primary Examiner* — Jonathan M Dager
(74) *Attorney, Agent, or Firm* — Nyman IP LLC; Scott Nyman

(57) ABSTRACT

A drone receiving apparatus is provided including a landing area including a platform, a lighting system, and/or a surface on which a drone is receivable, a charging plate for providing electrical power to charge the drone received by the landing area, and a communication system by which a signal is communicable to exchange data with the drone that is within a communicable proximity to the communication system. A method to receive a drone is also provided.

17 Claims, 64 Drawing Sheets

Related U.S. Application Data

(60) Provisional application No. 61/958,755, filed on Aug. 5, 2013.

(51) Int. Cl.

| | |
|---|---|
| *B60L 53/12* | (2019.01) |
| *F21V 19/02* | (2006.01) |
| *F21V 23/04* | (2006.01) |
| *F21W 131/103* | (2006.01) |
| *F21Y 113/00* | (2016.01) |
| *F21V 29/58* | (2015.01) |
| *F21Y 105/10* | (2016.01) |
| *F21Y 115/10* | (2016.01) |
| *B64C 39/02* | (2006.01) |
| *F21V 21/15* | (2006.01) |
| *G08B 13/00* | (2006.01) |

(56) References Cited

U.S. PATENT DOCUMENTS

| | | | | |
|---|---|---|---|---|
| 8,899,903 | B1* | 12/2014 | Saad | B65G 67/00 414/392 |
| 8,935,035 | B1* | 1/2015 | Bogdanowicz | G08G 1/20 701/26 |
| 9,020,666 | B2* | 4/2015 | Ohtomo | G05D 1/0669 701/15 |
| 9,056,676 | B1* | 6/2015 | Wang | B64F 1/00 |
| 9,063,544 | B2* | 6/2015 | Vian | G05D 1/0094 |
| 9,064,222 | B2* | 6/2015 | Saad | G06Q 10/0631 |
| 9,087,451 | B1* | 7/2015 | Jarrell | G08G 5/0069 |
| 9,359,074 | B2* | 6/2016 | Ganesh | G08G 5/0069 |
| 9,387,928 | B1* | 7/2016 | Gentry | B64C 39/024 |
| 9,454,157 | B1* | 9/2016 | Hafeez | G05D 1/104 |
| 9,471,064 | B1* | 10/2016 | Boland | G05D 1/104 |
| 9,505,493 | B2* | 11/2016 | Borko | B64C 39/024 |
| 9,527,392 | B2* | 12/2016 | Peverill | B64C 39/024 |
| 9,527,605 | B1* | 12/2016 | Gentry | B64F 1/12 |
| 9,561,871 | B2* | 2/2017 | Sugumaran | B64C 25/32 |
| 9,671,791 | B1* | 6/2017 | Paczan | B64C 39/024 |
| 9,678,507 | B1* | 6/2017 | Douglas | G08G 5/003 |
| 9,776,717 | B2* | 10/2017 | Spinelli | B64C 39/024 |
| 9,777,502 | B2* | 10/2017 | Curlander | E04H 14/00 |
| 9,783,075 | B2* | 10/2017 | Henry | B60L 11/1822 |
| 9,811,796 | B2* | 11/2017 | Ogilvie | G06Q 10/0832 |
| 9,815,633 | B1* | 11/2017 | Kisser | B64C 39/024 |
| 9,828,093 | B2* | 11/2017 | Raniere | B64C 39/024 |
| 9,828,094 | B2* | 11/2017 | McMillion | B64D 1/22 |
| 9,878,787 | B2* | 1/2018 | Chan | B64C 39/024 |
| 9,889,932 | B2* | 2/2018 | Sharma | B64C 39/024 |
| 9,902,504 | B2* | 2/2018 | Moore | B64F 1/00 |
| 9,928,749 | B2* | 3/2018 | Gil | H04W 4/70 |
| 9,934,630 | B2* | 4/2018 | Rephlo | G06Q 10/083 |
| 9,950,791 | B2* | 4/2018 | Blomberg | B64F 1/368 |
| D816,046 | S * | 5/2018 | Benini | D21/302 |
| 9,975,648 | B2* | 5/2018 | Arnold | G01S 19/15 |
| 10,028,606 | B1* | 7/2018 | Ritchie | A47G 29/12 |
| 10,061,328 | B2* | 8/2018 | Canoy | G08G 5/0078 |
| 10,079,497 | B2* | 9/2018 | Cheng | H02J 7/0044 |
| 10,093,432 | B2* | 10/2018 | McKinnon | B64F 1/007 |
| 10,099,561 | B1* | 10/2018 | Ananthanarayanan | B64C 39/024 |
| 10,112,728 | B2* | 10/2018 | Evans | B64F 1/36 |
| 10,120,376 | B2* | 11/2018 | Boss | B64D 27/24 |
| 10,124,908 | B2* | 11/2018 | Stabler | A63H 27/12 |
| 2006/0249622 | A1* | 11/2006 | Steele | B64F 1/02 244/115 |
| 2009/0224097 | A1* | 9/2009 | Kariv | B64F 1/02 244/63 |
| 2009/0299582 | A1* | 12/2009 | Anderson | A01B 79/005 701/50 |
| 2009/0306840 | A1* | 12/2009 | Blenkhorn | G05D 1/0676 701/16 |
| 2012/0261516 | A1* | 10/2012 | Gilliland | G01S 17/107 244/183 |
| 2013/0081245 | A1* | 4/2013 | Vavrina | B60L 11/1822 29/402.08 |
| 2014/0025228 | A1* | 1/2014 | Jang | G06Q 10/047 701/2 |
| 2014/0032034 | A1* | 1/2014 | Raptopoulos | G08G 5/0069 701/25 |
| 2014/0081479 | A1* | 3/2014 | Vian | G06Q 10/06 701/2 |
| 2014/0163781 | A1* | 6/2014 | Vian | A01G 23/00 701/3 |
| 2014/0303814 | A1* | 10/2014 | Burema | A01B 79/005 701/3 |
| 2015/0066248 | A1* | 3/2015 | Arbeit | G01C 21/20 701/2 |
| 2015/0069968 | A1* | 3/2015 | Pounds | B60L 11/1818 320/109 |
| 2015/0097530 | A1* | 4/2015 | Scarlatti | B60L 11/1827 320/109 |
| 2015/0158599 | A1* | 6/2015 | Sisko | B64F 1/32 244/114 R |
| 2015/0175276 | A1* | 6/2015 | Koster | B64F 1/32 244/114 R |
| 2015/0183528 | A1* | 7/2015 | Walsh | B64F 1/32 701/3 |
| 2015/0336669 | A1* | 11/2015 | Kantor | G01C 21/3415 701/3 |
| 2015/0379874 | A1* | 12/2015 | Ubhi | G01S 5/0027 701/3 |
| 2016/0001883 | A1* | 1/2016 | Sanz | B64F 1/02 244/17.23 |
| 2016/0009413 | A1* | 1/2016 | Lee | B64F 1/007 701/16 |
| 2016/0039541 | A1* | 2/2016 | Beardsley | B60L 11/1816 701/2 |
| 2016/0068277 | A1* | 3/2016 | Manitta | B64F 1/00 244/114 R |
| 2016/0144734 | A1* | 5/2016 | Wang | B60L 11/1822 701/17 |
| 2016/0159496 | A1* | 6/2016 | O'Toole | B64F 1/32 244/110 E |
| 2016/0200207 | A1* | 7/2016 | Lee | B60L 11/1816 320/109 |
| 2016/0200438 | A1* | 7/2016 | Bokeno | B64C 39/024 244/2 |
| 2016/0209839 | A1* | 7/2016 | Hoareau | G05D 1/0027 |
| 2016/0225263 | A1* | 8/2016 | Salentiny | G08G 5/003 |
| 2016/0247404 | A1* | 8/2016 | Srivastava | G01C 21/20 |
| 2016/0257423 | A1* | 9/2016 | Martin | B64F 1/00 |
| 2016/0257424 | A1* | 9/2016 | Stabler | A63H 27/12 |
| 2016/0266579 | A1* | 9/2016 | Chen | G05D 1/0038 |
| 2017/0028863 | A1* | 2/2017 | Meringer | B60L 11/1825 |
| 2017/0110901 | A1* | 4/2017 | Amarasekara | H02J 50/10 |
| 2017/0344000 | A1* | 11/2017 | Krishnamoorthy | B64C 39/024 |
| 2018/0039286 | A1* | 2/2018 | Tirpak | G05D 1/0676 |
| 2018/0129879 | A1* | 5/2018 | Achtelik | G01C 5/00 |
| 2018/0137454 | A1* | 5/2018 | Kulkarni | B64C 39/024 |
| 2018/0141657 | A1* | 5/2018 | Han | B64C 39/02 |
| 2018/0151045 | A1* | 5/2018 | Kim | B64C 39/024 |
| 2018/0188747 | A1* | 7/2018 | Venturelli | G08G 5/0069 |
| 2018/0246526 | A1* | 8/2018 | Wilkinson | G05D 1/0291 |
| 2018/0304755 | A1* | 10/2018 | Beaver | B60L 11/182 |
| 2018/0320402 | A1* | 11/2018 | Evans | E04H 14/00 |

* cited by examiner

Fig. 18 RGB-SOUND CONTROLLER BLOCK DIAGRAM 1800 w/ COMPUTER INTERFACE

STEPPER CONTROL CIRCUIT BLOCK DIAGRAM WITH COMPUTER INTERFACE

Table 2200

| State: | Left Panel: | Middle Panel: | Right Panel: |
|---|---|---|---|
| One | ON | OFF | OFF |
| Two | OFF | OFF | ON |
| Three | ON | ON | OFF |
| Four | OFF | ON | ON |
| Five | ON | OFF | ON |
| Six | ON | ON | ON |
| Seven | OFF | ON | OFF |

Fig. 35

Sheet 3500

Light Panel One Transitions Zero Default

| 1st | 2nd | -x | -y | +x | +y | +y-y | | 3rd | +y-y |
|---|---|---|---|---|---|---|---|---|---|
| (-2,0) | -x | (0,0) | (3,-1) | DC | (-3,-1) | (3,0) | | -x | (-3,0) |
| (1,-1) | -y | (-3,1) | (0,0) | (-1,1) | DC | (0,1) | | -y | (0,-1) |
| (0,0) | +x | DC | (1,-1) | (0,0) | (1,1) | (1,0) | | +x | (-1,0) |
| (1,1) | +y | (-3,-1) | (-1,-1) | (-1,-1) | (0,0) | (0,-1) | | +y | (0,1) |

Bit control of transitions
Five
states    in 15 degree increments from -30 to +30
Two transitions for some motion and three for
others.
Coding = 9 bits
Middle coverage = (15,0) (0,0) (-15,0)

four transitions plus
sign = 3 bits

Fig. 36

Sheet 3600

Light Panel Two Transitions Zero Default

| 1st | 2nd | -x | -y | +x | +y | +y-y | | 3rd | +y-y |
|---|---|---|---|---|---|---|---|---|---|
| (-2,0) | -x | (0,0) | (2,-2) | DC | (2,2) | (2,0) | | -x | (-2,0) |
| (0,-2) | -y | (-2,2) | (0,0) | (2,2) | DC | (0,2) | | -y | (0,-2) |
| (2,0) | +x | DC | (-2,-2) | (0,0) | (-2,2) | (-2,0) | | +x | (2,0) |
| (0,2) | +y | (-2,-2) | (0,-2) | (2,-2) | (0,0) | (0,-2) | | +y | (0,2) |

Bit control of transitions
Five
states    in 15 degree increments from -30 to +30
Two transitions for some motion and three for
others.
Coding = 9 bits
Middle coverage = (15,0) (0,0) (-15,0)

four transitions plus
sign = 3 bits

Fig. 37

Sheet 3700

Light Panel Three Transitions Zero Default

| 1st | 2nd | -x | -y | +x | +y | +y-y | | 3rd | +y-y |
|---|---|---|---|---|---|---|---|---|---|
| (0,0) | -x | (0,0) | (-1,-1) | DC | (-1,1) | (-1,0) | | -x | (1,0) |
| (-1,-1) | -y | (1,1) | (0,0) | (3,1) | DC | (0,1) | | -y | (0,-1) |
| (2,0) | +x | DC | (-3,1) | (0,0) | (-3,1) | (-3,0) | | +x | (3,0) |
| (-1,1) | +y | (1,-1) | (1,-1) | (3,-1) | (0,0) | (0,-1) | | +y | (0,1) |

Bit control of transitions
Five
states   in 15 degree increments from -30 to +30
Two transitions for some motion and three for others.
Coding = 9 bits
Middle coverage = (15,0) (0,0) (-15,0)

four transitions plus
sign = 3 bits

Fig. 38

Sheet 3800

Light Panel One Transitions Fan Out Default

| 1st | 2nd | -x | -y | +x | +y | +y-y | | 3rd | +y-y |
|---|---|---|---|---|---|---|---|---|---|
| (0,0) | -x | (0,0) | (3,-1) | DC | (-3,-1) | (3,0) | | -x | (-3,0) |
| (2,-1) | -y | (-3,1) | (0,0) | (-1,1) | DC | (0,1) | | -y | (0,-1) |
| (0,0) | +x | DC | (1,-1) | (0,0) | (1,1) | (1,0) | | +x | (-1,0) |
| (2,1) | +y | (-3,-1) | (-1,-1) | (-1,-1) | (0,0) | (0,-1) | | +y | (0,1) |

Bit control of transitions
Five
states   in 15 degree increments from -30 to +30
Two transitions for some motion and three for others.
Coding = 9 bits
Middle coverage = (15,0) (0,0) (-15,0)

four transitions plus
sign = 3 bits

Fig. 39

Sheet 3900

Light Panel Two Transitions Fan Out Default

| 1st | 2nd | -x | -y | +x | +y | +y-y | 3rd | +y-y |
|---|---|---|---|---|---|---|---|---|
| (-2,0) | -x | (0,0) | (2,-2) | DC | (2,2) | (2,0) | -x | (-2,0) |
| (0,-2) | -y | (-2,2) | (0,0) | (2,2) | DC | (0,2) | -y | (0,-2) |
| (2,0) | +x | DC | (-2,-2) | (0,0) | (-2,2) | (-2,0) | +x | (2,0) |
| (0,2) | +y | (-2,-2) | (0,-2) | (2,-2) | (0,0) | (0,-2) | +y | (0,2) |

Bit control of transitions
Five
states    in 15 degree increments from -30 to +30
Two transitions for some motion and three for others.
Coding = 9 bits
Middle coverage = (15,0) (0,0) (-15,0)

four transitions plus sign = 3 bits

Fig. 40

Sheet 4000

Light Panel Three Transitions Fan Out Default

| 1st | 2nd | -x | -y | +x | +y | +y-y | 3rd | +y-y |
|---|---|---|---|---|---|---|---|---|
| (0,0) | -x | (0,0) | (-1,-1) | DC | (-1,1) | (-1,0) | -x | (-1,0) |
| (-3,-1) | -y | (1,1) | (0,0) | (3,1) | DC | (0,1) | -y | (0,-1) |
| (0,0) | +x | DC | (-3,1) | (0,0) | (-3,1) | (-3,0) | +x | (3,0) |
| (-3,1) | +y | (1,-1) | (1,-1) | (3,-1) | (0,0) | (0,-1) | +y | (0,1) |

Bit control of transitions
Five
states    in 15 degree increments from -30 to +30
Two transitions for some motion and three for others.
Coding = 9 bits
Middle coverage = (15,0) (0,0) (-15,0)

four transitions plus sign = 3 bits

Fig. 47
S.A.L.T. 360 DEGREE VARIATION OPTION OVERVIEW TOP VIEW-6 PANEL CONFIGURATION-SHOWING VARIOUS DIFFERENT ROTATION LIGHT BEAM VIEWS
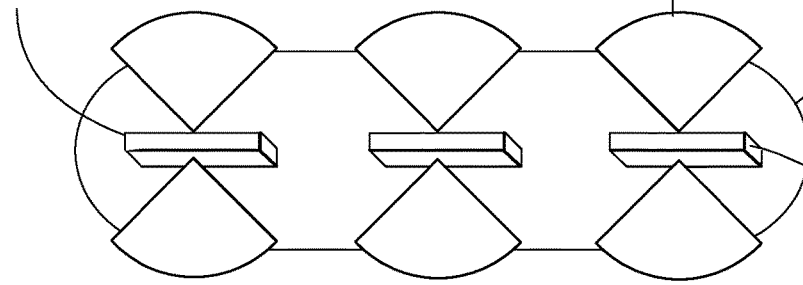
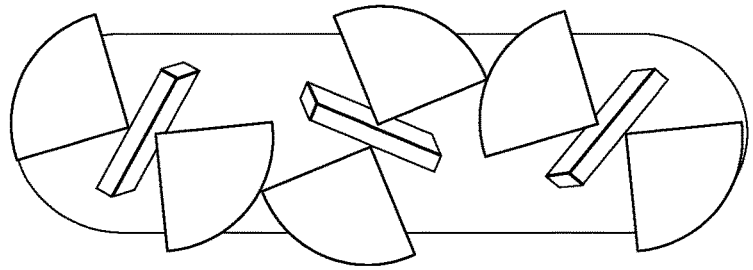
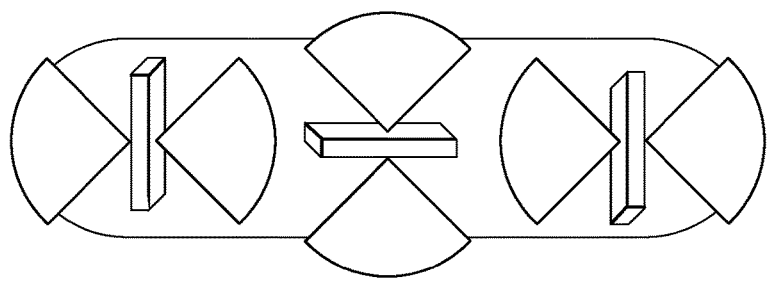
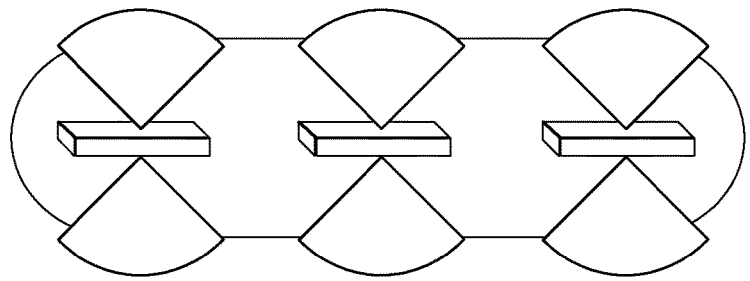

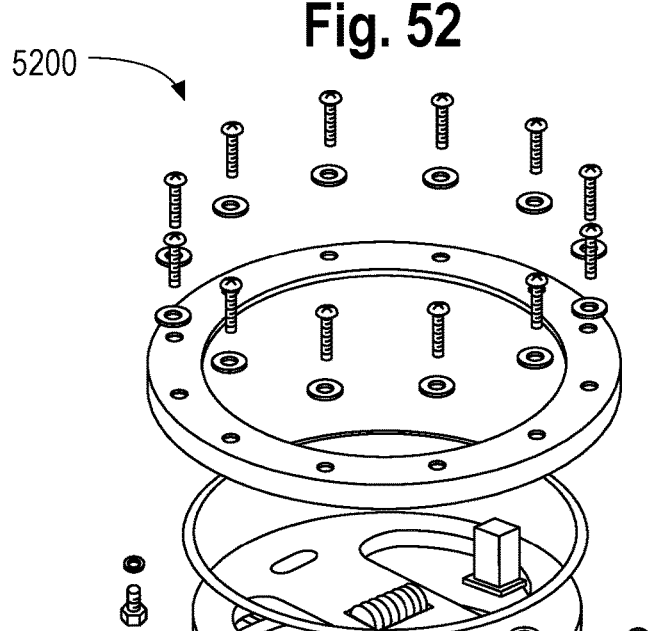
Fig. 52
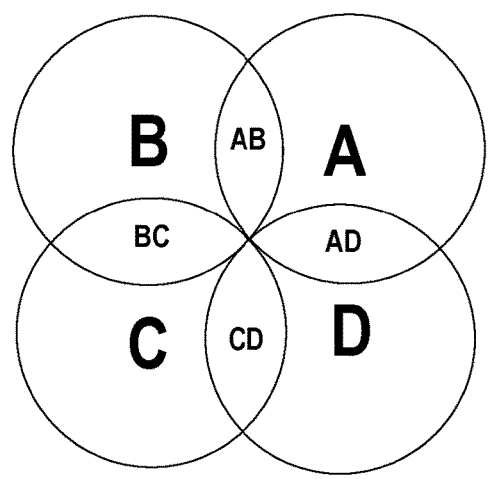
Fig. 51
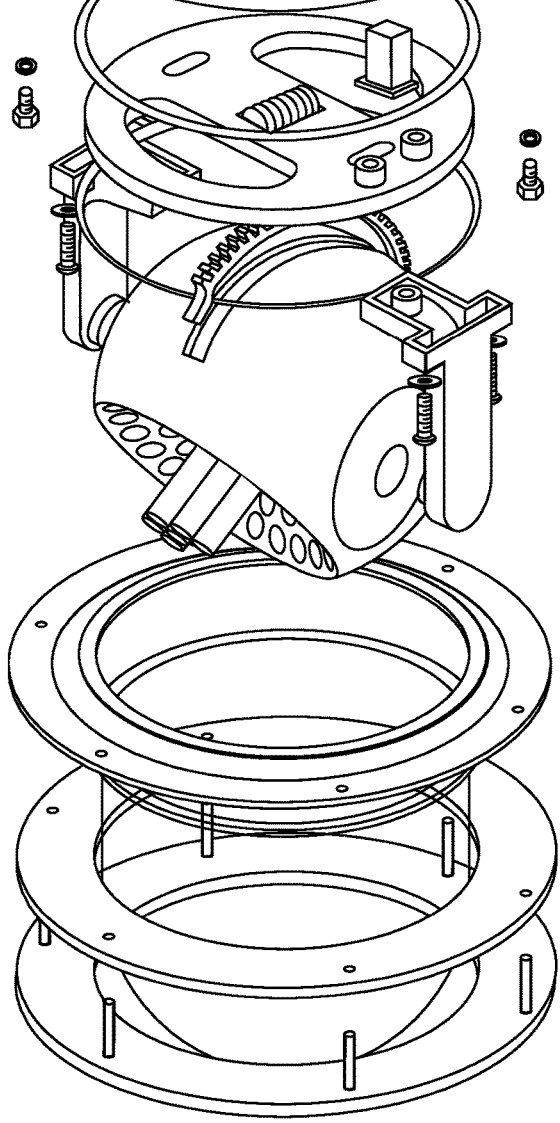

Fig. 55
Fig. 56
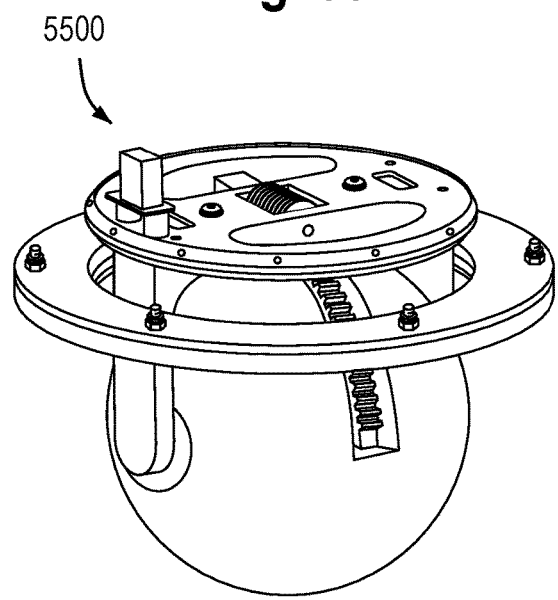
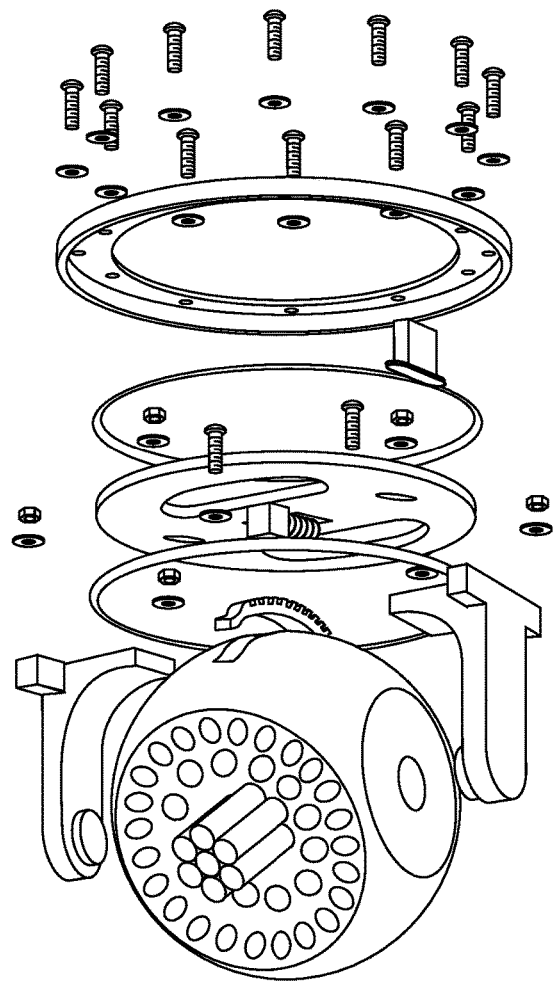
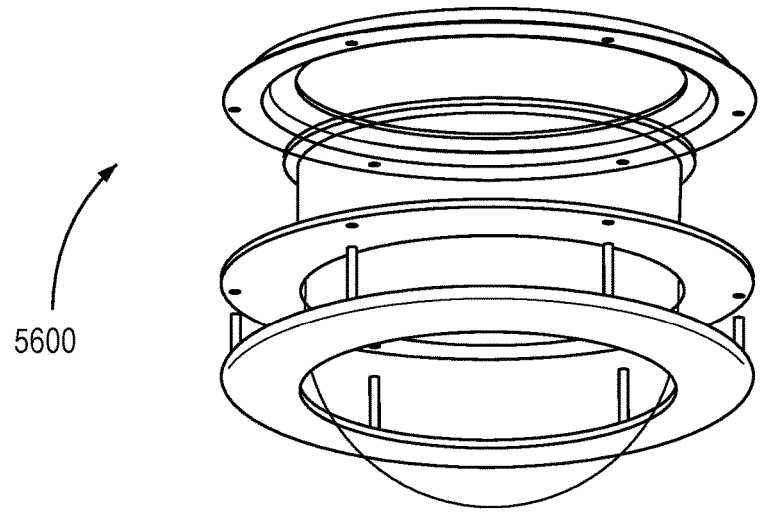

6100

6200

7800

7900

LIGHT BAR WITH INTERCHANGEABLE STREAMING MICROPHONES, CAMERAS WITH SENSOR OR SENSOR ARRAY CARDS

CAMERA BLOCK DIAGRAM FOR MOBILE/VEHICULAR/PORTABLE SYSTEMS

CAMERA BLOCK DIAGRAM FOR MOBILE/VEHICULAR/PORTABLE SYSTEMS

Fig. 83
CAMERA BLOCK DIAGRAM FOR MOBILE/VEHICULAR/PORTABLE SYSTEMS
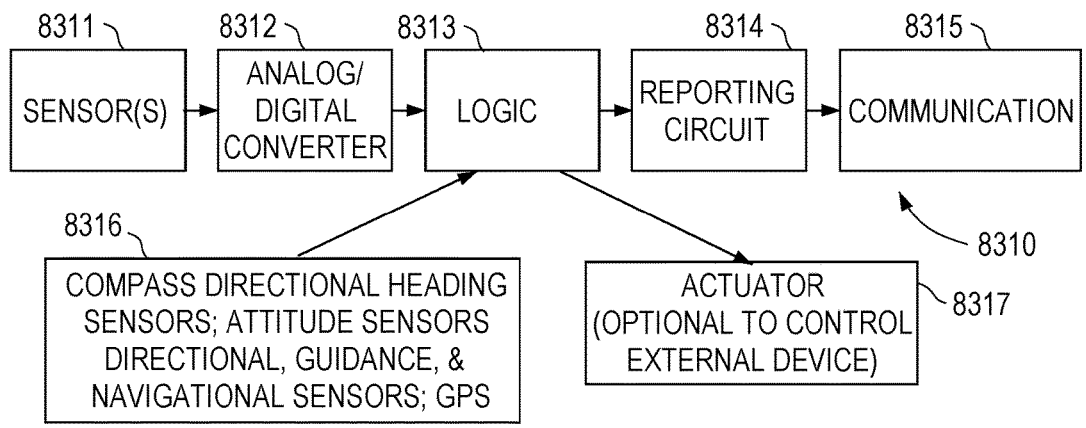
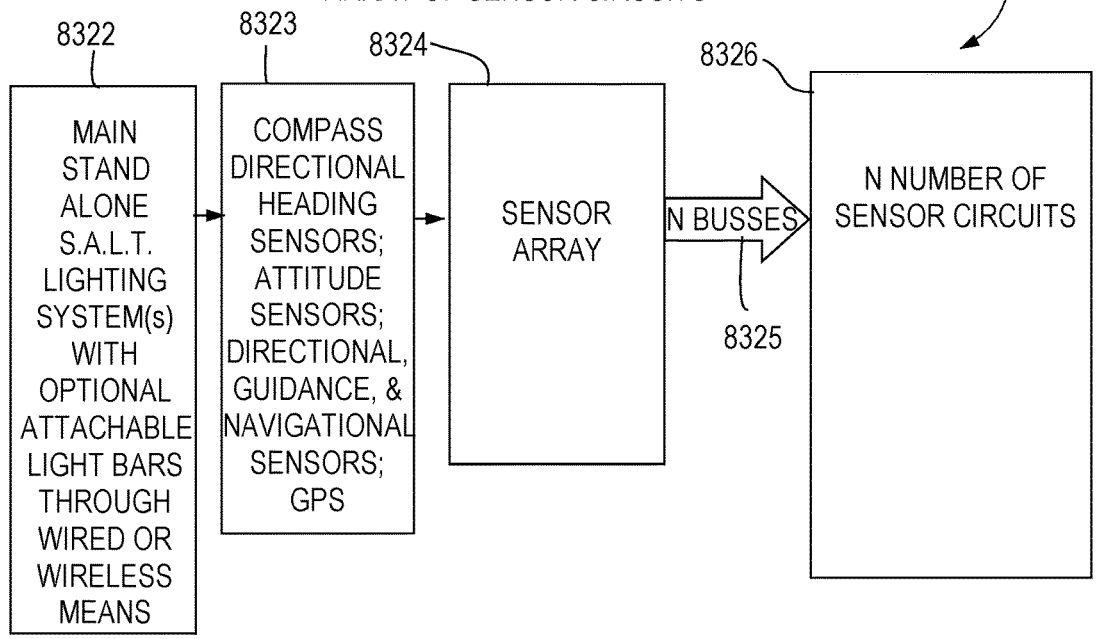

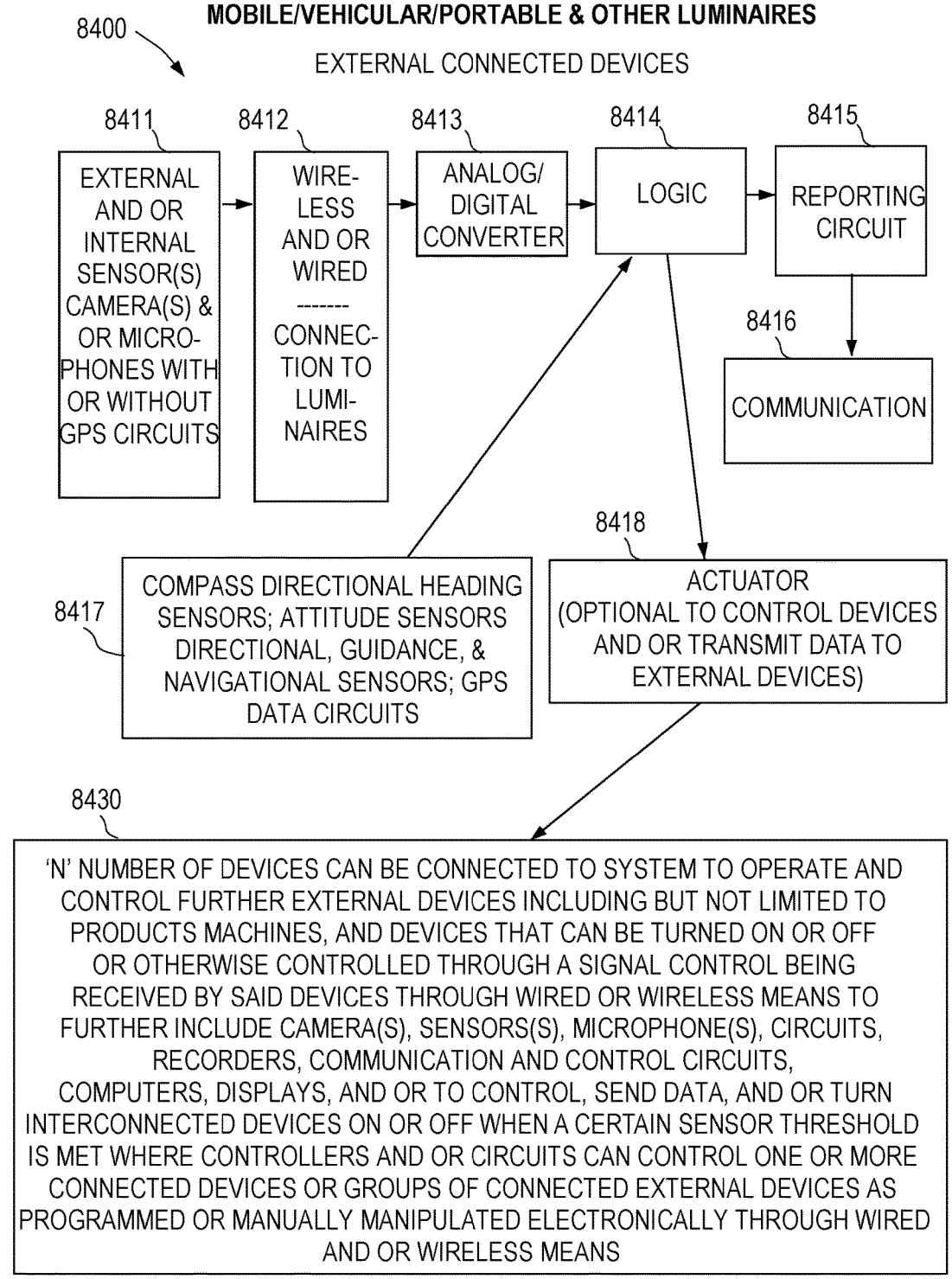

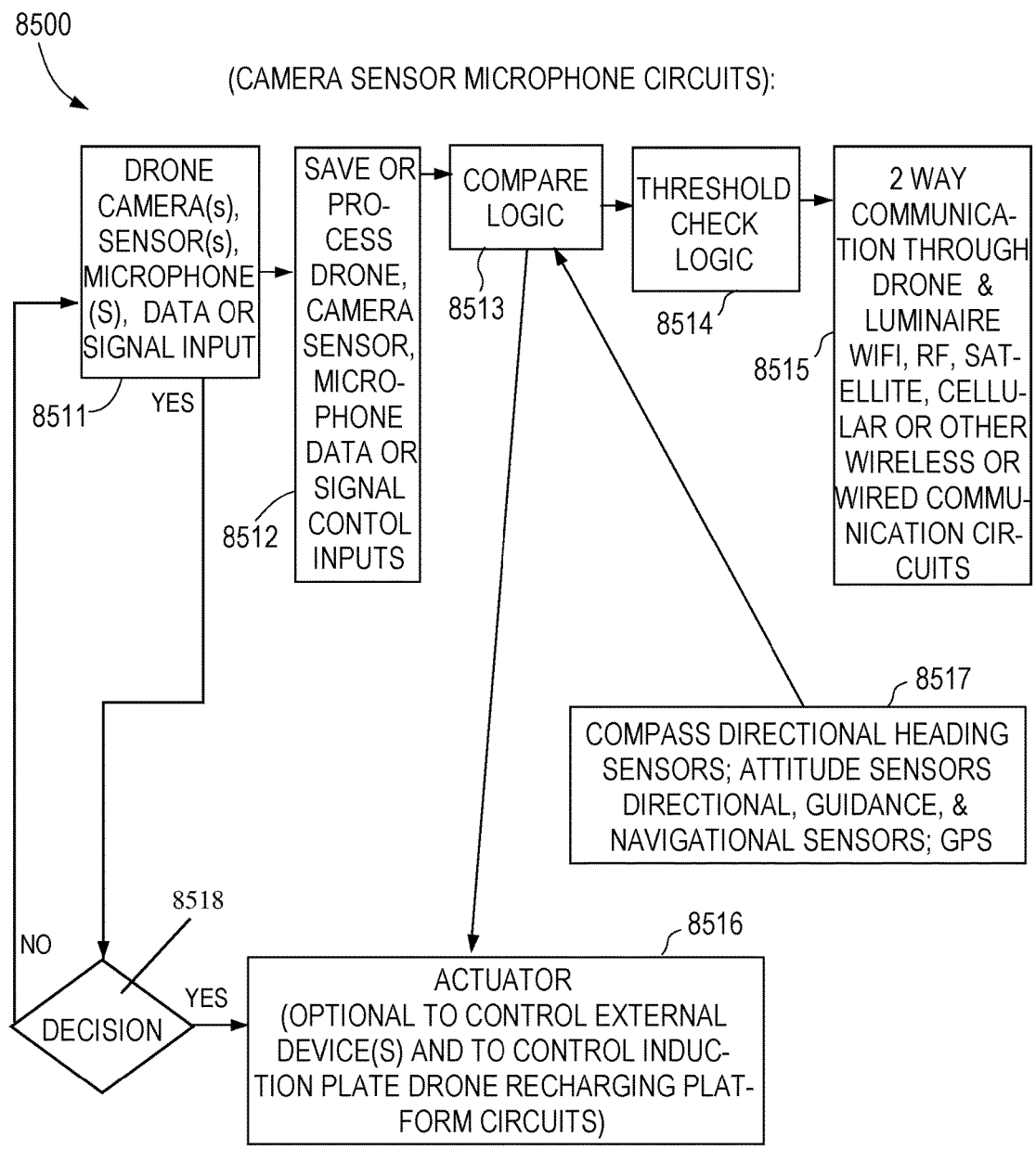

DRONE-SENSOR-CAMERA-MICROPHONE SAMPLING & COMMUNICATION LOGIC (ARRAY OF CAMERA, SENSOR, MICROPHONE CIRCUITS):

DRONE ASSISTANCE APPARATUS WITH CHARGING SYSTEM AND METHOD

CROSS-REFERENCE TO RELATED APPLICATION

This application is a continuing application of, and claims priority from, U.S. nonprovisional Utility patent application Ser. No. 14/450,877 filed Aug. 4, 2014, which claims the priority from U.S. provisional utility patent application Ser. No. 61/958,755 filed Aug. 5, 2013. The foregoing applications are incorporated in their entirety herein by reference.

FIELD OF THE INVENTION

The present disclosure relates to a drone assistance apparatus. More particularly, the disclosure relates to a drone assistance apparatus including a platform for receiving a drone.

BACKGROUND

Lighting systems have been in use for years. Typically, lighting systems include LEDs or other types of light source technologies, such as fluorescent, halogen, high intensity discharge lamps, or sodium vapor. However, conventional lighting systems lack advanced control over light sources to direct and rotate light panels to vary the beam angles of the light panels horizontally and vertically, to vary intensity of light panels, and to vary color of lighting panels within a light fixture. Conventional lighting also lacks an ability to control light panels in selected light fixtures or in selected groups of an array of light fixtures.

Additionally, conventional lighting systems lack a plurality of light panels with servo motors, stepper motors, other motors, solenoids, gears, and/or similar mechanisms to direct light in varying forward and peripheral directions to shine light forward from a light fixture, through the peripheral sides, or to the back of a light fixture. Similarly, such conventional lighting systems fail to include light panel rotation of between 180 degrees and 360 degrees to allow light panels to shine light forward, through the peripheral sides, or towards the back of a light fixture.

Existing products do not allow a user to save different light intensities, light panel rotation, direction of illumination, monochromatic color for illumination, multicolor light panel illumination configurations, and/or duration of illumination from a light source in memory that can later be scrolled through, recalled and utilized. Additionally, existing products do not allow a user to rotate light panels to a desired position for illumination, settings relating to such being savable in memory that can later be scrolled through, recalled, and utilized.

Additionally, existing products cannot allow changing color emanating from one or more multicolor light panels within a light fixture, program shining a desired color frequency where and when desired, saving different colors in memory along with a duration for displaying each color, using a timing circuit for when the colors may change, how long each color may be displayed, and to have the ability to step through saved settings and cycles to allow a light fixture or light panel to shine a desired color for a saved time interval. Existing products also lack stepping through to subsequent saved colors and profile for a time interval until all saved colors and time intervals have been completed with an optional repeat cycle that can continue or terminate on a number of repeat cycles or time and date.

Conventional lighting systems have been in use for years. Typically, lighting systems are designed for various applications such as street lights, parking lot lights, building and warehouse lighting, outside lot lighting, retail lot lighting, grocery lots, car dealer lots, gas or electric recharge stations, dock lighting, security or surveillance, pathway lighting making use of various types of lighting sources. A problem with conventional lighting systems is that most lighting fixtures are not sufficiently energy efficient due to obsolete light sources.

Existing products lack the intelligent control ability to direct light as might be desired through advanced logic and circuitry making use of stepper motors, servo motors, solenoids, programmable controls, mechanisms and assemblies. Additionally, existing products lack the ability to intelligently direct the position of lighting panels through default, programmed and/or through user-defined settings. Moreover, existing products lack the ability to intelligently fine tune lighting direction and intensity through programmed and user-defined settings.

While existing devices may be suitable for the particular purpose to which they address, they are not as suitable for providing stepper motor assisted advanced intelligent lighting systems where light sources are integrated in electro-mechanically pivotal-rotatable light panels in a fixture to provide light with a wide field of coverage with advanced default, and user defined, selected, and/or programmed directional and intensity settings. Further, existing devices do not provide sufficiently advanced control over light sources and light fixtures to direct and rotate light panels within one or more light fixtures, vary beam angles of the light panels horizontally and vertically, vary the intensity of light panels, and vary the color of lighting panels with various advanced controllers to create different lighting systems including wired and wireless lighting systems and their respective controls, including computer controlled lighting systems and lighting systems controlled from mobile phones, remotes, or other digital devices for a wide variety of applications. The systems can use a variety of light source technologies, such as light emitting diode (LED) technology.

In these respects, the servo/stepper assisted lighting technology systems according to the present invention substantially departs from the conventional concepts and designs of the existing technologies, and in so doing provides an apparatus primarily developed for providing advanced control over light sources and light fixtures to direct and rotate a plurality of light panels within one or more light fixtures to vary the beam angles of the light panels horizontally and vertically, to vary the intensity of a plurality of light panels, and to vary the color of a plurality of lighting panels with various advanced controllers having advanced features and benefits to create many different lighting systems including wired and wireless lighting systems and their respective controls, including computer controlled lighting systems and lighting systems controlled from mobile phones, remotes, touch screens, or other digital devices for a wide variety of applications.

SUMMARY

Generally, the present invention provides an intelligent stepper assisted lighting system with automatic light intensity adjustment for variable ambient conditions and for motion sensing security, movable light panels for variable coverage or to follow detected motion with possible real time recording of motion in the vicinity of the lights, programmability for intensity and motion control where there are factory assigned defaults that the user can augment by reprogramming various features, thermal control of light panels for all weather conditions, alarms and component failure notification, electrical interface capability for connecting to computers and control or display devices for control and reporting, and various mounting capabilities and lighting configurations. The rotatable, movable light panels may be electromechanically pivotal. The luminaires of the present invention may feature various enclosures for different applications. Such systems may have a variety of enclosures for different applications.

In these respects, the stepper assisted intelligent lighting systems, according to an embodiment of the present invention substantially departs from the conventional concepts and designs of the existing technologies, and in so doing provides an apparatus primarily developed for providing stepper motor assisted advanced intelligent lighting systems. The light sources can be integrated in one or more electromechanically pivotal-rotatable light panels in a fixture to provide light with a wide field of coverage with advanced default, user defined, selected, and/or programmed directional and intensity settings.

The present invention relates generally to a servo/stepper assisted lighting technology system. The servo/stepper assisted lighting technology system may be referred to throughout this disclosure in the shorthand "S.A.L.T." without limitation. More specifically the present invention relates to S.A.L.T. systems for providing advanced control over light sources and light fixtures to direct and rotate one or more light panels, having one or more light sources per panel, within one or more light fixtures. The S.A.L.T. system may vary beam angles of the light panels horizontally and vertically, intensity of a plurality of light panels, and color of one or more lighting panels configured with various advanced controllers, options, parts and accessories of the system to create various lighting systems and lighting product lines. These systems may include wired and wireless controlled lighting systems and their respective controls, including lighting systems controlled from computers, mobile phones, remotes, or other digital devices. The systems can use a variety of light source technologies, such as light emitting diode (LED).

The present invention also relates generally to intelligent lighting systems and more specifically a stepper assisted advanced intelligent lighting system. The present invention may include a stepper motor to control light sources integrated in electromechanically pivotal-rotatable light panels to provide light with a narrow, intermediate, or wide field of coverage. The system may use advanced default, and user defined, selected, and/or programmed directional and intensity settings.

In view of the foregoing disadvantages inherent in the known types of lighting systems of the existing technologies, the present invention provides a new servo/stepper assisted lighting technology system construction for providing advanced control over light sources and light fixtures to direct and rotate a plurality of light panels within one or more light fixtures. The system may vary beam angles of the light panels horizontally and vertically, intensity of a plurality of light panels, and color of the lighting panels via advanced controllers. The system may operate wired and wirelessly. The lighting systems may be controlled from computers, mobile phones, remotes, or other digital devices. The systems can use a variety of light source technologies, such as, light emitting diode (LED) technology.

The general purpose of the present invention, which will be described subsequently in greater detail, is to provide a new servo/stepper assisted lighting technology system with advantages over existing designs and many novel features that result in new servo/stepper assisted lighting technology systems which is not anticipated, rendered obvious, suggested, or even implied by any of existing technologies lighting systems, either alone or in any combination thereof.

The present invention generally may include LEDs or other light source technologies of various lumen values mountable on movable light panels to produce stepper or servo controlled light fixture models. The fixture models may include servo or stepper motors, ball-screw devices, worm or other gears, solenoids, other motors, mechanisms, and/or other motion devices to affect movement of light panels. The invention may include infrared light sources, such as for surveillance and security, camera(s), lenses/filters of various colors and transparencies, secondary optics including bullet resistant lens/filter models, and/or reflectors.

Moreover, the invention may include various types of sensors and associated sensor circuitry, security applications including motion sensors and interfaces for light activation, camera activation, and/or recording device activation. The invention may further include intensity control circuits including ambient light intensity sensor, motion sensors and motion sensing circuits, a thermal management regulation circuit having heating and cooling capabilities, a temperature sensor or thermistor, an individual fixture controller user interface to control individual fixtures with display, a master control room controller user interface to control multiple fixture units and/or groups of luminaires with a display, other displays or computer interfaces, an internal timing circuit, heat sinks, a fan, a heating element, a heater and heating circuit, optional wire-infused heated lenses, at least one lens filter and/or light diffuser, secondary optics, reflectors behind light sources on lighting panels, an enclosure, one or more seals-gaskets for proper thermal and moisture isolation, purge valves for condensation and moisture control, a control circuit, alert-alarm-status circuits, GPS circuits, optional camera(s), optional RF circuits, a power supply, rechargeable batteries, solar cell(s), and an optional fault tolerant switching circuit. The invention may include an optional fan and an optional liquid cooling system (with an optional heat pump).

The invention may include laser communication systems with bidirectional capabilities, such as including multiple laser communications systems in a fixture with networking capability. The system may also include GPS and related circuitry for communicating repair and status alerts and alert circuitry to give fixture location for repairs. The invention may include power switches to energize the controllers depicted, selectable power switches on a controller to energize individually selected light panels on a single fixture, selectable power switches on controller to energize selected fixtures or groups of fixtures, and/or various controllers with similar or different features designed to control a plurality of light panels within a light fixture. The invention may include a laser (for control signals and data communication, audio communication, video communication, other communications), for industrial cutting as well.

The invention may include wireless radio frequency controls, (RF) control electronics circuits for wireless control including transmitters and receivers for control and optionally for audio, secure mobile controller devices with related circuitry, logic and/or software to control lighting through a mobile device such as a cell phone, a digital device, a computer, or a wireless remote control device. The system may also include one or more microphone, a microphone jack, and/or software to control lighting and intercom speakers on the light systems through a control device for one-way or bidirectional communication. Additionally, the invention may include thermal management elements including heat sinks, fan (optional), heater, vents, control and alert circuitry, purge valves for condensation control, seals for proper thermal and moisture isolation. The system may include bullet-resistant and standard non-bullet resistant enclosures of materials including metal and thermally suitable plastics. The system may include or power supplies suitable for an anticipated load. The present invention may include combinations of the above items and/or subsets of the above items.

LEDs or other light source technologies may be included with various lumen values mounted on movable light panels to produce different stepper or servo controlled light fixture models. The light sources may be connected to servo or stepper motors, ball-screw devices, worm or other gears, solenoids and other motors, mechanisms and/or other motion devices to affect movement of lighting panels. The invention may include various types of sensors and associated sensor circuitry. Security applications make use of S.A.L.T. Lighting Systems including motion sensors, circuits, and interfaces for light activation, camera activation, recording device activation, or control and activation or turning the power on to any device.

In an embodiment of the present invention, dual stepper motors may be used per each electromechanically pivotal-rotatable light panel for X-Y coordinate directional control and positioning of the light panels that contain one or more light sources. In an alternative embodiment, light fixtures can have one stepper motor per light panel to have only X or Y positioning capability instead of both X and Y positioning ability. Each light fixture may include three light panels having one or more light sources on each light panel, such as LED light sources, without limitation. In alternative embodiments, different numbers of light panels and different numbers of light sources and different types of light sources, such as halogen, fluorescent, and other technology types can be used within a light fixture luminaire.

One or more light intensity sensors may be built into the light fixture to sense a lumen rating of the installed light panel light sources. The sensors may alert users if illumination by a light fixture is less than the rated lumen value and can further determine if the Light Fixture meets default or user-defined brightness levels. Ambient light intensity sensors may determine if dusk or dawn have commenced automatically turn on or off the lighting systems where such ambient light sensors continually monitor surrounding light to turn lights on or off.

In one embodiment, four motion sensors may be included in each light fixture to determine X and Y direction of motion. Different numbers of motion sensors can be used for alternative embodiments without limitation.

The thermal management circuit may include a temperature sensor and/or thermistor to sense temperature of the light fixture to control heating and cooling of the light fixture and to also provide alerts, alarms, and status of light fixtures in operation. A thermal management circuit may include heat sinks, heating elements to warm the light fixture internally if it is too cold or frozen, or a wired-heating element in the lens filter or light diffuser to eliminate ice or condensation. Optionally, an electronic fan or liquid cooling system (with optional heat pump) can be further utilized to cool the light fixture.

An advanced power supply may provide surge and line conditioning protection, for soft start and shut downs to extend the life of the light sources, to provide clean power, to provide variable power needed for different default and programmed brightness requirements, and to provide an interface with rechargeable batteries that power circuits to provide alerts in brown out or black out power outages. A solar battery may provide power to recharge the batteries for alerts. Further, sensors and alert reporting circuits may provide power outage and other alerts and such circuits may be powered by harvesting energy from surroundings.

In one embodiment, three types of user interface controllers and displays, which may include one keypad controller and display that controls an individual light fixture, a master keypad controller and display that controls one or more groups of light fixtures that can be installed in a central control room location, and a computer interface with software that allows light unit fixtures to be connected to a computer system.

The timing circuit serves a variety of functions including providing date-time stamps of sensor findings and to send a date-time stamp with an alert or alarm sent or streamed to keypad or other user interface-controller(s), display(s), and computers so a log of activity can be kept if desired of sensor findings and to report operating status and to send a date-time stamp each time motion is detected by individual light fixtures.

Heat sinks are attached or built into the light fixture enclosure and/or onto the light panels themselves. A fan or liquid cooling system (with an optional heat pump) is optionally included in a light fixture to help cool the light fixture and/or to circulate warm air in a cold light fixture if required by the thermal management circuit. An optional wired-lens or wired-light diffuser may be included with the thermal management circuit that heats the lighting fixture lens or light diffuser to melt ice or eliminate condensation or fog when activated by the thermal management circuit.

One or more lens filters and/or light diffusers may be included in the fixture to seal the unit with a transparent or semi-transparent cover to transmit light through the light fixture while protecting internal components. The lens filters or light diffusers may be tinted to allow the desired lighting effect for fog or other considerations for different applications.

Secondary Optics may optionally be included to trim, narrow, or expand the beam angle of light sources on light panels for various lighting applications. Reflectors may be included behind light sources on the lighting panels to reflect light outwardly through the lens filters and/or light diffusers from the internal portions of the light fixture.

The standard enclosure can be made of aluminum, alloys, other metals or thermally suitable plastics. Optionally, a fixture may be lowered from the mounting post for convenience in maintenance. This could be achieved with a motorized cable system. After raising the fixture to its operational position, there may be a mechanism to twist and lock the fixture into place with a self-positioning coupling.

One or more purge valves are optionally included within an enclosure to vent gasses and/or liquids outside the fixture enclosure for condensation and moisture control and/or to equalize pressure.

The user interface controllers and fixture control circuits may contain all of the elements that provide complete control of the lighting system, including a numeric portion of the keypad, directional control unit, brightness control interface, software control and sufficient displays to provide information about the system status. The Alert-Alarm-Status Circuit may provide operating status information of the various circuits within the intelligent light fixture system where such information is sent along with date-time stamps. Alert-Alarm-Status circuits may further provide information from each separate individual light fixture location via a GPS derived location of each light fixture, which may send sensor data and findings, an alert-alarm, status message, audio/visual warning, or other messages. The GPS circuit within a fixture may provide location information of the fixture to the alert-alarm-status circuit upon transmission of an alert, alarm, status message, or warning to the keypad controllers, displays, and/or computers.

The system of the present invention may optionally include a camera, RF circuits, rechargeable batteries, solar cells that recharge batteries, and a fault tolerant switching circuit that rotates spare light panels into position to replace faulty light panels. The invention may include combinations of the above items, or subsets of the above items, without limitation.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the description and should not be regarded as limiting.

OBJECT OF THE INVENTION

A primary object of the present invention is to provide servo/stepper assisted lighting technology systems that will overcome the shortcomings of existing devices.

An object of the invention is to provide a plurality of light panels with servo motors, stepper motors, other motors, solenoids, gears, and/or similar mechanisms to direct light in varying forward and peripheral directions to shine light forward from a light fixture, through the peripheral sides, or to the back of a light fixture. Similarly, the present invention may include light panel rotation of between 180 degrees and 360 degrees to allow light panels to shine light forward, through the peripheral sides, or towards the back of a light fixture.

An object of the invention is to provide a user to save different light intensities, light panel rotation, direction of illumination, monochromatic color for illumination, multi-color light panel illumination configurations, and/or duration of illumination from a light source in memory that can later be scrolled through, recalled and, utilized. Additionally, object of the invention is to allow a user to rotate light panels to a desired position for illumination, settings relating to such being savable in memory that can later be scrolled through, recalled, and utilized.

Additionally, an object of the invention is to allow changing color emanating from one or more multicolor light panels within a light fixture, program shining a desired color frequency where and when desired, saving different colors in memory along with a duration for displaying each color, using a timing circuit for when the colors should change, how long each color should be displayed, and to have the ability to step through saved settings and cycles to allow a light fixture or light panel to shine a desired color for a saved time interval. An object of the invention is to provide stepping through to subsequent saved colors and profile for an interval until all saved colors and intervals are complete with an optional repeat cycle that can continue or terminate on a number of repeat cycles or time and date.

An object of the invention is to selectively change the color emanating from one or more light sources or light panels remotely with a wired or wireless controller to change the color to alert an employee of a business or industrial condition or process to increase productivity in business or industrial applications. An object of the invention is to provide control of individual light panels within a plurality of light panels within a fixture to vary each light panel individually for rotation, direction, or position.

An object of the invention is to provide selective control of individual or groups of light panels within a plurality of light panels within a fixture to vary each light panel simultaneously and/or individually for light intensity, color, combination of colors, rotation, direction, or position. Moreover, an object of the invention is to provide selective control and creation of groups of individual light panels to be controlled, save groups of individual light panels, and delete groups of individual light panels within a plurality of light panels within a single fixture to vary each group of light panels simultaneously or individually for rotation, direction or position. An object of the invention is to select, control, create groups of fixtures, save groups of fixtures, and delete groups of light fixtures from an array of light fixtures to control each light fixture's individual light panels to vary each light panel of the chosen light fixture or group individually or simultaneously from an array of light fixtures to control each light fixture's individual light panels to vary each light panel of the chosen light fixture individually and/or simultaneously for rotation, direction, position, light intensity, or color.

An object of the invention is to provide lock and/or unlock controller functions to prevent accidental changes to the position, rotation, or angle of light panels; or to prevent accidental changes to light intensity, and/or accidental changes in color. Additionally, an object of the invention is to provide separate control over peripheral lighting panels and mechanisms to rotate peripheral light panels in inward and outward directions concurrently with respect to a further light panel that shines light in a forward direction. An object of the invention is to provide control for vertical adjustment of the array of light panels by groups or individually within a fixture. An object of the invention is to provide a reset button to change the rotation angle, position, intensity, and color of the light panels within a fixture to a default horizontal or to a default vertical position.

An object of the invention is to provide ergonomic displays to illustrate which light panels within a fixture are selected, or to illustrate what groups of light fixtures are selected along with their respective light intensity values, position values of rotated light panels, or color selection of light panels or fixtures. Another object of the invention is to provide an ability to communicate sound or audio from a controller with a microphone or from a wired or wireless remote controller having a microphone or microphone jack that communicates to a light fixture having a speaker to create an intercom system.

An object of the invention is to communicate sound or audio from a controller with a microphone or from a wired or wireless remote controller having a microphone or microphone jack that communicates to a selected light fixture or a light fixture socket having a speaker to create an intercom system that also allows one to mount light sources into the light socket to deliver sound or audio through the light socket and to selectively turn light sources on or off, to control intensity, and to control direction of the light sources as well as to communicate audio through the light socket's speaker or the light enclosure's speaker.

An object of the invention is to step through saved settings such as saved light intensities, light panel positions, or color choices, which may include using randomizing algorithms activated by selecting a button, automatically, randomly, activated by sound, and/or via rhythms of music An object of the invention is to provide bidirectional wireless, wired, laser, and/or satellite communication system circuits to communicate data and/or to control one to bidirectional wireless and/or wired communications enabled light fixture systems with networking capability. An object of the invention is to provide sensors and sensor communication system circuits with GPS to communicate sensor data and sensor location from lighting fixtures having sensor and GPS circuits to communicate sensor and location data through wired or wireless means to controllers, to satellites, to cell phones, to remote devices, to wireless devices, to communication networks, and to computers. An object of the invention is to provide capability to add one or more threat sensors of various kinds for a multitude of applications to detect biological, chemical, radiological, flammable liquids, explosives, health or other threats, which other sensors could be used in applications such as manufacturing, industrial, quality control, scientific, engineering, biometric, weather, and other applications.

An object of the invention is to provide energy efficient light sources. An object of the invention is to provide control ability to direct light through advanced logic and circuitry using stepper motors, servo motors, solenoids, programmable controls, mechanisms and assemblies. Additionally, an object of the invention is to provide intelligently direct the position of lighting panels through default, programmed, and/or through user-defined settings. Moreover, an object of the invention is to intelligently fine tune lighting direction and intensity through programmed and user-defined settings.

An object of the invention is to provide advanced intelligent thermal management features; advanced security and surveillance features making use of intelligent logic and circuitry; manual, programmable, default and automatic modes; proprietary control algorithms that allow better positioning of electromechanically movable light sources on light panels; overlap light coverage from multiple light panels to reduce energy requirements and to provide better light coverage; proprietary operating modes and controls; features that ease installation and maintenance; and configurable system operation.

An object of the invention is to provide substantially sealed, protected system enclosures, which may include controllable light sources or light panels per luminaire. Reflectors may be included for better light coverage in a lighting system with a plurality of light panels.

An object of the invention is to provide X-Y coordinate controlled light panels and beaming with reflectors that move via servo/stepper motors, solenoids, mechanisms and assemblies. Advanced sensor and logic circuitry may control operative features, brightness, lighting direction, and programmable light intensities. Lumen capacity may be increased via overlap of light beams from electromechanically pivotal light panels in a single luminaire having servo and/or stepper motor control.

An object of the invention is to provide programmable logic circuit positioning and control of lumen requirements. Lighting may be provided with high lumens output and greater Light Coverage than conventional technologies using fewer units by reducing the number of conventional luminaires used due to light overlap from a plurality of light panels to light an area thereby reducing energy, installation, and maintenance costs. An object of the invention is to provide energy savings from light overlap electromechanically pivotal light panels rotated and/or moved from stepper controlled motors, servo motors, solenoids, mechanisms and/or assemblies and from using energy saving light sources such as light emitting diodes (LEDs) or other energy efficient light sources.

An object of the invention is to reduce replacement costs through component logic, motorized cable lowering features that lower the luminaire from a post, and by using long life Light Emitting Diodes (LEDs) or other long life and energy saving light sources.

An object of the invention is to provide factory-set, pre-programmed, programmable, user-defined, and default intensity settings. Responses via sensors may control the luminaire and provide audible and/or visual alerts and alarms. Intensity and direction of lighting may be controlled utilizing light panels with light sources with unique feature sets.

An object of the invention is to provide one or more types of light sources and enclosures using electromechanically pivotal and/or rotatable light panels, such as having weatherproofing features. Advanced controllers and control-display systems, such as proprietary panning or tracking features, may move light panels to follow humans and/or objects via motion and other sensors with advanced logic and to include default and/or user-defined programming and settings. The advanced control interfaces may include keypads, and displays, with audible and/or visible alerts and status reporting.

An object of the invention is to provide advanced features for mounting and dismounting luminaires from light poles or other installations via motorized cables that can unlock and lower the luminaire, or raise and lock the luminaire into operating position through a self-positioning coupling. A proprietary power supply may dynamically vary and interface with rechargeable back-up batteries to provide power requirements for different energy settings to vary brightness and to supply power to motors, sensors, and to alert-status reporting circuits. Moreover, sensors and alert-status circuits may operate from battery backup if power goes out or as such circuits may operate from harvesting energy from surroundings. An object of the invention is to provide drone maintenance techniques where a drone can send a control signal to disconnect power couplings, and later to connect them, and to electromechanically and/or electromagnetically, or magnetically attach itself to remove and reinstall lighting luminaires and induction plate drone recharging platform(s) to disconnect them from light poles or towers or as such devices might be attached to or in buildings where a drone can lift and replace a luminaire or an induction plate drone recharging platform for maintenance with automatically unlocking and locking mechanisms and automatically locking and unlocking power couplings.

To the accomplishment of the above and related objects, this invention may be embodied in the form illustrated in the accompanying drawings, attention being called to the fact, however, that the drawings are illustrative only, and that changes may be made to the specific construction illustrated.

According to an embodiment of the present invention, a lighting system is provided including one or more movement system, light source, sensor, and controller. The movement system may include a motor to rotate a panel. The light source may be installed to the panel to emit light in a spectrum, the panel being repositionable via the movement system. The sensor may detect a condition of an environment. The controller may include a processor and memory to execute electronic logic communicably connected to the movement system, the light source, and the sensor. The controller may control characteristics of the light emitted by the light source, the controller controlling rotation of the panel by the movement system(s), and the controller receiving signal information from the sensor(s). Settings are programmable to the memory by the controller relating to operation of the movement system and the light source, the settings being retrievable from the memory to be executed by the controller and affect operation of the movement system and the light source.

In another aspect, the sensor may include a motion sensor to detect an object in the environment, wherein upon detection of the object communicating data to the controller, and wherein the controller controls the light source in response to the data from the motion sensor to track and illuminate the object.

In another aspect, a surveillance system may be communicably connected to the controller to monitor and detect the condition.

In another aspect, optics may be included to affect the light emitted from the light source, the optics further including primary optics to affect the characteristics of the light and secondary optics to affect a direction the light travels.

In another aspect, a communication system may be included to transmit data between the controller and an external device, the light source and the movement system being remotely controllable by logic received using the controller via the communication system.

In another aspect, an intercom system with a microphone connection and a speaker may be included communicating audio data between the lighting system and the external device via the communication system.

In another aspect, the controller may communicate maintenance information via the communication system, wherein location and status are communicable to initiate maintenance service.

In another aspect, a user interface may be included to interface with the controller. The user interface may be usable to define and recall the settings. The user interface may be usable provide the logic to the controller to affect operation of the light source and the movement system. A user interface or touch screen with a variety of GUIs (Graphical User Interfaces), or other ergonomic user controls with a variety of interfaces and menus may be included.

In another aspect, the light source, the movement system, the controller, the sensor, and the communication system are installable in a drone. An object is detectable by the sensor of the drone. The object is illuminable by the light source of the drone. Data is communicable between the drone and the external device via the communication system of the drone. Camera(s), sensor(s), microphone(s), speaker(s), with extra jacks and connectors to add additional such devices, may be included in luminaires for indoor, outdoor, vehicular, and special purpose lighting where said devices can also be installed on a drone.

In another aspect, the communication system may operate wirelessly. The drone may be communicable with additional drones to exchange data regarding status and coordinate operation, and wherein the drone transmits a homing signal detectable by the external device to provide location information about the drone. Status may be used to control the drone, to coordinate operation with other drones, and where a drone can sense a homing signal to an inductive plate drone recharging platform, get GPS coordinates, go to recharging platform, dock, lock in place, remain securely locked in place at rest and or be made ready for further activation and flight, or to rest at and be put in standby mode.

In another aspect, the drone executes diagnostics to detect a status, wherein the drone communicates the status via the communication system. Upon detecting the status not in compliance with an expected status, the drone may remove itself from an operating location and relocate to a maintenance facility substantially autonomously. The drone may relocate itself from the maintenance facility or storage to the operating location substantially autonomously.

In another aspect, the drone is dockable to a charging plate at an operating location, wherein the charging plate transmits electric power for storage by the drone, wherein the electric power is transmittable via induction; wherein the drone is temporarily lockable to the charging plate.

In another aspect, a power system may be included to affect a power state of an operatively connected component of the lighting system, a switch being includable by the power system to control the power state of the component.

In another aspect, an alert system may be communicably connected to the controller and the sensor to analyze the environment, compare a result of the analysis to an expected condition for compliance, and generate an alert if the condition is out of compliance with the expected condition.

In another aspect, a housing may substantially enclose at least the light source, the movement system, and the controller.

In another aspect, the housing is mountable to an operating location, wherein the housing is removable from the operating location via a motorized cable system, wherein the housing is lockable to the operating location during operation and unlocked from the operating location during removal.

In another aspect, the housing further includes a seal and a climate management system to control at least temperature and moisture, purge valves being includable by the climate management system to vent the moisture detected beyond a threshold level.

In another aspect, thermal management components may be included to affect a temperature around the light source and the controller. A thermistor and heat pump may be included by the thermal management components.

In another aspect, the communication system may be wirelessly communicable with wearable apparel including apparel camera(s), apparel sensor(s), apparel microphone(s), apparel speaker(s); wherein conditions of an environment near the apparel is detectable by the apparel sensors of the wearable apparel; and wherein data is wirelessly communicable between the wearable apparel and the controller of the lighting system via the communication system. Apparel can have a microphone to receive a command in the form of a stored waveform that is matched with internal fuzzy logic that analyze audio inputs for recognizable waveforms that for example would allow a user to utter the word "light" or the words "light on" to turn the LEDs added to apparel ON and utter again the word "light" or the words "light off" to toggle the LEDs added to the apparel OFF. Similarly the other components, including but not limited to the sensor(s), camera(s), microphone(s) and other attached apparel, hat, pocket, or other devices can be made to operate or be controlled through voice commands In another aspect, the controller is updatable to selectively toggle activation of operative features.

According to an embodiment of the present invention, a lighting system is provided including a movement system, light source, sensor, controller, and communication system. The movement system may include a motor to rotate a panel.

The light source may be installed to the panel to emit light in a spectrum, the panel being repositionable via the movement system. The sensor may detect a condition of an environment. The controller may include a processor and memory to execute electronic logic communicably connected to the movement system, the light source, and the sensor. The controller may control characteristics of the light emitted by the light source, the controller controlling rotation of the panel by the movement system, and the controller receiving signal information from the sensor. The communication system may transmit data between the controller and an external device, the light source and the movement system being remotely controllable by logic received using the controller via the communication system.

The light source, the movement system, the controller, the sensor, and the communication system are installable in a drone. An object is detectable by the sensor of the drone. The object is illuminable by the light source of the drone. Data is communicable between the drone and the external device via the communication system of the drone. The drone may execute diagnostics to detect a status. The drone may communicate the status via the communication system, wherein upon detecting the status not in compliance with an expected status, the drone removes itself from an operating location and relocates to a maintenance facility substantially autonomously, and wherein the drone relocates itself from the maintenance or storage to the operating location substantially autonomously. The drone is dockable to a charging plate at the operating location, wherein the charging plate transmits electric power for storage by the drone, wherein the electric power is transmittable via induction, and wherein the drone is temporarily lockable to the charging plate.

Unless otherwise defined, all technical terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents and other references mentioned herein are incorporated by reference in their entirety. In the case of conflict, the present specification, including definitions will control.

BRIEF DESCRIPTION OF THE DRAWINGS

FIGS. 35-40 are spreadsheet tables showing light panel transitions using the zero default, according to various embodiments of the present invention.

FIG. 47 is a top plan view showing 360-degree double-sided light panel rotation, according to an embodiment of the present invention.

FIG. 51 is a diagram of sensor overlap, according to an embodiment of the present invention.

FIGS. 52-56 are perspective views of rotatable light panels, according to an embodiment of the present invention.

FIG. 83 is a flowchart of an illustrative sensor sampling operation, according to an embodiment of the present invention.

FIG. 84 is a flowchart of an illustrative external device sampling operation, according to an embodiment of the present invention.

FIG. 85A-85B are a flowchart of an illustrative drone sensor-camera-microphone sampling operation, according to an embodiment of the present invention.

DETAILED DESCRIPTION

Figure 1:
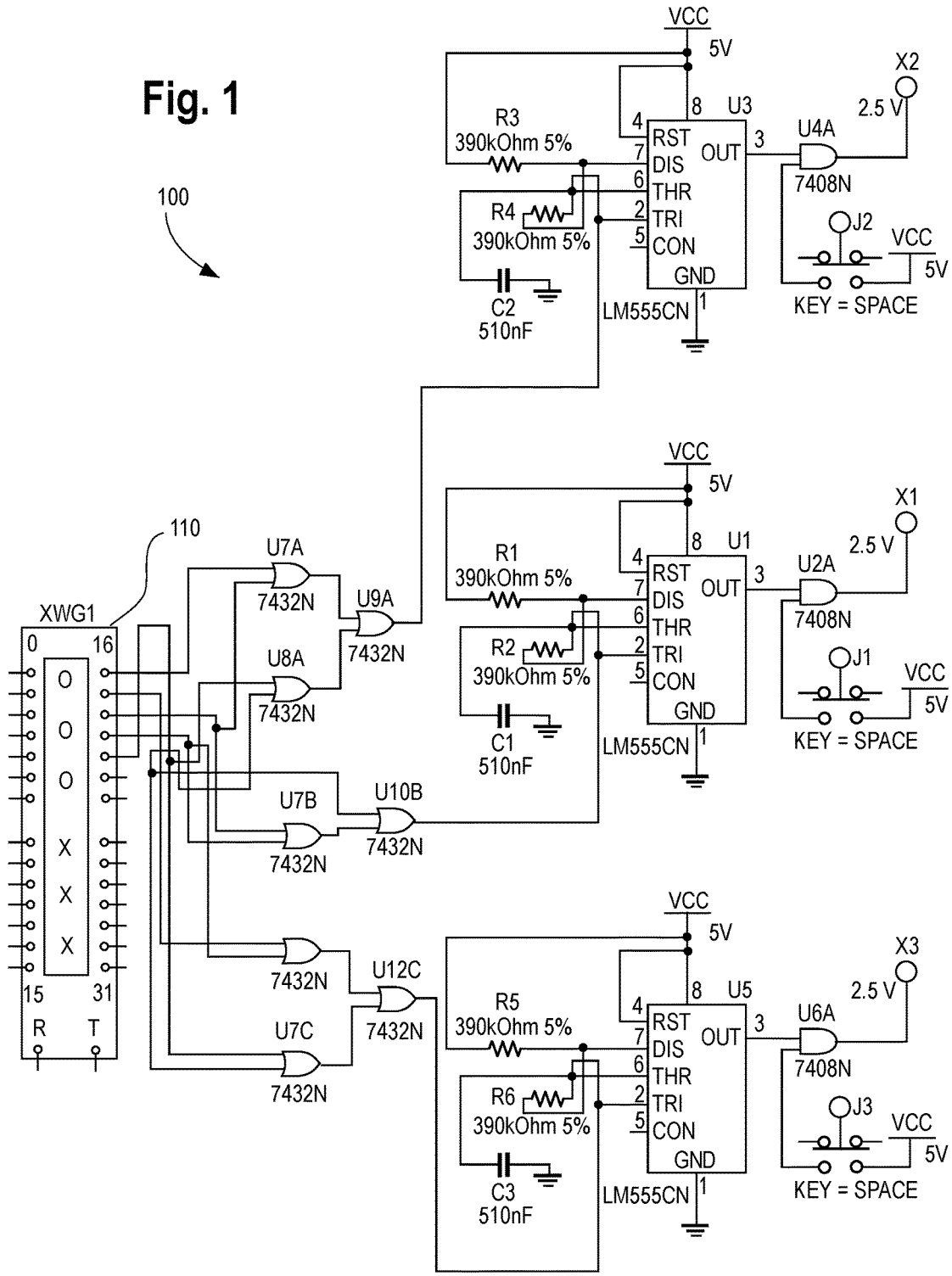
FIG. 1 is a control circuit to select panels for intensity and directional control, according to an embodiment of the present invention.

The present invention is best understood by reference to the detailed drawings and description set forth herein. Embodiments of the invention are discussed below with reference to the drawings; however, those skilled in the art will readily appreciate that the detailed description given herein with respect to these figures is for explanatory purposes as the invention extends beyond these limited embodiments. For example, in light of the teachings of the present invention, those skilled in the art will recognize a multiplicity of alternate and suitable approaches, depending upon the needs of the particular application, to implement the functionality of any given detail described herein beyond the particular implementation choices in the following embodiments described and shown. That is, numerous modifications and variations of the invention may exist that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

The present invention should not be limited to the particular methodology, compounds, materials, manufacturing techniques, uses, and applications, described herein, as these may vary. The terminology used herein is used for describing particular embodiments only, and is not intended to limit the scope of the present invention. As used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" may be a reference to one or more steps or means and may include sub-steps and subservient means.

All conjunctions used herein are to be understood in the most inclusive sense possible. Thus, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should be read as "and/or" unless expressly stated otherwise. Structures described herein are to be understood also to refer to functional equivalents of such structures. Language that may be construed to express approximation should be so understood unless the context clearly dictates otherwise.

Unless otherwise defined, all terms (including technical and scientific terms) are to be given their ordinary and customary meaning to a person of ordinary skill in the art, and are not to be limited to a special or customized meaning unless expressly so defined herein.

Terms and phrases used in this application, and variations thereof, especially in the appended claims, unless otherwise expressly stated, should be construed as open ended as opposed to limiting. As examples of the foregoing, the term "including" should be read to mean "including, without limitation," "including but not limited to," or the like; the term "having" should be interpreted as "having at least"; the term "includes" should be interpreted as "includes but is not limited to"; the term "example" is used to provide exemplary instances of the item in discussion, not an exhaustive or limiting list thereof; and use of terms like "preferably," "preferred," "desired," "desirable," or "exemplary" and words of similar meaning should not be understood as implying that certain features are critical, essential, or even important to the structure or function of the invention, but instead as merely intended to highlight alternative or additional features that may or may not be utilized in a particular embodiment of the invention.

Those skilled in the art will also understand that if a specific number of an introduced claim recitation is intended, such an intent will be explicitly recited in the claim, and in the absence of such recitation no such intent is present. For example, as an aid to understanding, the appended claims may contain usage of the introductory phrases "at least one" and "one or more" to introduce claim recitations; however, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C" is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.).

All numbers expressing dimensions, quantities of ingredients, reaction conditions, and so forth used in the specification are to be understood as being modified in all instances by the term "about" unless expressly stated otherwise. Accordingly, unless indicated to the contrary, the numerical parameters set forth herein are approximations that may vary depending upon the desired properties sought.

The invention provides an intelligent lighting system adaptable to numerous installations and uses. In general, the system includes a light source, movement system, surveillance system, optics, controller, sensors, communication system, power system, alert system, housing, and climate management system. Skilled artisans will appreciate additional elements that may be included with the intelligent lighting system of the present invention after having the benefit of this disclosure.

The light source will now be discussed. The light source may include light emitting devices, such as light emitting diodes (LEDs) or other lighting technologies. The light source may be configured with various lumen values. The light source may emit light in various spectra, such as visible, infrared, or other spectra. The light source may be mounted on movable light panels, which may be manipulated by the movement system, to produce different movement controlled light fixture models. The light source may include thermal management elements, such as heat sinks, fans, liquid cooling systems (with optional heat pump(s)), heaters, vents, thermal conductive tape or putty, heated lenses and/or filters, fuses, special thermal circuit protection shutdown mechanisms, and/or other thermal-related features.

LEDs or other light source technologies of various lumen values, colors, and/or wavelengths may be mounted on movable panels. The light source may include infrared LEDs, RGB LEDs, and other light source technologies including fluorescent, halogen, sodium vapor, high intensity discharge, or plasma. The light source may be mounted on rotatable light panels, which may be rotated using the movement system.

Referring to FIG. 1, an illustrative basic model of the Servo/Stepper Assisted Lighting Technology (S.A.L.T.) system includes an array of lights that allow control of intensity and direction. The basic model may have a configuration of multiple LED light panels in a single fixture arranged in a linear array. The features in this model include: 1) a wide field of coverage, 2) movable light panels for variable coverage, 3) factory assigned defaults for programming intensity and motion control, and 4) various mounting capabilities and lighting configurations.

The narrow/wide field may be created by using LED panels that have narrow/wide angle coverage and having three panels per fixture in linear formation. Light sources can vary in total angular coverage, with the electronics being modified to rotate panels as described throughout this disclosure. The default intensity is manually controlled by an ergonomic interface. The intensity and position of light panels may be pre-programmed to a number of specifications. The panel default positions can be pre-programmed for any number (e.g., seven) motion modes, including reset forward positioning. A plurality of panels may be provided depending upon the application. The mechanical and electrical properties described herein can be designed for any number of panels in a fixture. The fixtures may be designed to allow various mounting capabilities.

Figures 22, 23:
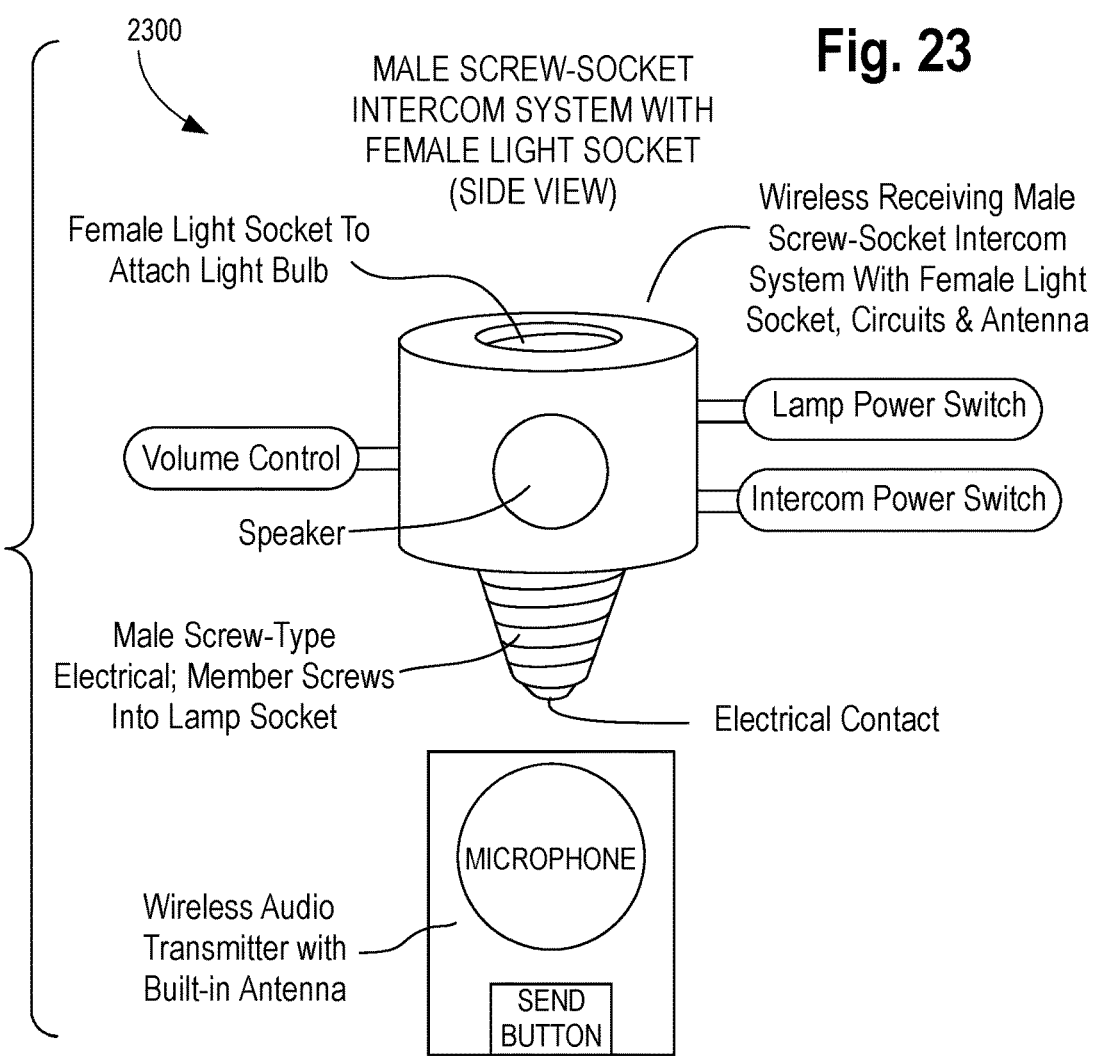
FIG. 22 is a state diagram table for mode selection, according to an embodiment of the present invention.
FIG. 23 is a block diagram of a portable wireless screw-socket intercom communication system, according to an embodiment of the present invention.

Panels may by selected by the user via a user interface, such as a keypad, touch screen, or other ergonomic user interface, which may be used with the controller. A keypad may be discussed as the user interface throughout this disclosure in the interest of clearly disclosing the invention and without limitation. The keypad may include a button for each panel that allows selecting that panel for intensity adjustment. The keypad will be discussed in detail below. Once the keypad input is received, a decoder may send the state to the enable pin of the selected panels. The state diagram for possible selections of the "mode" for this illustrative configuration is given in the table 2200 of FIG. 22. The signals from the mode selection decoder may be input to the full selector circuit 100 shown in FIG. 1, which may be performed via the demultiplexer 110.

Figure 2:
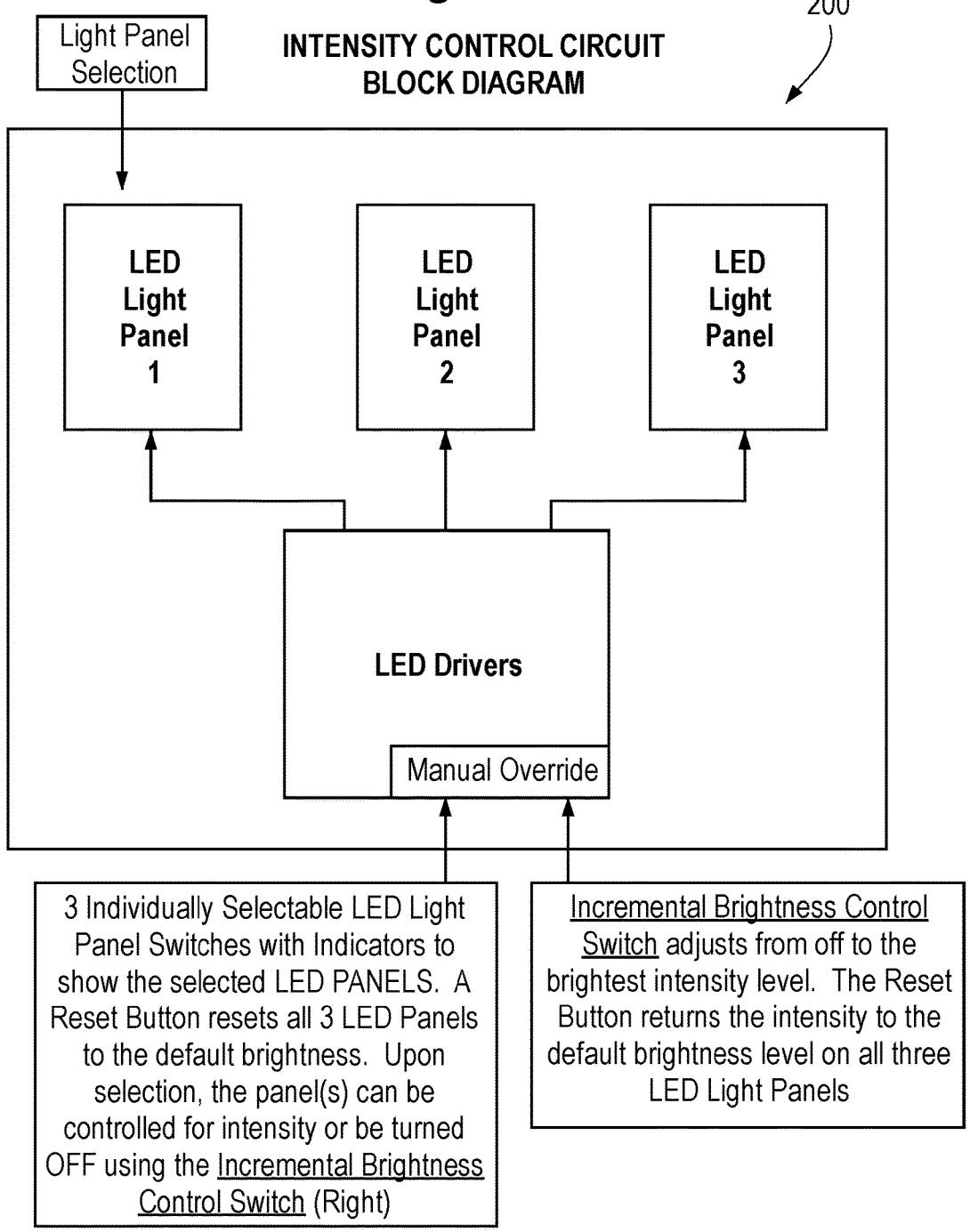
FIG. 2 is a block diagram of an intensity control circuit, according to an embodiment of the present invention.
Figure 3:
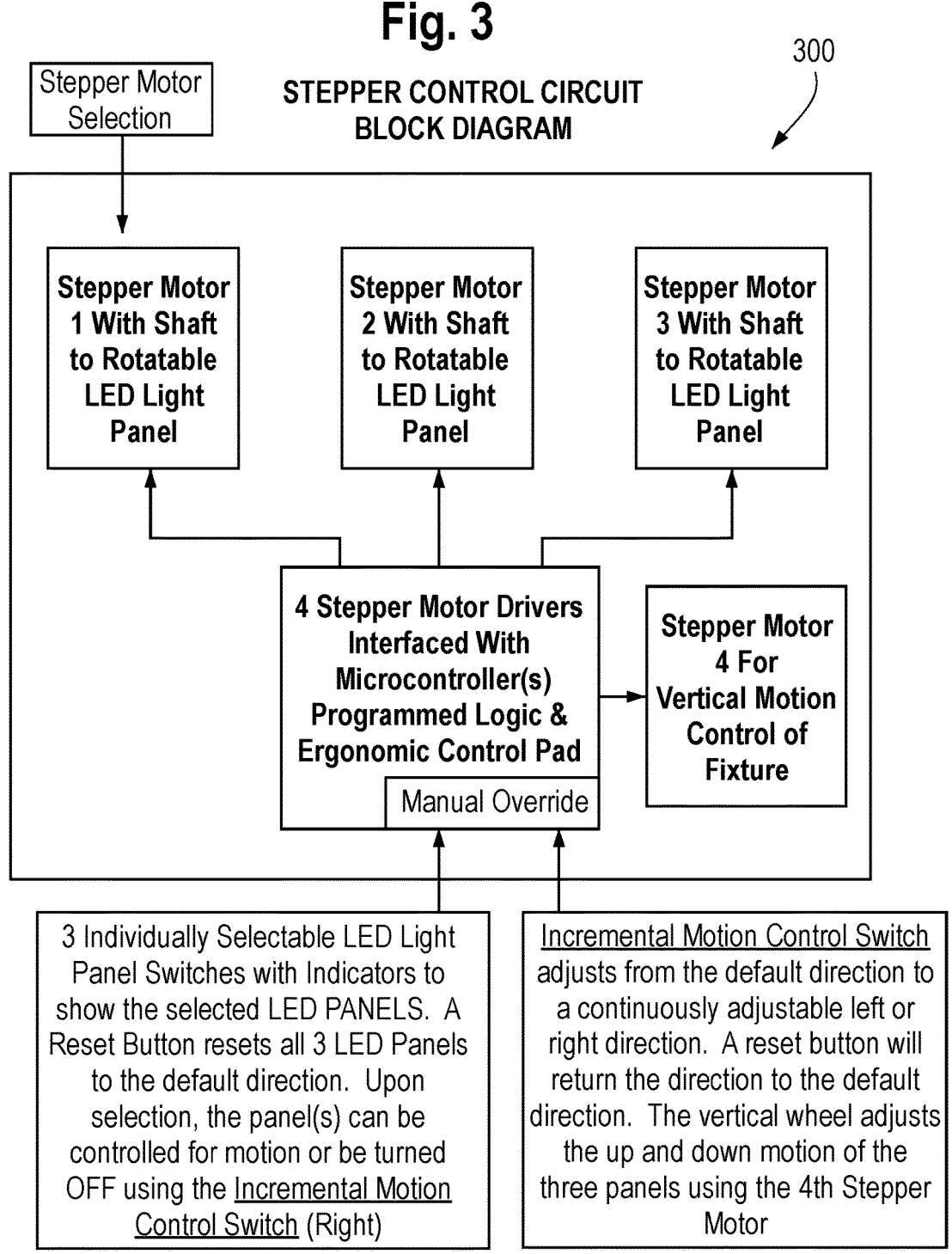
FIG. 3 is a block diagram of a stepper control circuit, according to an embodiment of the present invention.

An illustrative adjustability of the LED intensity in the S.A.L.T. system is provided in block diagram 200 of FIG. 2. Light levels may be continuously adjustable from off to high intensity levels. Intensities can be controlled for each panel or a combination of panels separately. In one example, only selected panels may change intensity, while others remain at their former intensity. The intensity of the selected panels may be adjusted by a sliding finger control to about continuously adjust the intensity from off to the highest level.

When the lights are turned off, the intensity may remain at the last setting for when they are turned on the next time. Enabling a "Reset Brightness" setting can return the intensity to a default mode (mid-intensity). There is also a manual mode.

The movement system will now be discussed. The motion system may include one or more motors, such as servo or stepper motors to affect movement of the light panels. The motion system may additionally include ball-screw devices, worm or other gears, solenoids, other motors, and/or other motion devices to cause movement of lighting panels.

Various rotation mechanisms may rotate light panels. For example, the movement system may include servo motors, stepper motors, micro stepper motors, hybrid motors, other motors, solenoids, electromechanical worm gears, other gears, and similar mechanisms. In one embodiment, stepper motors are coupled to an attached extended shaft. A lighting panel may be mounted to the shaft, which may be rotated by the shaft to a desired angular position. A light fixture with two light panels may have two extended shafts with a light panel mounted on each shaft. A light fixture with three light panels would have three extended shafts with a light panel mounted on each of the shafts and so on. The stepper motors may be controlled via the controllers.

In one embodiment, dual stepper motors are used per each electromechanically pivotal-rotatable light panel for X-Y coordinate directional control and positioning of the light panels that contain one or more light sources. In an alternate embodiment, light fixtures can be developed having one stepper motor per light panel to have only X or Y positioning capability instead of both X and Y positioning ability. In the preferred design of the light fixture, three electromechanically pivotal-rotatable light panels may be included in each light fixture having one or more light sources on each light panel. Preferably, LED light sources are used for greater energy efficiency and long life to reduce energy and replacement costs. In alternative embodiments, different numbers of light panels and different numbers of light sources and different types of light sources can be used within a light fixture.

A self-positioning mount coupling may be included with electrical mating contacts. A special coupling-mating collar may be provided on the light fixture and another in the mount area to connect and mate with each other physically to turn and put the light fixture into a one-way self-positioned operating position and electrically mate the light fixture with power for operation. The motorized cable mechanism and electrical mating electromechanical circuit may disconnect the fixture from power, from its locked operating position, and unlock it to allow a user to lower the light fixture for maintenance. Upon raising the fixture by the motorized cable mechanism, the special coupling-mating collar may allow the unit to reconnect with power in the proper physical operating position and lock back into place through electromechanical interfaces. A logic insert mating system may also be provided by coding each panel and any of the connecting components so that the proper component pairs are installed to each section of each lighting system. If the wrong component is added to the system, the system may prevent functioning. An alert may indicate that the wrong component is utilized to protect the design integrity, the operation, functionality, and the requirements of the system.

The surveillance system will now be discussed. The surveillance system may include cameras to monitor an environment, which may be mounted or located adjacent to a movable light panel. The surveillance system may work with the lighting system to illuminate an environment to be monitored. In one embodiment, the surveillance system may include an infrared camera to monitor an environment illuminated by infrared lights of the lighting system. Additionally, the surveillance system may include security features, such as sensors, motion sensors, light activation, camera activation, recording device activation, and/or virtually any other device activation, power-up, power-down, and control mechanisms and circuits for attaching and controlling one or more devices. In one embodiment, sensors can activate and control virtually any attachable wired or wireless device.

Various infrared light sources can be mounted on the light panels for surveillance or stealth operations. Illustrative applications of stealth operations include hunting, military, law enforcement, surveillance, and other monitoring applications. Various infrared light sources having different brightness and power levels may be included by the light source. The surveillance system may optionally include one or more camera, which may be mounted on light panels, in the light fixture enclosure, or on the outside of the light fixture. The cameras may include various types of lenses, including standard, wide angle, zoom, and telephoto. Cameras may operate in association with motion sensors, which may be built into the light fixture or connected wirelessly or wired via the communication system. Detection of motion may activate the camera to record what the camera sees in addition to activating white light, infrared, or multicolor light sources.

The optics will now be discussed. The optics may affect the light provided by the lighting system. In one embodiment, primary optics may include a lens and/or filters and may affect a characteristic of the light. Additionally, secondary optics may include reflectors and may affect the direction the light travels. The optics may be substantially transparent or semi-transparent. The optics may be constructed using various materials, including bullet and/or shatter resistant materials, composite materials, transparent or opaque polycarbonate, acrylic, glass, and/or other suitable weather proof and/or thermally suitable plastics. The optics may have various colors to affect characteristics for different applications, such as amber, yellow, or orange for fog lighting, and/or other colors for special effects. One or more lens filters and/or light diffusers may be included in the fixture to seal the unit and allow the transfer of light through the light fixture while protecting internal components.

Secondary optics and reflectors can be utilized to cover light sources and/or to reflect light to vary the beam angles and directions desired emanating from each light panel, narrow the beam angle to create more focused light, widen the beam angle, or focus the beam. Various light sources may have differently shaped secondary optics and reflectors for the beam angles desired. Reflectors may be included behind light sources on the lighting panels to reflect light outwardly through the lens filters and/or light diffusers from the internal portions of the light fixture.

The controller will now be discussed. The controller may include a processor and memory, and may execute programmable logic to affect operation of the lighting system of the present invention. The controller may affect operation of other elements of the lighting system. The controller may include circuitry, logic, and/or software to control lighting through a mobile device such as a cell phone, a digital device, a computer, or a wireless remote control device. The controller may interact with the light source, movement system, and/or optics to control operation of the lighting system. Additionally, the controller may interact with the sensors, alert system, and/or communication system to generate and communicate alerts, status, messages, provide control signals, and or communicate data.

Controllers may be included with similar or different features designed to control a plurality of light panels within a light fixture. Controllers for a two light and three light panel system are illustrated in this disclosure. However, controller designs and their features can be expanded to include other light panel configurations that have different numbers of light panels and that have different numbers of servo motor, stepper motor, solenoid, ball screw device, electromechanical worm gears and other mechanism configurations.

The controller may communicate with the communication system and may include wireless radio frequency controls (RF) and control electronics circuits for wireless control including transmitters and receivers for control and for audio (optional). Optional RF circuits and controls may transmit and receive control signals to operate the lighting systems as depicted in the controller functions. Further, RF circuits may send secure audio signals over a spectrum of frequencies to enable lighting systems containing a speaker to be utilized as an intercom system. RF transmission and receiving circuits may have built in antennas to transmit and to receive control signals, data signals, communication signals, and audio signals, spectral frequencies, and/or packets. The controller may operate with a remote or touch screen device.

Secure mobile controller devices may be included with related circuitry, logic, microphone, microphone jack, and/or software to control lighting and intercom speakers on lighting systems. The secure mobile controller devices may operate via a mobile device such as a cell phone, a digital device, a computer, laptops, remote control devices, a wireless remote control device, other digital devices, and wireless devices with related circuitry, logic and/or software, and/or mobile applications. Mobile devices may be used to control lighting systems and/or to send sound or audio to lighting systems or intercom systems that include speakers. Intercom systems that can receive audio from a transmitter may include lighting systems containing servo motors, stepper motors, or solenoid driven light panels, or they can include an intercom system built into a light lamp socket or in a wall plug in version as depicted and illustrated in the drawings and in the specification.

The lighting system may also incorporate a physical electro-mechanical computer interface to allow various lighting system units with lighting panels that can be automatically and/or manually controlled by a computer, mobile phone, remote, or other digital device and software. This also allows the units to be controlled by remote device, such as by using mobile applications installed on smart phones or other digital devices. Wireless transmitters and wireless receivers can further be used for wireless connections to control the lighting systems.

The sensors will now be discussed. The sensors may include analog and/or digital components to detect a condition in the environment. The sensors may additionally include circuitry to detect, process, and communicate the condition. GPS and related circuitry, or other triangulation-based location systems, may be included for communicating location information with conditions detected by other sensors and systems. Sensor(s) and their respective logic may be used to activate, de-activate, or control any wired or wirelessly attached device. The sensory data may be communicated using the communication system, alert system, and/or other systems of the invention. The communication may occur via the controller. In one example, location data may accompany repair alerts, status alerts, and alert circuitry to give fixture location for repairs. The sensors may additionally detect audio, for example, via a microphone, temperature, light, activation of the light source, camera activation, recording device activation, and other operational status of a system.

The lighting system may include various types of sensors and associated sensor circuitry. One illustrative sensor may detect ambient light to turn on the lighting systems substantially automatically. Audio sensors may direct the lighting systems respond to methodically and/or randomly step through saved lighting panel intensities, directions and positions of light panels, and color settings according to rhythmic beats provided by music or sound inputted through microphones. Other sensors may be included, without limitation, motion sensors to activate cameras, camera recording, turn on-turn off lights, or turn on and turn off and or control other devices attached wirelessly or through wired connections.

The sensors may interact with the surveillance system, such as for security purposes. For example, motion sensors, circuits, interfaces for light activation, camera activation, and/or recording device activation may communicate with the surveillance system. Various activation circuits may be connected to audio, motion, or ambient light sensors to activate lights and step the lights through saved light intensity settings, light panel position settings, and color settings. Further activation settings can turn on lights, attached cameras, or recording devices, including video and/or audio recording devices. Additional sensors may be utilized by activation sensors, including ambient light sensors to turn lights on when it gets dark, audio sensors to step through the various modes mentioned, and motion or other sensors to activate camera(s) LEDs, light sources, audio-visual recording devices, and virtually any wired and or wirelessly attached devices.

The sensors may determine location, for example, via triangulation. Global Positioning Satellite systems (GPS) and related circuitry may be included to communicate repair and status alerts and alert circuitry to give fixture location for repairs. GPS system circuitry may interact with the alert system to provide the location of a fixture and associated data such as control data, status messages, and alerts for repair where readouts on receiving controllers would receive data, messages, and alerts from a light fixture needing repair at a GPS location. Various GPS circuits can be used.

In the primary embodiments, one or more light intensity sensors may be built into the light fixture to sense the lumen rating of the installed light panel light sources and to report lumens given off by the luminaire. The sensors may also be used to alert users if the lumens given off by a light fixture are less than the rated lumen rating of the fixture and they are further used to determine if the light fixture meets default or user-defined brightness levels. An optional fault tolerant switching circuit may be connected to the sensors to rotate spare light panels into position to replace faulty light panels. Ambient light intensity sensors may be used to determine whether dusk or dawn have commenced to assist in the automatic turning on or turning off of the lighting systems.

In the primary embodiment, four (4) motion sensors may be included in each light fixture to determine X and Y direction of motion or more specifically the full spectrum of movement from −X to +X and from −Y to +Y. Skilled artisans will appreciate that different numbers of motion sensors can be used for alternative embodiments.

One or more other sensors can be included in the lighting fixture including sensors and sensor communication system circuits to communicate through the lighting fixture's GPS circuitry. Sensor data including sensor location from lighting fixtures having sensor and GPS circuits communicate sensor and location data may be communicated through wired or wireless means to controllers, satellites, cell phones, remote devices, wireless devices, communication networks, and computers. Other sensors can be included in the lighting fixture to sense one or more threats by utilizing sensors to detect biological, chemical, radiological, flammable liquids, explosives, health, or other threats. Further sensors can be used where the lighting fixture might include one or more sensors for applications for industrial, quality control, scientific, engineering, biometric, weather, security, vibration, stress, temperature, manufacturing, industrial processes, sanitation, food processing, agricultural production and quality control, warehousing, intermodal, railways, cargo, marina, river, great lakes, lake and pond management, port management, airport and security management, customs, high security facility containment, control, military recon, law enforcement border control management, intelligence gathering, national and global security, and countless other applications utilizing different sensors currently in the marketplace or as more sensors will be developed for present and future applications.

Sensors can be built into the light fixture. Sensors can be alternatively connected to the light fixture and the light fixture's GPS location reporting circuitry through wireless or wired means. A jack on the lighting fixture can also be included to plug in various attachable sensors and sensing systems (portable or otherwise) that can connect wirelessly or via wired connections.

The communication system will now be discussed. The communication system may facilitate exchange of information between the various components of the lighting system using transmitters and receivers. The communication system may communicate the information over various media, for example, via lasers, wired network, wireless networks, radio frequency (RF), or other communication protocols that would be apparent to a person of skill in the art. The communications system may facilitate bidirectional communication. The communication system may be included adjacent to one or more other components of the lighting system, for example, in an enclosure with the light source and movement system. The communications system may communicate, for example, data, video feeds, audio feeds, status conditions, sensory information, and other communicable content that would be apparent to a person of skill in the art.

In one example, one or more laser communication systems may be included with bidirectional capabilities locatable in a fixture with networking capability from controllers. Bidirectional laser communication systems may include laser transmission circuits and laser receiving circuits that decode laser communication signals and/or packets. Different types of communication lasers can be used.

The power system will now be discussed. The power system may be used to energize other elements of the lighting system. The power system may include a power source to supply power to the various components of the lighting system under a variety of load requirements. The power system may also include one or more switch to affect a power state of a respectively connected element. For example, a switch may control power transmission from a power source to a controller, fixture, and/or group of fixtures. Multiple power switches may be included to energize individually selected light sources, light panels, fixtures, groups of fixtures, or other components.

Various power switches can be used including switches, buttons, membrane switches, other switches, or software. Selectable power switches may be provided by the controller to energize individually selected light panels on a single fixture. Individual light panel switches may turn on or select each light panel in a fixture to enable different operations, such as selecting one or more light panels within a fixture to vary or change light intensity, light panel position, and/or a desired color in RGB LED models. Light panel switches can be buttons, switches, membrane switches, other switches, or software control. Other control switches on a controller can include touch sensitive incremental switches that can vary light panel rotation, light intensity, and color. The switches may be operated by a user sliding a finger or a thumb across the touch sensitive incremental switch from left to right or vice versa. Additional switches and controls may include a computer mouse, touch pad control devices, and/or other remote or digital devices with various control buttons and/or touch sensitive pads or interfaces.

Fixture-group switches can be buttons, switches, membrane switches, other switches, or software control. Other control switches on a controller can include touch sensitive incremental switches that can vary light panel rotation, light intensity, and color by a user sliding a finger or a thumb across the touch sensitive incremental switch from left to right or vice versa. Various fixture/group switches can be utilized.

An advanced power supply may provide surge protection, soft start and shutdowns, clean power, variable power needed for different default and programmed brightness requirements, and an interface with rechargeable batteries that power circuits to provide alerts in the event of a brown out or black out power outage. A solar battery may be included to provide power to recharge the batteries for alerts. Further, sensors and circuits that provide power outage and other alerts may otherwise be powered by technology that harvests energy from surroundings.

The alert system will now be discussed, which may include an Alert-Alarm-Status circuit. The alert system may generate alerts regarding a condition of the lighting system. The alert system may operate with one or more other system, for example, to sense a condition, analyze the condition, compare the condition with an expected condition, determine whether the condition is in compliance with the expected condition, generate the alert for the condition that is not in compliance, and communicate the alert, optionally with identifying information. Control and alert circuitry may communicate with GPS circuitry to allow individual light fixtures to send status and message alerts from a GPS fixture location when a light fixture might need repair or report status and settings of each light fixture location. Various control and alert circuits may utilize sensors and monitor circuitry for abnormal indications and communicate this information to the controllers through the controller's display readouts via a wired or wireless circuit mechanism.

The alert system may include a timing circuit to provide date-time stamps of sensor findings and to send a date-time stamp with every alert or alarm sent to keypad controller displays and computers, and to provide a date-time stamp each time motion is detected by individual light fixtures.

The housing and climate management system will now be discussed. The housing may include one or more elements of the lighting system. The housing may include an enclosure to protect the included elements from environmental conditions, which may be constructed using various materials obvious to a skilled artisan, including thermally suitable plastics. The enclosure may include one or more transparent portions, through which light emitted from the light source may pass. The enclosure may include toughened materials, such as bullet-resistant materials. The housing may additionally include seals and/or gaskets for thermal and moisture isolation. Seals and/or gaskets may line an area where the lens or lens filter meets the enclosure to create a weather resistant enclosure to protect electronic, mechanical, and electromechanical components from exposure.

The enclosure may be shaped to fit a desired number of light panels. For example, the enclosure may be shaped resembling a rectangle to accommodate three light panels. The enclosure may be large enough to include additional components, such as light source panels, servo or stepper motors and associated mechanicals to affect movement of lighting panels, thermal management elements, control circuitry, and alert circuitry. The housing may also accommodate purge valves for condensation control, lens filters including primary and secondary optics, seals and/or gaskets for thermal and moisture isolation. Furthermore, the housing may include GPS circuits and alert circuitry to give fixture location, camera, surveillance components, RF control electronics for wireless control, and/or power supplies.

The enclosure may fit all or subsets of the above while allowing for efficient thermal management. The enclosure may be constructed using various materials, such as, for example, aluminum, alloys, other metals, or thermally suitable plastics. Some materials may be bullet resistant. In one embodiment, the housing may be lowered from a mounting post for maintenance via a motorized cable system. Lowering the housing from an installed position may occur via a motorized cable system after unlocking or disconnecting the housing from an installed position. The housing may also be raised to its operational position. A mechanism may twist and lock the fixture into place with a self-positioning coupling. Drone replacement of fixtures may be included where the fixtures have self positioning couplings that also connect to power and control circuits where the luminaire or the drone recharging platform(s) are connected or disconnected from power couplings in the mounting mechanism as the luminaires or the recharging platforms are removed or replaced by a drone during maintenance operations.

Figure 7:
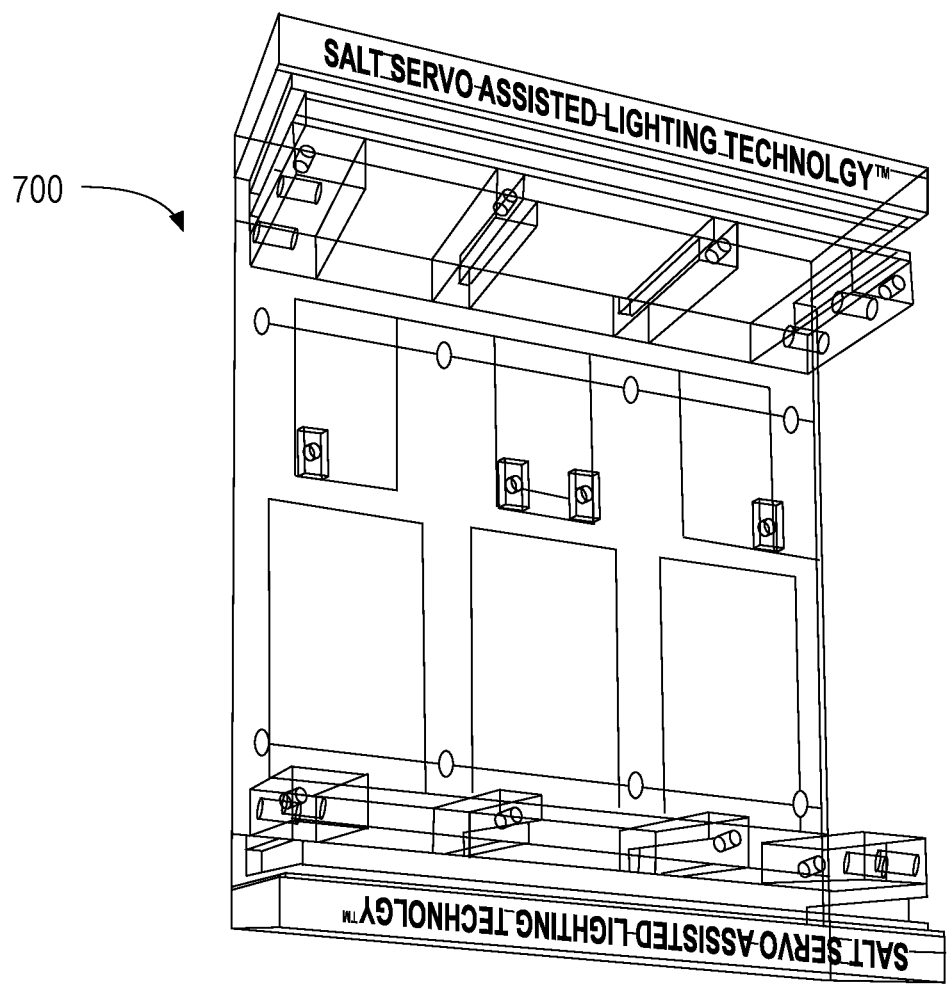
FIGS. 7-8 are perspective views of a S.A.L.T. system enclosure, according to an embodiment of the present invention.
Figure 8:
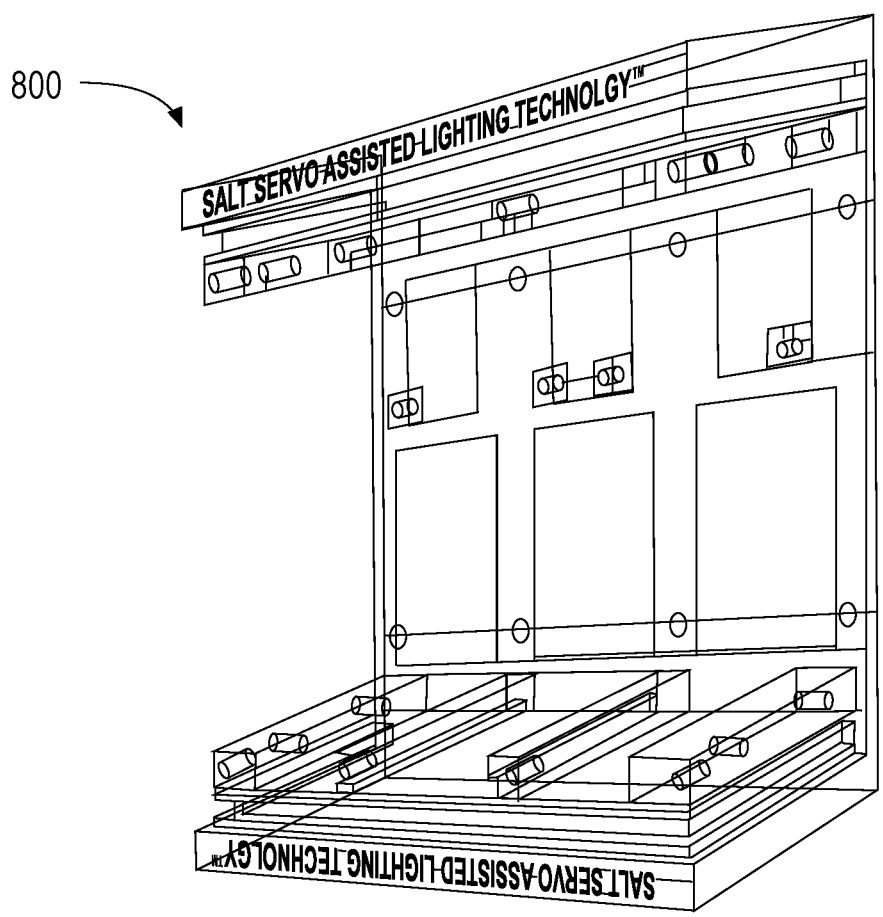

Positioning of the enclosures should be flexible in direction to allow for forward flood lighting, or sideways and downward for street and parking lot lighting and downward for building floor lighting. An illustrative example is shown in diagrams 700, 800 of FIGS. 7-8, respectively. The enclosure may include clearance on both sides of each light source panel for rotation of the light panels, for example, up to 90 degrees. The lens filters may wrap from the front of the light fixture to at least one side of the enclosure to facilitate illumination through the front and side of the fixture. The lens filter may wrap from the front to cover both sides of the fixture to facilitate illumination through both sides of a rectangular fixture Skilled artisans will appreciate additional variations of the enclosures and housings. Mounting brackets may be installed to the top, bottom, front, back, or any side. Expanders may enable multiple fixtures.

In one embodiment, various components of the lighting system may be mounted to the housing. The housing may additionally include intercom speakers operable via a microphone, locally connected controller, or remotely connected device such as a mobile phone or computer.

The climate management system may be operated to affect an operating condition of the lighting system. For example, the climate management system may include a heater to heat the interior of an enclosure in a cold environment. As another example, the climate management system may include fans, purge valves, seals, and other features to control temperature, humidity, condensation, and other environmental factors. Purge valves optionally control condensation within a fixture and may be located on the bottom or sides of the enclosure and may vent gasses and/or liquids outside of the fixture enclosure. The purge valves help control condensation and moisture and/or to equalize internal pressure of a fixture.

The thermal management circuit may include a temperature sensor or thermistor to sense temperature of the light fixture to control heating and cooling of the light fixture and to provide alerts, alarms, and status of light fixtures in operation. The thermal management circuit may include heat sinks, heating elements to warm the light fixture internally if it is too cold or frozen, and/or optional wired-heating element in the lens filter or light diffuser to eliminate ice or condensation. Optionally, an electronic fan, liquid cooling with an optional heat pump can be included to cool the light fixture.

Heat Sinks may be attached or built into the light fixture enclosure and/or onto the light panels. An electronic fan or liquid cooling (with optional heat pump) is optionally included in a light fixture to help cool the light fixture or to circulate warm air in a cold light fixture if required. An optional wired-lens or wired-light diffuser is included in various designs to interface with the thermal management circuit to heat the lighting fixture lens or light diffuser to melt ice or eliminate condensation or fog when activated by the thermal management circuit.

An illustrative motion control system is provided along with FIGS. 3-6 without limitation. Dual steppers may be included for proper positioning and rotation of panels having two-dimensional rotation capability. The three panels may be enabled to rotate in the x-direction (horizontal plane) and all three panels rotate together in the y-direction (vertically). The x-axis is the long axis joining the three panels in the fixture. The y-axis is perpendicular to the x-axis and is the shorter side of the fixture, rotating the panels together vertically. Thus, the stepper motor control circuit may allow the required number (e.g., four) stepper motors to be adjusted to the desired direction.

Figure 4:
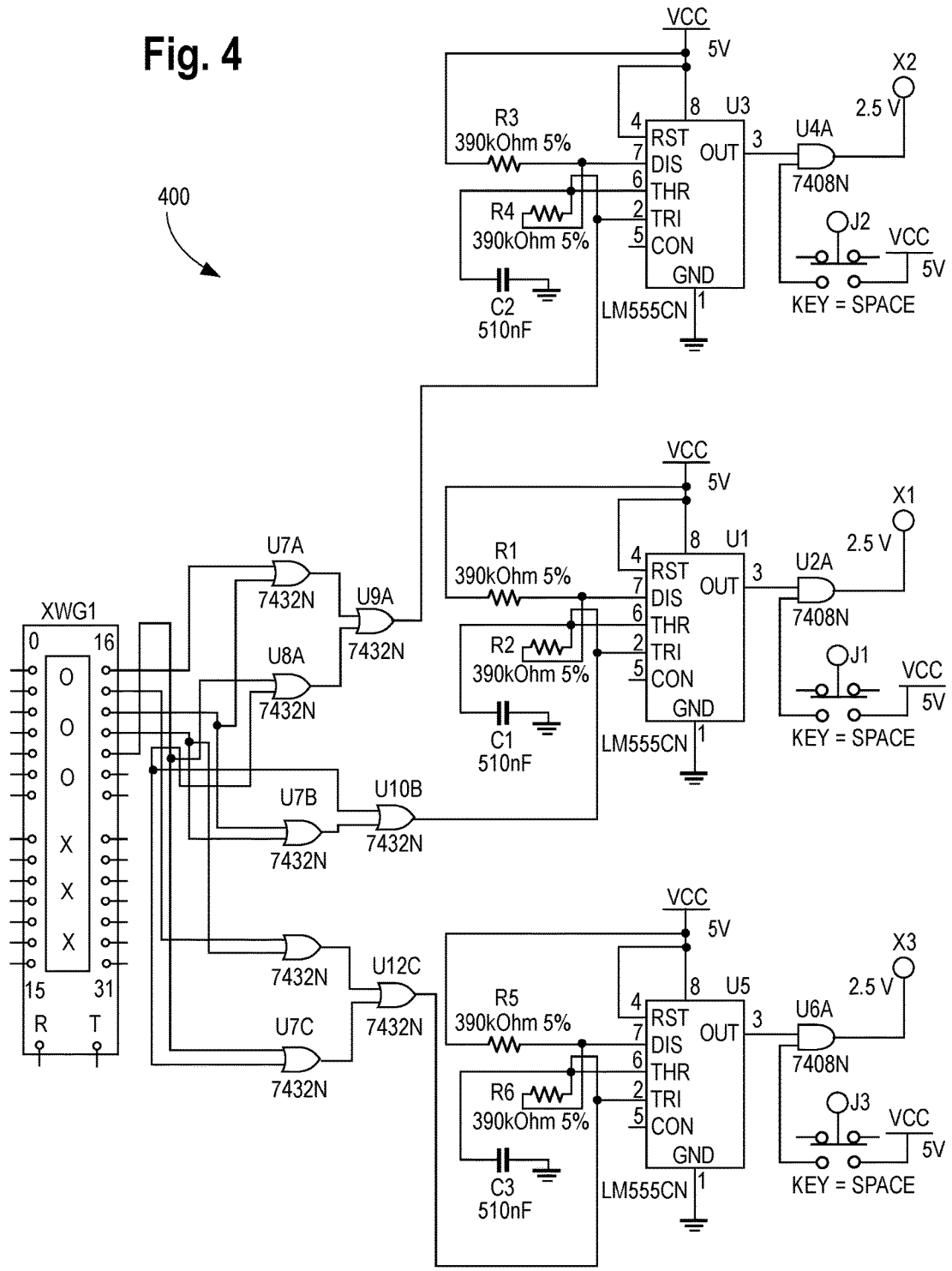
FIG. 4 is a rotational control circuit, according to an embodiment of the present invention.

Saved settings can include electronic codes to identify and rotate the selected panels. The codes include which panel(s) may be rotated, the x or y stepper to be rotated and how far the rotation (units of a number of degrees) is to be done. The operation of each stepper motor is controlled by an X-Y decoder that inputs numbers of degrees to rotate in either direction. An illustrative stepper block diagram 300 for the X-Y stepper control is given in FIG. 3. The inputs are binary codes to the X-Y decoder and outputs to the steppers for changing the panel direction. An illustrative rotational control circuit selector 400 is shown in FIG. 4, which is part of the controller shown in FIG. 3.

Figure 5:
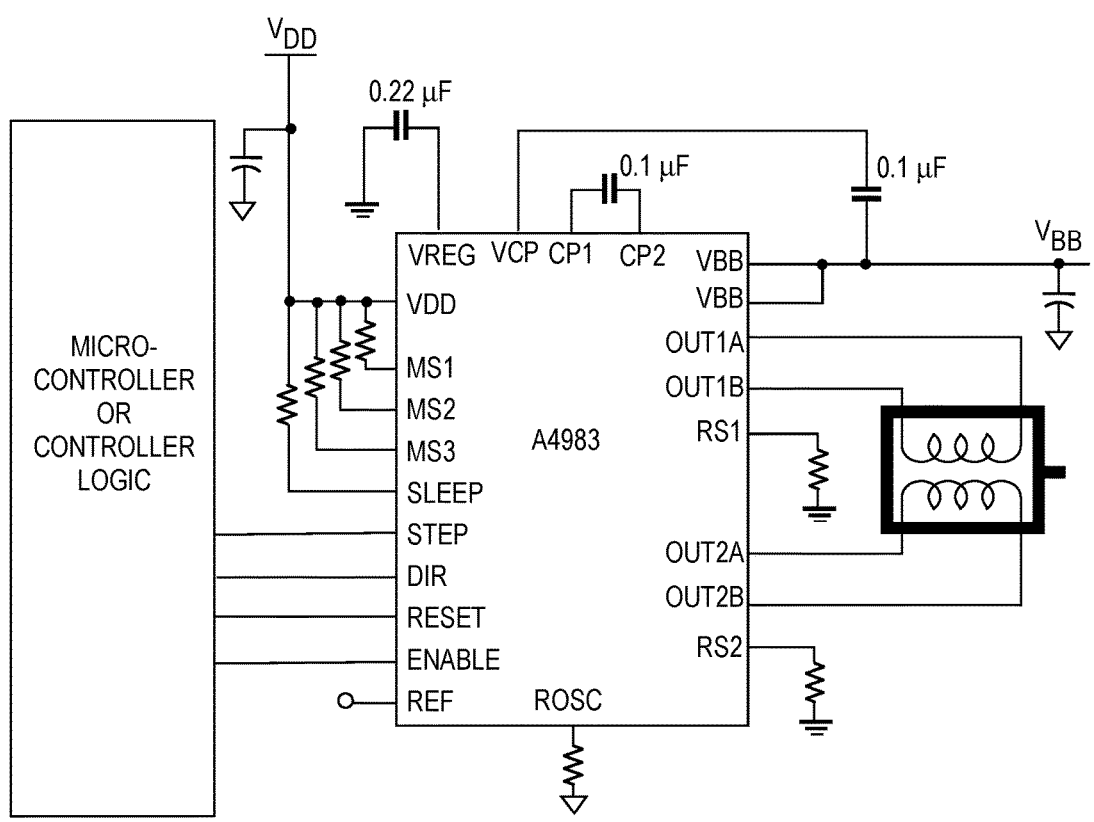
FIG. 5 is a block diagram of an illustrative controller, according to an embodiment of the present invention.

Once the selection code is input to the controller, the appropriate rotational circuit is activated. This can be done with the AND gates in FIG. 4. Each timing circuit may be connected to the Enable input to the stepper driver for the panels. The specific design for an illustrative embodiment of the timing circuit is explained below. In one example, an Allegro A4983 Quad Driver may be chosen as the stepper driver, although equivalent micro-controllers can be used. In the A4983 driver, each of four Drivers may be connected to the select portion of the Rotational Control Circuit (AND gate outputs) that go to Enable that Driver. The timing output of the Rotational Control Circuit may be attached to the Step input of the Driver. A block diagram 500 of the stepper driver controller is shown in FIG. 5. The details of each circuit are explained with the embodiments below.

Figure 6:
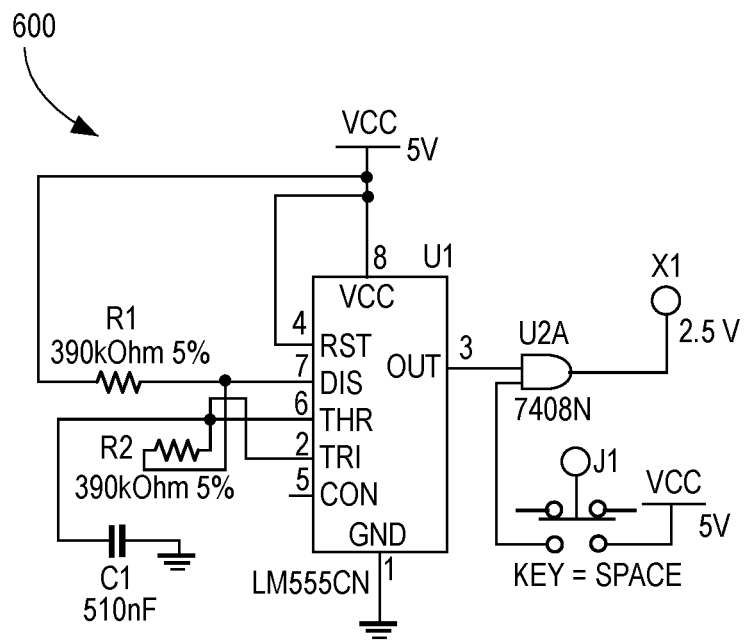
FIG. 6 is a block diagram of a stepper control timing circuit, according to an embodiment of the present invention.

The A4983 Quad Stepper Driver may control the stepper motors for rotating panels in the SALT design. Quoted logic levels for this example are from 3-5 V and may be controlled by a controller circuit or computer. The controller logic inputs to the driver include, without limitation:

1. Step: Step input is pulled HIGH with a 2 kΩ resistor and is rising edge triggered. Minimum 1 µs pulse time and 50% duty cycle, maintaining the frequency to 500 kHz. The step input circuits of the present embodiment may include, without limitation, timing for the rotation rate of the panels and a step enable signal to turn the rotation mode on. The enable input may come from a momentary "push and hold" switch connected to a +5 V source, which goes into a 2-input AND gate with the second input connected to the output of a 555 timer configured as an astable multivibrator. The multivibrator elements may deliver a duty cycle=(ON time)/(TOTAL time)=⅓, with a frequency of 25 Hz. The frequency may be set to match a rotational rate of 1.8 degrees per step for a total time of 2 seconds for a full 90 degree rotation. This may be achieved by setting the two input resistors for the 555 timer equal to about 19 kΩ and the input capacitor to 1.0 µf. Thus, when the enable button is pressed, the chosen panel may rotate until the user lifts the button, whereby the motion stops. The circuit diagram 600 for this illustrative timing control is shown in FIG. 6, with one of the elements of the rotational selector circuit shown in circuit diagram 400 of FIG. 4.

2. Direction: Direction input is pulled HIGH with a 20 kΩ resistor. The HIGH level rotates the panel counter-clockwise while the LOW level rotates it clockwise. The Direction input is connected to an incremental touch-sensitive sliding switch, connected to a 5 Volt input. One switch setting connects the voltage, rotating the panel counter-clockwise, while the other is grounded, rotating the panel clockwise.

3. Reset: Reset input is tied to a 20 kΩ resistor to the HIGH level. Pulling the input LOW resets the driver to the default position. The Reset input is connected to Ground through a single enable switch for activating the Reset input to return the panel to the default position.

4. Enable: Enable input is pulled LOW with a 20 kΩ resistor. The Enable input is connected to +5V through a single enable switch to active the motor to turn off when pulled to HIGH level.

An example of motion control codes will now be discussed, without limitation, including selection of a fixture and panel. Selecting direction and angle of rotation may be performed by assigning input codes to a Rotational Control Circuit and the Driver circuit. Once the signal goes from the decoder to the stepper motor, rotation can occur in the direction and amount decoded. Most rotation may be handled in Manual mode, but this design allows saving of particular angles. An illustrative code for rotating a panel may include the following information with the size of the code: 1) fixture location within an array (n bits for 2n panels); 2) panel or combination of panels within the fixture to be rotated and in which direction [x or y] (3 bits); 3) rotational direction (clockwise=CW or counter-clockwise=CCW) (1 bit); and 4) how much the panel is to be rotated (0-90 degrees in 1.8 degree increments (6 bits).

The fixture location may begin with 0 (n bits) for the first designated fixture. The selected combination of panels, with seven possible states (see table 2200 of FIG. 22) have codes from 001 to 111 to rotate in the x (horizontal) direction and the unused 000 code may designate rotation in the y-direction, or vertically. The rotation from forward, defined to be 0 degrees, is in 1.8 degree increments, requiring 50 such increments for a 0-90 degree coverage. The six digits of the code then may range from 000000 through 110001.

As an example using a preferred embodiment, assume that the left and right panels in the sixth fixture of a nine fixture array should be rotated in the −x direction (CCW) by 30 degrees. The nine fixtures typically require four bits to specify. The left and right panel selection code is 101 and the −30 degree rotation is coded by CCW direction (1) and angle (30 degrees is seventeen 1.8 degree increments) having a code 010000. The overall resulting code may be 0101-101-1-010000. Here, the labeling of position for fixtures in an array starts with 0000. Note that alternative angular divisions are possible. Once the particular panel is chosen, the control logic is enabled to rotate the panels in a particular direction at a chosen angle. The controller circuit design is discussed in detail above.

Note that most functions presented using electronic control circuits can be implemented in software code using any of a variety of languages. The circuits presented in this section to operate the motion driver can be modified or replaced by software codes that operate the driver as described. The language and code design may depend upon which driver is used in a given application.

The user interface will now be discussed, which may be included with a controller. There are various types of user interface controllers and displays, for example: one keypad controller and display that controls an individual light fixture, a master keypad controller and display that controls a plurality of light fixtures or separate groups of light fixtures from a central control room location, and a computer interface with software that allows light unit fixtures to be connected to a computer system for control and to receive alert operations. The keypad controllers and fixture control circuits provide complete control of the lighting system by including a numeric portion, a directional control unit, a brightness control interface, software control, and sufficient displays to provide information about the system status Skilled artisans will appreciate keypads and controller interfaces after having the benefit of this disclosure.

Figure 9:
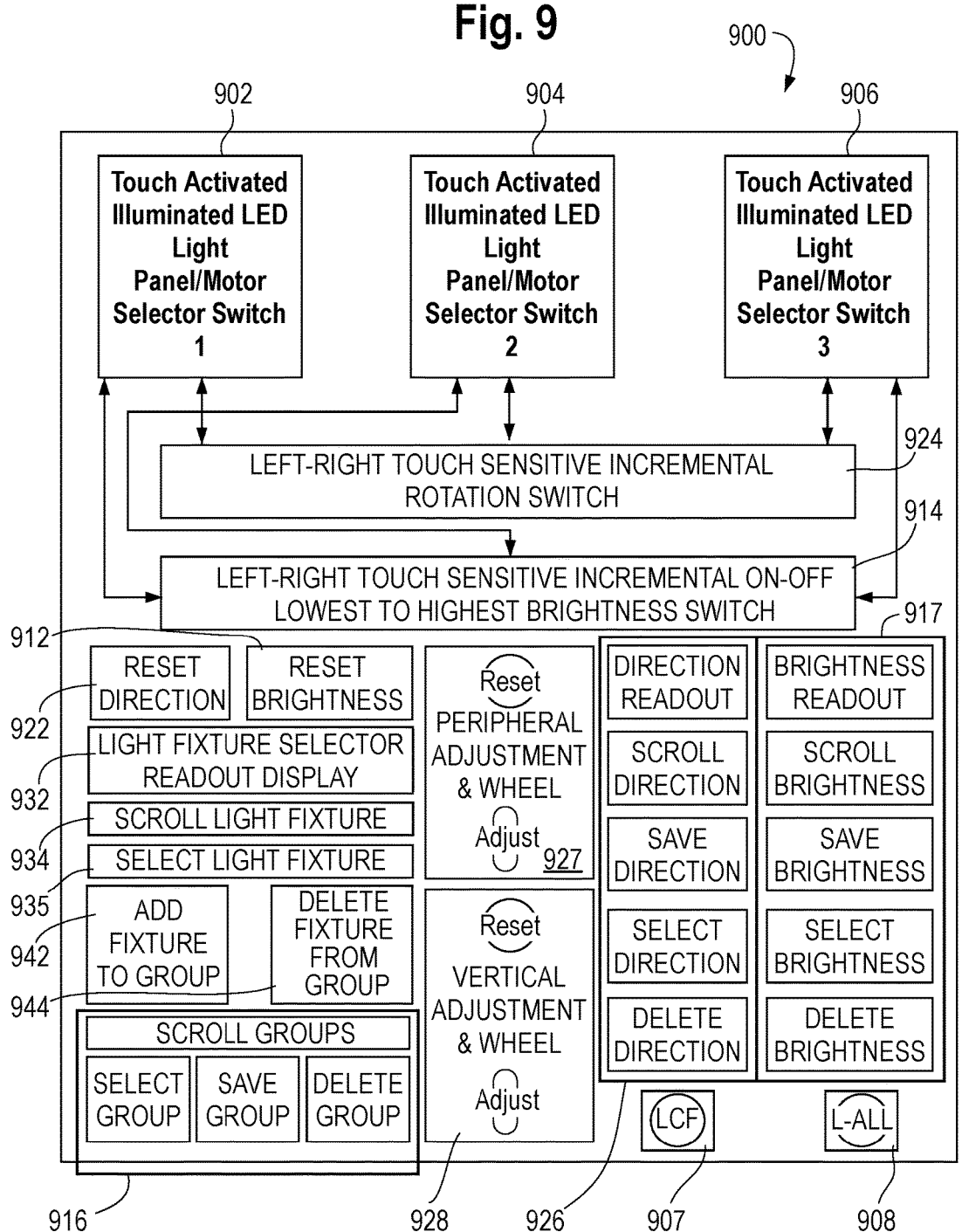
FIG. 9 is a block diagram of a controller interface, according to an embodiment of the present invention.

An illustrative keypad is provided by diagram 900 of FIG. 9, without limitation. The keypad may include controller interface elements to provide complete control of the lighting system. The keypad may include physically actuated buttons, touchscreen, or other sources of engagement, without limitation. Typically, the keypad should include a brightness control, a directional control unit, and software control built-in and sufficient displays to provide information about the system status. Additional keypad functions and buttons can be implemented for different applications.

The keypad may feature panel selection. The top of the keypad panel may provide selection of LEDs or light sources to control, illustrated as buttons 902, 904, and 906. The control may then allow the user to adjust brightness or direction of the panel. The LCF button 907 may lock the center panel (LED 2) in the forward direction. The L-ALL button 908 may lock every control in a fixed position.

The keypad may feature brightness selection. In an example, three techniques may be provided for brightness selection: (1) a RESET BRIGHTNESS key 912 to set to the default level; (2) an analog touch sensitive switch that increments continuously to the desired brightness level 914; and (3) keys 916 to access any saved levels of brightness, which may be controlled by software and saved in a non-volatile RAM. The keys 917 allow programming and selection of various intensity levels. These are the single panel editing features. If the SELECT button is pressed, the SCROLL activates all modes previously saved in memory. If the SELECT button is not pressed, the SCROLL cycles through the saved modes and shows them on the screen. Once the appropriate mode for that panel appears on the readout, the SELECT sets the codes to activate that saved mode. The SAVE button allows the user to save a new mode in memory.

The keypad may feature direction and rotation selection. In an example, three techniques may be provided to control direction of each panel: (1) a RESET DIRECTION key 922 sets the chosen light panel(s) to the default position (forward direction); (2) the "Touch Sensitive Incremental Rotation Switch" 924 may allow continuous adjustment of the rotation of the panels; and (3) keys 926 may allow selection and editing of preset directions. These are the single panel editing features. If the SELECT button is pressed, the SCROLL activates all modes previously saved in memory. If the SELECT button is not pressed, the SCROLL cycles through the saved modes and shows them on the screen. Once the appropriate mode for that panel appears on the readout, the SELECT sets the codes to activate that saved mode. The SAVE button allows the user to save a new mode in memory. The PERIPHERAL ADJUSTMENT & WHEEL 927 may control LED panels 1 and 3 to rotate outward or inward concurrently in opposite directions. The PERIPHERAL RESET button may return these LED panels to the default forward direction. The VERTICAL ADJUSTMENT & WHEEL 928 may move the three-panel fixture vertically in the chosen direction. The VERTICAL RESET button resets the fixture to the default forward direction.

The keypad may feature a fixture selector, which may include a LIGHT FIXTURE SELECTOR READOUT DISPLAY 932. This display 932 may show which light fixture is being controlled. The panel within that fixture may be then selected with, for example, the top touch activated switches. The fixture selector may include a SCROLL LIGHT FIXTURE SELECTOR 934. This key may scroll through the possible fixtures within an array to for selection to be controlled. A SELECT LIGHT FIXTURE key 935. This key may select within an array is selected to activate.

The keypad may feature a group selector. Group selection keys may be included in the applications that encompass more than one fixture. An ADD FIXTURE TO GROUP key 942 may be included to add a new fixture to the group for controlling brightness and intensity. Additionally, a DELETE FIXTURE FROM GROUP 944 may be used to eliminate a selected fixture from a group Keys 942 and 944 may be used to edit the fixtures within a defined group. In this embodiment, Keys 916 and 928 may also be used to control the group. For example, the VERTICAL ADJUSTMENT WHEEL 928 may continuously adjust the vertical direction of the light fixture in a manual mode for directional control.

Fixtures may be selected from an array using a controller. In one example, the A4983 Controller may be used having four inputs to control the selection and operation of each light panel, as discussed above. This control can be expanded to multiple panels and fixtures with a 1-of-N demultiplexer circuit. The output of this demultiplexer "fixture selector" can activate each panel with a single enable pulse from the fixture selector. The enable signal may be input to control intensity, including a mode selection circuit and brightness control touch-sensitive incremental switch, and rotation, including a panel rotation mode and driver control circuit. The rotation control may also include step and direction controllers and the reset button.

The channel selector to the demultiplexer may be a 1-to-N counter that can be incremented with a push button switch to the fixture number of the desired fixture to control. The counter may be attached to a display that indicates the fixture number under control. The controller interface may include "Scroll Light Fixture" 934 and "Select Light fixture" buttons 935 on the middle left side of the diagram 900 of FIG. 9. Selecting the "Scroll Light Fixture" button 934 may increment the light fixture number in the "Light Fixture Selector Readout Display 932." Selecting the "Select Light Fixture" button 935 may choose the fixture whose label is the number shown on the "Readout Display."

Figure 10:
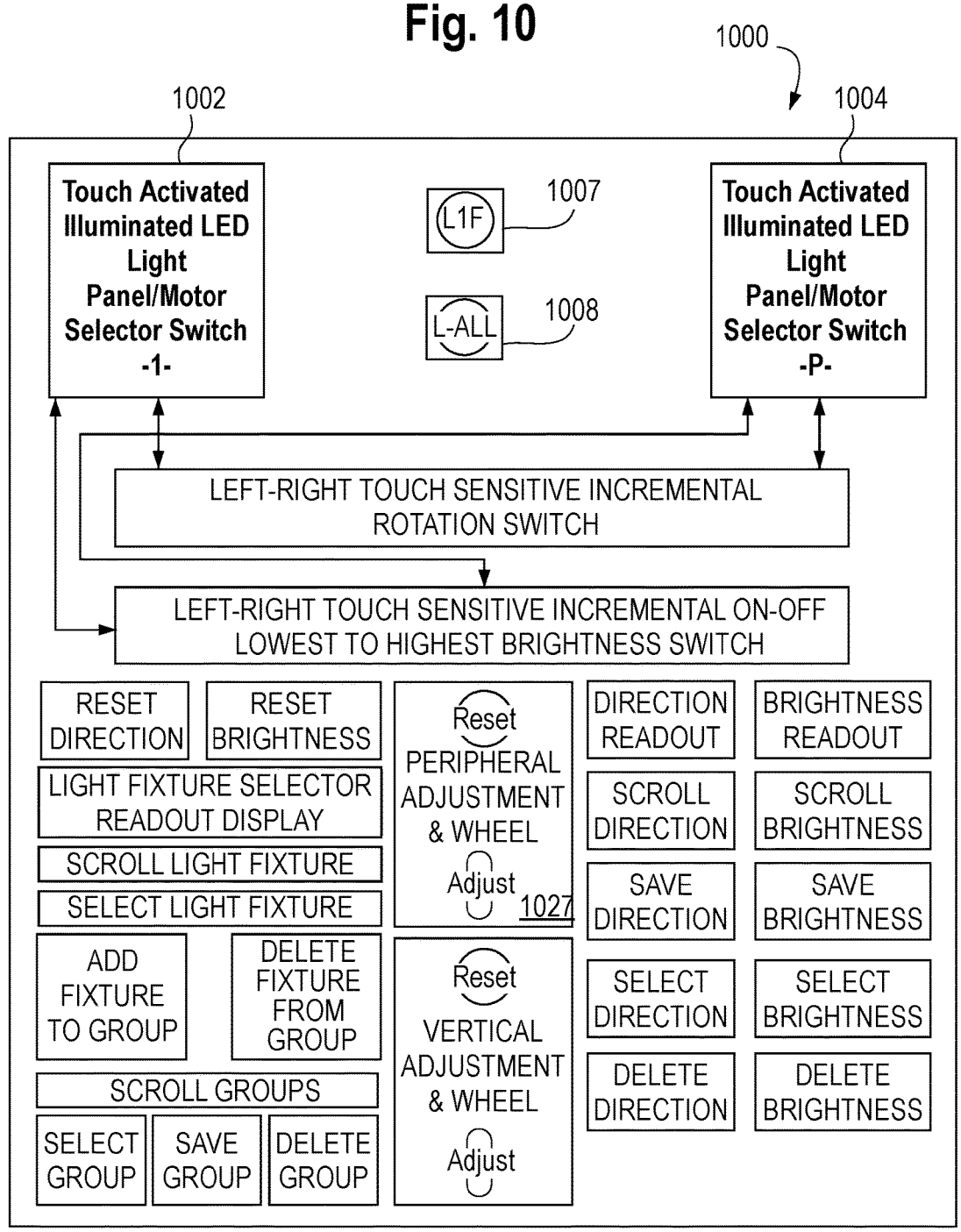
FIG. 10 is a block diagram of a two-light panel variation of the controller interface, according to an embodiment of the present invention.

Some illustrative variations of controllers will now be discussed to illustrate the flexibility of the lighting system of the present invention, without limitation. Referring to block diagram 1000 of FIG. 10 shows the interface block diagram modified for a two-light panel system. Most of the controls in the diagram are the same as for the three-light panel system discussed above with FIG. 9 except for the two buttons at the middle top part of the diagram, labeled "L1F" 1007 and L-ALL 1008. The L1F 1007 button may lock the first light panel while allowing the other light panel to rotate. The L-ALL button 1008 may lock both light panels and the entire control panel to fix all settings to prevent them from changing. Pressing the L-ALL button 1008 a second time may unlock the controls. The first light panel control 1002 may be used as a fixed LED or light source panel or it could include a peripheral control 1004 for a fixture requiring rotation. The "P" designation of control 1004 indicates "Peripheral" and may freely control rotation.

Figure 11:
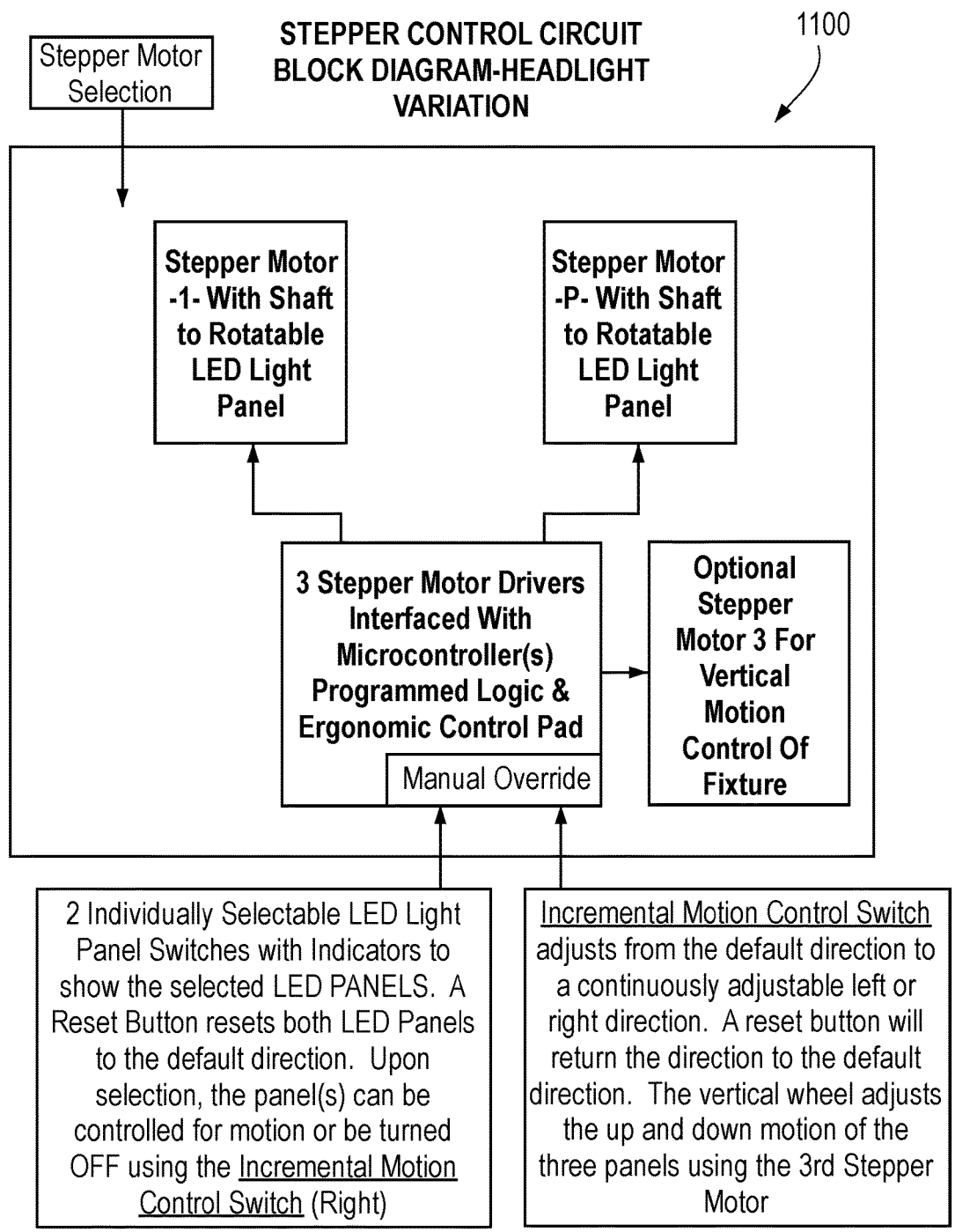
FIG. 11 is a block diagram of a two-light panel variation of the stepper control circuit, according to an embodiment of the present invention.

The two-light panel system of FIG. 10 may include a modified stepper control circuit, shown in block diagram 1100 of FIG. 11. This is similar to the three-light panel model. As with the Control Interface, the "P" light panel can be placed on either the left or right side so models can be developed for left-handed or right-handed peripheral control, to move as controlled by the user with the Peripheral Adjustment Wheel 1027.

Figure 12:
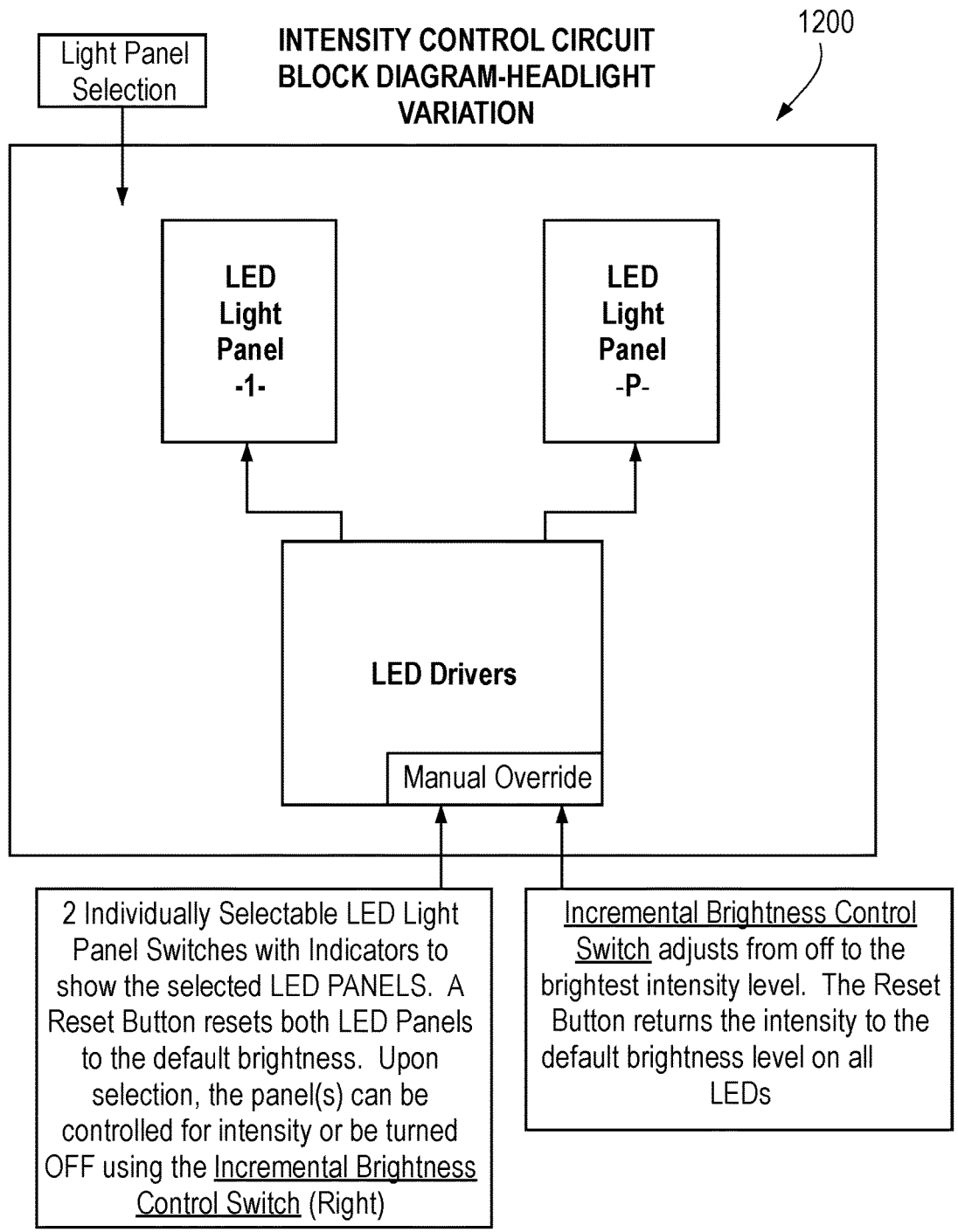
FIG. 12 is a block diagram of a two-light panel variation of the intensity control circuit, according to an embodiment of the present invention.

An alternative intensity control circuit is shown in block diagram 1200 of FIG. 12 that is modified for the two-light panel system illustrated in FIG. 10. The functions are substantially the same as the three-light system of FIG. 11. Similar controls and fixtures can be developed with any number of light panels, LEDs, lasers, and/or other light source technologies.

This embodiment may facilitate many applications by using variable lighting system components. Some possible interchangeable parts and systems may include LEDs or other light source technologies with various lumen values mountable on movable light panels of stepper or servo controlled light fixture models. This embodiment may include servo or stepper motors, ball-screw devices, worm or other gears, solenoids and other motors, mechanisms and/or other motion devices to affect movement of lighting panels. A surveillance system may be included with infrared light sources, cameras, motion sensors and interfaces for light activation, camera activation, and/or recording device activation, or to activate, de-activate or control any devices through wired or wireless means, and other surveillance features. Optics may be included, for example, primary and secondary optics. Additionally, this embodiment may include sensors and associated circuitry, laser communication systems with bidirectional capabilities, networking, GPS and related circuitry for communicating repair and status alerts, wireless RF controls, and other controllers that can affect operation of the lighting system. Power switches may be included to energize the controllers depicted, including selectable power switches on a controller to energize individually selected light panels on a single fixture and/or groups of fixtures A secure mobile controller devices with related circuitry, logic, microphone connection, and software to control lighting and intercom speakers may be included by the lighting systems, which may be controlled through a mobile device such as a cell phone, a digital device, a computer, or a wireless remote control device.

Figure 13:
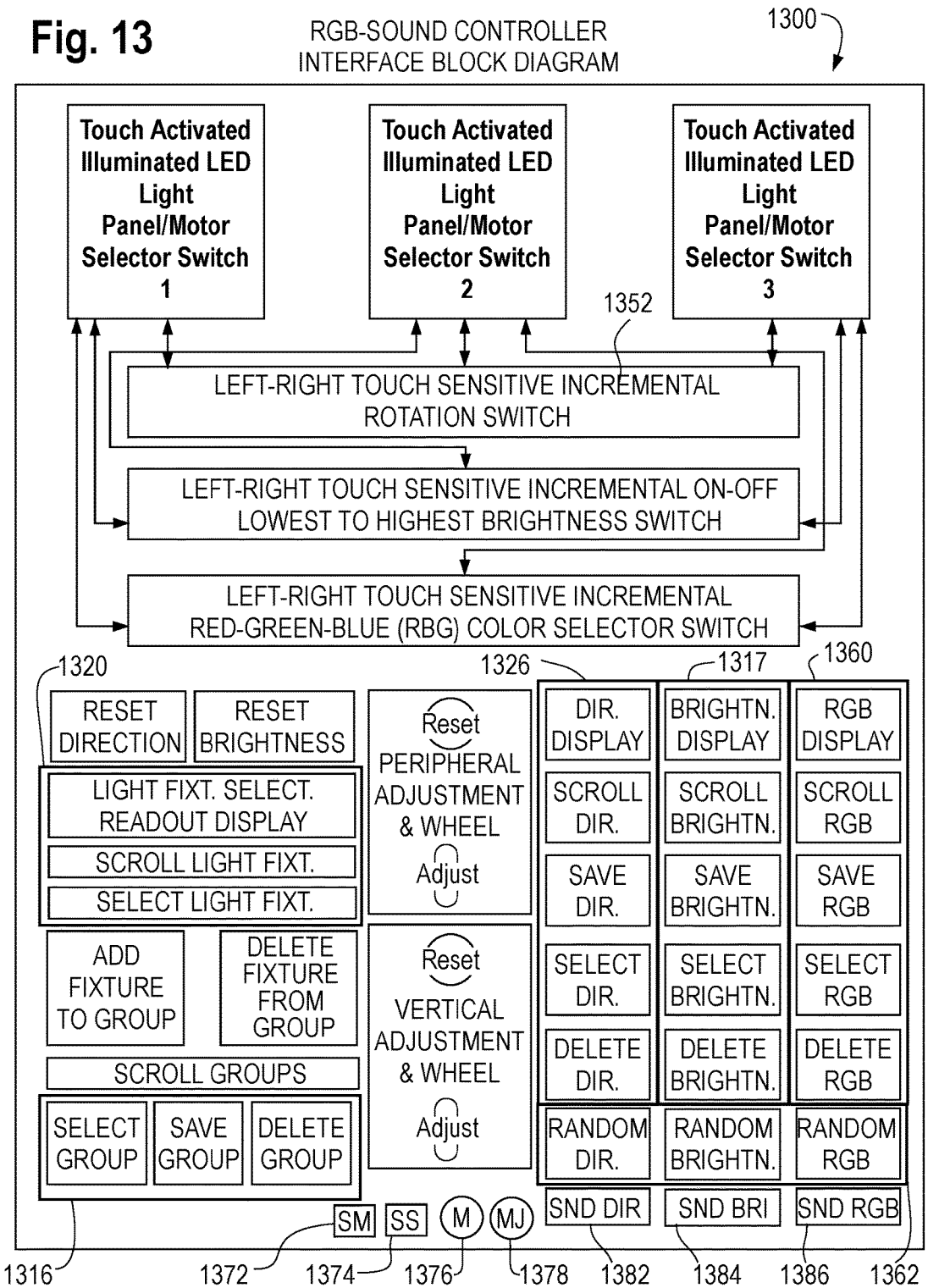
FIG. 13 is a block diagram of a RGB variation of the control interface, according to an embodiment of the present invention.

Referring to block diagram 1300 of FIG. 13, yet another alternative embodiment will be discussed in context of an RGB-configured application. The S.A.L.T. system may use color lighting. Each panel may have RGB capable LEDs or other light source technologies. The controller in this variation may set colors and save the settings for each light panel. The RGB variation of the controller may include the main features outlined in the embodiments discussed above. In addition, it this embodiment may include a Left-Right Incremental Touch Sensitive RGB Color Selector Switch 1352 to continuously vary color combinations through a "rainbow" spectrum, including about infrared through violet. For example, at the very right setting position of the RGB incremental switch, the color may become white. The buttons 1360 on the right in FIG. 13 may control selection and setting the memory for various colors. Buttons 1360 have similar controls as the intensity and direction buttons 1317, 1326 discussed above with buttons 917, 926 of FIG. 9. Thus, the user can scroll, select, save and delete color settings as in the other buttons. Additional buttons 1362 may be included for entertainment and mood lighting applications. The Intensity, Brightness, and Color settings can be randomly stepped through the saved settings in memory. These may be controlled by a randomizing algorithm.

The SM and SS buttons 1372, 1374 allow sound synchronization with the lighting changes. For sound synchronization, a built-in microphone ("M") 1376 and microphone jack ("MJ") 1378 may be included. A microphone may be connected to microphone jack 1378. The "SM" button 1372 may activate the sound mode. Once activated, the user may select the light fixture or group of fixtures with the buttons 1316, 1320 to synchronize light and sound. The "SS" button 1374 then activates synchronization and the selected light fixture or groups of light fixtures may react to the sounds input from the microphone. Upon pressing the "SS" button 1374, sound from a user at the control interface may be sent through selected external speakers connected to the lighting fixtures.

Light fixtures may be selected that include speakers and additional speaker jacks-connectors to add additional speakers with wired or wireless connections to behave like an intercom system. Microphones or microphone jacks built into the light fixtures or to respective controllers may allow a user to step through saved direction, brightness, and RGB settings when the "SND DIR" 1382, "SND BRI" 1384, and "SND RGB" 1386 buttons are activated. The stepping process may be random and may be controlled through randomizing algorithms. Subsequent interaction with these buttons 1382, 1384, 1386 may deactivate the stepping process. Sound communication can be achieved through wired or wireless circuits. Each transmitter and sound receiving circuit can be configured to work across selectable frequencies to avoid external frequency interference and operate using analog or digital communication to send secure communication packets.

Figure 14:
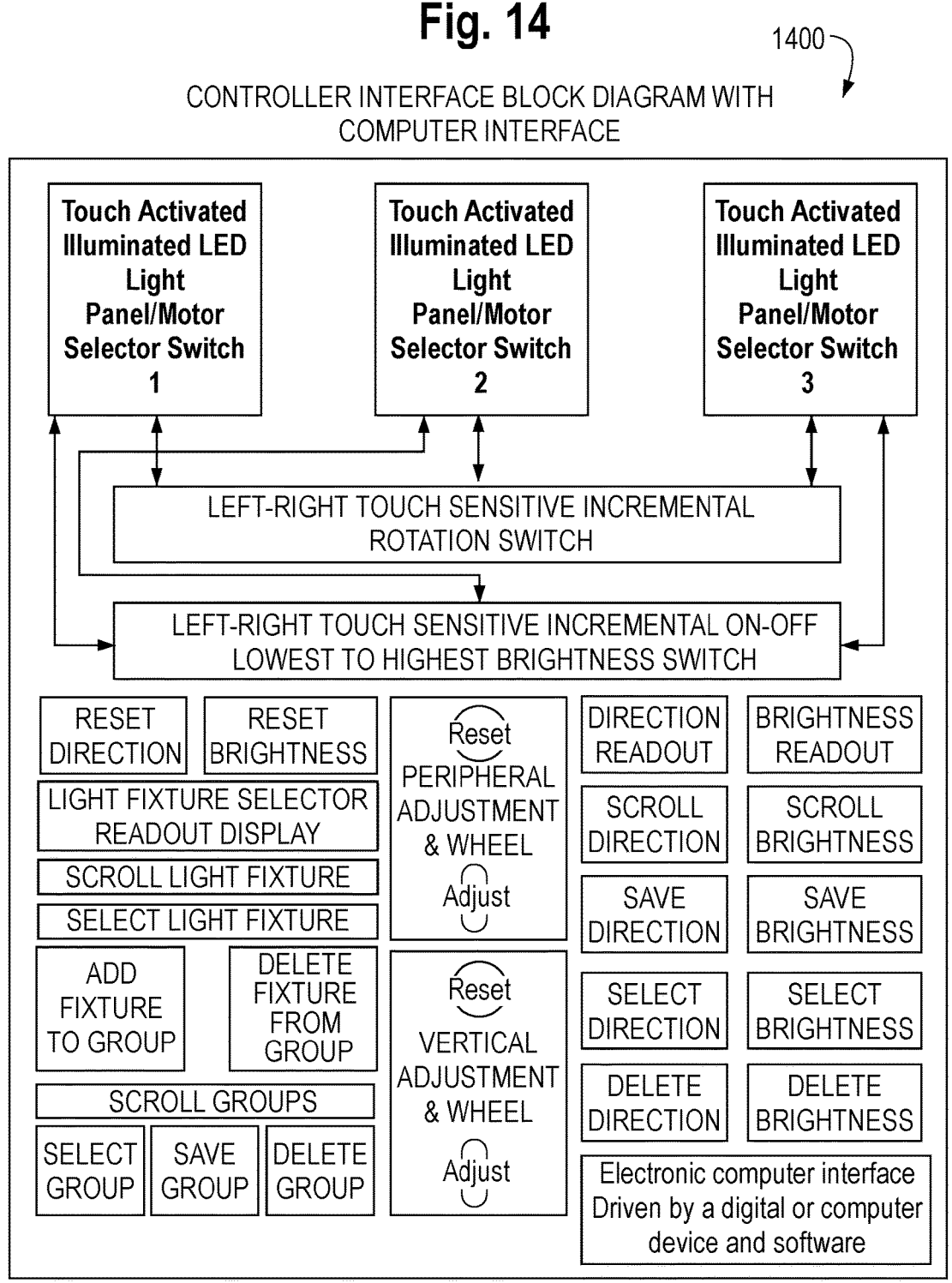
FIG. 14 is a block diagram for three light panels having a computer interface, according to an embodiment of the present invention.
Figure 15:
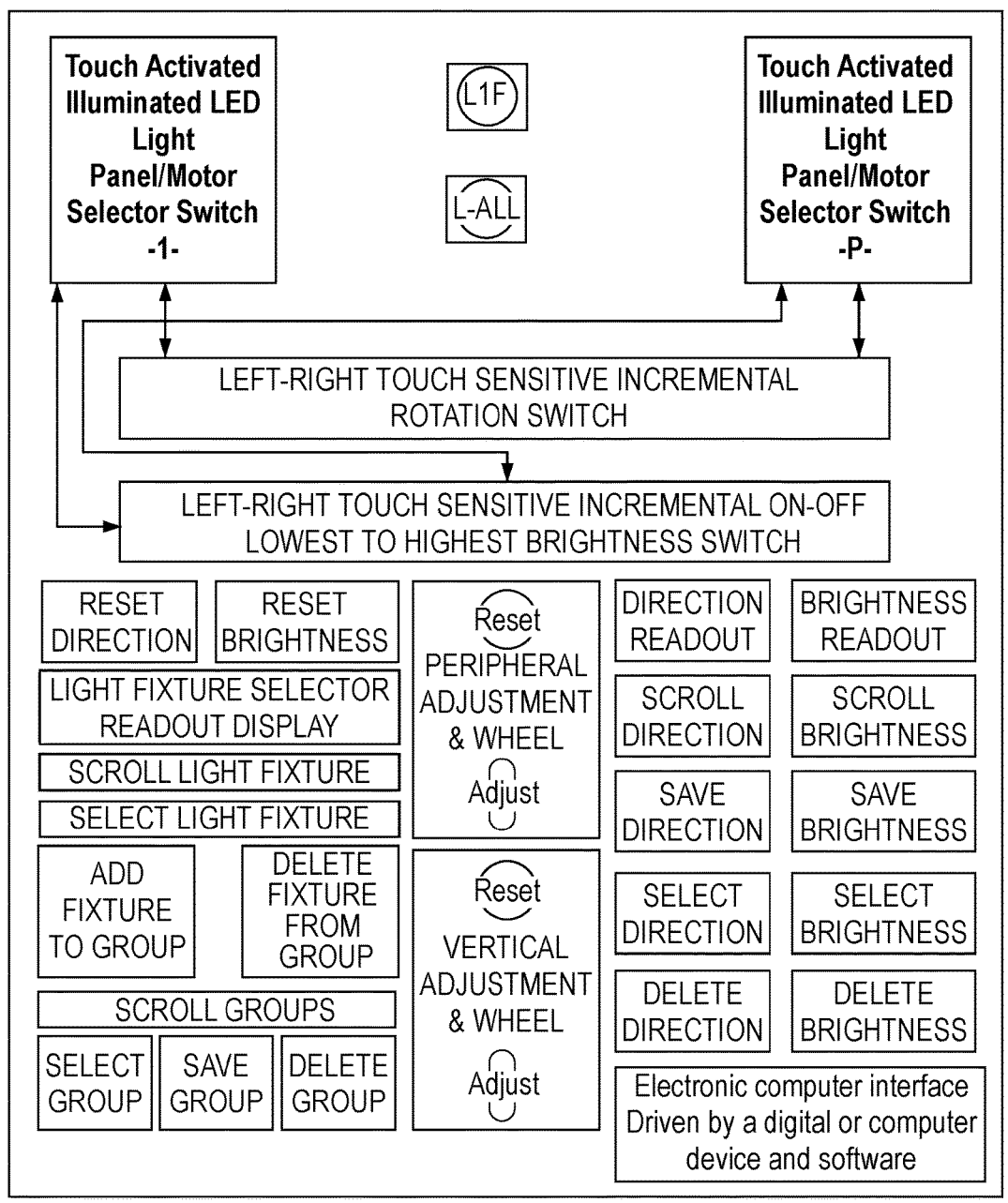
FIG. 15 is a block diagram for two light panels having a computer interface, according to an embodiment of the present invention.
Figure 16:
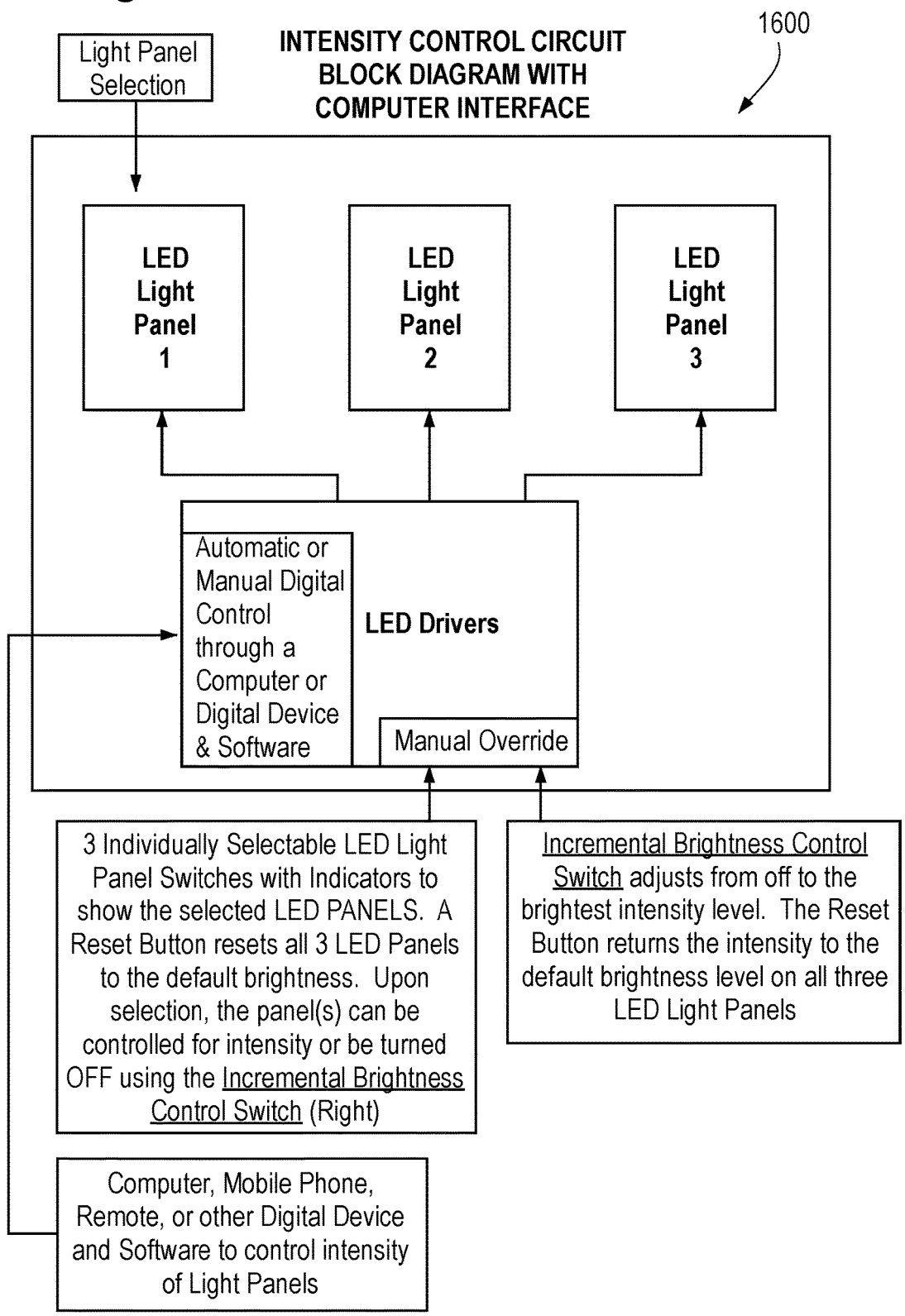
FIG. 16 is a block diagram for three light panels with an intensity computer interface, according to an embodiment of the present invention.
Figure 17:
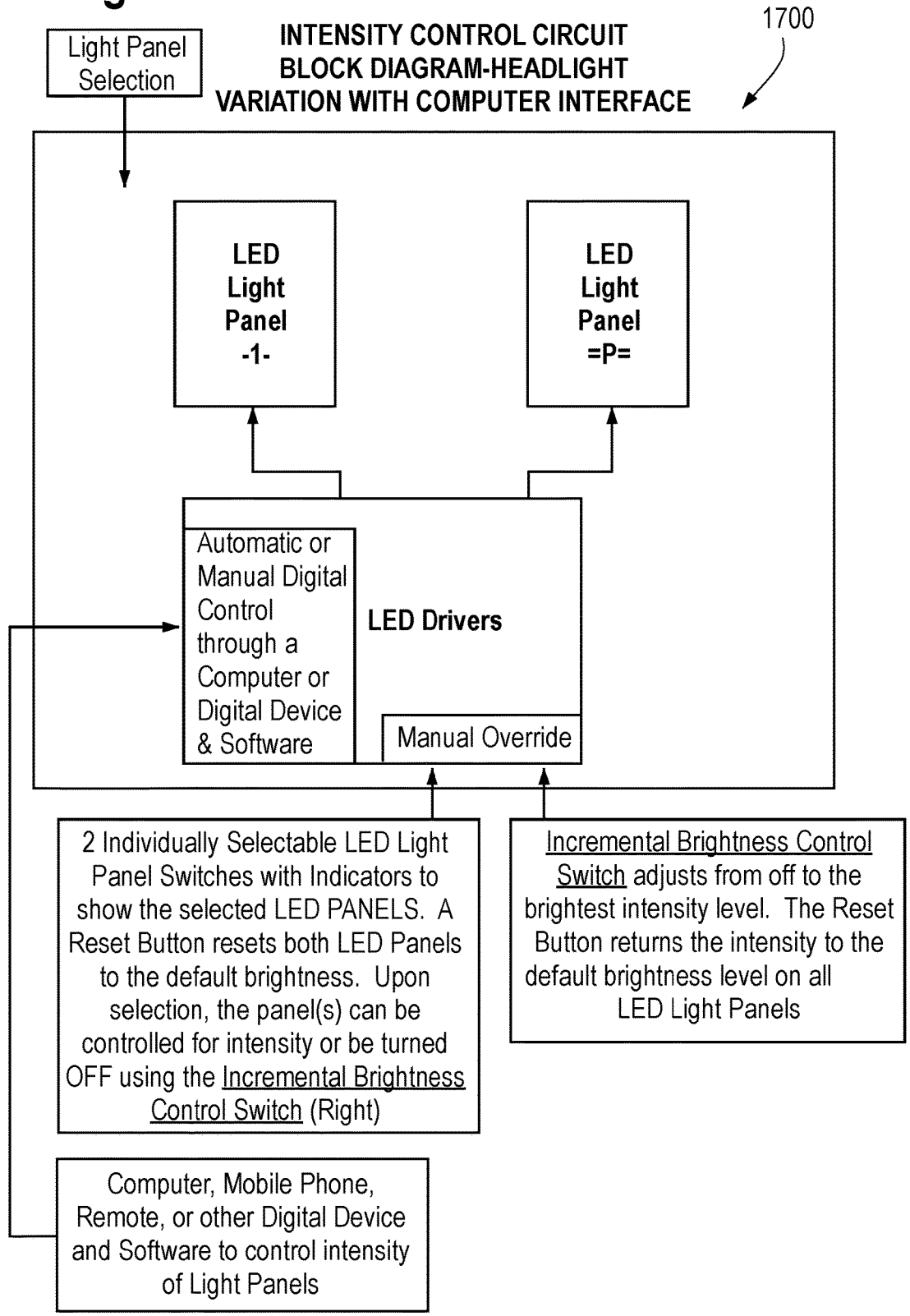
FIG. 17 is a block diagram for two light panels having an intensity computer interface, according to an embodiment of the present invention.
Figure 18:
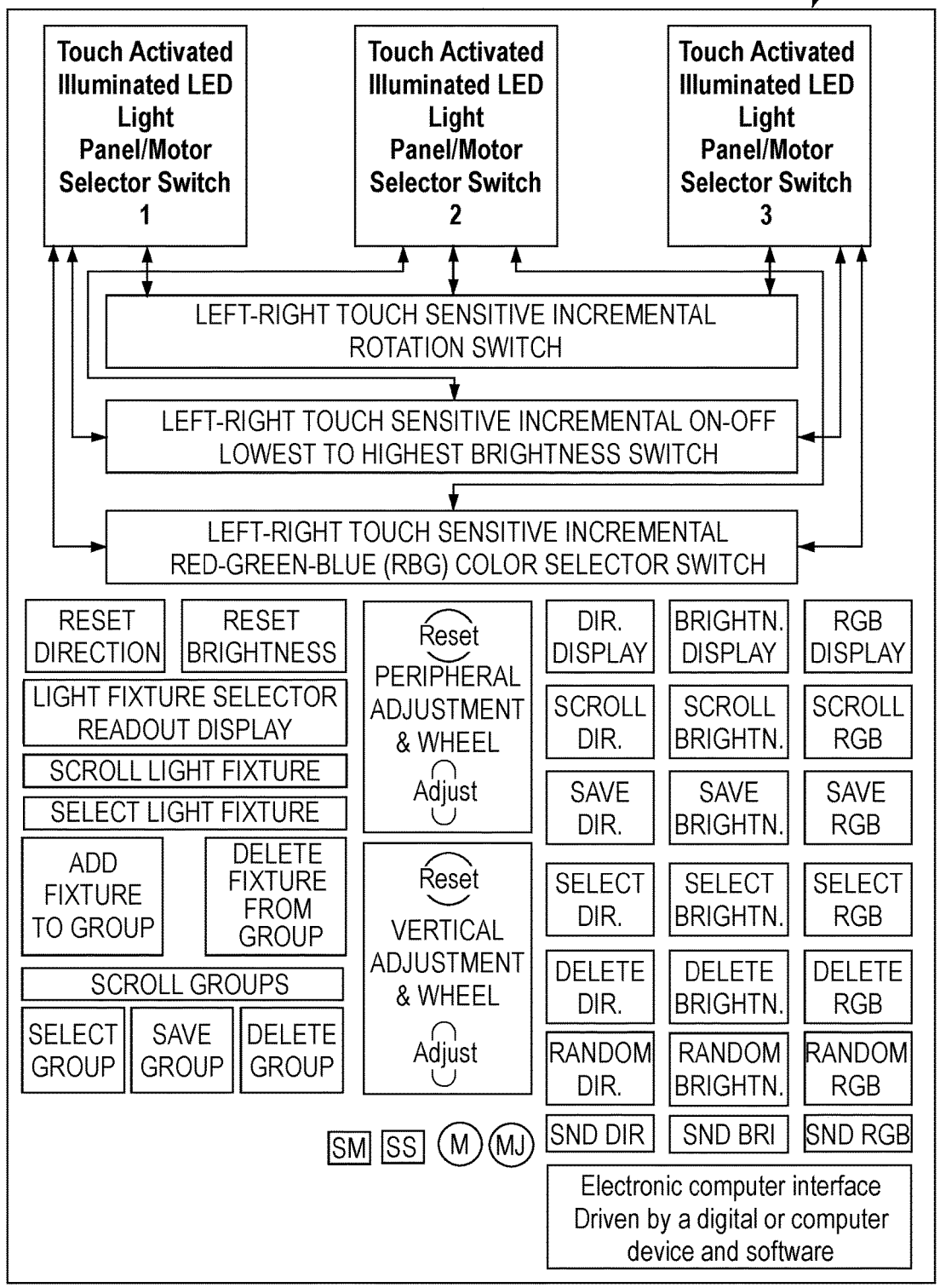
FIG. 18 is a block diagram for three RGB light panels with a computer interface, according to an embodiment of the present invention.
Figure 19:
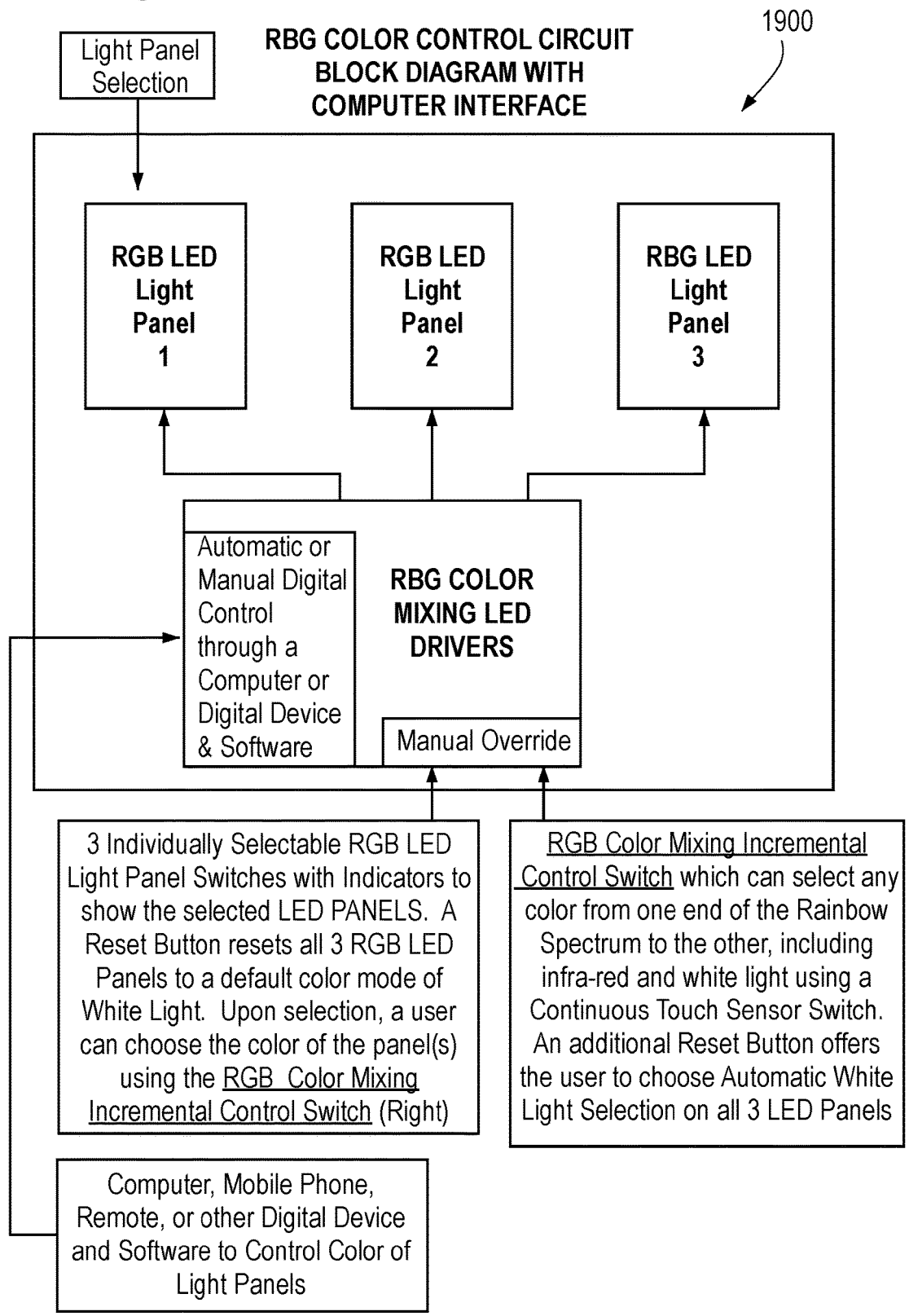
FIG. 19 is a block diagram for three RGB light panels with a computer interface, according to an embodiment of the present invention.
Figure 20:
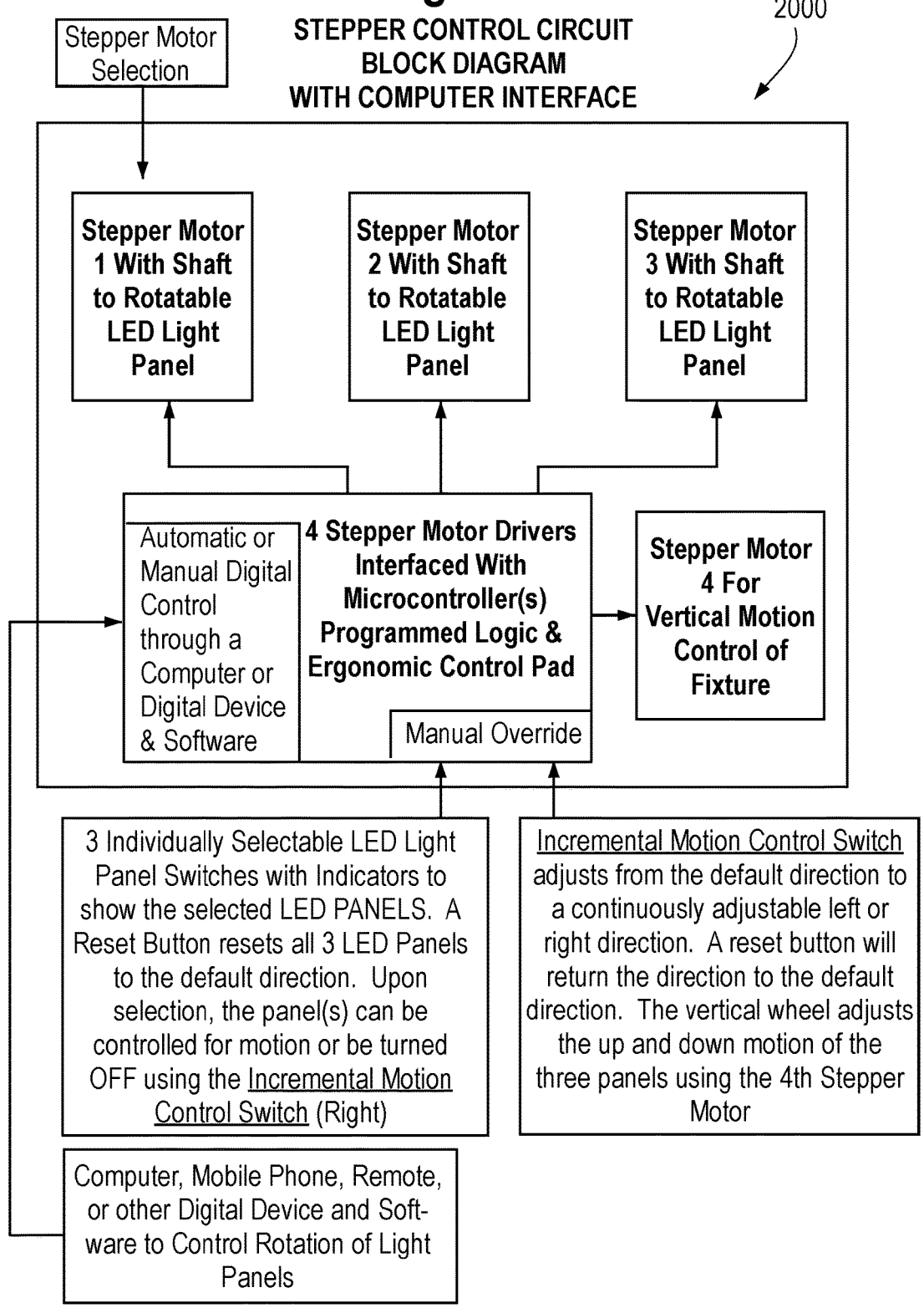
FIG. 20 is a block diagram for a three light panel system with computer stepper control interface, according to an embodiment of the present invention.
Figure 21:
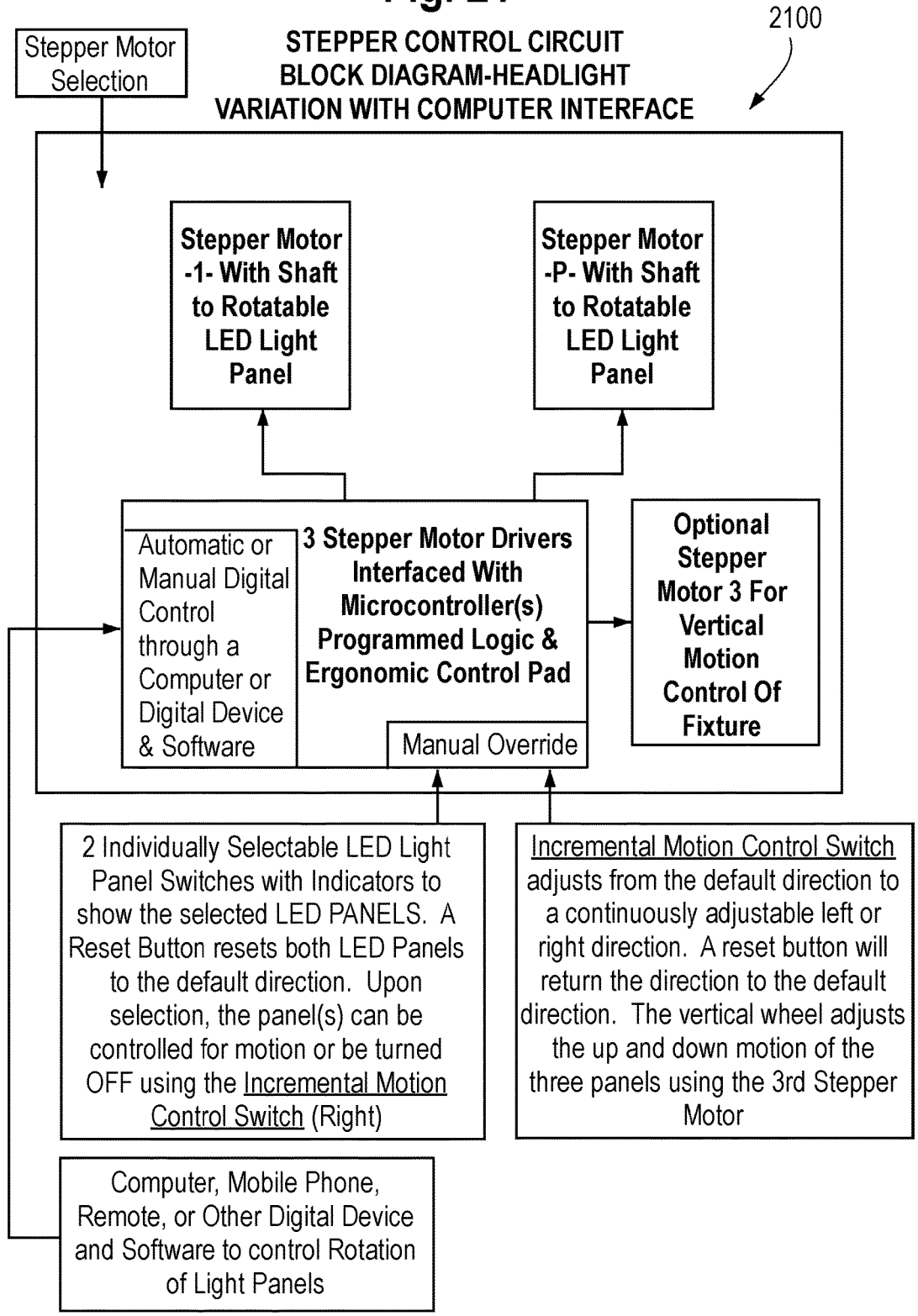
FIG. 21 is a block diagram for a two light panel system with a computer stepper control interface, according to an embodiment of the present invention.

Additional embodiments of the controller and keypad will be appreciated by a person of skill in the art. Block diagrams 1400 and 1600 of FIGS. 14 and 16 illustrate a 3 panel keypad with computer control. Block diagrams 1500 and 1700 of FIGS. 15 and 17 illustrate a 2 panel keypad with computer control. Block diagrams 1800 and 1900 of FIGS. 18 and 19 illustrate a 3 RGB panel keypad with computer control. Block diagram 2000 of FIG. 20 illustrates a stepper with computer control. Block diagram 2100 of FIG. 21 illustrates a stepper headlight with computer control. These additional examples would be readily understandable to a skilled artisan with the disclosure provided above.

In operation, the lighting system according to embodiments of the present invention may intelligently control illumination of a space. Some illustrative uses of the lighting system may include, without limitation, home lighting; warehouse and commercial lighting; security applications (surveillance, buildings, border patrol); civilian, commercial, police, and emergency vehicle lighting; marine vehicle applications; and farm equipment. Additional uses may include outdoor lighting such a street lighting, parking lots, neighborhoods; military and militia applications; billboards; construction including heavy machinery and road signs; wall, ceiling, and track lighting; stage and stadium lighting; miniaturized control circuits for flashlight applications with similar, greater, or a subset capabilities as the larger versions for other applications; and photographic lighting. The lighting system may be operated using keypad or another interface, such as a secure mobile controller applications to control lighting from a mobile device such as a cell phone, a digital device, or a remote control device, medical applications, and other applications.

The above components and subcomponents provide and allow for at least the features and functions discussed below, without limitation. The lighting system of the present invention provides better control, direction, and redirection of light beams from a luminaire. This is achieved via a light fixture having light sources incorporated into rotatable-pivotal light panels controlled or moved by motors and mechanisms such as X-Y stepper motors, servo motors, solenoids, and/or by other mechanisms.

The lighting system of the present invention facilitates control of light beams. This is achieved via the secondary optics and reflectors including lens filters and light diffusers that help focus, expand, or restrict light coverage by expanding or restricting the beam angle of the light sources on the light panels. The lighting system of the present invention also provides programmable lighting features using embedded logic, code, memory and the interfaces to program and select from programmed or default modes of operation to rotate the light panels in desired directions.

The lighting system of the present invention provides better lumen control. This is achieved via multiple light panels with one or more light sources on each light fixture to effectuate greater light coverage from rotatable multiple light panels. The lighting system of the present invention advantageously permits installation of fewer units to replace conventional light fixtures. More intensity can be provided to targeted areas by having the ability to rotate panels, resulting in the overlap of the beams.

The lighting system of the present invention also provides programmable energy control modes by having a dynamic power supply that varies the voltage output to provide power as required to adjust the light fixture to accommodate different brightness levels. This power control accommodates operation of thermal management circuits, motor controls, communication circuits, optional RF circuitry, and other features.

The lighting system of the present invention provides thermal management features for extended life, less maintenance, and energy savings. The light fixture may manage thermals via the thermal management circuits, heat sinks, heating elements, heating wire-infused lens filters, diffusers, electronic fans, liquid cooling, and/or other cooling systems.

The lighting system of the present invention provides security and surveillance features. This is achieved by the light fixture having interfaces and control signaling capability to turn cameras on or off or put cameras in standby mode, and to start and stop recording devices or put recording devices in standby mode. When motion is detected from motion sensors, cameras and recording devices attached to the light fixture interfaces can be turned on for recording. When motion is no longer detected, and/or after a programmable timed period, the selected cameras can be turned off or be put in standby mode, and the selected recording devices can be stopped, put into standby mode or turned off. An optional panning, and multiple scan modes that can scan from point of interest to point of interest as desired and as can be saved, be later recalled and utilized, or edited, deleted, or added to memory to scan and repeat as desired along with other scan modes in various combination where the scan modes can also randomly change and cycle through in any order desired for a particular time of day with manual override control capabilities as well.

The lighting system of the present invention may operate in manual, programmable, default, and/or automatic modes. Circuitry and a keypad controller, touch screen, or other ergonomic user interface may be used to program and save user-defined operations of the lighting system. Default and automatic modes are saved in memory and selectable from the keypad. The option may exist to disable the electronic modes and revert to manual control.

The lighting system of the present invention may feature algorithms for directional control, sensor interfaces, brightness control, and power and thermal management. Other algorithms are provided to integrate the motion, sensor, camera and recording functions for surveillance and communication operations.

The lighting system of the present invention may use a feature to raise and lower a fixture from a mounting post. This could be achieved with a motorized cable system having one or more cables attached to the fixture. After raising the fixture to its operational position, a mechanism may twist and lock the fixture into place with a self-positioning coupling. This may result in a reduction of panel and fixture component replacement service costs. This may also operate with a drone.

The lighting system of the present invention may operate a keypad to control the lighting system, which may include operating a numeric portion of the keypad, a directional control unit, software control, and displays. The lighting system may include a keypad, touch screen, or other ergonomic user interface.

The lighting system of the present invention facilitates operating X-Y (two dimensional) coordinate controlled light panels and beaming via servo/stepper motors. This is achieved by electronically controlling X-Y stepper motors with a controller, which may vary the rotational assemblies of light panels by a certain degree to adjust the beam positioning of the light panels as desired. The rotational degrees chosen by the controller or computer determine the X-Y position of the light panels. In the preferred design, every 15-degree increment is one transition from one position to the next. By varying transitions by one bit each, rotation transition moves a light panel in 15-degree increments. The preferred design has rotational degrees of freedom that can vary in two dimensions.

The lighting system of the present invention may operate sensor and logic circuitry, including brightness and motion sensors, to affect its operation. Light (brightness) sensors have intensity to voltage input to a resistive output to adjust the panel current. Feedback circuits can keep a pre-set intensity about constant. Discrete brightness levels are controlled to a JND (just noticeable difference). An alarm may activate for the intensity going too low or too high, followed by the logic circuits properly adjusting the brightness level. The motion control unit may detect motion within the area of illumination and track the motion throughout the activation of the motion sensors in a particular fixture. Multiple fixtures can be synchronized to track motion in a large area of illumination. Lights may be preset to shine light rated at a certain lumen output, however LEDs or light sources of greater lumen values will be selected where that portion of the lumen rating above the intensity of the rated lumen value will be held in reserve to be where intensity and brightness is slowly increased later in LED or lamp life where the reserved output can then be utilized to keep brightness constant and extend lumen output over a greater lighting system life span. When life of a light source diminishes circuits start using some of the reserve capacity to keep brightness constant over the life of the fixture, as a light source gets older, the reserve is utilized more and more to compensate for the brightness lost due to age of an LED or a particular light source that might begin to degrade in brightness.

The lighting system of the present invention may be used to control output of the light sources, such as via selecting brightness modes on a keypad controller or computer. These can be default or user programmed modes stored in memory. Manual operation is also selectable. Additionally, a healing mode may activate alternate light sources adjusted for additional brightness when LED panels get old or stop functioning.

Figure 41:
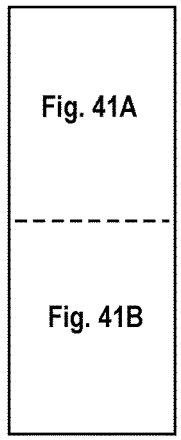
FIGS. 41A-41B are a block diagram showing materials of the lighting system, according to an embodiment of the present invention.
Figure 41A:
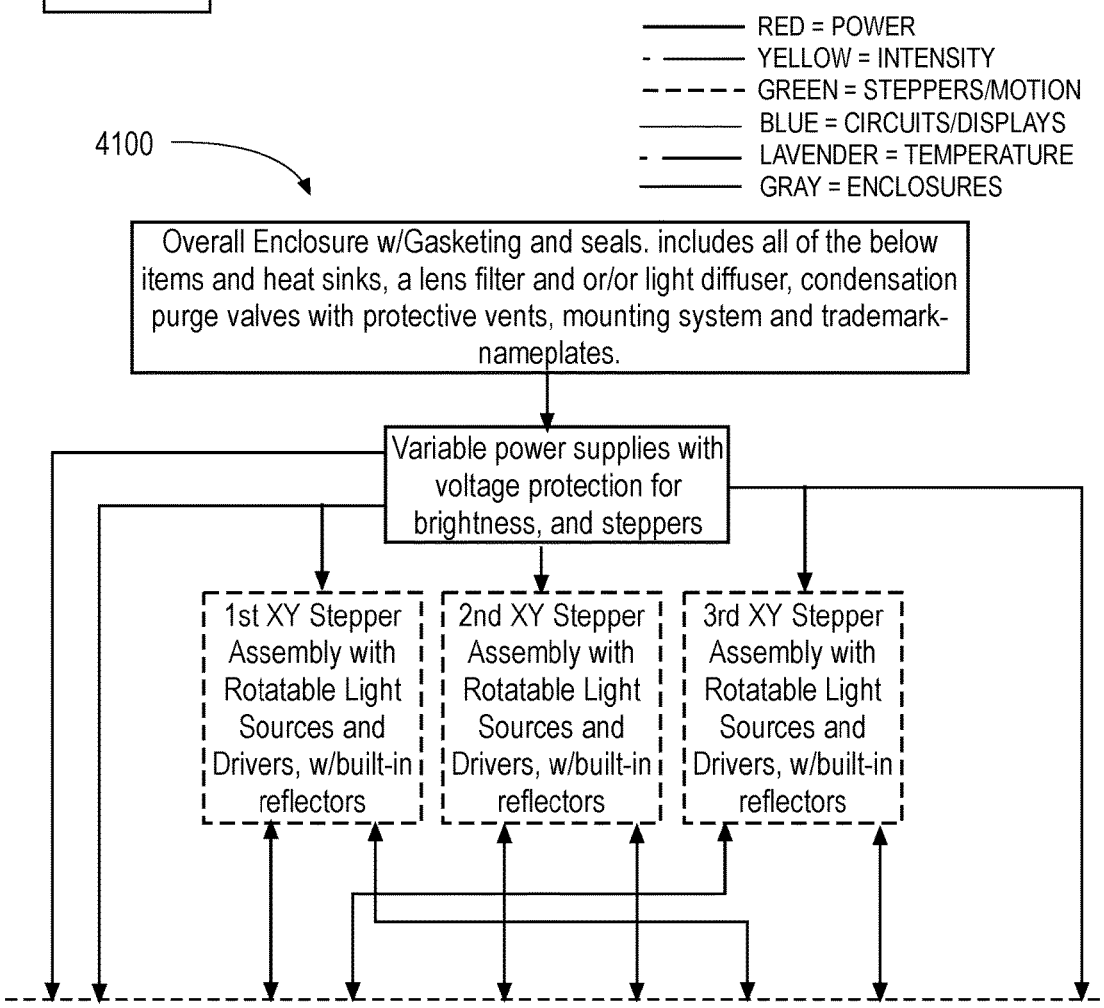
Figure 41B:
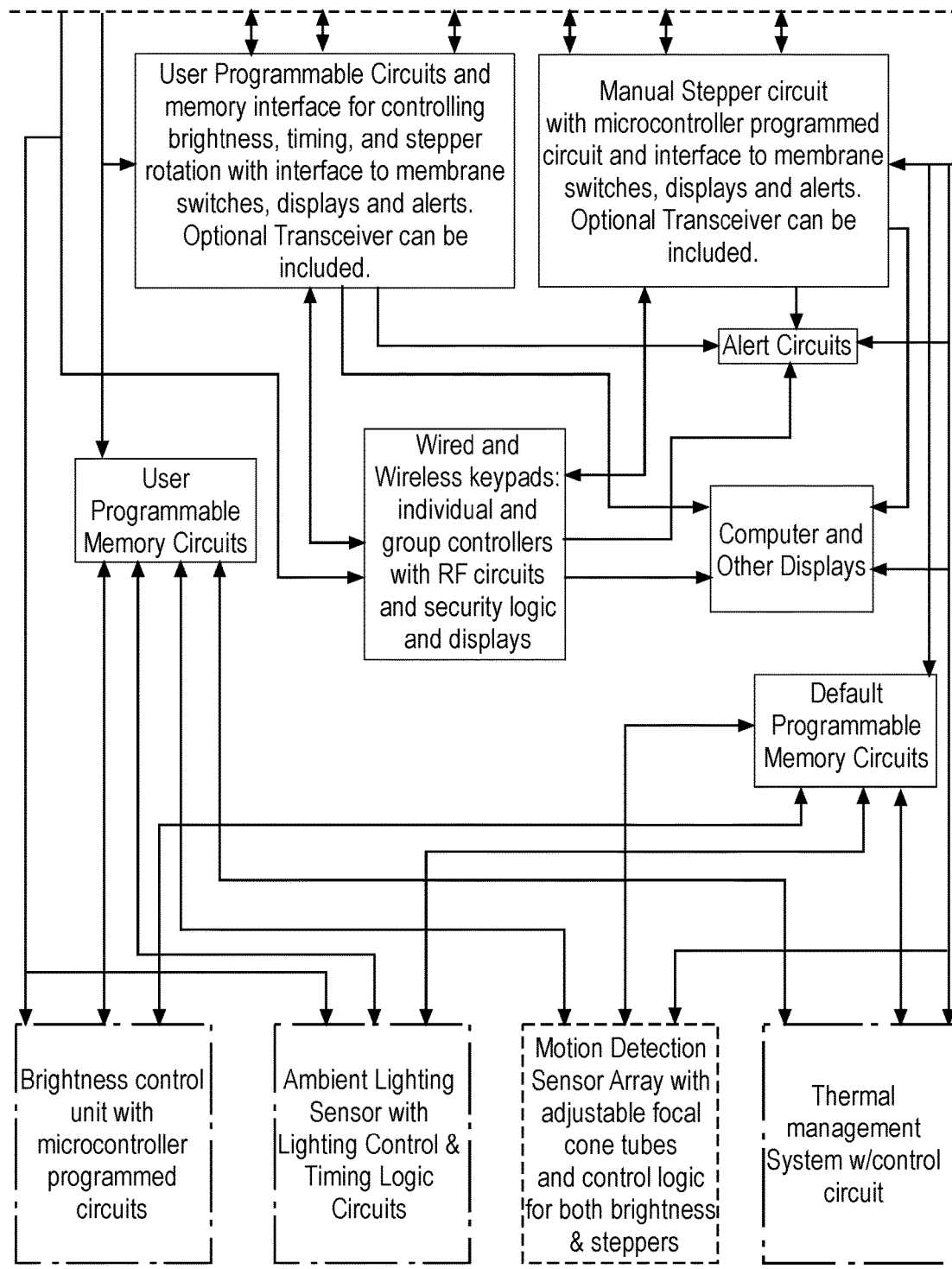

An illustrative example of a lighting system will now be discussed in the context of an Intelligent Lighting System (ILS). The illustrative system is represented by or may be similar to block diagram 4100 of FIGS. 41A-41B. The illustrative lighting system may include intensity control, motion control, thermal regulation, lighting coverage, enclosures, keypad design, system controller, displays, and other components.

Figure 26:
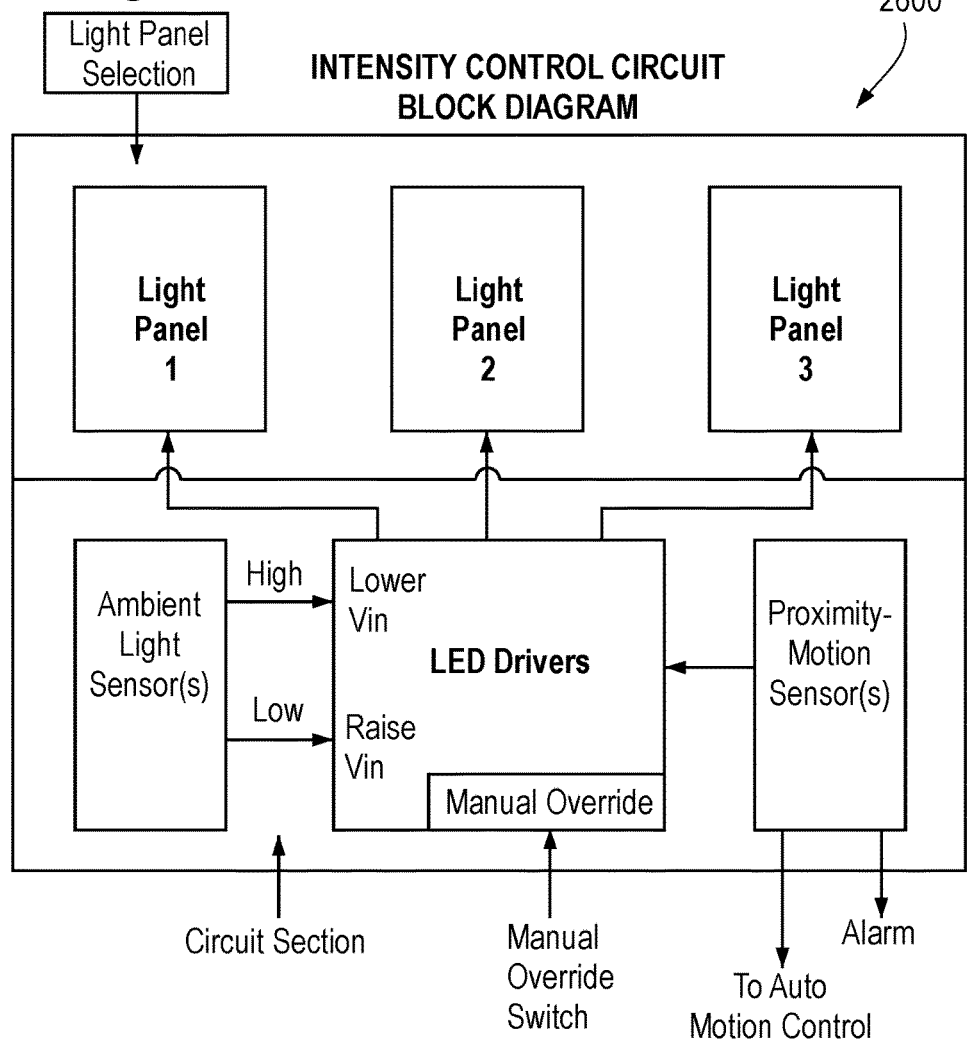
FIG. 26 is a block diagram of the intensity control circuit showing light intensity sensors, according to an embodiment of the present invention.

The illustrative Intelligent Lighting System (ILS) may include an array of lights that have automatic control of intensity and direction with auxiliary functions of thermal control and alarms for component failure and security applications. The basic model has a configuration of multiple LED light panels in a single fixture. Normally, this may be in linear array, such as illustrated by block diagram 2600 of FIG. 26. The features in this model ILS may include: a narrow/wide field of coverage; automatic light intensity adjustment for variable ambient conditions and for motion sensing security; movable light panels for variable coverage or to follow detected motion with possible real time recording of motion in the vicinity of the lights; programmability for intensity and motion control (factory assigned defaults may be augmented by reprogramming features); thermal control of light panels for all weather conditions; alarms and component failure notification; electrical interface capability for connecting to computers for control and reporting; and various mounting capabilities and lighting configurations.

A narrow/wide field may be created by using LED panels that have narrow/wide angle coverage and having three panels per fixture in linear formation. For intensity adjustment, a default intensity can be pre-programmed. As the ambient light changes, the intensity is automatically adjusted to provide about constant illumination below.

For panel movement, panel default positions can be pre-programmed and to provide coverage to odd shaped surfaces. The option to follow motion sensed by the four motion sensors per panel is provided. The panels may automatically move to provide maximum illumination to the observed object. Once the sensors no longer detect motion, the panels may return to the default settings. For recording of real time motion, activation of motion sensors can be recorded in real time with or without panel movement. This would be useful for indoor recording of motion in retail stores for example.

The intensity and position of light panels can be pre-programmed to a number of specifications. Automatic features that change these parameters can automatically revert to the default settings. Temperature range control is also programmable. The temperature inside the enclosed fixture (for example, having three panels) may be held to a pre-programmed range. If the fixture gets too cold, a built in heater may raise the temperature. Overheating may be controlled by heat sinks built into the enclosure or on the rotatable light panels, fan(s), liquid cooling system(s) (with optional heat pump(s)). Positioning of the heating elements and heat sinks may be designed not to be counterproductive. Alarms may be included that can send message if any component in the fixture fails or if motion is detected within the range of the motion sensors. Further, control signals can be triggered within the lighting system when a circuit fails to operate to shut the system down and or to provide a warning or message through communication circuits to provide an alert for maintenance or to alert personnel to a particular lighting or sensed condition or to provide operating status.

The fixtures are designed to allow for various mounting capabilities, depending upon the application. Illustrative static applications requiring no compensation for motion of the lighting system itself may include street lights; parking lot lights; building and warehouse lighting; outside lot lighting, such as gas or electric recharge stations; dock lighting; security or surveillance; pathway lighting; boat, plane, jet, helicopter, balloon, yacht, ship, train, car, truck, and other vehicular lighting; and other lighting applications. These applications benefit the surveillance and intensity control. The combination of intensity and thermal control allow this system to be more environmentally friendly and more efficient.

Light sensors have intensity (to voltage) input to a resistive output to adjust current. The feedback is to keep the pre-set intensity about constant. Discrete levels are controlled to JND (just noticeable difference), which may be predetermined. An alarm may be set for an intensity that is too low or too high. These may typically require separate preset intensity thresholds, such as outputs of a Schmitt trigger.

Intensity control components may include light intensity sensors, intensity controllers, and intensity control for motion sensing. Two illustrative applications will be discussed where intensity can be controlled by the ILS automatic system. One is keeping the effective intensity of the light about constant while ambient light changes. The other is for adjusting the intensity to follow movement under the light for security purposes. The intensity may increase to follow the source of the motion while the sensors are activated. An illustrative intensity control schematic 100 is shown in FIG. 1, showing two sets of sensors with control circuitry for three-light panel system.

When the ambient light changes, the ILS may adjust the output light intensity to keep the overall illumination about constant. In order for the adjustment to be accurate and efficient, a timing element may be coupled with the brightness control circuit. The timing may be preset to a few seconds to test if the ambient intensity is changing sufficiently to warrant the change in panel light intensity. The sensor may continue to output the voltage corresponding to the ambient intensity and changes may be matched with the timing. If the ambient light intensity varies by a preset amount, then the panel intensities may be changed accordingly. An illustrative block diagram 2600 of the Intensity Control Circuit is provided in FIG. 26.

The following are key features of the intensity control circuit: default light levels include low, high, and off and are continuously adjustable; default intensities can be factory or user set, appropriate to the application; intensity current is adjusted to keep overall light intensity about constant with changing ambient conditions; feedback to voltage control for keeping the overall intensity about constant (circuit shown in FIG. 26); and adaptive logic triggering (the capability of individual panel control versus group control of single or multiple fixtures may be built-in). This may require an external connector to the logic circuitry for interconnections between multiple light fixtures. As the ambient light intensity changes, voltage output of the light sensor varies. A feedback circuit may inversely change with the voltage change and feeds back into the supply voltage of the panel to keep the intensity about constant. A voltage regulator circuit may be appropriate for this purpose.

When a motion sensor is triggered, the "brightness mode" may increase the intensity of the light panel(s) associated with the sensor. One option for the user is to keep the light panels stationary while the intensity is adjusted to follow the motion. The other option is to activate the steppers to move the panels to cover the motion. Movement and intensity control may operate discretely and/or together. Brightness variation for motion sensing may use a MOV (metal-oxide varistor) or simple diode. The advantage of these is that they have a sharp voltage rise for small change in input voltage. When a sensor is activated, send voltage from the device back to the panel power supply to adjust the input voltage and thus, brightness level.

The motion control unit of this example will now be discussed. The primary function of the motion control unit is to detect motion within the area of illumination and track the motion throughout the activation of the motion sensors in a particular fixture. Multiple fixtures can be synchronized to track motion in a large area of illumination. There are three primary modes under which the motion control unit can operate when the sensors are activated. The system may include motion and auto-tracking as separate features, where motion does not have to use the auto-tracking feature, motion can operate through various automatic scan modes that can be selected or stored in the system, or be deleted and edited, and where motion can be manual, and where auto-tracking can be a more specialized feature of motion when enabled to follow items of interest as they enter into sensor sensing zones.

First, in the active mode, an alarm may be sent to a control center to indicate that a sensor has been activated. Position and time stamps are also sent with the information on location and real time of activation. Then, while tracking, the panels are rotated to follow the motion. See FIGS. 35-40 for illustrative codes to shift the panel positions when x or y sensors are activated. These codes may also enable rotating the panels to follow the motion for maximal illumination.

To rotate the panels, the ILS may use proprietary x-y steppers that move in increments of the full coverage. Thus, each position rotates by an amount $\Delta\theta n=\theta total/n$, where "n" is the number of increments possible between angular position extremes. The value for "n" is variable. For example, if the x coverage lies between −30 and +30 degrees, and the desired increments are ±15 degrees, then the number of increments is 4. The codes for position change in FIGS. 35-40 indicate the transitions in 15 degree increments between the initial and final angular positions, assuming a ±30 degree coverage. Thus, $\theta total=60$ degrees. Note that these are rotation transitions, not final positions.

Second, for the brightness mode, the alarm and information are sent to the control center as in the active mode. Instead of rotating the panels to follow the motion, the panel brightness is increased to follow the motion as the appropriate sensors are activated. Brightness control of the detection and subsequent evolution of the motion will be discussed in greater detail below.

Before the motion sensors are activated, the position and brightness of the panels are in the default mode. When motion is detected, the appropriate panel in the fixture increases brightness to respective level, which may be pre-specified. When the sensor turns off, the panel is returned to the default brightness. The sensor-to-panel association for three panel fixture is: −x sensor: this may increase the brightness of Panel no. 1; −y or +y sensor: this increases the brightness of Panel no. 2; and +x sensor: this increases the brightness of Panel no. 3. The sensor may send voltage that may adjust the current to the LED panel to increase brightness.

Figure 27:
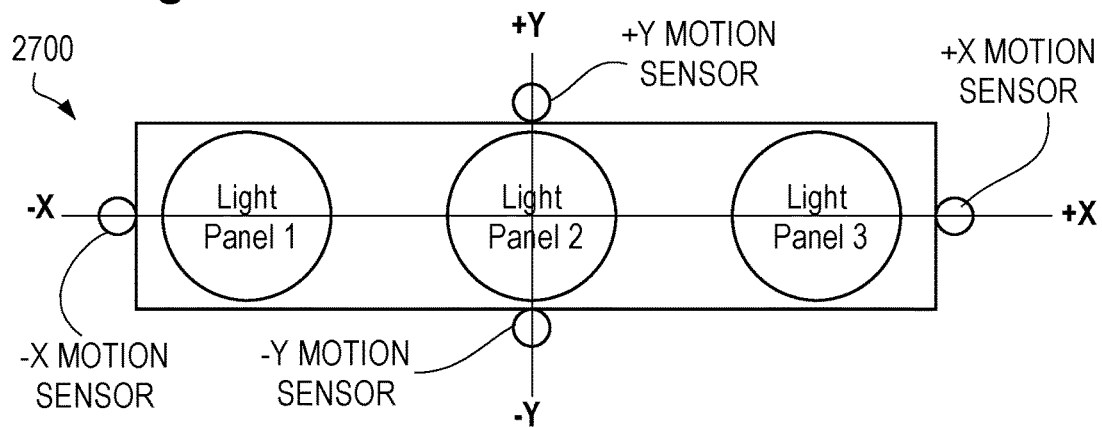
FIG. 27 is a bottom view showing position of sensors on a three-panel fixture, according to an embodiment of the present invention.

Third, in the passive mode, the alarm with location and time stamps are sent to the control center, but the panels are not rotated to follow the motion. The position of the sensors is shown in block diagram 2700 of FIG. 27. As feature for retail use in the passive mode, a counter can be attached to each sensor and updated as the sensor is activated. Instead of surveillance, this could keep track of how active various parts of the floor are as function of time. It may help in placement planning of retail items in sections of the store or with identifying the most popular items in a sale. In drive through restaurants, such a system can report how long customers have been in queue to help improve service. In manufacturing and warehousing, one can keep track of how long processes and employees take to complete function. Many applications can benefit.

In most applications, there may be multiple fixtures illuminating an area. For purposes of surveillance and following motion, this array of fixtures can be labeled in ordered pairs as $(N_i,n_j)$, where $N_i$ is the $i^{th}$ fixture in an area and $n_j$ is the label of the $j^{th}$ panel.

The following is the order of events for the motion control circuit after sensor is activated. Sensor activation: Send the position information $(N_i,n_j)$ to the control center. Activate the built-in timer for activation reporting and recording. Send time stamp to control center. Initiate video recording if cameras are installed. Activate stepper motors for rotation of panels in the active mode OR brightness control circuits for the brightness mode OR do nothing in the passive mode. Record positions of the subsequent detected motion. Sensor off: Return to default position and brightness setting after brief time delay. Multiple fixture array: Repeat the first two steps for each activated sensor, sending position and time stamps to the central control for recording of the motion (along with possible video feed information). Block diagram 200 of FIG. 2 illustrates and example position of the sensors on each three-panel fixture.

Figure 28:
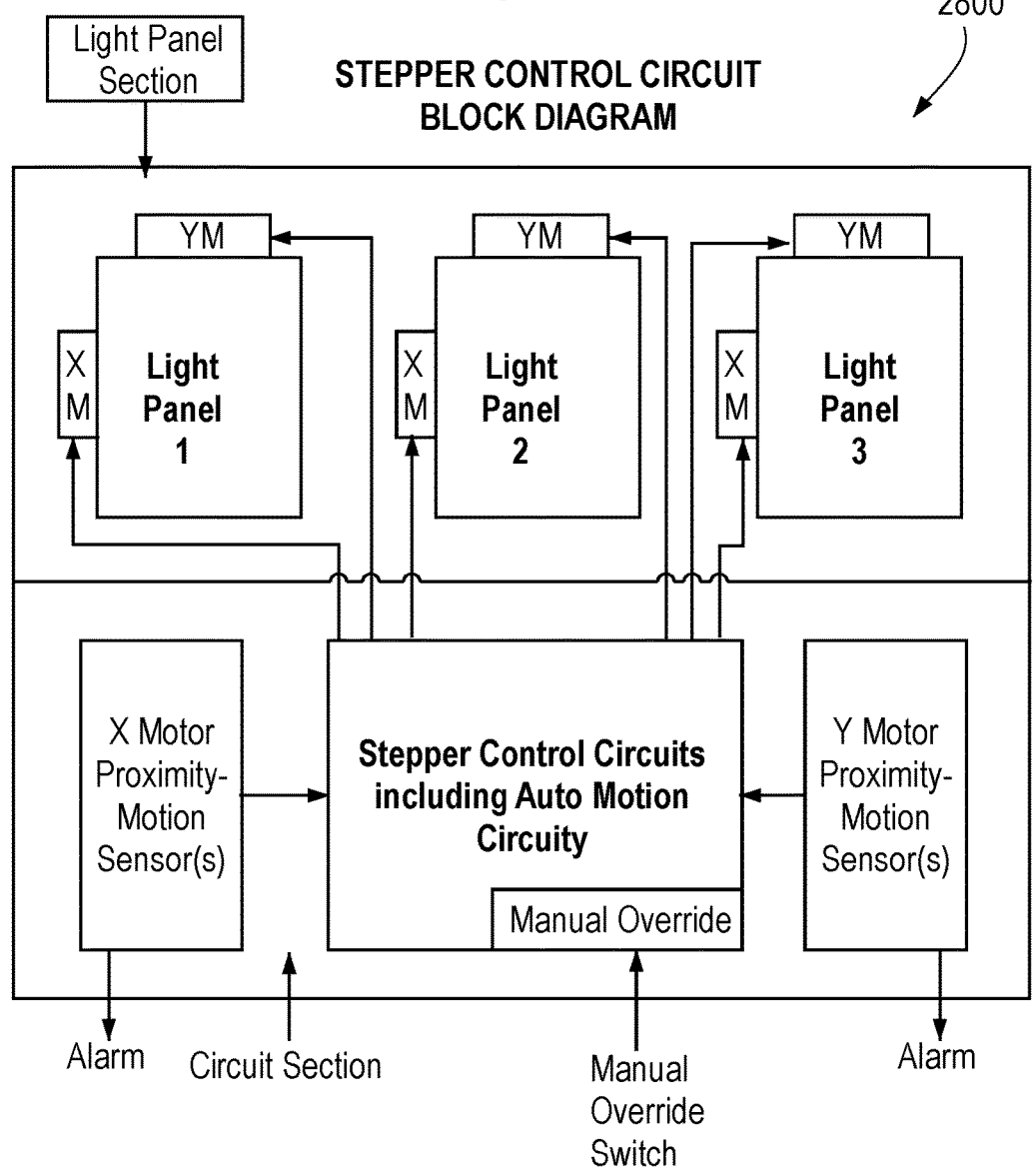
FIG. 28 is a block diagram of a stepper control circuit, according to an embodiment of the present invention.
Figure 29:
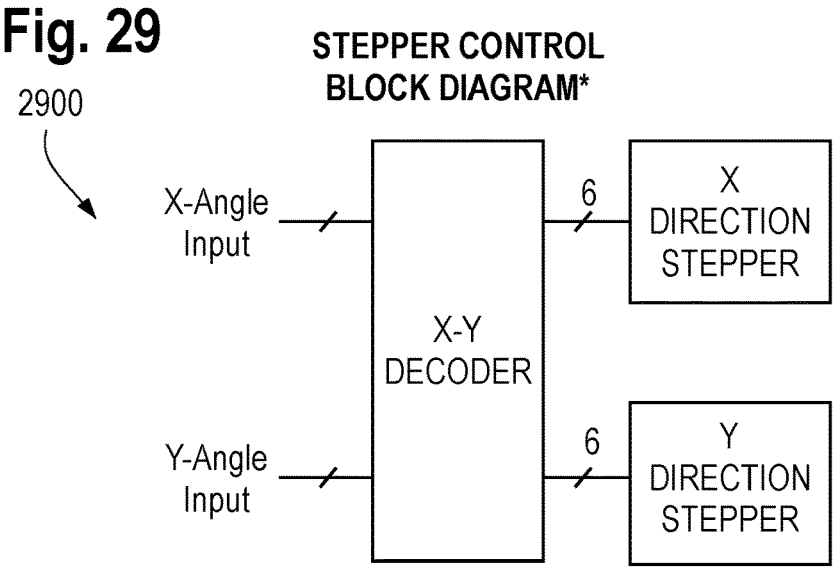
FIG. 29 is a block diagram of an X-Y stepper motor decoder, according to an embodiment of the present invention.

Dual Steppers will now be discussed in the context of this example. For proper positioning and rotation of panels, there may be two-dimensional rotation capability for each panel. The x-axis is labeled as the long axis joining the three panels in the fixture (see block diagram 2800 of FIG. 28). The y-axis is perpendicular to the x-axis and is the shorter side of the fixture. The stepper motor control circuit controls all six steppers in three-panel fixture. Inputs may include coded control signals to rotate the panels. The codes include which panel(s) may be rotated, the x or y stepper to be rotated and how far the rotation (units of a certain number of degrees) may be done. The operation of each stepper motor is controlled by an X-Y decoder that inputs numbers of degrees and direction of rotation to the individual stepper motors. The decoder block diagram for the X-Y stepper control is given in block diagram 2900 of FIG. 29. The inputs are binary codes to the X-Y decoder and outputs to the steppers for changing the panel direction. See FIGS. 35-40 for the example transition codes. The outputs of the circuitry may be the rotation and the alarms for motion detection or component failure.

Figure 30:
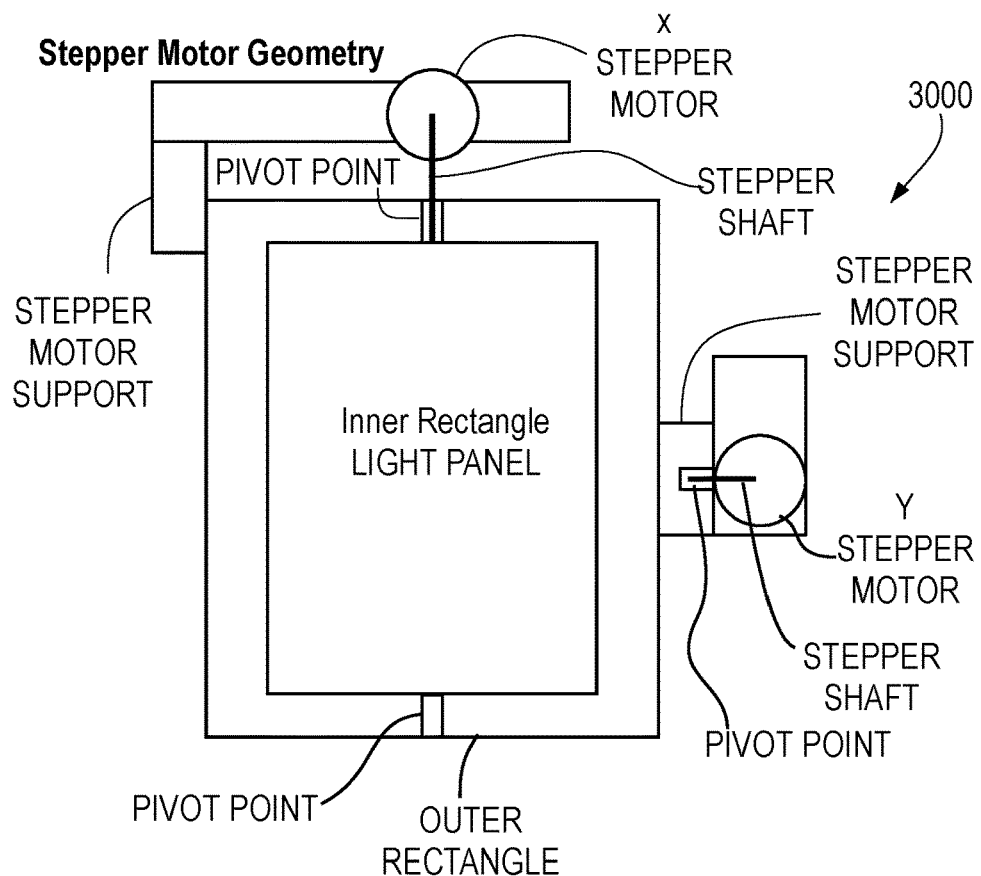
FIG. 30 is a block diagram of illustrative stepper motor geometry, according to an embodiment of the present invention.

Once the signal goes from the decoder to the stepper motor, the rotation may occur in the direction and the amount decoded. An illustrative individual stepper motor geometry is shown in block diagram 3000 of FIG. 30. The X and Y stepper motors shown may take the inputs from the decoder.

The code for rotating a particular panel may include the following information with the size of the code: (1) fixture location within an array, (n bits for 2n panels); (2) which panel within the fixture is to be rotated, (2 bits); (3) which stepper (x or y) may be activated, (1 bit); and (4) how far the panel is to be rotated, (3 bits). As an example using the preferred design, assume that the second panel in the sixth fixture of a nine fixture array should be rotated in the −y direction by 30 degrees. The nine fixtures typically require four bits to specify, the panels may be labeled as 1, 2 or 3 for left to right notation, the y-stepper may be denoted by 1 and the −30 degree rotation coded by 110. Here the first bit indicated positive 0 or negative 1 rotation and the next two bits the increments by 15 degrees. The resulting binary code may be 0101011110. Here, the labeling of position for fixtures in an array starts with 0000 and the panel in a fixture with 00. Note that alternative angular divisions are possible.

Thermal regulation in the context of the current example will now be discussed. Sources (LEDs) are sealed with wire infused glass for heating in cold weather. A thermistor, or equivalent, may sense the temperature and activates the heater. The design of the sealed lamp may be easy to service. The overall enclosure may be sealed for thermal insulation and be waterproof. The control can be achieved in part by wires for heating lenses. LED panels may have reflecting surfaces at their rear. These may be designed using material that is not sensitive to overheating. Thermal management of the enclosure may include all LED panels, stepper motors, electronic circuitry and power supplies within the enclosure.

Figure 31:
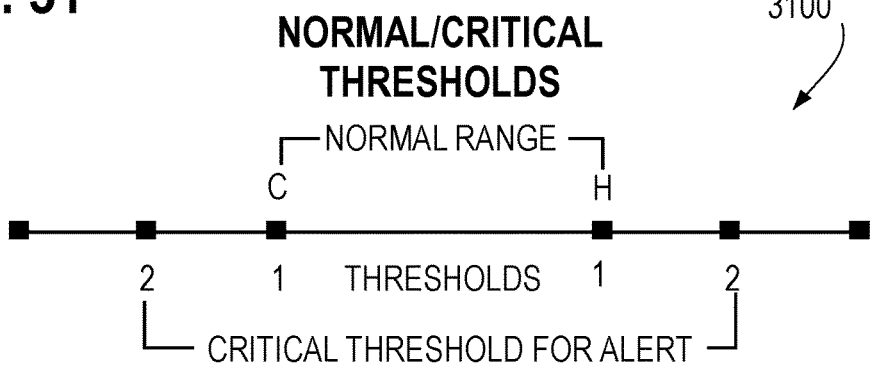
FIG. 31 is a diagram of critical temperature thresholds for thermal control of the fixture, according to an embodiment of the present invention.
Figure 32:
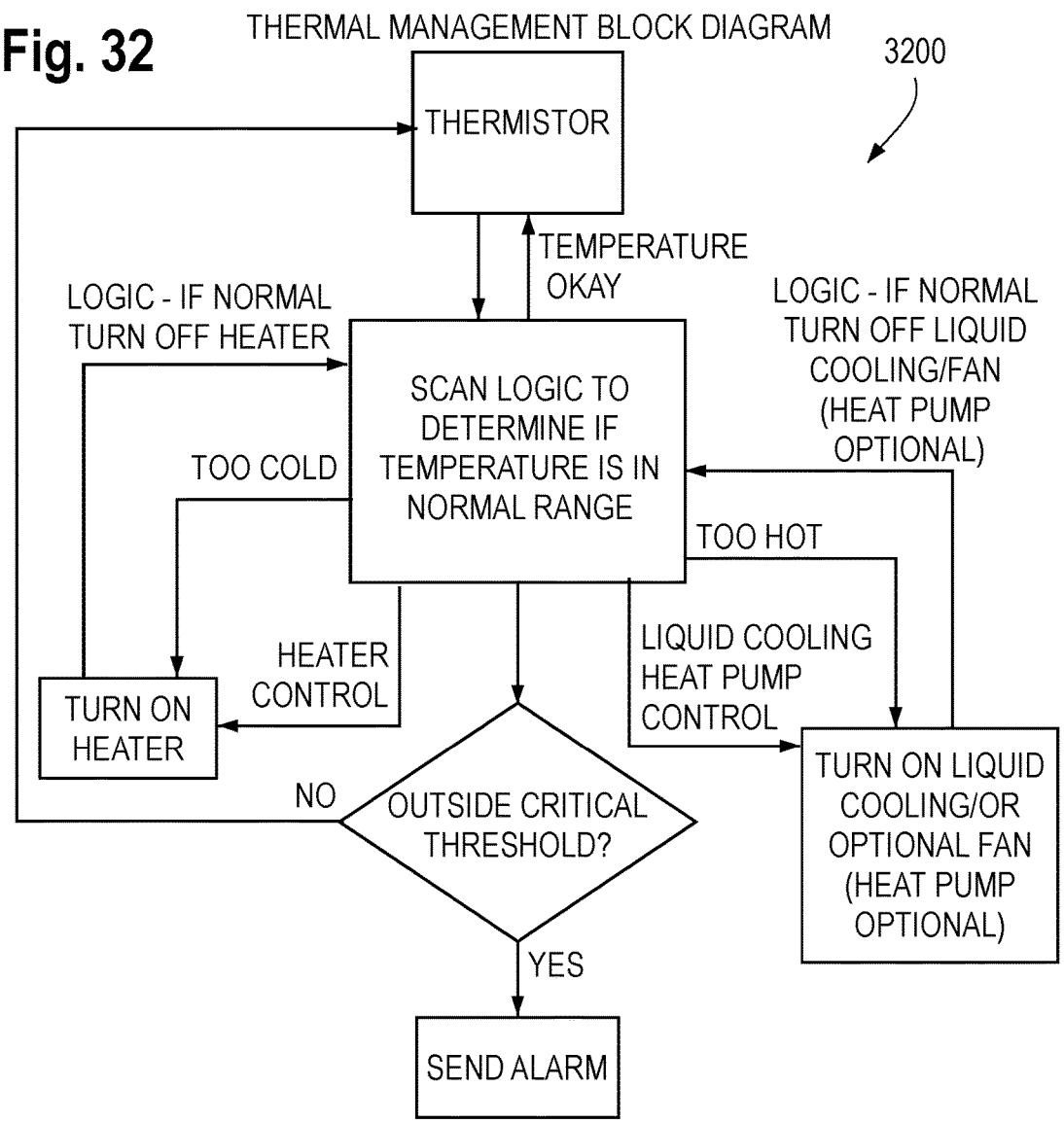
FIG. 32 is a flowchart of thermal management logic, according to an embodiment of the present invention.

The temperature sensor may measure the temperature and send a signal to the temperature control circuit if the value is outside the normal preset operating range. If the temperature remains out of the operating range for a long period (measured with an internal timer), an alert may be sent to the control room that the thermal management circuits are not performing up to specifications. Further, if the temperature continues to increase or decrease without being corrected, an alert may be sent to this effect. Thus, there may be two thresholds: one for temperature outside of range and the second for the temperature becoming dangerously extreme to damage the panels. In this case, there may be an automatic shutoff signal for the panel power. Diagram 3100 of FIG. 31 and flowchart 3200 of FIG. 32 illustrate the two-threshold system conceptually. Since every reduction of temperature of ten degrees Celsius normally doubles the life expectancy of an LED, operating temperature may be set at the lower end of the recommended operating range. If temperature is a problem over an extended period of time then a control signal can shut down the luminaire with increased safety and send or activate an audio visual alert, message, or activate and control other attached devices to be turned on or off, or to be controlled or the system may activate another spare luminaire to be used for redundancy and or emergency back up.

Thermal management includes heating for the cold extreme temperatures and cooling mechanisms for extreme heat. The temperature range may be well within the recommended range of LED operating temperatures. This may result in optimal performance and long lifetime for the panels. Thermal control features include: a thermistor or equivalent sensor to measure temperature and relay information to the temperature control circuit; dissipating heat sinks for overheating prevention; interior heater to raise the temperature of the panel to a desired value; a heating element over the lens cover to prevent freezing; and placement of LEDs and corresponding control circuits to optimize thermal management. Thermal management may include operating a fan, liquid cooling. Light panels may optionally be exposed to ambient air of an environment without a lens filter, where they still might be fitted with optional secondary optics, for better venting and cooling. Exposed light panels may include a fan, liquid cooling, or alternate design for improved venting and cooling.

One design of a heating element would be a metal ring structure with connecting wires and a central heater to thaw the mid-section of the housing. Cooling can be accomplished with heat sinks strategically placed or small exhaust fans. All sensor connections may be to both heating and cooling circuits. A logic circuit, similar to a Schmitt trigger system, can control the threshold temperatures for minimum and maximum values. Then the appropriate mechanism can be activated for temperature control.

Fixture design and lighting techniques will now be discussed, according to an embodiment of the present invention without limitation. The overlap geometry is shown in the triangles of diagram 3300 of FIG. 33. The variables are defined as follows:

$\alpha$=LED source beam angular coverage, typically between 30 and 120 degrees.

w=width of the panel in each fixture.

d=distance between centers of the panels in the fixture.

D=height of fixture above ground level. For building interior lighting, typically about 3 meters. For factory and highway lighting, can range between about 10-20 meters.

C=distance coverage of each panel in the x-direction (horizontal, or parallel to the panel configuration in the fixture).

$\Omega$=horizontal light overlap width, different from the coverage of each panel.

Most applications with the parameters described above have the quantities w and d much less than the floor distance, D. Then, the coverage of each panel is given by Equation 1:

$$C = 2D \tan\left(\frac{\alpha}{2}\right) + w \approx 2D \tan\left(\frac{\alpha}{2}\right). \tag{1}$$

Then, the corresponding overlap area for adjacent lights is given by Equation 2:

$$\Omega = C - d \approx C, \tag{2}$$

for the parameters above. Thus, only small area on either side of the coverage is not part of the overlap. This is an artifact of the fixture to floor distance dominating the parameters.

The coverage may increase with distance D, but at the expense of the intensity at the ground. For the approximation above, the intensity falls off like a point source $1/D^2$ (not a line source $1/D$), so the product of the coverage and intensity is given by Equation 3:

$$C * \frac{I}{I_0} = \frac{2\tan\left(\frac{\alpha}{2}\right)}{\frac{D}{D_0}}, \tag{3}$$

which falls off as $1/D$. The intensity Io is the quoted intensity parameter for a calibrated distance $D_0$ from the source. However, the overlap, $\Omega$ may partially compensate for this loss in overall intensity. For a three panel fixture, typically only three percent of the overall fixture coverage is not illuminated by all three panels, so the total effective intensity at the ground is given by Equation 4:

$$\frac{I}{I_0} = \frac{3D_0}{2D}, \tag{4}$$

which is about ½ for D=3m while it is about ⅒ for D=15 m, assuming $D_0 \neq 1.0$ m. However, the coverage-intensity product is not affected by as much as these figures. Typically, $D_0$ is larger than one meter, improving the numbers above.

Figure 33:
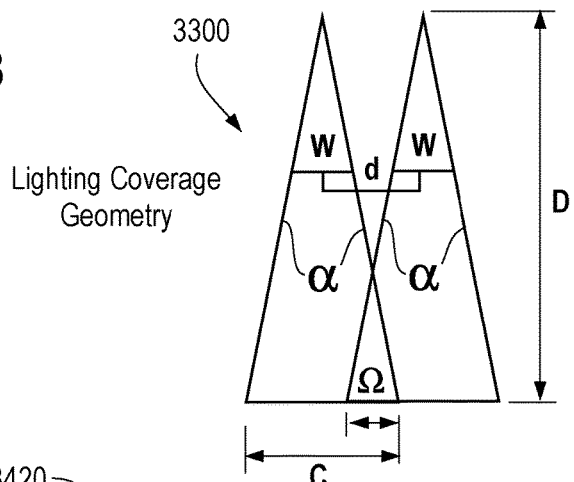
FIG. 33 is a diagram of typical light coverage and overlap, according to an embodiment of the present invention.

The fixtures may cover an area defined by (i) the coverage angle of each LED panel and (ii) the geometry of the panels within the fixture. The most typical fixture for building and parking applications may have the panel separation, d much smaller than the coverage, C so that there is considerable overlap. In diagram 3300 of FIG. 33, this corresponds to $\Omega \approx C$. Thus, the overall coverage for a fixture is just larger than C, but the intensity is almost 3 times the intensity per panel for a majority of the coverage. In placing the fixtures, the overlap in lighting can be planned for minimal overlap of beams, since the multiple panels may be sufficient for the intensity. If the triangles in FIG. 33 represent the separate fixtures, instead of panels, this placement corresponds to making $\Omega$ minimal. Thus, the overall coverage may be approximately nC×C for n inline fixtures. The criterion for placement of fixtures is then placing the fixtures a distance d apart such that d≈C. To further enhance coverage, light diffusers can be placed in the enclosure.

Illustrative enclosures will now be discussed, according to an embodiment of the present invention and without limitation. The shape of the fixture enclosure may be rectangular for the three-panel fixture. It may be large enough to include LED panels; stepper motors; thermal management elements including heat sinks, fan (optional), heater and vents; control and alert circuitry; purge valves for condensation control; lens filters and secondary optics; seals for proper thermal and moisture isolation; GPS circuits; camera (optional); RF electronics (optional); and power supplies.

The enclosures may be minimized in size to fit all of the above while allowing for efficient thermal management. The standard enclosure can be made of aluminum, alloys, other metals or thermally suitable plastics. An optional feature would include the ability to lower a fixture from the mounting post for convenience in maintenance. This could be achieved with a motorized cable system. After raising the fixture to its operational position, there may be a mechanism to twist and lock the fixture into place with a self-positioning coupling.

Positioning of the enclosures may be flexible in direction to allow for forward flood lighting, or sideways and downward for street and parking lot lighting and downward for building floor lighting. These categories would allow for many other applications.

An illustrative example of the keypad will now be discussed, according to an embodiment of the present invention and without limitation. This example is illustrated as block diagram 3400 of FIG. 34. The keypad may include the elements that provide complete control of the lighting system. Generally, this would include a numeric portion 3410 of the keypad, a directional control unit 3420, software control 3430 and sufficient displays 3440 to provide information about the system status. The numeric part 3410 typically includes numerical digits, 0 to 9; a function key to select control functions; control keys for intensity control (dim, normal, bright); a pound key to indicate the end of an input, similar to as found on a telephone; a power key just below the numeric keypad for keypad power with "power ON" indicator light; and an optional separate key for powering the light fixture. The directional part 3420 typically includes directional keys such as up, down, left, right and X-Y for the stepper motor system; capability to set directions for lighting position in degrees; software controls 3430 such as Edit, Save, Clear; and arrow keys for scrolling the display 3440.

Figure 34:
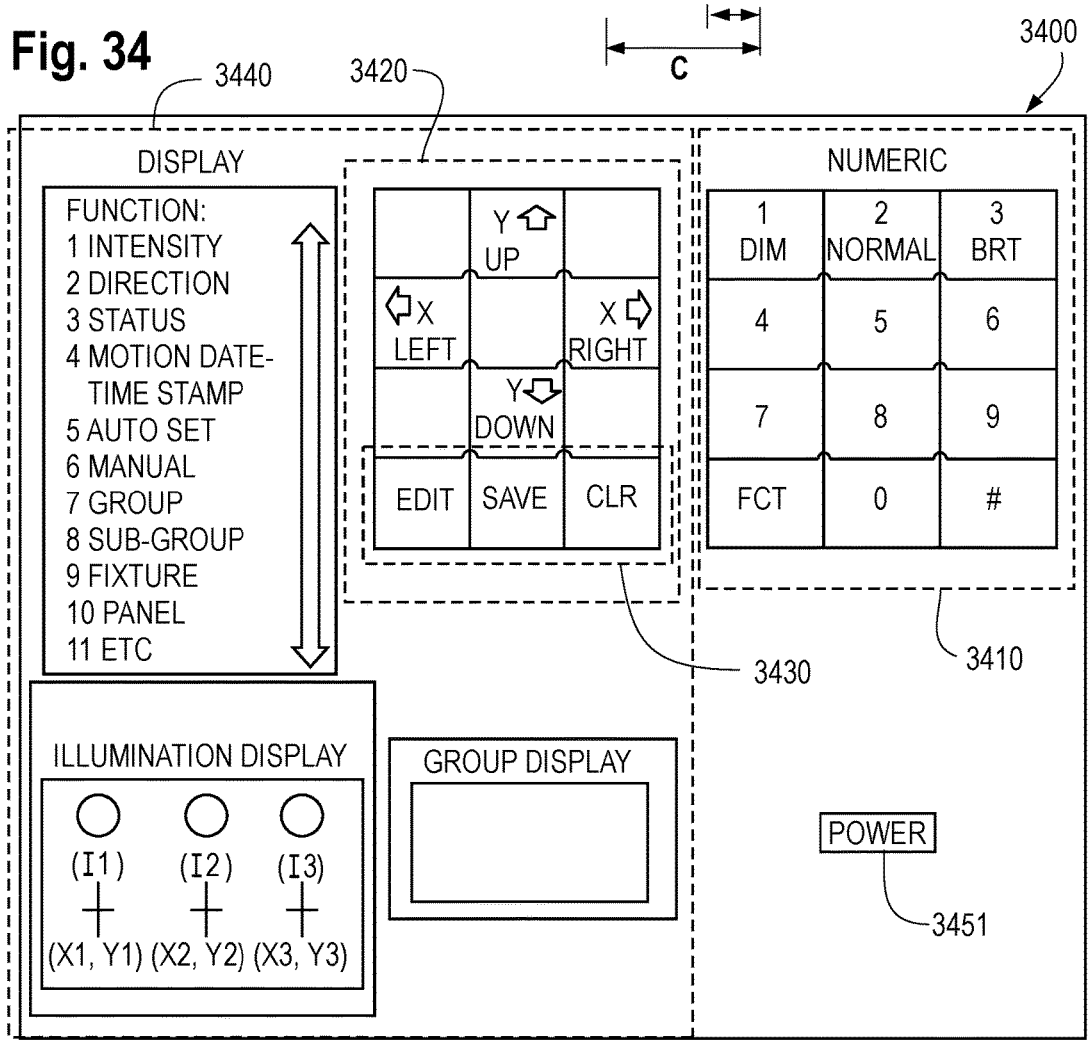
FIG. 34 is a front view diagram of a user interface controller, according to an embodiment of the present invention.

An example of the keypad functions are shown in FIG. 34. The keypad may include a decoder that converts the keypad matrix to binary code for adjusting steppers and intensity voltage. The power control 3451 may provide circuit power and backlighting for the keypad itself. The Dim and Bright keys of the numerical portion 3410 may change the light intensity incrementally by a default amount with each press of the key, until the desired intensity is reached. The Normal key may restore the intensity to the user-set default amount.

The function key of the numerical portion 3410 may select the function display. Up/down arrows of portion 3420 allow user selection of a desired function. Subsequent pressing of EDIT key of portion 3430 may allow selection of parameters for the function. Once the values are set, the SAVE button of portion 3430 may lock in the new values for that function. In the Function mode, the EDIT key allows the settings for a function to be changed. The Save key may save any changes made to setting in a mode. Once this is pressed, the programming may automatically escape that function and return to the next level upward. See the descriptions below for list of the functions and sub-functions available. The clear button may clear values listed for a function or a setting on the selected function, including alert displays.

There may be four directional keys in portion 3430: X-Left, X-Right, Y-up and Y-down. These are used to set the positions of the panels in each fixture. Each press of the key may increment the position by the default amount. In this example, the default amount is 15 degrees. Normally, only one of these may be pressed at a time.

When the FCT button of portion 3410 is pressed, the display of portion 3440 may numerically list the functions that can be edited. The numerical part of the keypad can select which function may be edited. When within a particular function any sub-function may be selected similarly. After a SAVE operation, the control may return to the next function upward.

Once one of these functions is selected, the Illumination Display may show which of the panels is to be set. The numerical keypad 3410 is used to select the panel within the fixture to be set and the Illumination Display may show the status of that particular panel. Upon saving the setting, the Illumination Display may return to the actual status of the panels within the fixture and the Function Display may show which function has been selected.

In the normal operating mode, the Illumination Display indicates the status of the lights within the panel. During an alert or input from the various detectors, the Display may indicate the nature of the alert and possible corresponding instructions. If a particular panel is involved, the Illumination Display may exhibit a flashing light for that panel.

When motion below a fixture is detected, the internal clock may generate a date-time stamp that may be displayed on the keypad or be sent to computers. The duration of the motion detection and corresponding directional flow of the motion may be indicated on the Controller Display or the Computer Display. This information may be saved in nonvolatile Read Write RAM with the capability to be retrieved later.

The Auto Set function may return all directions and intensities for the light panels to the default values originally set by the user. The Manual Mode may allow panels to be controlled manually. This can be used for following detected motion, for example.

This display, in the lower left corner of the keypad in portion 3440, shows which lights in a fixture are ON in the NORMAL mode. In the CONTROL mode, they indicate which lights are being set by the keypad function. Similarly, the direction display arrows show the positioning of each panel in each mode. One up/down and/or one left/right light may be on to indicate the quadrant of positioning of that panel. The pairs of numbers, (Xi, Yi) show the direction of the panels, while the single numbers below the circles, (Ii) indicate the level of intensity of each panel. The index i indicates which panel within the fixture is activated. The numerical indicators below the arrows show the panel position angles in each direction.

An illustrative operation for setting the direction and intensity of light is discussed below. A separate control pad with similar format may be used for controlling fixture arrays in grouping. This may provide keypad control for single fixtures and a master control for all fixtures in an array. For the master keypad, selection buttons allow choosing of a fixture in an array. Then the control settings may apply to only that particular fixture.

An illustrative operation for setting the direction and intensity of light will now be discussed, without limitation. To enter the manual mode, select FCT and 6 on the keypad (see FIG. 34). This may transfer the control to the user. The DISPLAY may then highlight 1 Intensity and 2 Direction. The user may select one of these by selecting FCT and 1 or 2 on the keypad. The ILLUMINATION DISPLAY may highlight either the circles and "I" values for intensity or crosses and (Xi, Yi) values for direction. The present intensity or direction may be shown on the ILLUMINATION DISPLAY. Simultaneously, the DISPLAY may highlight the numbers 7-10 to choose the group, sub-group, fixture or panel to be controlled. The preset array of lights may be indicated on the GROUP DISPLAY to aid the user in selecting the proper lights to be controlled. As a smaller group of lights is selected, the GROUP DISPLAY may adjust the graphic accordingly, so the user can focus in on the proper light selection. The level of control 7-10 may be displayed in text on the GROUP DISPLAY. Once the panel to be controlled is selected, The GROUP DISPLAY may prompt the user for the appropriate settings. Note that the FCT key typically may be pressed before selecting the numerical level of control.

If the user wants to set a fixture or subgroup identically (same intensity or direction), when the next lower level is shown on the DISPLAY the user can press the "pound key" on the NUMERIC keypad and the control be transferred to the latest level selected. All settings may be made to that group of lights simultaneously.

Example 1: manually setting the intensity of panel 3 of fixture 6 of group 2 in an array of two groups of nine lights each. This example will be provided by the paragraphs below. Assume that the panel starts at level two of five intensity levels and the user wants to increase the intensity to the fourth level.

FCT 6: This selects the MANUAL mode.

FCT 1: Selecting the intensity function to control. The DISPLAY may then highlight selections 7-10 and GROUP DISPLAY may prompt with "At which highest level will you start?"

FCT 7: The user has selected the GROUP level and the GROUP DISPLAY may highlight the two groups (as labeled boxes) from which to select.

Press 2: Pressing the number 2 may highlight group 2 in the display.

FCT 9: This selects the FIXTURE level and the individual fixtures in group 2 are shown in the GROUP DISPLAY.

Press 6 now, fixture 6 is selected and highlighted in the GROUP DISPLAY.

FCT 10: The PANEL level is now selected and the individual panels are shown in the GROUP DISPLAY box.

Press 3: Panel 3 is selected and the third circle and (I3) are highlighted in the ILLUMINATION DISPLAY.

BRT: Pressing the BRT (brighten) key twice increases the light intensity by 2 levels of intensity, set to JND (just noticeable difference).

SAVE: The SAVE key may then save all of the newly edited settings.

The control may then revert to the original input setting after the MANUAL mode was selected. To return to the AUTO mode, press FCT 5. This concludes Example 1.

Example 2: manually setting the direction of panel 3 of fixture 6 of group 2 in an array of two groups of nine lights each. This example will be provided by the paragraphs below. Assume that the panel starts at (0, 15) (pointing to the right) and the user wants to orient the panel at (−15, −15) (toward the lower left). The following sequence of keypad selections may be made.

FCT 6: This selects the MANUAL mode.

FCT 2: Selecting the direction function to control. The DISPLAY may then highlight selections 7-10 and GROUP DISPLAY may prompt with "At which highest level will you start?"

FCT 7: The user has selected the GROUP level and the GROUP DISPLAY may highlight the two groups (as labeled boxes) from which to select.

Press 2: Pressing the number 2 may highlight group 2 in the display.

FCT 9: This selects the FIXTURE level and the individual fixtures in group 2 are shown in the GROUP DISPLAY.

Press 6 now, fixture 6 is selected and highlighted in the GROUP DISPLAY.

FCT 10: The PANEL level is now selected and the individual panels are shown in the GROUP DISPLAY box.

Press 3: Panel 3 is selected and the third cross and (X3,Y3) are highlighted in the ILLUMINATION DISPLAY.

Arrow X Left: Pressing the "arrow Left" key twice moves the light panel left by 30 degrees (each press is in 15 degree increments).

Arrow Y Down: Pressing this once may rotate the panel downward by 15 degrees to the final destination.

SAVE: The SAVE key may then save all of the newly edited settings.

The control may then revert to the original input setting after the MANUAL mode was selected. To return to the AUTO mode, press FCT 5. This concludes Example 2.

Example 3: Setting the intensity or direction of a group of fixtures in an array. These may be electronically linked by fixture ID numbers. This example will be provided by the paragraphs below. We will select subgroup 3 in a group of five subgroups within an array.

FCT 6: This selects the MANUAL mode.

FCT 1 or FCT 2: Selecting the intensity or direction function to control. The DISPLAY may then highlight selections 7-10 and GROUP DISPLAY may prompt with "At which highest level will you start?"

FCT 7: The user has selected the GROUP level and the GROUP DISPLAY may highlight the five groups (as labeled boxes) from which to select.

Press 3: Pressing the number 3 may highlight subgroup 3 in the display.

Once this subgroup is selected, the procedure for setting the intensity or direction proceeds in the same way as in the first two examples. Any command given may be applied to all of the fixtures in that subgroup. This concludes Example 3.

An example will now be discussed for automatic setting of direction and intensity of lights. There may be factory set default modes built into the system controller. These may include following two modes: (1) middle level of intensity (normal for that application) and direction perpendicular to the face of the fixture itself; (2) middle level of intensity (normal for that application) and fan-out direction of the end panels, both at 30 degrees.

When the AUTO SET function is selected, the factory default modes may appear along with any past saved user set modes in the DISPLAY box on the keypad. When a particular mode is selected, the intensity levels and the directions of the panels within the fixture for that mode may appear in the ILLUMINATION DISPLAY box on the keypad. To select that particular mode, press the # key, which stores the mode in the buffer. Then, the DISPLAY may highlight the group settings, functions 7 through 10. The prompts may then continue as with the manual settings in the last section. Once the level of application is selected along with the particular lights to be set, then press SAVE on the keypad to set that mode for those lights.

Within the AUTO SET function, there may be selection prompt for "Setting New Saved Modes". When this function is selected, new mode can be created. The buffer may allow the setting of the new mode. The mode may be set in the same way as the manual settings. This includes the level and particular light panels that may be affected by this mode. By pressing SAVE after setting the intensity and direction of the lights, the new mode may be saved in memory.

To delete previously set mode, highlight the mode within the AUTO SET function. Then press CLEAR on the keypad. The DISPLAY may indicate, "Are you sure you want to delete this mode?" Pressing CLEAR again may delete the mode and pressing SAVE may cancel the deletion.

To edit a previously set mode, select the mode as explained above. Then press EDIT on the keypad. The ILLUMINATION DISPLAY may highlight the settings of that mode. Then proceed with the editing process as with the manual settings and the new saved modes. When finished editing, press SAVE. The DISPLAY may indicate, "Are you sure you want to save these changes?" Pressing SAVE again may save the changes and pressing CLEAR may cancel the editing.

An example of the system controller will now be discussed. The main features of the system controller may include: to enable the stepper motors to rotate the panels in two dimensions (labeled X and Y above); to allow control of single or a group of fixtures as outlined in section 7; enabling the capability to detect and follow intruder motion with the appropriate illumination; to send an alarm to a control center when motion is detected; controlling light intensity for adjustment to changing ambient conditions or for panning the area where motion is detected; using scan modes that are saved in memory to scan from desired point 1 to desired point 2 to desired point 3 and so on, and then cycle through those positions as desired and where various scan modes can be saved, recalled, edited, and later utilized; and interfacing the controller to both lighting systems and other electronic devices, such as video cameras for surveillance, computers for recording light system conditions over time or reporting the status of the system elements.

The intensity circuits may be able to adjust light panel intensity in response to (i) manual control, (ii) automatic presetting of light intensities or (iii) automatic controlling of intensity when tracking motion in intruder detection. The two single-directional stepper motors may rotate in fifteen degree increments to rotate the panels in one of two directions (labeled +X, −X, +Y, −Y in section 3). These may be in response to (i) manual control, (ii) automatic presetting of light directions or (iii) automatic controlling of motion tracking for intruder detection. The motion tracking feature includes manual override capability.

Connections typically will be made to pass data between lights, controllers and monitors at the central control location. Data handling may be included in the following ILS capabilities: functional control of intensity and direction (sensors and actuators); group control of all capabilities; communications, including ID encoding, encryption, source and receiver handshaking, routing of signals; display coding and information; thermal control signals; status of operational modes, failure and alert signals; and help routines for maintenance. Certain data which is part of memory storage may include control data for intensity and direction; GPS data and corresponding for each fixture; encryption keys for ID and locations of fixtures; surveillance data for detected motion; time-date stamp data for operation and surveillance; recording of system status and alarms issued; video data if attached to the surveillance subsystem; and data stored in memory including preprogrammed and default settings.

Electronic considerations will now be discussed for an illustrative embodiment without limitation. The following electronic considerations may be included in the overall design of the controller: voltage overload protection circuitry; built-in alarms for various applications as outlined in the next section; optimization for electrical signal routing, thermal management and service; memory capability that recalls the default settings and the most recent manual settings to return to after a motion sensing and tracking cycle; voltage levels may be adjusted for the proper lumen/candela requirements of each type light panel, lamp or light source used; timing circuits (timers, displays, memory) and recording may be included in the controller; GPS sensors to locate particular fixtures for data, troubleshooting and motion sensing for surveillance; software may include the algorithms for detecting and tracking motion, which include both directional tracking and intensity adjustment for best illumination of the motion area; and electronic circuits may include capability for wired and wireless communication and control. Power requirements may include capabilities to drive light sources; sensors; thermal control circuits; electronic circuits, including the controller; busses; memories; communications circuits; displays; alert circuits; stepper motors/servo motors/solenoids, gears; and battery backup for solar and wind power capability. Proper grounding of all elements is highly desired in the manufacturing process.

Alerts include surveillance and component failure. An alert is a response to either detected motion in the surveillance mode or failure of any component of the ILS system. Motion alerts include human or object movement in real time. The following components are part of the ILS alert features: user setting of location of array, clock (also GPS setting) and alert modes; visual and audible alert capabilities; time/date and location stamps; wiring and location circuits for identifying specific location of a fixture in an array; listing and graphical capabilities for display of alert location; evolution of alerts for multiple fixtures; memory storage of alert information with user selection of longevity; and reset and clear functions for alerts.

The user can initialize the alert system by coding the location of fixtures in an array. The clock may be normally set by a GPS for accuracy of time-date-location stamps. Alert modes that can be set include method of alerts (listing on computer or pictorial information) and activation of each type alert. Each alert has both visual (screen output) and/or audible (alert sound) capabilities that are selected by the user. The wiring and selection software allows identification of the fixture location within an array. This is coded to give the user location information that is coupled with the time stamp from the clock to output a date-time stamp for each alert sent. This information is recorded in a master memory and kept for specified amount of time. When multiple motion alerts are sent, the evolution of the subsequent motion is recorded and this information can give an indication of the path of the intruder or object in real time. If a security camera is included in the security or motion tracking system, video recording can help identify the intruder(s) or object(s). The whole alert system has both reset and clear functions for each type of alert. All alert systems may have power failure alerts and may be backed up by battery. The battery can include either solar powered battery charging or sensors that harvest energy from surroundings.

Component failure may include, but is not limited to the examples of the following paragraphs:

Illumination: Send alert if illumination goes below a selected threshold. Use a high resistance "voltmeter" to monitor load voltage (versus lumens). When a light panel goes out, becomes defective, or dims due to age, adjust the other panels in the fixture to keep illumination about constant.

Power failure: Send alert if power is lost (use of an inverter). Alert circuit typically must have battery backup.

Thermal: If inside temperature (for the fixture) goes either below or above the Low/High thresholds, an alert is sent to indicate temperature malfunction. This alert indicates that the temperature compensation circuit failed. The user can either shut down the light or physically have it checked. For a higher temperature threshold, this would indicate fire in the fixture and the power would be immediately shut off while sending an alert to central control.

Communications and control signals: Use polling cycles to test communication between fixtures and central control. If handshaking is negative in a particular fixture, send an alert. Then reroute the signals in an alternate part of the array.

Optional Healing mode: When a light panel goes out, send alarm and replace with alternate panel in the same fixture. This typically requires a larger fixture with more comprehensive thermal control.

Component insert logic: During maintenance, if the wrong light panel or component is placed in the fixture, an alarm may be activated to indicate that the panel or component is not matched properly. There may be an embedded code in each panel or component that typically must be matched with the fixture code in order for the alarm to stay silent and to allow for light panels and components to operate.

Stepper/Servo motor failure: This typically requires a visual maintenance check of the fixtures. The default position can be manually changed and visual inspection of the rotation may indicate whether the panels are working properly. This concludes examples of component failures.

An expensive alternative for the stepper/servo motor malfunction would be to attach slotted a circular disk to each stepper/servo with small laser or small light source shining through. The light would activate a photocell whose voltage feeds into an up-down counter decoded into degrees. The count direction can drive the stepper in either direction. When the pulse is sent and the laser light or light source light may not get blocked during programmed direction, a failure alert may be sent.

The following chart describes alert descriptions and outputs/action. All actions in the last column are preceded by sending an alert to the central control station with GPS information included.

TABLE 1

Alert descriptions and actions

| Type Alert | Description | Additional action |
| --- | --- | --- |
| Illumination | Low lumens with load voltage low | Adjust other panel outputs |
| Panel outage | Panel goes out and load Voltage changes | |
| Power | Outage or voltage fluctuation | Activate battery backup |
| Thermal | Fixture out of temperature range | Physically check fixture |
| Thermal | Fixture temperature over high threshold | Shut down fixture power |
| Communication | Polling handshake comes back negative | Give location, reroute signal |
| Component insert mismatch | Comparator indicates code mismatch, function disabled | Alert |
| Sensor malfunction | Poll sensor output voltage | Send location information |
| Motion detection | Motion sensors activated | Adjust direction/ illumination, send alert |

Example displays will now be discussed, according to an embodiment of the present invention and without limitation. The displays may include a control center computer displays with following:

Status: The status screen may show all fixtures in the master group with their intensity and direction status. It includes information on the power source (e.g., electric generator, solar or wind)

Failure Alerts: This screen may show where the failure is occurring, the type of failure and preprogrammed set of possible actions to take. Input capability may be transferred to the keypad. The panel ID may be displayed for positive identification.

Intruder/Object alert: The screen may contain real time information on the location and subsequent motion of an intruder or an object via the input signals of the motion sensors mounted on each fixture. The status of the motion tracking, including panel angles and intensities, may be displayed as well. If video cameras are mounted or used, the monitor may show the real time video of the motion.

Manual configuring: When in the manual configuring mode, the display may update the intensity and position information to the status screen, so that the proper settings are ensured.

Keypad displays: See above on keypad design and displays.

The displays may relay alerts. Table 1 describes the action taken with the corresponding alerts. These alerts may be displayed on the keypad and system monitor in the control center. The corresponding circuit types are described in the following (see Table 1 above).

Illumination: If one panel in the fixture goes out, a voltage regulator adjusts the other panels in the fixture to maintain about constant illumination. Each panel may have maximum voltage control so that the recommended maximum voltage for that LED or light panel may not be exceeded.

Panel outage: Either the illumination control may be activated or fault tolerance switching may occur. See the description below for fault tolerance switching.

Power: When power to a group of lights goes out, a battery/generator backup circuit may optionally be enabled. An alert may be sent to the control center.

Thermal: If a fixture exceeds the maximum temperature rating for more than 15 seconds, the power to the fixture may automatically be shut off and an alert may be sent to the control center and the keypad display. The thermal sensor indicating maximum temperature may continually activate a timer and when the timer reaches a limit, for example, 15 seconds, it triggers a switch to cut the power to the fixture.

Communication: If the polling handshake comes back negative, the location may be identified, and the location ID may be sent as an alert. Electrical signal control may be rerouted around the faulty fixture.

Sensor failure: If the polling of sensor output voltage is negative when an input test signal is sent during test phase, the fixture ID is sent to the control center and to the keypad display as an alert.

Motion: The motion control circuits are included in the motion section, 3.

Fault tolerance switching-when installed: When a light panel or light source goes out, dims because of age or becomes faulty, a spare is rotated into position or is otherwise activated to operate and an alarm is sent to the central control area.

The following describes the list of materials needed to implement the illustrative lighting design as outlined. Additionally, block diagram 4100 of FIGS. 41A-41B visualizes the billing of materials for illustrative systems for the lighting system.

The categories and their general descriptions for the billing of materials are as follows.

Power to all circuits: Variable power supplies with voltage protection for intensity, motion control, displays, alerts and temperature control circuits. Battery backup in case of power failure.

Intensity circuitry: Brightness control unit, ambient light sensor and timing circuits for ensuring ambient light stability.

Motion control: X-Y stepper motors with decoders, drivers, rotating light panels with built-in reflectors and motion sensors with stepper control circuits. These may be coupled with brightness control for intruder or object monitoring.

Circuits: User programming circuits, memory interface for default settings and user control, circuits for brightness, timing, motion control (steppers), display, switches, alerts, optional transceiver, wired and wireless keypads, security displays and circuits and system controller or computer control, and display as outlined in the previous sections.

Displays: System control master display, alerts, status, security and GPS location displays.

Temperature control: Sensors and control circuits for thermal control, optional heating elements, fans and heat sinks.

Enclosures: Overall enclosure with gaskets, seals, a lens filter or light diffuser for each panel, condensation purge valves with protective vents, mounting system and trademark nameplates.

The list includes only the general requirements to implement the ILS. Specific components may depend on the final designs of each component.

A variety of advanced lighting controllers are utilized to rotate the position of a plurality of light panels that have one or more light sources on them. The controllers can also adjust the light panels for light intensity and color. Light panels include one or more light sources, preferably LEDs that are connected to servo motors, stepper motors, solenoids, worm or other gears that are connected to the light panels through gears and/or a shaft so that light panels and their respective attached light sources can be rotated to the positions desired. The plurality of light panels utilize servo motors, stepper motors, other motors, solenoids, gears, and/or similar mechanisms that can direct light to shine light in varying forward and in varying peripheral directions to shine light forward from a light fixture and to shine light through the sides of a light fixture. The advanced controllers have the following circuits, buttons, switches, logic and/or software, computer or remote devices, ergonomic interfaces and displays, including wired and wireless transmission and wireless receiving circuits, mobile phones and applications, to allow a user to:

1) Save different light intensities in non-volatile memory that can later be scrolled through, recalled and utilized. Optionally and save scan vectors from point to point from one position to another where many scan modes can be saved, deleted, edited, later recalled and utilized.

2) to rotate light panels to a desired position to shine light where desired and to also save different positions in memory that can later be scrolled through, recalled and utilized.

3) Change the color emanating from the light panels to a desired color to shine light where desired and to also save different colors in memory that can later be scrolled through, recalled and utilized.

4) Save different light intensities in memory that can later be scrolled through, recalled and utilized.

5) Rotate light panels to a desired position to shine light where desired and to also save different light panel positions in memory that can later be scrolled through, recalled and utilized. This would include moving light panels individually, in groups, to shine light in forward directions, to shine light in peripheral directions, and to shine light in 360 degrees in models having a 360 degree enclosure fitted with a 360 degree lens filter. This would further include moving light panels in seven or more states that are mentioned elsewhere in this specification. At a minimum, the seven motion states in a three light panel system include: 1) moving light panel one individually (1st state), 2) moving light panel three individually (2nd state), 3) moving light panels 1 and 2 together (a 3rd state), 4) moving light panels 2 and 3 together (a 4th state), 5) moving light panels 1 and 3 together (a 5th state), 6) moving light panels 1, 2, and 3 together (6th state), 7) moving light panel 2 individually (7th state). Please note that the states can be numbered differently but are shown here in their particular order to reflect the order in FIG. 22.

6) Change the color emanating from the light panels to a desired color to shine light where desired and to also save different colors in memory that can later be scrolled through, recalled and utilized.

7) Selectively control individual light panels within a plurality of light panels within a single fixture to vary each light panel individually for rotation, direction or position.

8) Selectively control individual light panels within a plurality of light panels within a single fixture to vary each light panel individually for light intensity.

9) Selectively control individual light panels within a plurality of light panels within a single fixture to vary each light panel individually for color.

10) Selectively control, create groups of individual light panels, save groups of individual light panels, and delete groups of individual light panels within a plurality of light panels within a single fixture to vary each group of light panels simultaneously or individually for rotation, direction or position.

11) Selectively control, create groups of individual light panels, save groups of individual light panels, and delete groups of individual light panels within a plurality of light panels within a single fixture to vary each group of light panels simultaneously or individually for light intensity.

12) Selectively control, create groups of individual light panels, save groups of individual light panels, and delete groups of individual light panels within a plurality of light panels within a single fixture to vary each group of light panels simultaneously or individually for color.

13) Select, control, create groups of fixtures, save groups of fixtures, and delete groups of light fixtures from an array of light fixtures to control each light fixture's individual light panels to vary each light panel of the chosen light fixture or group individually or simultaneously for rotation, direction or position.

14) Select, control, create groups of fixtures, save groups of fixtures, and delete groups of light fixtures from an array of light fixtures to control each light fixture's individual light panels to vary each light panel of the chosen light fixture or group individually or simultaneously from an array of light fixtures to control each light fixture's individual light panels to vary each light panel of the chosen light fixture individually or simultaneously for light intensity.

15) select, control, create groups of fixtures, save groups of fixtures, and delete groups of light fixtures from an array of light fixtures to control each light fixture's individual light panels to vary each light panel of the chosen light fixture or group individually or simultaneously from an array of light fixtures to control each light fixture's individual light panels to vary each light panel of the chosen light fixture individually or simultaneously for color.

16) Select individual light fixtures from an array of light fixtures to select, create, save, delete, and control groups of multiple light fixtures to vary each group of light fixtures simultaneously or individually to move light panels for rotation, direction or position.

17) Select individual light fixtures from an array of light fixtures to select, create, save, delete, and control groups of multiple light fixtures to vary each group of light fixtures simultaneously or individually to select and control groups of multiple light fixtures to vary each group of light fixtures simultaneously or individually for light intensity.

18) Select individual light fixtures from an array of light fixtures to select, create, save, delete, and control groups of multiple light fixtures to vary each group of light fixtures simultaneously or individually for color.

19) To lock and/or unlock controller functions to prevent accidental changes to the position, rotation, or angle of light panels; or to prevent accidental changes to light intensity, and/or accidental changes in color.

20) Have separate control over peripheral lighting mechanisms to rotate peripheral light panels in inward and outward directions concurrently with respect to a further light panel that shines light in a forward direction.

21) Have a separate control for vertical adjustment of the entire array of light panels within a fixture.

22) Have a reset button to change the rotation angle or position of the light panels within a fixture to a default horizontal or vertical position.

23) Have a reset button to change the intensity of the light panels within a fixture to a default light intensity.

24) Have a reset button to change the color of the light panels within a fixture to a default color.

25) Have ergonomic display readouts to illustrate what light panels within a fixture are selected, or to illustrate what groups of light fixtures are selected along with their respective light intensity values, position values of rotated light panels, or color selection of light panels or fixtures.

26) Have the ability to communicate sound or audio from a controller with a microphone or from a controller having a microphone jack to a light fixture having a speaker to create an intercom system.

27) Have the functionality to step through saved settings such as through a plurality of various saved light intensities, through a plurality of various saved light panel positions, or through a plurality of various saved color choices.

28) Have the functionality to step through saved settings using randomizing algorithms such as stepping through a plurality of various saved light intensities, through a plurality of various saved light panel positions, or through a plurality of various saved color choices activated by a button to randomly step through saved settings or activated by sound and/or the rhythms of music where the musical beat can serve to make the random generator step through the various saved settings in memory for mood lighting.

29) Have bidirectional laser communication systems to include the transmission of data and control signals to at least one or to a plurality of bidirectional laser communications enabled lighting systems in a fixture with networking control and data sending capability between systems.

30) Have bidirectional wireless and/or wired communication system circuits to communicate data and/or to control one to a plurality of bidirectional wireless and/or wired communications enabled light fixture systems with control and data networking capability.

31) Have bidirectional satellite communication system circuits to communicate data and/or to control one to a plurality of bidirectional satellite communications enabled light fixture systems with control and data networking capability.

32) Have sensors and sensor communication system circuits with GPS to communicate sensor data and sensor location from lighting fixtures having sensor and GPS circuits to communicate sensor and location data through wired or wireless means to controllers, to satellites, to cell phones, to remote devices, to wireless devices, to communication networks, and to computers.

33) Have the capability to add one or more threat sensors of various kinds for a multitude of applications to detect biological, chemical, radiological, flammable liquids, explosives, health or other threats.

34) Have the capability to add one or more sensors of various kinds for a multitude of applications for industrial, quality control, scientific, engineering, biometric, weather, manufacturing, industrial processes, sanitation, food processing, agricultural growth control and quality control monitoring, food chain monitoring, epidemic containment, sea water, lake water, river quality monitoring, water table level monitoring, contamination and containment monitoring, gas containment, anomaly monitoring, and other applications.

Alternatively, a portable wireless screw-socket intercom system is proposed where communication is achieved by having four central parts with several components: 1) a power supply and/or transformer with at least one wireless audio transmitter that has a microphone and a button that a user depresses to transmit sound and an antenna, 2) at least one screw-based male socket wireless receiving intercom that can screw into a light socket commonly found on lamps to receive power containing: a speaker, a wireless audio receiving circuit, an antenna, a volume control, and having a further female socket built-in to allow a user to screw in a separate light bulb with a male screw-based or other type of connecting member, 3) a power switch on the wireless receiving screw-socket intercom communication system that allows power to separately energize the intercom receiving circuit, speaker, and volume control of the intercom socket, and 4) a separate power switch to turn on (or energize), dim or control the intensity any attached light bulb.

At least one or a plurality of wireless sound transmitters can send sound wirelessly to one addressable selected light socket intercom system or to many wireless sound receiving addressable selected light socket intercom light screw sockets that are configured to receive sound. It is further contemplated that each transmitter and sound receiving circuit can be configured to work across a selectable variety of frequencies to avoid external frequency interference and to operate using either analog or digital communication to allow one to send secure communication packets to communicate in a secure fashion. The wireless screw-socket intercom light system communication variation is illustrated by diagram 2300 of FIG. 23.

Figure 25:
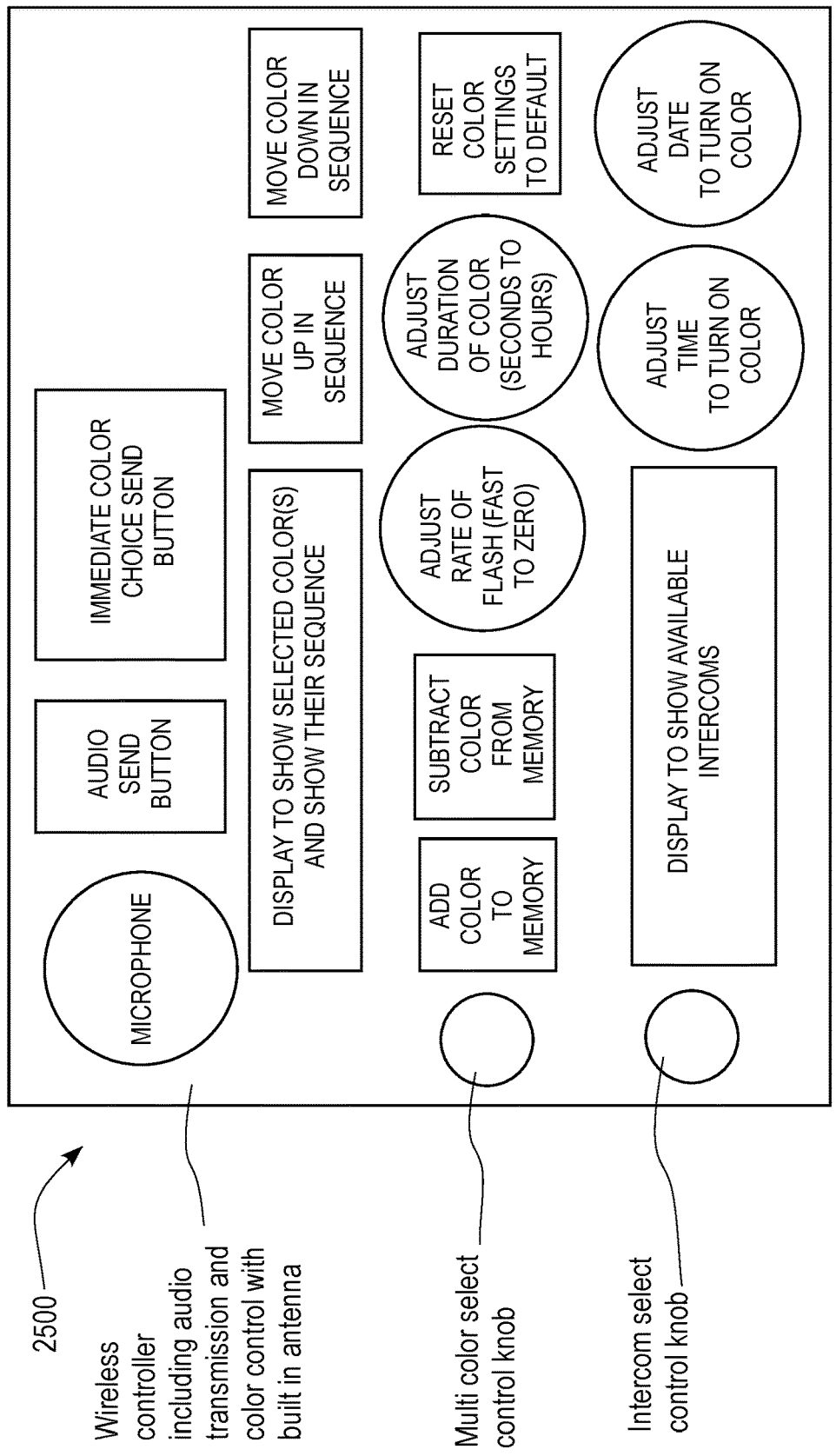
FIG. 25 is a block diagram of a portable wireless screw-socket multicolor intercom communication system, according to an embodiment of the present invention.

Further optional versions of the wireless screw-socket intercom communication light system include a configuration to create a screw-socket intercom communication multicolor light system (shown by block diagram 2500 of FIG. 25) with multicolor light source capabilities and control circuits with specialized controllers. These systems would have an option to screw in a multicolor capable light source that can be selectively turned on through wireless or through wired controllers remotely where a user through the use of a remote controller can select a targeted multicolor light source in a particular targeted and addressable screw-socket intercom light system, change the color as desired, and/or alternatively select a group of alternating colors to be displayed through the attached multicolor light source.

The colors may be chosen by the user operating the controller, are saved in memory in the controller. The control signal outputs may make the multicolor light source change to the desired color or colors are received by the targeted screw-socket intercom light system to change the color of the light source as desired by a color control receiving logic circuit built into the screw-socket intercom light system. The time each color is displayed can be set or be programmed by the controller, and the sequence of each color being displayed by the multicolor light source can be selected. The colors can be set to alternate from one color to the next saved in memory in a repeat cycle by the controller to repeatedly alternate from one color to another in a continuous fashion until the color alternating color-changing transmission mode is canceled by a cancel button on the controller. Virtually any color or group of colors can also be chosen to flash or turn on at a programmed, date schedule, or at a selectable rate of speed as well through control buttons on the remote wired or wireless controller. Brightness can be adjusted by the remote wireless or wired controller or by a user varying a control switch or knob physically located or built into the screw-socket intercom multicolor light system. An intercom system built into the luminaire can also have a voice mail box where through a transmitter, a person can leave a message at a particular addressable luminaire and a person at the luminaire can later securely listen to the message that was sent through head phones or through the luminaire's speaker(s), perfect for leaving a message to a worker at their office, say if you stepped in and wanted to leave them a note at their luminaire, or if you want to leave a message to one or more of your family members. It is also understood that multiple messages can be saved and deleted from the memory banks, there is also an option to make the message secure, or to allow public access.

These multicolor features allow companies to use the screw-socket intercom multicolor light system to enforce and to better control office, business, and/or industrial productivity where companies can assign meanings to particular colors, color sequences, to flashing colors, and duration of colors to have employees or managers respond to color codes for particular business processes, conditions, or for alerting employees that an important email has been sent to them, or for other targeted events and conditions that might merit attention as to the corporate rules that might be set up in relation to color codes that the screw-socket intercom multicolor light system can provide. After a business event that relates to a particular color has been satisfied, an employee that fulfilled a task related to a particular transmitted color code might then visit, call or email the manager that activated that employee's color light code and tell him or her that they satisfied the issue and then the manager can turn off the color code transmission to a normal state such as green, or white, or stop a light or color from flashing or alternating, or to remove one or more colors being transmitted from a group of alternating colors to remove one or more alerts and condition codes so employees can resume working on other matters not requiring special attention.

Further, optional text can be transmitted through a wired or wireless remote controller to the memory of the screw-socket intercom multicolor light system and/or to scroll text sent from a controller onto a display of a targeted screw-socket intercom multicolor light system having an optional LCD or LED capable of displaying text along with transmitting color codes to the light source to provide further directions or clarifications to employees. The text can also be cleared or reset by the sender or the manager. Variations of the text feature include a wireless receiving display that can receive text sent from a controller to operate with the screw-socket intercom multicolor light system in a separate wireless system, the display can connect to the screw-socket intercom multicolor light system through wired means, or the text LCD or LED can be directly built into the screw-socket intercom multicolor light system.

Alternatively, a portable wireless wall plug-in intercom system is proposed where communication is achieved by having four central components: 1) a power supply and/or transformer, at least one wireless sound transmitter that has a microphone and a button that a user depresses to transmit sound, 2) at least one wall plug-in wireless receiving intercom system that can connect to an electrical socket, to an extension cord, or to a power cord connecting to an electrical socket to receive power containing a power supply or transformer, a speaker, a wireless sound receiving circuit, a volume control, and 3) a power switch on the wireless wall plug-in intercom communication system that allows power to energize the intercom receiving circuit, speaker, and volume control.

Figure 24:
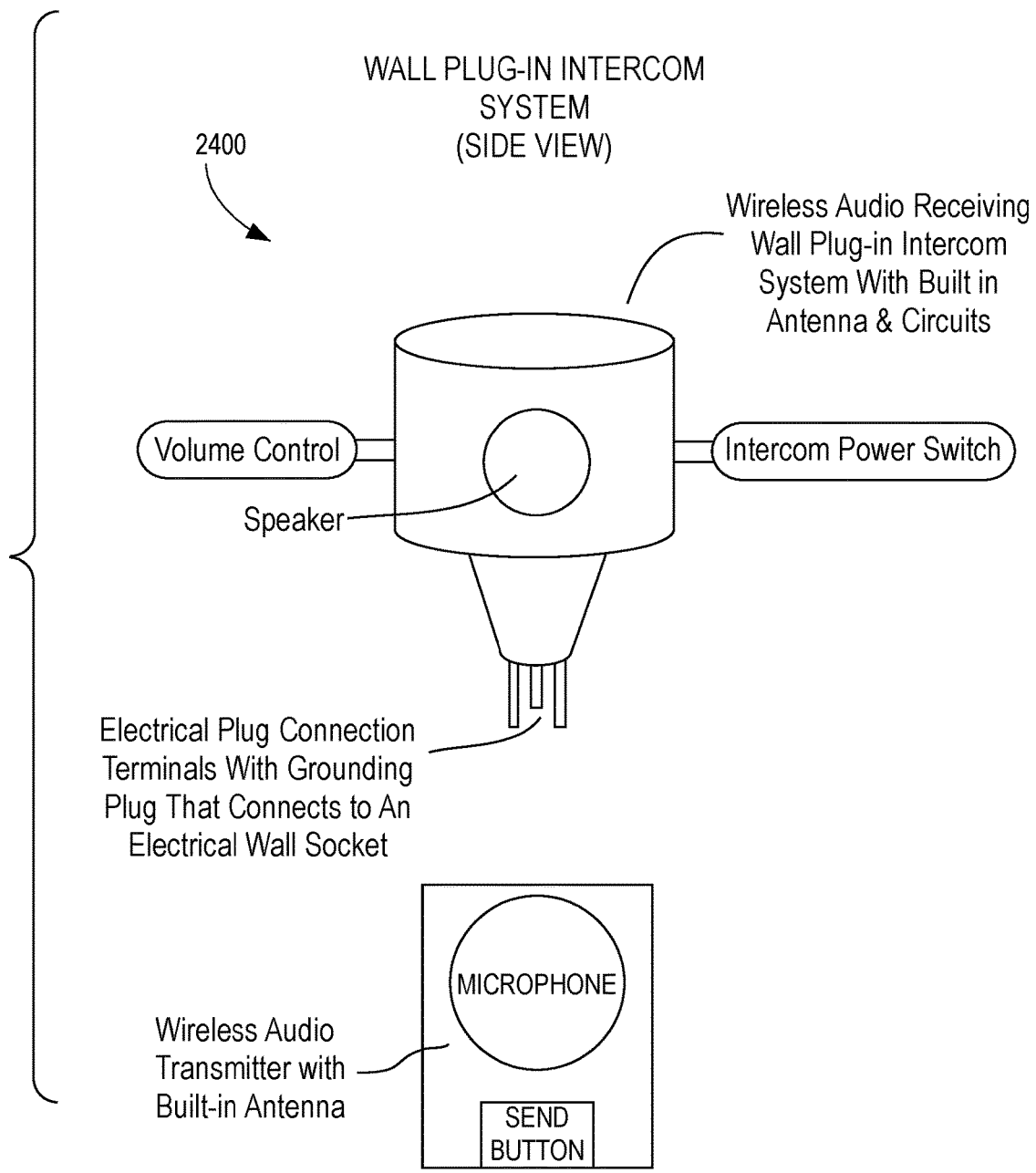
FIG. 24 is a block diagram of a portable wireless wall plug-in intercom communication system, according to an embodiment of the present invention.

It is contemplated that at least one or a plurality of wireless sound transmitters can send sound wirelessly to one or to many wireless sound-receiving intercom wall plug-in units that are configured to receive sound. It is further contemplated that each transmitter and sound receiving circuit can be configured to work across a selectable variety of frequencies to avoid external frequency interference and to operate using either analog or digital communication to allow one to send secure communication packets to communicate in a secure fashion. The wireless wall plug-in intercom communication variation is illustrated in diagram 2400 of FIG. 24.

Further, a variation of the three-panel servo/stepper assisted lighting technology systems can also include the option to control multicolor light sources placed on the light panels that can be selectively turned on through wireless or through wired controllers remotely where a user through the use of a remote controller can select a targeted multicolor light source in a particular three-panel servo/stepper assisted lighting technology system, change the color as desired, and/or alternatively select a group of alternating colors to be displayed by the three-panel servo/stepper assisted lighting technology system. The colors may be chosen by the user operating the controller, are saved in memory in the controller, and the control signal outputs to make the multicolor light source change to the desired color or colors are received by the three-panel servo/stepper assisted lighting technology system to change the color of the light source as desired by a color control receiving logic circuit built into the three-panel servo/stepper assisted lighting technology system.

The time each color is displayed can be set or be programmed by the controller, and the sequence of each color being displayed by the three-panel servo/stepper assisted lighting technology system having multicolor light sources can also be selected. The colors can be set to alternate from one color to the next saved in memory in a repeat cycle by the controller to repeatedly alternate from one color to another in a continuous fashion until the color alternating color-changing transmission mode is canceled by a cancel button on the controller. Virtually any color or group of colors can also be chosen to flash at a programmed or at a selectable rate of speed as well through control buttons on the remote wired or wireless controller. Brightness can be adjusted by the remote wireless or wired controller.

These multicolor features allow companies to use the three-panel servo/stepper assisted lighting technology system to enforce and to better control office, business, and/or industrial productivity where companies can assign meanings to particular colors, color sequences, to flashing colors, and duration of colors to have employees or managers respond to color codes for particular business processes, conditions, or for alerting employees that an important email has been sent to them, or for other targeted events and conditions that might merit attention as to the corporate rules that might be set up in relation to color codes that the screw-socket intercom multicolor light system can provide.

In an illustrative embodiment, dual stepper motors may be used per each electromechanically pivotal-rotatable light panel for X-Y coordinate directional control and positioning of the light panels that contain one or more light sources. In other embodiments, the light fixtures can be developed having one stepper motor per light panel to have only X or Y positioning capability instead of both X and Y positioning ability. The preferred design of the present invention uses dual stepper motors per each light panel, one for X-axis movement, the other for Y-axis movement of each light panel to provide incremental rotational control of a light panel. In the preferred design, one light fixture may have a total of six (6) stepper motors to induce electromechanically pivotal-rotational movement of three light panels both in X-Y directions within the light fixture. See block diagram 2800 of FIG. 28 for the stepper control circuit. See block diagram 2900 of FIG. 29 for the X-Y stepper motor decoder. It is assumed and contemplated that other technologies besides stepper motors can be used such as servo motors, solenoids, mechanisms, assemblies, and other motors to rotationally move pivotal light panels in the directions desired either through manual electronic controls or through programmed default or user-defined settings. As indicated, a servo motor can be used instead of a stepper motor, though a stepper motor is the preferred choice for expense reasons.

Further, one or more solenoids can be extended or retracted attached to pivotal-rotatable light panels to affect desired X-Y coordinate positioning of the light panels. However, stepper motors or servo motors would be more accurate in positioning and/or in rotating the electromechanically movable pivotal-rotatable light panes assemblies, with the stepper motor being the preferred choice for expense reasons. It is further contemplated that only one stepper motor, or one servo motor, or one solenoid can be used to affect pivotal-rotational electromechanical movement of the light panel in X or Y directions as desired instead of both X and Y directions. Of course, it is further contemplated that one light fixture may have a combination of stepper motors, servo motors, solenoids, and/or other mechanisms, assemblies and/or motors to affect motion of the respective light panels within a fixture.

In an embodiment of the light fixture there are three electromechanically movable, pivotal-rotatable light panels included in each light fixture having one or more light sources on each light panel, with preferably LED light sources for greater energy efficiency and long life to reduce energy and replacement costs. In alternative embodiments, different numbers of light panels, different numbers of light sources, and different types of light sources can be used within a light fixture.

In one embodiment, light panels of rectangular or square shapes with light sources are built into an electromechanical assembly that may include a swinging light panel that allows movement in the X-direction attached to an X-axis direction stepper motor where the entire assembly with the X-axis stepper is further attached to another outer panel that is attached to the Y-axis stepper that moves the assembly with the X-axis stepper motor in the Y axis direction to affect both X-Y coordinate positioning of the light panel. In the preferred design, there are three light panel assemblies with each having dual stepper motors as depicted. See FIG. 26 for a block diagram 2600 of the intensity control circuit showing light panels, light intensity sensors and motion sensors. See FIG. 28 for a block diagram 2800 of the Stepper Control Circuit. See FIG. 29 for a block diagram 2900 of the stepper motor decoder. See FIG. 33 for a diagram 3300 of typical light coverage and overlap of light panels in a fixture. The light panels can be fabricated to be different shapes and sizes to accommodate the placement of light panels and the stepper motors into different types and shapes of enclosures. By fabricating light panels into different shapes and sizes such fabrication would allow light panels to be inserted into rectangular enclosures, square enclosures, rounded enclosures, and into different shaped enclosures to accommodate different installation desires such as inserting an X-Y coordinate dual stepper system with rounded or half-moon shaped light panels on light panel one and light panel three while having a square or rectangular middle light panel with optionally rounded or curved edges to produce an enclosure and light panel system with a circular look for ceiling or other rounded lights.

One or more Light Intensity Sensors may be built into the light fixture to sense the overall operating lumen rating of the fixture and lumen brightness settings set by the user of the installed light panel light sources. These settings may be used to alert users if the lumens given off by a light fixture are less than the rated lumen rating and they are further used to determine if the Light Fixture meets default or user-defined brightness levels. Ambient light intensity sensors are used to determine if dusk or dawn have commenced to assist in the automatic turn on or turning off the lighting systems.

Various photocells and ambient light intensity sensors can be used. See FIG. 26 for a block diagram 2600 of the intensity control circuit showing light panels, light intensity sensors and motion sensors. The light intensity sensors that provide alerts check to see if the luminaire conforms with proper lumen ratings. The light intensity sensors can be placed in the projected light path of each respective light fixture to monitor light intensity levels given off by the luminaire in real time. Ambient light intensity sensors can be built into the enclosure where the sensor side faces outside the enclosure to determine the status and strength of ambient light to turn the light fixture on or off through logic light intensity threshold circuits. The light intensity sensors can be surrounded by physical tubes or collars that limit or expand the angular sensing ranges of the light intensity sensors to trim, narrow, or expand the light sensing beam angle for the desired light sensing ranges to be effected if deemed so required for various light sensing applications.

In one embodiment, there may be four motion sensors included in each light fixture to determine −X, +X, −Y, and +Y direction of motion. It is contemplated that different numbers of motion sensors can be used for alternative embodiments. In the preferred design, there are four (4) motion sensors that are built into or attached to each light fixture enclosure that are positioned to monitor the area under the light where one is placed to the left in the −X position, one to the right in the +X position, one to the bottom of the fixture in the −Y position and one to the top of the fixture in the +Y position. See FIG. 26 for a block diagram 2600 of the intensity control circuit showing light panels, light intensity sensors and motion sensors. See FIG.

27 for a bottom view diagram 2700 of a light fixture showing the position of these sensors on a three-panel fixture.

Different types of motion sensors can be used to detect heat, humans, or to detect movement of reflective surfaces or to further use other motion sensors for different applications. Sensors are triggered when an object is within the aimed vicinity of a particular sensor. If, for example, a person moves under the left sensor range of the −X position sensor of a light fixture the −X sensor would be activated. If a person moves towards the right from the left eventually the right or +X sensor would be activated. If a person moves towards the top sensor range of the +Y sensor, the +Y sensor would be activated. If a person moves towards the bottom sensor range of the −Y sensor, the −Y sensor would be activated. Upon sensor activation motion can be tracked and be stored into memory and be reported and different electromechanical pivotal-rotational modes can be selected to move the light panels as programmed or as selected by users. Further, various modes can be entered into where the light panels follow the motion, where the light panels follow motion and become brighter when tracking a person or object, and/or there can be passive modes where there are only reports and alerts of something being tracked by a particular sensor or a group of sensors in a light fixture.

Since each light fixture may have GPS circuitry, the motion being tracked can be coupled with the location of the light fixture to determine what light fixture motion sensors have been activated for various metrics and surveillance interests. The motion sensors can be surrounded by various physical tubes or collars that maintain the angular sensing ranges of the motion sensors and to trim, narrow, or expand the motion sensing beam angle for the desired motion sensing ranges to be effected if deemed so required for various motion sensing applications.

The Thermal Management Circuit may include a temperature sensor or thermistor to sense temperature of the light fixture to control heating and cooling of the light fixture and to provide alerts, alarms, and thermal status of light fixtures in operation, including alerts if the fixture might be too cold, too hot, or on fire. The thermal management circuit may include heat sinks, heating elements to warm the light fixture internally if it is too cold or frozen, and/or an optional wired-heating element is used in the lens filter or light diffuser to eliminate, fogging, ice or condensation.

Optionally, an electronic fan can cool the light fixture. If the light fixture becomes too hot, warnings or alerts may be sent to the keypad controllers or to the computer interfaces, and if too hot the system may be optionally set to shut down the light fixture or to cut off power to prevent fire. If a fire condition occurs the thermal management circuit may send an alert and power would be automatically cut off to the light fixture. See FIG. 31 for a diagram 3100 of critical temperature thresholds for thermal control of the fixture. See FIG. 32 for a diagram 3200 for a process flow chart block diagram of thermal management logic. A heater element within the light fixture is also operated by the thermal management circuit to warm the stepper motors in extremely cold conditions for proper operating temperature ranges.

An advanced power supply is utilized to provide surge protection, for soft start and shut downs, to provide clean power, to provide variable power needed for different default and programmed brightness requirements, and to provide an interface with rechargeable batteries that power circuits to provide alerts in the event of a brown out or black out power outage. A solar battery can be provided to provide power to recharge the batteries for alerts as well. Further, sensors and circuits that provide power outage and other alerts may otherwise be powered by technology that harvests energy from surroundings. The power supply can supply energy to the light fixture and/or there can be an alternative switching power supply system that selects wind power to batteries or solar power and batteries to power the light fixture at night or in low light conditions.

There may be three types of keypad controllers and displays: one keypad controller and display that controls an individual light fixture, a master keypad controller and display that controls a plurality of light fixtures or groups of light fixtures preferably installed in a central control room location, and a computer interface with software that allows light unit fixtures to be connected to a computer system for individual, group control, or to control a plurality of light fixtures. See FIG. 34 for a front view diagram 3400 of the present invention showing a general diagram of keypad controller design. The keypad typically must contain all of the elements that provide complete control of the lighting system. At a minimum, there typically may be a numeric portion of the keypad, a directional control unit, a brightness control interface, software control and sufficient displays to provide information about the system status.

The numeric portion may include numerical digits (0 to 9); function key to select control functions; control keys for intensity control (dim, normal, bright, to include variable control of dim to bright ranges); pound key to indicate the end of an input, similar to a telephone, power key just below the numeric keypad for keypad power with "power ON" indicator light; and optional key for powering the light fixture.

The directional control unit may include directional keys such as up, down, left, right and X-Y for the stepper motor system; capability to set and save directions for lighting position in degrees; software controls such as Edit, Save, Clear; arrow keys for scrolling the display; and one or more scrollable or regular displays.

The Timing Circuit may serve a variety of functions including providing date-time stamps of sensor findings and to send a date-time stamp with every alert or alarm sent to keypad controller displays and computers, and to provide a date-time stamp each time motion is detected by individual light fixtures. The timing circuit also may operate to determine a programmed period when a particular action reverts to a dynamic, default mode, or pre-programmed setting after being altered by a sensor once a sensor is no longer activated. The timing circuit can have a variety of timed modes for functions used by the lighting fixture.

Heat Sinks may be attached or built into the light fixture enclosure and/or onto the light panels. It is possible to include heat sinks attached to the light enclosure with fins protruding outwardly from the light fixture enclosure. It is also possible to have heat sinks within the center of the light fixture attached to the light panel behind the light sources where the light sources use the heat sinks as reflectors. The heat sinks in this case may have a polished side to act like reflectors on one side and have heat sink fins on the other side of the light panels to dissipate heat throughout the enclosure or proceed outside the back of the light fixture. The light fixture might have the light panel heat sink fins protruding externally from the enclosure where the movable back of the light panel would be exposed to the outside of the light fixture with heat sink fins protruding externally from the back of the light panel. In the case where the back of the light panel is exposed outside of the unit the light panel assemblies may be sealed themselves for weather proofing, waterproofing, and hazard area requirements.

Also, light panels with optional secondary optics or coatings may be exposed to ambient air without a lens filter.

An electronic fan, liquid cooling (with optional heat pump(s)) is optionally included in a light fixture to help cool the light fixture or to circulate warm air in a cold light fixture if required. The electronic fan would be driven by the thermal management circuits.

An optional wired-lens, wired-light, or non-lens filter diffuser is included in various designs that have an interface with the Thermal Management Circuit that heats the lighting fixture lens or light diffuser to melt ice or eliminate ice, condensation or fogging when activated by the Thermal Management Circuit. The optional wired lenses or optional wired light diffusers would have a wire embedded within the lens or diffuser that would heat up to melt ice or to eliminate condensation or fog. Further, the wired lens or the wired light diffusers may be tinted to provide different shades of polycarbonate, glass, acrylic, or other transparent or semi-transparent materials to serve better for particular applications such as fog, underwater purposes, or to serve other applications. The wired lenses or wired light diffusers can be made out of bullet resistant or standard strength materials.

One or more lens or non-lens filters and/or light diffusers are included in the fixture to seal the unit with a transparent or semi-transparent cover to allow the transfer of light out through the light fixture while protecting internal components. The lens filters or light diffusers may be tinted to allow the desired lighting effect for fog or other considerations for different applications. The lens filters or light diffusers may be tinted to allow the desired lighting effect for fog or other considerations for different applications. Further, the lens filters or the light diffusers may be constructed with different shades of polycarbonate, glass, acrylic, or other transparent or semi-transparent materials to serve better for particular applications such as fog, underwater purposes, or to serve other applications. The lens filters or light diffusers can be made out of bullet resistant or standard strength materials.

Secondary optics may optionally included to trim, narrow, or expand the beam angle of light sources on light panels if deemed so required for various lighting applications. The Secondary optics can be additional lens covers directly over the light sources or light sources or light panels can be surrounded by tubes or collars that maintain the angular projection of light coverage proceeding out of a light fixture to trim, narrow, or expand the beam angle of light sources on light panels if deemed so required for various lighting applications.

Optional reflectors may be included behind light sources on the lighting panels to reflect light outwardly through the lens filters and/or light diffusers from the internal portions of the light fixture. The light panel board where light sources are mounted can be fabricated to have a reflective surface, or heat sinks having a reflective surface can be mounted behind the light sources on the light panel with the reflective surface facing the light sources. Further still, added reflectors can be mounted behind the light sources on each light panel.

The standard enclosure can be made of aluminum, alloys, other metals or thermally suitable plastics. An optional feature would include the ability to lower a fixture from the mounting post for convenience in maintenance. This could be achieved with a motorized cable system. After raising the fixture to its operational position, there may be a mechanism to twist and lock the fixture into place with a self-positioning electronic-mating coupling. The enclosure can be made out of bullet resistant or standard strength materials.

One or more purge valves and/or desiccants are optionally included within an enclosure that can vent gasses and/or liquids to release them outside of the fixture enclosure for condensation and moisture control and/or to equalize pressure of the fixture internally with a fixture's surroundings when desired in various applications. Various purge valves and desiccants are commonly found as parts within the industry.

The keypad controllers and fixture control circuits typically must contain all of the elements that provide complete control of the lighting system. There typically may be a numeric portion of the keypad, a directional control unit, a brightness control interface, software control and sufficient displays to provide information about the system status. See block diagram 3400 of FIG. 34 for a front view of the present invention showing a general diagram of keypad controller design.

The numeric portion may include numerical digits (0 to 9); function key to select control functions; control keys for intensity control (dim, normal, bright, to include variable control of dim to bright ranges); pound key to indicate the end of an input, similar to a telephone; power key just below the numeric keypad for keypad power with "power ON" indicator light; and an optional separate key for powering the light fixture. The directional control unit may include directional keys such as up, down, left, right and X-Y for the stepper motor system; capability to set and save directions for lighting position in degrees; software controls such as Edit, Save, Clear; arrow keys for scrolling the display; and one or more scrollable or regular displays.

Various controllers or keypads can be designed or utilized to affect the functions of this specification that are specific to the lighting system application and that the descriptions throughout this document of controllers and keypads may not be construed as limiting.

The individual keypad controller-display systems are designed to control individual light fixture(s) and are used to receive alerts from individual light fixtures, the master control room keypad controller-display system allows you to control a plurality of light fixtures or groups of light fixtures and to receive alerts, alarms, and status messages from a plurality of light fixtures or from groups of light fixtures.

The Alert-Alarm-Status Circuit provides operating status information of the various circuits within the intelligent light fixture system with date-time stamps and information from each individual light fixture location by using a GPS circuit that provides the location of each light fixture sending an alert-alarm or status message or audio visual warning. The Alert-Alarm-Status Circuit provides alerts, alarms, messages in audible or visual form to the keypad controller-display systems for individual light fixtures, for the master control room keypad controller-display system that allows you to control a plurality or groups of light fixtures and to receive alerts, alarms, and status messages from a plurality or from groups of light fixtures.

The global positioning system (GPS) circuit may be included within a fixture to provide the location information of the fixture to the alert-alarm-status circuit when the alert-alarm-status circuit sends an alert, alarm or status message or warning to the individual or master keypad controllers and/or displays and/or to computers through the use of a global position sensor. Various global position system circuits and global positioning sensors are commonly available throughout the industry.

Optional systems include: camera(s), RF circuits, rechargeable batteries, solar cell(s) that recharge batteries, and a fault tolerant switching circuit that rotates spare light panels into position to replace faulty light panels. Optional cameras can be connected to the light fixture electronics and controllers so that cameras and recording of what cameras see can be activated at any time or when motion sensors are activated. Optional radio frequency (RF) circuits can be utilized to provide radio frequency control and reporting, including alerts, alarms and status messaging instead of wired control and wired reporting between controllers and light fixtures. Optional rechargeable batteries can be used to power lighting circuits and alert circuits to be used instead of conventional power or to be used in the event of a power failure. The rechargeable batteries can be further powered or charged by solar batteries or by wind power systems utilized by light fixtures. Optional fault tolerant switching circuits sense when a light panel burns out or when a light panel diminishes its lumen rating to the point where the faulty light panel is automatically rotated out of position and a new light panel replaces it in the proper operating positions as the first faulty light panel. A replaced light panel that utilizes fault tolerant switching may work as the original light panel that it replaces before it burnt out or diminished in quality. Stepper motors move light panels incrementally a number of degrees where transitions occur to move the stepper motors in 15 degree increments as follows: See FIGS. 35-40 for tables 3500, 3600, 3700, 3800, 3900, and 4000 showing various light panel transitions using the zero default. Default positions indicate the default position of light panels. A zero default may indicate that the light panels default to a perpendicular position that that shines light directly below a pole mounted lighting fixture area. A Fan-Out default may indicate that light panels default to a wider-spread light panel beam angle that covers more area outwardly where light panel one and light panel three is angled to the left and right respectively beyond the perpendicular position.

This illustrative design is meant for the three-light panel array to form a fixture (3×1). Motion may be sensed by particular sensor and the light panels may rotate in two dimensions to follow the motion. The following matrices indicate transitions in the X (horizontal-defined as the direction of the adjacent light panels) and y (vertical-perpendicular to the light panel array). The notation indicates the rotations in 15 degree increments from −30 degrees to +30 degrees. Here, negative rotation is to the left in X (or downward in y) while positive rotation is to the right in X (or upward in y). It is assumed that the angular coverage of each panel is 120 degrees.

See sheet 3500 of FIG. 35 for Light Panel One transitions using the zero default. See sheet 3600 of FIG. 36 for Light Panel Two transitions using the zero default. See sheet 3700 of FIG. 37 for Light Panel Three transitions using the zero default. See sheet 3800 of FIG. 38 for Light Panel One transitions using the fan-out default. See sheet 3900 of FIG. 39 for Light Panel Two transitions using the fan-out default. See sheet 4000 of FIG. 40 for Light Panel Three transitions using the fan-out default.

Figure 42:
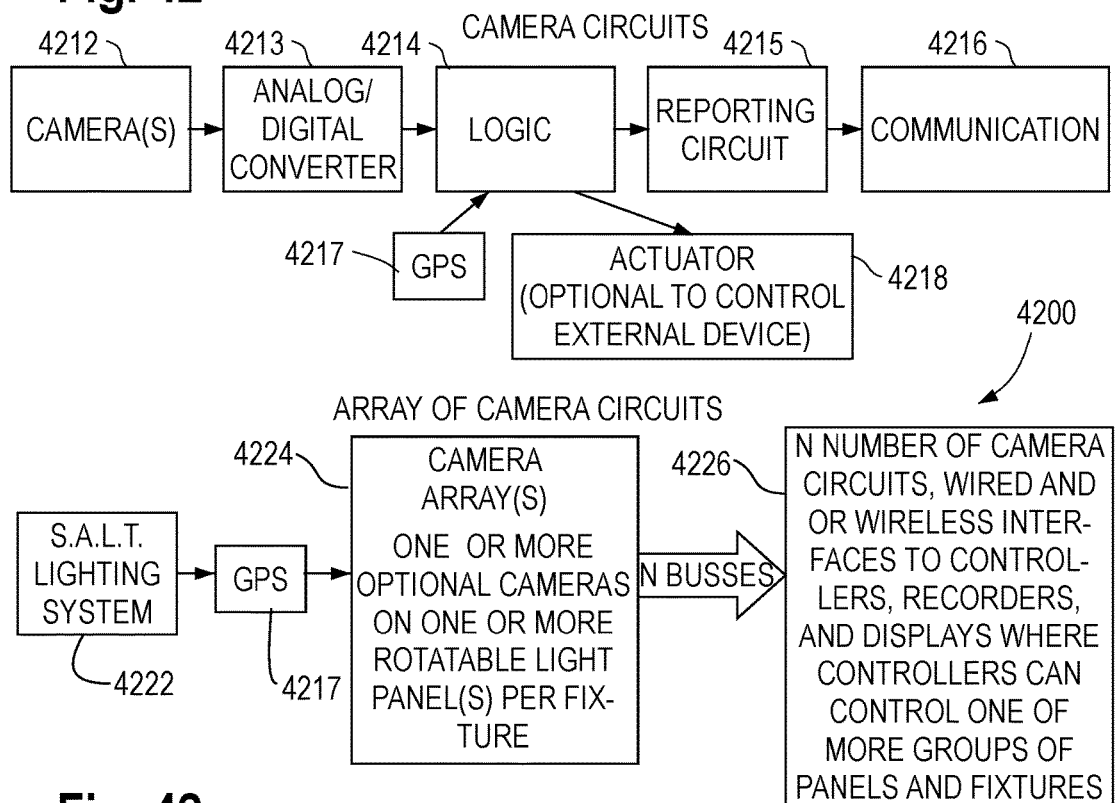
FIG. 42 is a block diagram relating to a camera, according to an embodiment of the present invention.

Referring to FIG. 42, an embodiment of the present invention including a camera will now be discussed in greater detail. FIG. 42 shows a camera block diagram 4200 showing where one or more cameras and/or camera circuits are added as options to the lighting system where one or more cameras are mounted in the enclosure, on the enclosure, and/or on each individual rotatable light panel in the system. The camera(s) 4212 may connect to an analog/digital converter 4213 that then uses logic 4214 and a reporting circuit 4215 to communicate video and/or audio feeds through wired or wireless communication interface 4216 to a central location, to a controller, to remote devices, to networks, to computers, and/or to portable computer or other devices. These camera systems and circuits are also connected to the lighting system's GPS circuitry 4217 and to lighting system identification circuits that allow location and lighting system identification data to be sent to a central location, to a controller, to remote devices, to networks, to computers, and/or to portable computer or other devices. Further, upon camera activation by motion sensors or by manual means, the camera systems can also activate an actuator 4218 to engage and turn on external devices such as recording devices, alarm circuits and signals, audio devices, text producing or messaging devices and circuits, emails, and/or other devices.

Block diagram 4200 of FIG. 42 further shows that the servo/stepper assisted lighting technology (S.A.L.T.) system 4222 can function with an array of cameras 4224 where one or more optional cameras are utilized on one or more rotatable light panel(s) per fixture where there can be N number of camera circuits 4226 with wired or wireless interfaces to controllers, recorders, and to displays where controllers, central locations, remote devices, networks, computers, and/or portable computers or other devices can control and receive data from one or groups of cameras from the lighting panels and/or from lighting fixtures.

Figure 43:
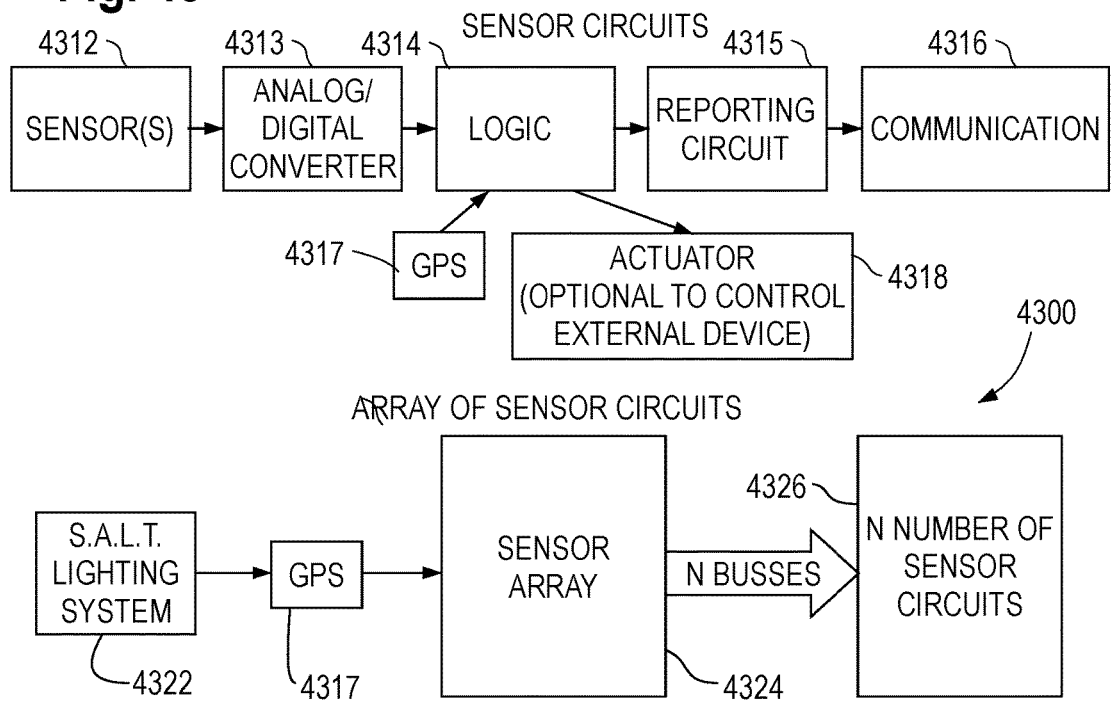
FIG. 43 is a block diagram relating to a sensor, according to an embodiment of the present invention.

Referring to FIG. 43, and embodiment of the present invention including sensors will now be discussed in greater detail. FIG. 43 shows a sensor block 4300 diagram showing one or more sensors 4312 and sensor circuits are added as options to the lighting system where one or more sensors are mounted in the enclosure, on the enclosure, or attached through wireless or wired means and circuits to the circuits of the lighting system. The sensor(s) 4312 are shown to connect to an analog/digital converter 4313 that then uses logic 4314 and a reporting circuit 4315 to communicate sensor data feeds through wired or wireless communication interface 4316 to a central location, to a controller, to remote devices, to networks, to computers, and/or to portable computer or other devices. These sensors and sensor systems and circuits are also connected to the lighting system's GPS circuitry 4317 and to lighting system identification circuits that allow location and lighting system identification data to be sent to a central location, to a controller, to remote devices, to networks, to computers, and/or to portable computer or other devices. Further, upon sensor activation or by manual sensor sampling control activation means through a controller, the sensor systems can also activate an actuator 4318 to engage and turn on external devices such as recording devices, alarm circuits and signals, audio devices, text producing and/or messaging circuits systems or devices, emails, and/or other devices.

Block diagram 4300 of FIG. 43 further shows that the servo/stepper assisted lighting technology (S.A.L.T.) system 4322 can function with an array of sensors 4324 where one or more optional sensors are utilized by one or more light system fixtures where there can be N number of sensor circuits 4326 with wired or wireless interfaces to controllers, recorders, and to displays where controllers, central locations, remote devices, networks, computers, and/or portable computers or other devices can control and receive data from one or groups of fixtures.

Figure 44:
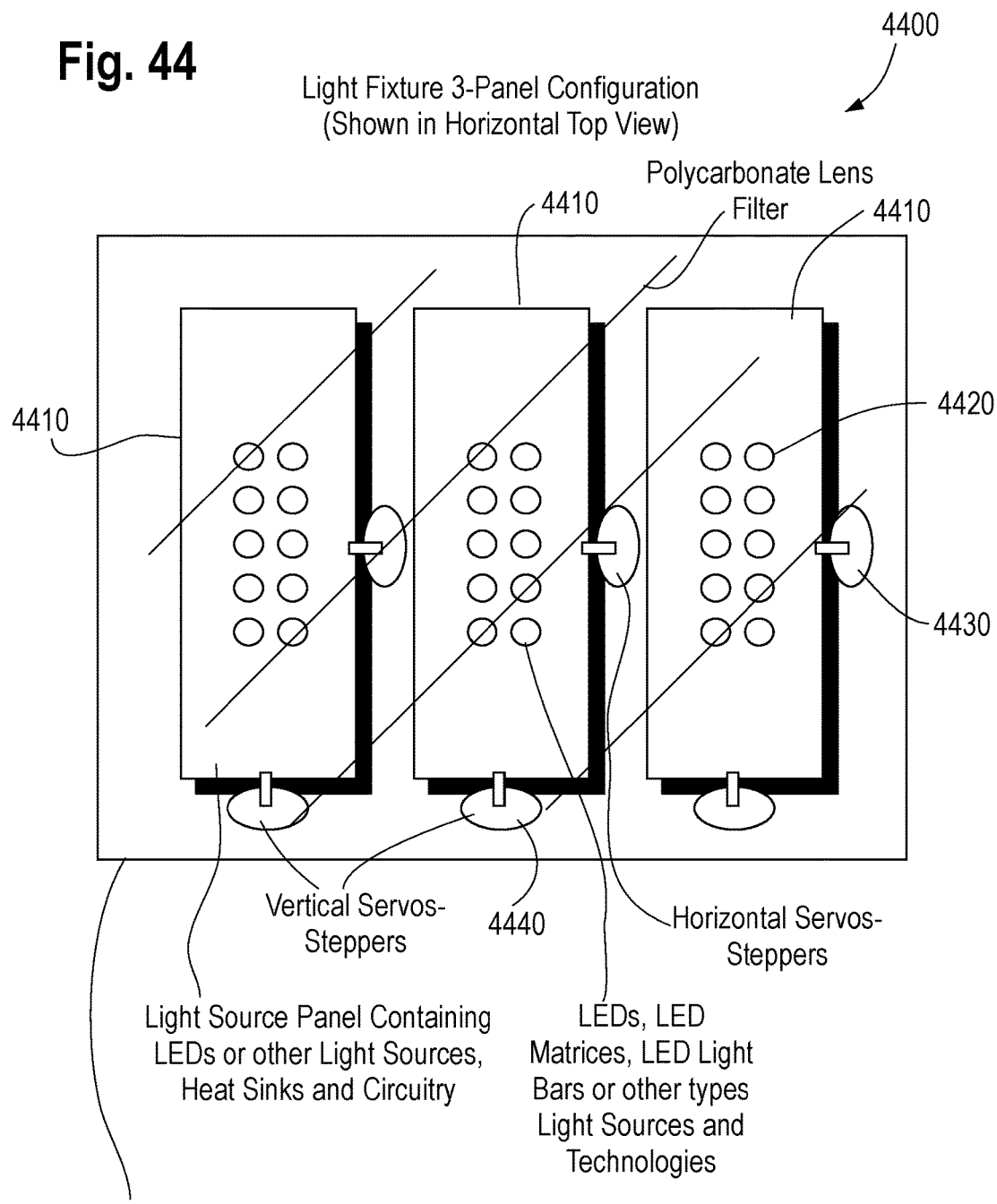
FIG. 44 is a side elevation view of lighting panels w/horizontal and vertical motors, according to an embodiment of the present invention.

Block diagram 4400 of FIG. 44 is a side view of one or more light sources 4420 mounted on rotatable lighting panels 4410 controlled with horizontal and vertical servo or stepper motors 4430, 4440 to create the capability of gimballing where the light panels can rotate in horizontal and vertical positions. It is also contemplated that solenoids can be used to rotate the lighting panels or light sources. A lighting system with a 3-lighting panel configuration with a lens filter is illustrated.

Figure 45:
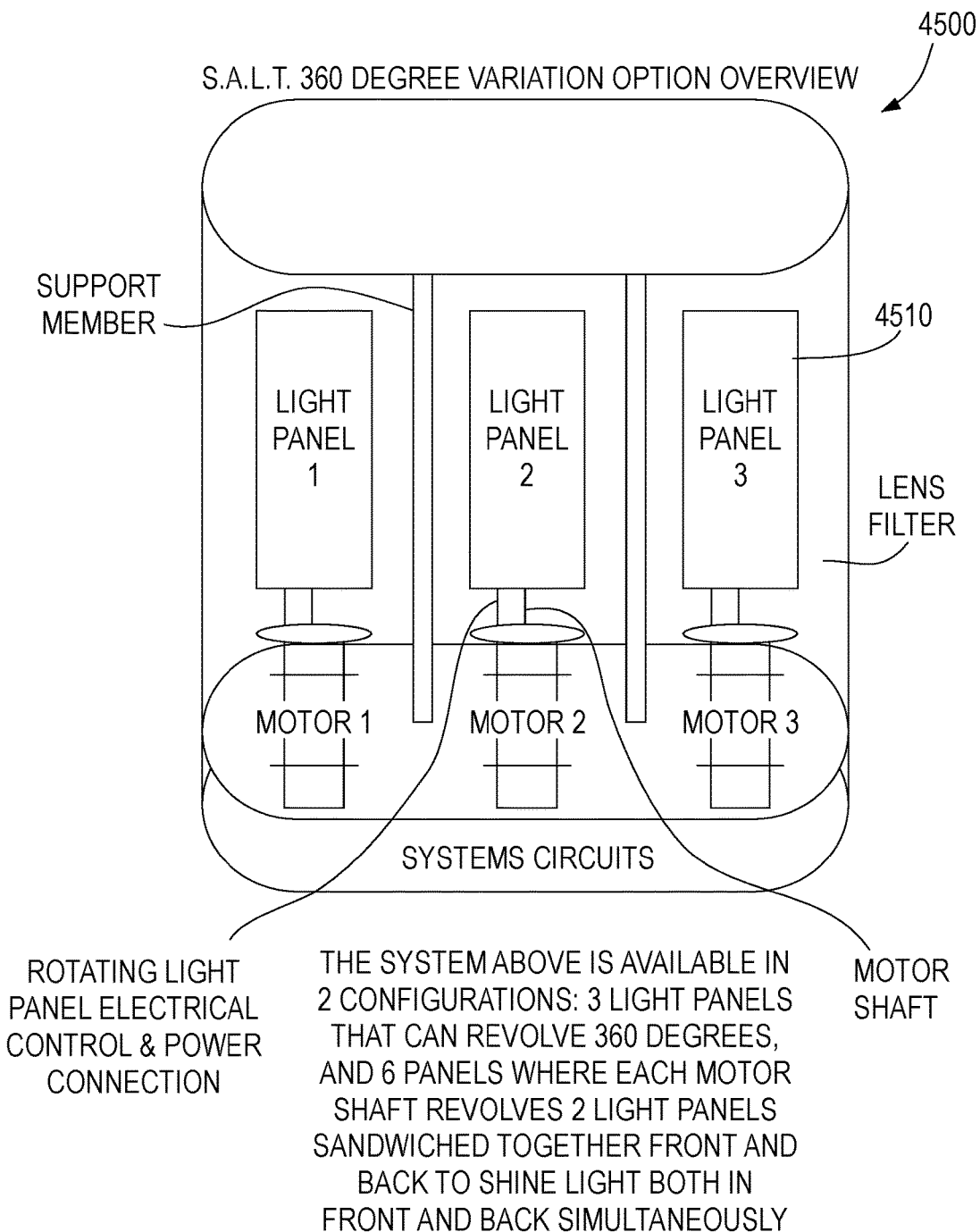
FIG. 45 is a side elevation view of a 360-degree lighting system version, according to an embodiment of the present invention.

Block diagram 4500 of FIG. 45 is a side view showing a 360 degree lighting system version where the lighting sources are mounted on rotatable lighting panels 4510 that can rotate a full 360 degrees. This is accomplished by having electrical and control wiring that connect to the rotatable light panels that are also able to rotate with the light panels through special rotatable-revolving electrical control and power contacts that also rotate along with the rotatable light panels when the light panels are rotated to allow the electrical contacts to energize, power and control the lighting panels to turn them on or off, to change intensity, to change color, and to otherwise control the lighting panels.

Figure 46:
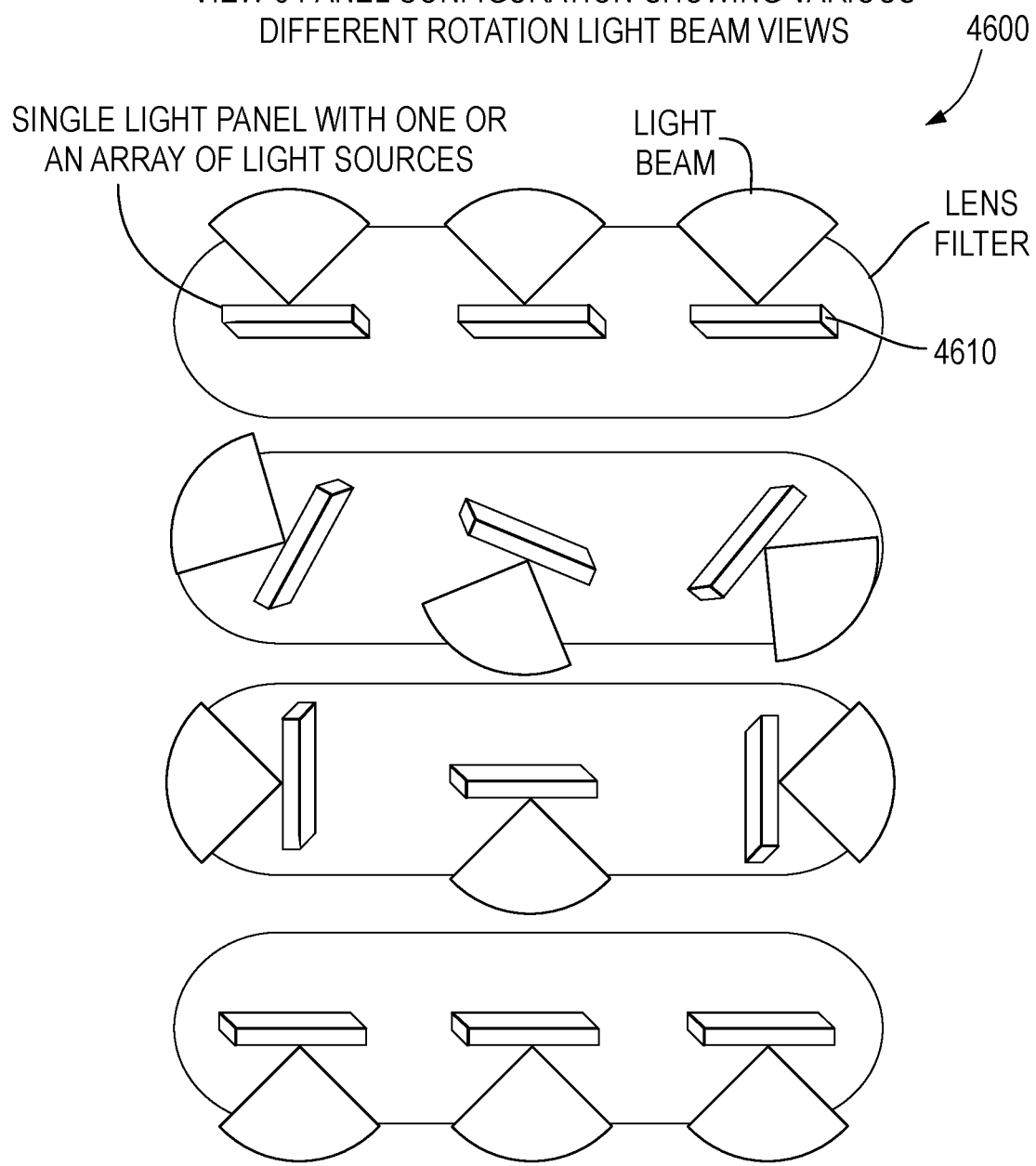
FIG. 46 is a top plan view showing 360-degree single-sided light panel rotation, according to an embodiment of the present invention.
Figure 48A:
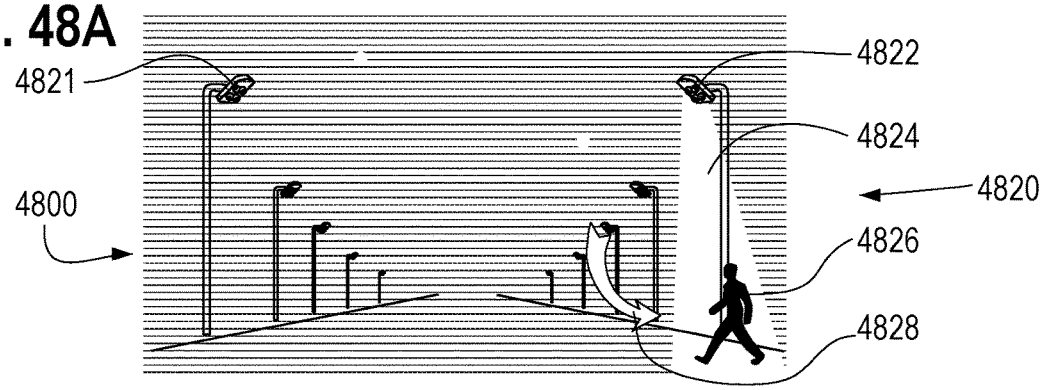
FIGS. 48A-48D are an illustrative diagrams of the system in operation, according to an embodiment of the present invention.
Figure 48B:
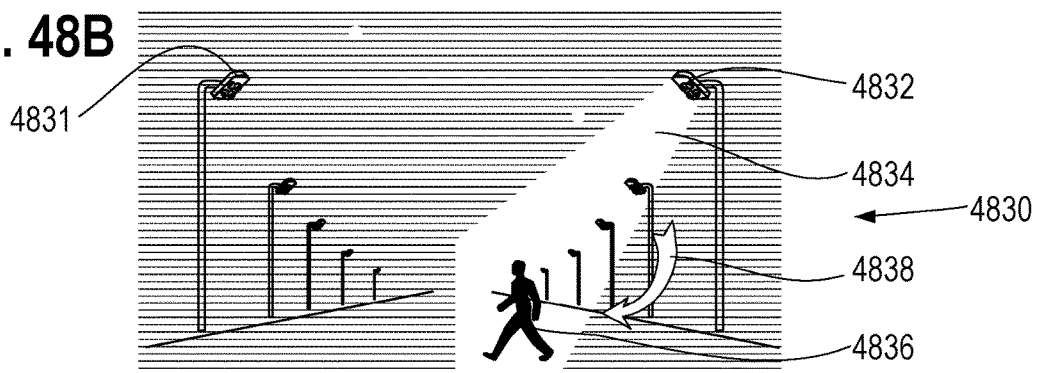
Figure 48C:
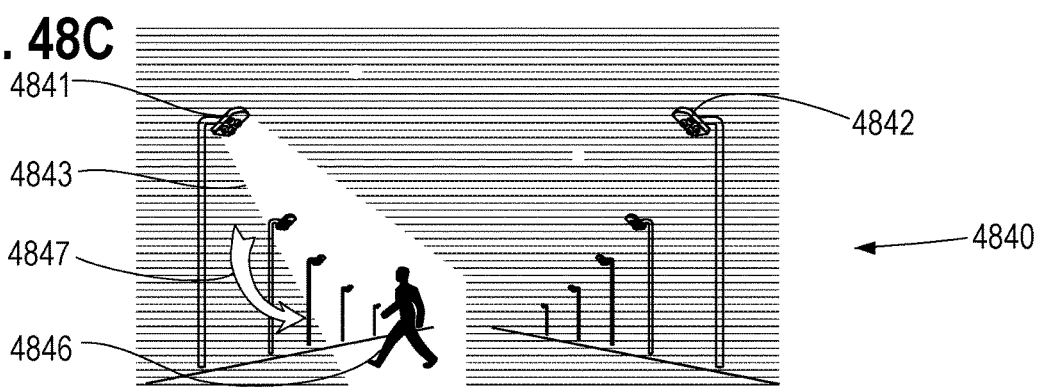
Figure 48D:
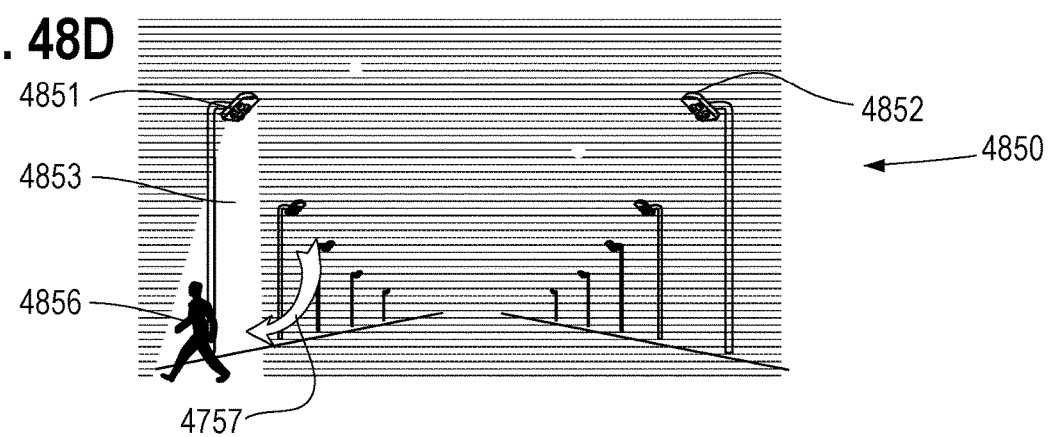

FIG. 46 is a top view showing 360 degree single-sided light panel rotation. In block diagram 4600 of FIG. 46 there are light panels 4610 that have light sources mounted on one side of the rotatable light panels to shine light beams outward from one side of each light panel. The light panels are shown in various illustrations to be able to shine light in various positions to include full 360 degree movement.

FIG. 47 is a top view showing 360 degree double-sided light panel rotation. In block diagram 4700 of FIG. 47 there are light panels 4710 that have light sources mounted on both sides of the rotatable light panels to shine light beams outward from both sides of each light panel. The light panels are shown in various illustrations to shine light in various positions to include full 360 degree movement.

In an embodiment of the present invention, the lighting system may be installed in an intelligent lighting system. Diagram 4800 of FIG. 48 illustrates an installation of the lighting system in a street light application. The first frame 4820 shows a first step of the intelligent lighting being installed in street lights 4821, 4822. The lighting system may detect an object 4826 and adjust a beam of light 4824 to illuminate that object 4826. The beam of light 4824 may rotate in a direction 4828 to direct the light to the object 4826. Since the street light 4821 has not yet detected the object 4826, it does not direct light towards the object.

The second frame 4830 shows a second step of the intelligent lighting being installed in street lights 4831, 4832. The lighting system may continue to detect the object 4836, which may have moved. The lighting system may adjust a beam of light 4834 to follow and illuminate that object 4836. The beam of light 4834 may rotate in a direction 4838 to direct the light to the object 4836. Although the object 4836 has not yet reached light 4831, and thus is not illuminated by a beam of light from light 4831, the object 4836 is approaching an area of detection for the light 4831.

The third frame 4840 shows a third step of the intelligent lighting being installed in a street lights 4841, 4842. The lighting system may detect an object 4846 and adjust a beam of light 4843 to illuminate that object. The task of illuminating the object 4846 may be passed off from light 4842 to light 4841 due to the movement of the object 4846. The beam of light 4843 may rotate in a direction 4847 to direct the light to the object 4846.

The fourth frame 4850 shows a fourth step of the intelligent lighting being installed in street light 4851, 4852. The lighting system may detect an object 4856 and adjust a beam of light 4853 to illuminate that object 4856. The beam of light 4853 may rotate in a direction 4857 to direct the light to the object 4856.

Figure 49:
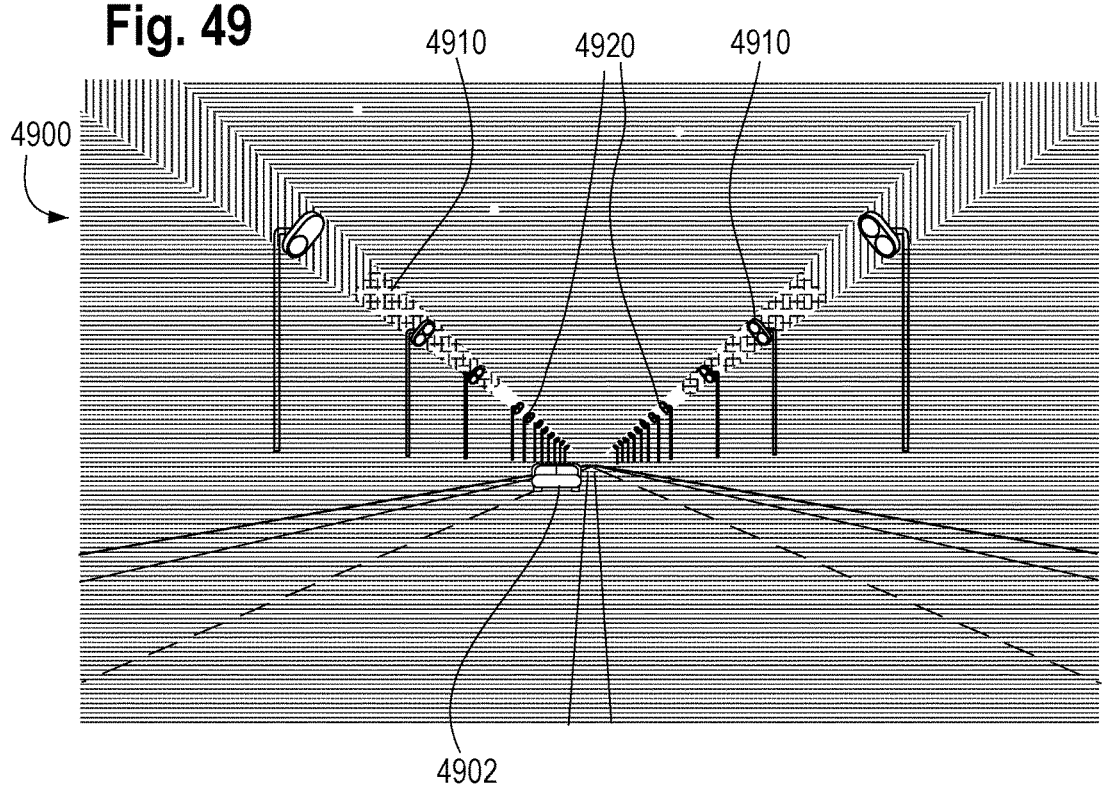
FIG. 49 is an illustrative diagram of an alternative system in operation, according to an embodiment of the present invention.

In an embodiment of the present invention, the lighting system may be used to intelligently control light emitted by street lights in an emergency situation. Referring to diagram 4900 of FIG. 49, an emergency vehicle 4902 may be traveling down a road. The light ahead of the emergency vehicle 4910 may change to an emergency color, indicating that caution or emergency action is required. The lights behind the emergency vehicle 4920 may change to a cautionary or safe color, indicating that emergency action is not required.

Additional applications for the color changing features may include remote control lighting GPS/ID location triggering for first responders; two-way communications through password enabled remote devices given to emergency agencies; police vehicle communication through 2-way lighting intercom systems; lighting units including GPS/ID identification to assist first responders; public-city communication through 2-way public address intercom systems; city protection grids; traffic congestion routing technology; and environmental and hazard detection in emergency. The color change may occur via change in spectrum, oscillation, flash, and change in brightness. Yellow and red may indicate caution and warning, respectively. White or other colors may indicate safe or clear status. Skilled artisans will appreciate other colors may be used. Other colors may be used as well as selecting multicolor RGB light sources, such as multicolor LEDs or multicolor RGB LEDs, where one light source can provide multiple colors and where each light source can change to a particular color desired.

The system may be used to direct buses, taxis, limousines, parking lot vehicles, and other vehicles. The system may provide train arrival light situational color change. Here, the system may change train boarding areas to yellow when boarding begins or flashing red when boarding is about to end. The system may also affect street lights, parking lot light systems changing to amber if there are weather conditions of fog, rain, sleet, snow, or other weather patterns to increase visibility.

Figure 50:
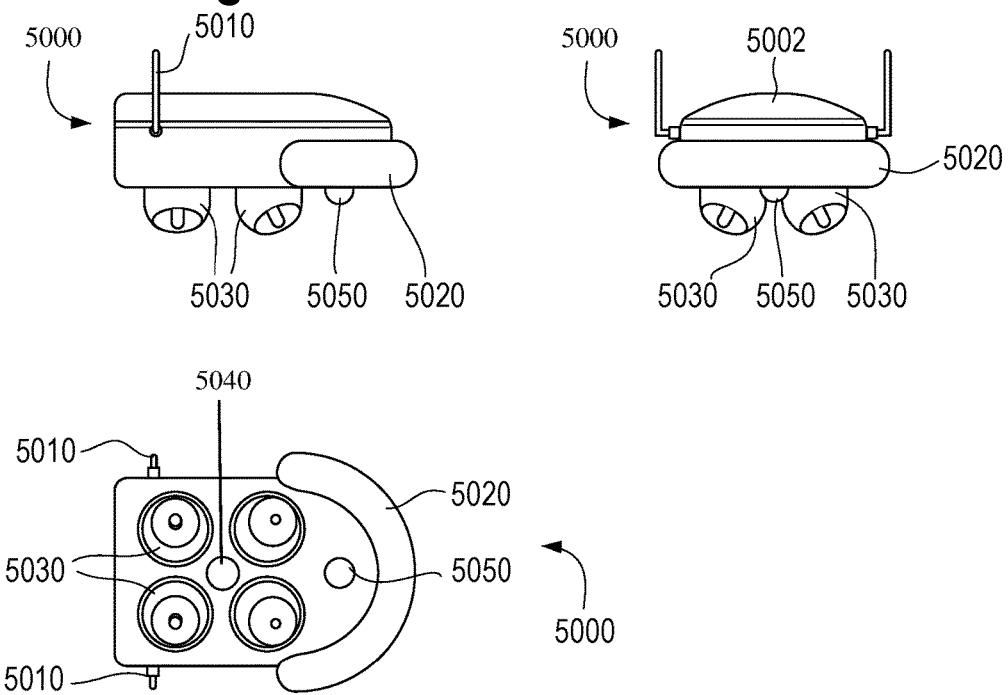
FIG. 50 includes views of an enclosure, according to an embodiment of the present invention.
Figure 53:
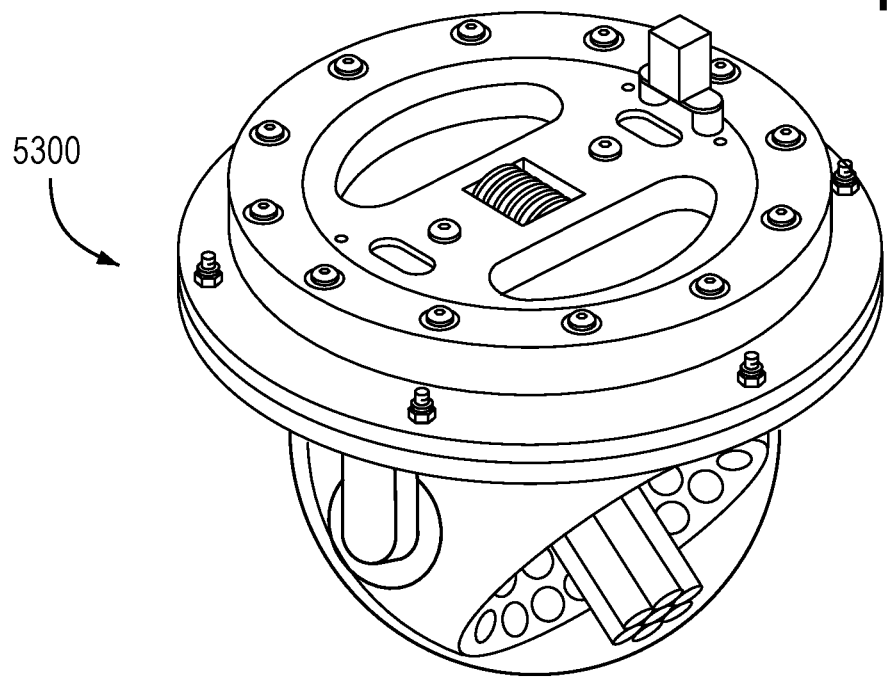
Figure 54:
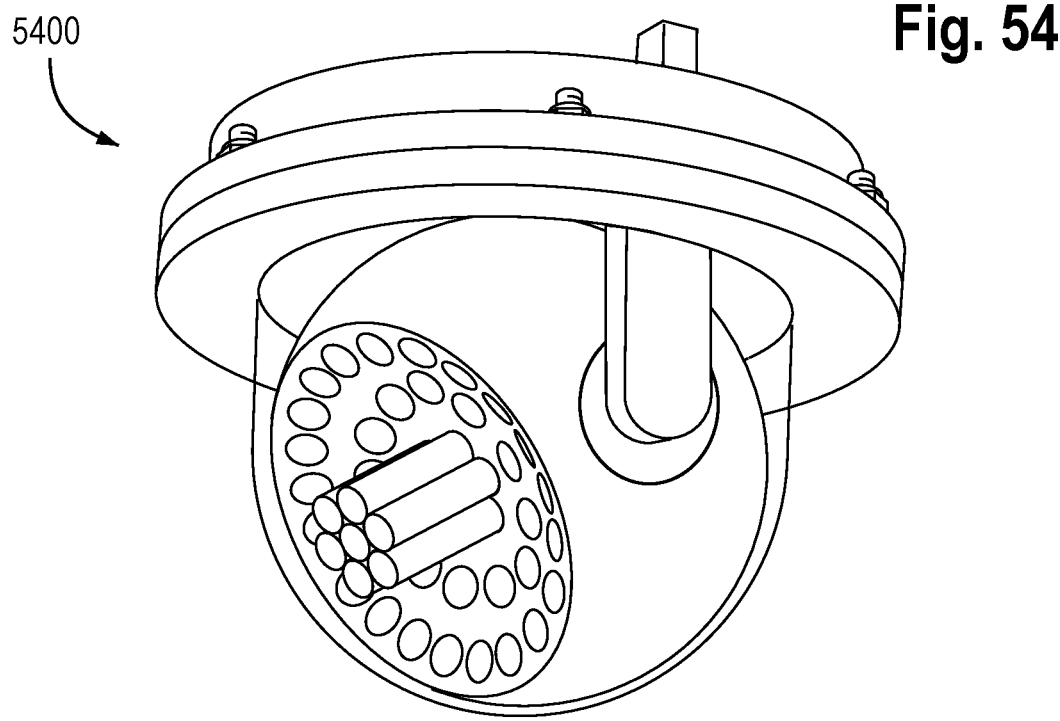

In an embodiment of the present invention, the enclosure may be adapted to perform street lighting functions. Referring to the views 5000 of FIG. 50, the lighting system may be included in an enclosure 5002. The system may include a wireless communication antennae 5010, sensors dome 5020, sensors 5030, 5050, and light panels 5030. The light sources 5030 may be rotatable as discussed in detail above.

View 5000 shows one version of the proposed lighting system with four (4) rotating light panels 5030 of an eyeball-type configuration, a sensor dome 5020 being positioned on one end of the luminaire, with antennae 5010 for data communications, sensor reporting, status and control operations, with microphones, speaker, and sensors being placed in the fixture at various locations including on the rotating eyeballs, within the sensor dome, and optionally at the microphone 5050 or speaker 5040 location. It is further contemplated that the sensor dome 5020 can wrap itself around the entire periphery of the light fixture enclosure 5002, or be added in segments to different sections of the light fixture to provide a sensor or an array of sensors on every side of the lighting fixture enclosure wherever desired.

In an embodiment of the present invention, light coverage will now be discussed along with diagram 5100 of FIG. 51. This grid explanation covers possible coverage for both motion sensors and stepper motors for light movement direction and control. The grid may divide the total light coverage for a fixture into a grid structure. The grid may provide four directional motion sensors provide complete fixture coverage. In the one embodiment, at least four directional motion sensors placed in the sensor dome of the light fixture, or at other strategic locations of the light fixture.

In this example, at least four Motion Sensors, or Directional Motion Sensors are as placed in the sensor dome of the light fixture or around the enclosure of the light fixture. Label the four sensors A through D, corresponding to the four quadrants I-IV in math. (Please note that it is further contemplated that different numbers of sensors can be utilized.)

Overlap of the four sensors to create four overlap zones: Aft BC, CD and AD, as shown in FIG. 51. The center of the grid is the point at which the zones meet. The angles Δθn and Δφn are the spherical angles extending from the grid center. Here, the polar angle Δθn corresponds to rotation about the horizontal gear axis and the azimuthal angle Δφn is rotation about the vertical axis. The variable n is the nth increment of the stepper/servo motor. The eight resulting zones illustrated in FIG. 51 may determine the angles Δθn and Δφn (in spherical coordinates) of the light direction. Depending upon the light panel angular coverage and increments of the stepper/servo motors the motion may be pre-programmed to aim the panel at the center of the zone corresponding to where the sensors are activated.

Coding for tracking may respond to the zone in which the motion is taking place. The overlap zones may cause the adjacent panels to rotate in following the motion. Status of each panel's position and associated sensor data may be sent via electronic message to uniquely identify the position of the motion. This information can be converted into electronic activation signals for lighting control, security and other devices. To refine the resolution of the grid or to expand the coverage, additional overlapping zones can be added to the grid shown in FIG. 51.

In an embodiment of the present invention, inner movement system mechanisms will now be discussed along with view 5200, 5300, 5400, 5500, and 5600 of FIGS. 52-56. These views are perspective views of inner mechanisms of one embodiment illustrating a type of movable eyeball-type light panel. This is only one component-assembly option of the entire lighting system luminaire, which includes various parts such as an enclosure, with at least one circuit card with logic; special components such as PROMS, EEPROMS, ROMs FPGAs, gate arrays, and various sets of firmware to enable specific circuits that may be added to the board to enable features and options chosen by a buyer. An embodiment may include various enclosures, mechanisms, and features further specified and shown in FIGS. 52-56, without limitation.

Figure 57:
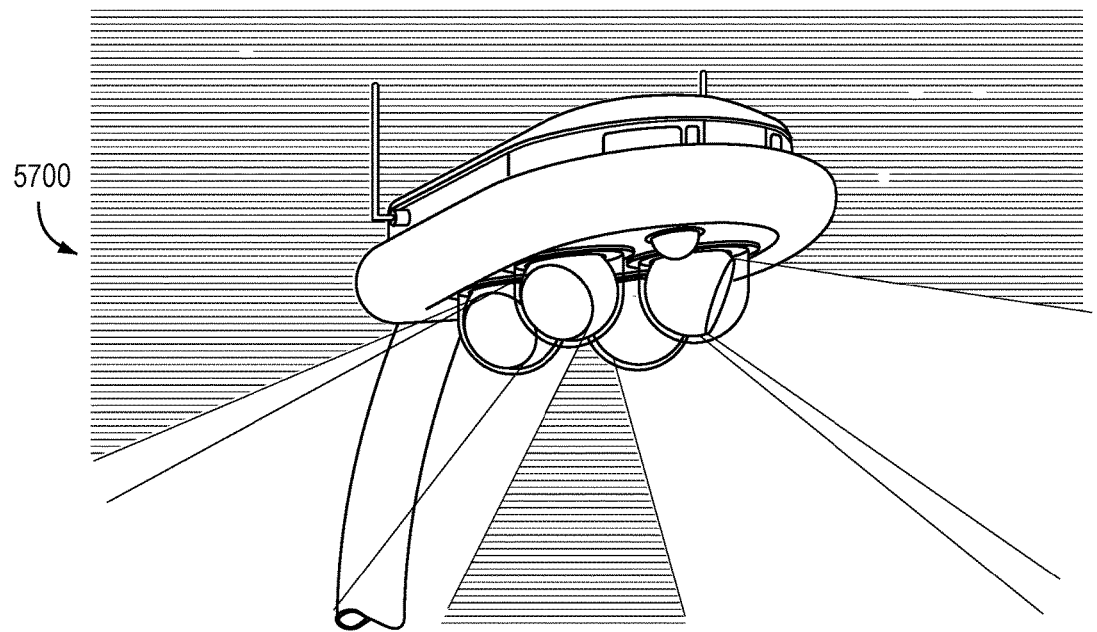
FIGS. 57-60 are perspective views of the rotatable light panels being installed in an enclosure, according to an embodiment of the present invention.
Figure 58:
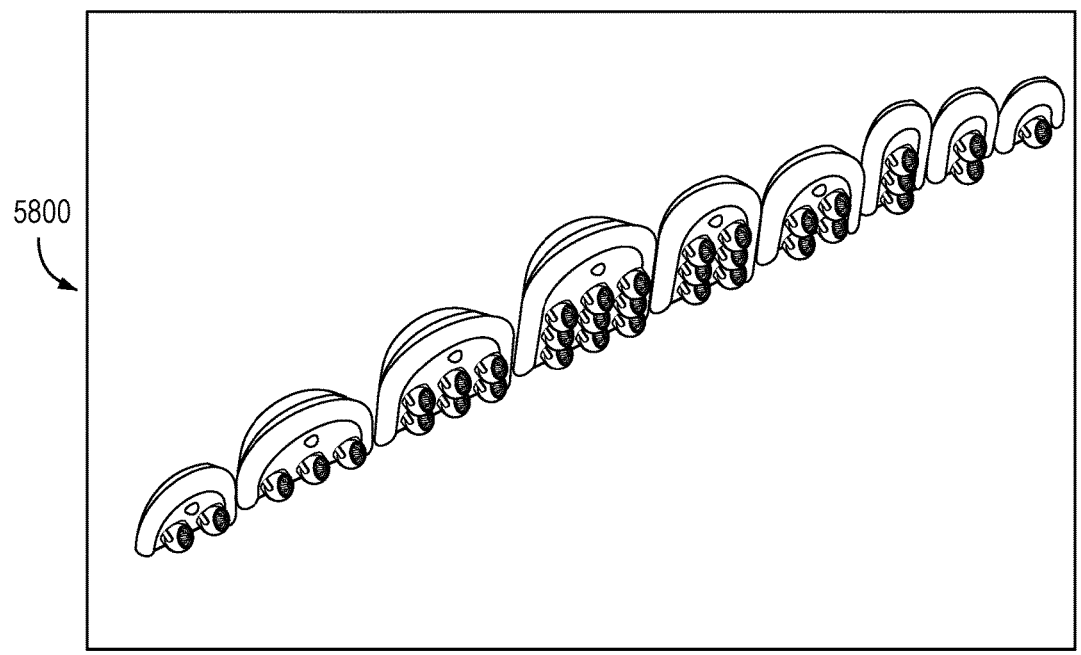
Figure 59:
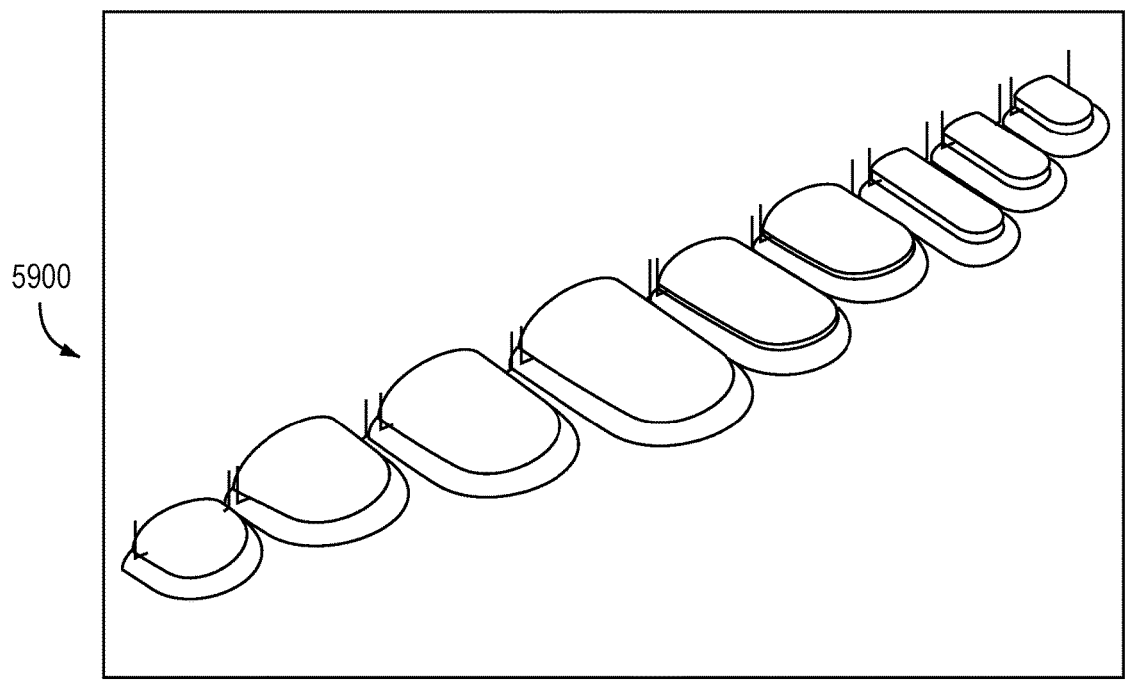

Views 5700, 5800 and 5900 of FIGS. 57-59 provide further perspective views of one or more versions/models of the enclosures and systems with the rotatable light panels/eyeballs shown above inserted into their proper operating positions. View 5700 shows rotatable light panels/eye balls positioned in a spread apart pattern. Views 5800 and 5900 show various product families where we have the following light panel/eyeball configurations available in the preferred product line family of embodiments: One (1), Two (2), Three (3), Four (4), Six (6), Nine (9). Logic options for the product families shown in FIGS. 58-59 is provided in Table 2 below:

TABLE 2

Truth Tables for Multiple Panel Matrices
Scan truth tables for multiple panel matrices

| One | Two | Three | Four | |
|---|---|---|---|---|
| 1 ○ | 1 3 ○ ○ | 1 2 3 ○ ○ ○ | X MOTION 1 3 ○ ○ ○ ○ | Y MOTION .+Y ○ ○ .- Y ○ ○ |

| Six | | Nine | |
|---|---|---|---|
| X MOTION 1 2 3 ○ ○ ○ ○ ○ ○ | Y MOTION .+Y ○ ○ ○ .- Y ○ ○ ○ | X MOTION 1 2 3 ○ ○ ○ ○ ○/○ ○ ○/○ | Y MOTION .+Y ○ ○ ○ .- Y ○/○/○/ ○ ○/○ |

○ indicates panel
Some panels move together
"○/" is fixed Panel configuration
One through three move synchronously in the y-direction This group of diagrams illustrates how the panels in an array are programmed to move together in response to a sensor or control input.

For the one, two and three panel arrays, the lights move in the sequence outlined in FIGS. 35-40.

In the four panel array, the panel motion in the x- and y-directions are coupled together by column (X motion) or row (Y motion).

For the six panel array, the color coded coupled panels move together as outlined in the tables below and coupled together by column (X motion) or row (Y motion).

The x- and y-panel motion in the nine panel array is similar, except the middle panel does not move in the x-direction while the middle group stays fixed in the y-direction. Array may be coupled together by column (X motion) or row (Y motion)

Figure 60:
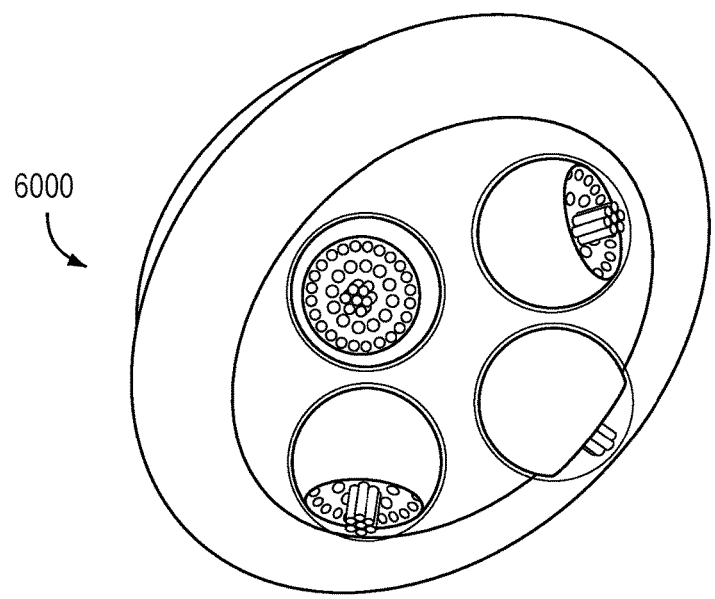

Referring to view 5900 of FIG. 59, the product family is shown with an illustrative enclosure design with rounded top designs and surrounding Sensor Dome around the metallic enclosure, preferably out of aluminum, or stainless steel, or other thermally-weather resistant suitable material. Antennae are also shown used in bidirectional communications and control. A rounded alternative embodiment is provided in view 6000 of FIG. 60. Here, a rounded enclosure is shown, however, virtually any shaped enclosure can be used.

Figure 61:
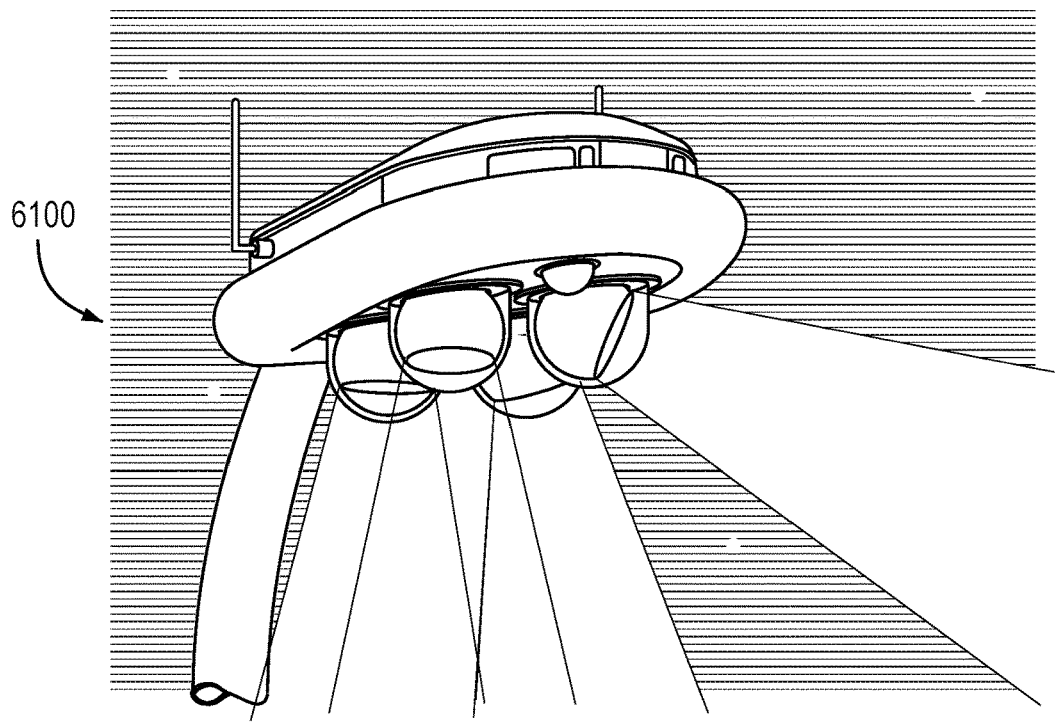
FIGS. 61-63 are perspective views of an enclosure with rotatable light panels being installed to a light pole, according to an embodiment of the present invention.
Figure 62:
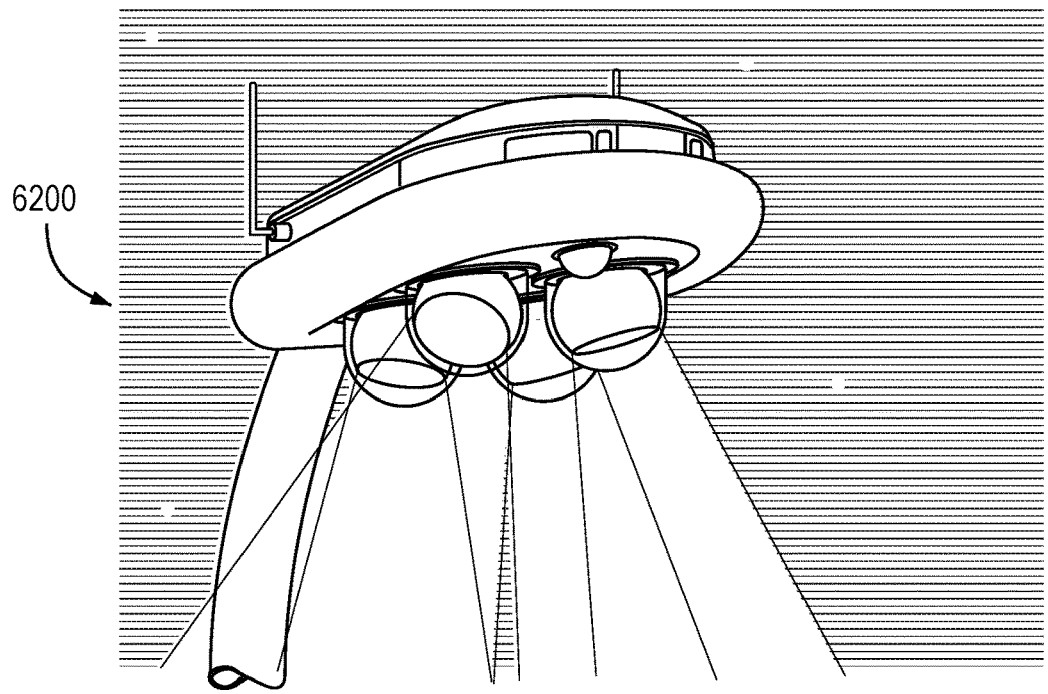
Figure 63:
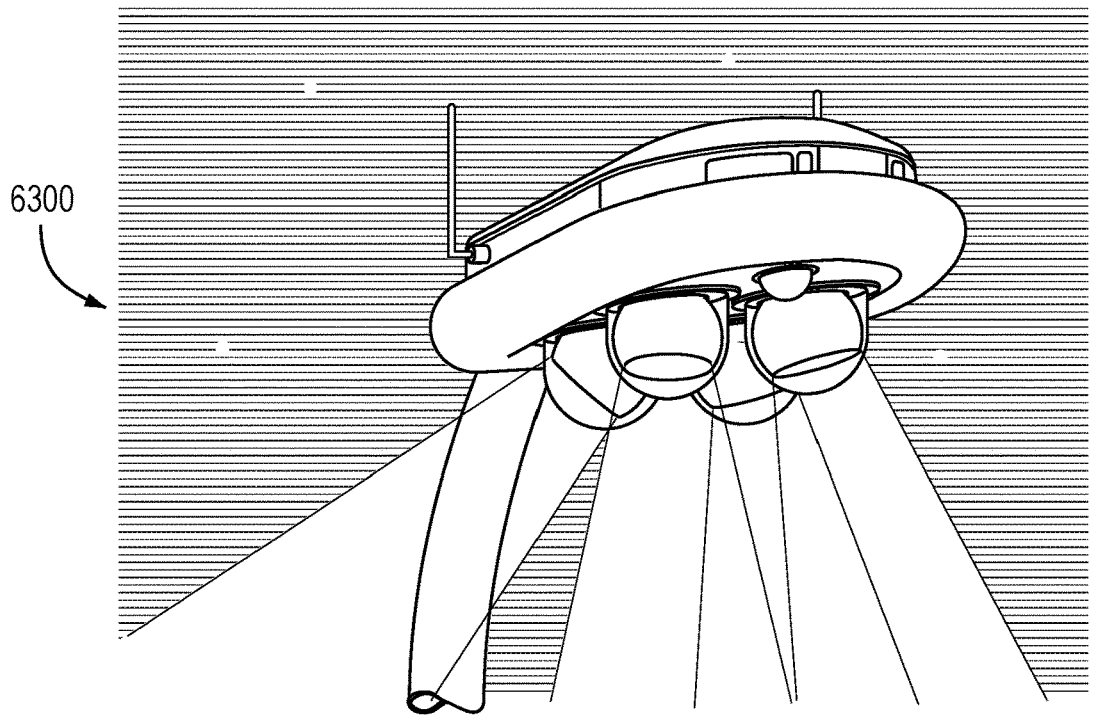
Figure 64:
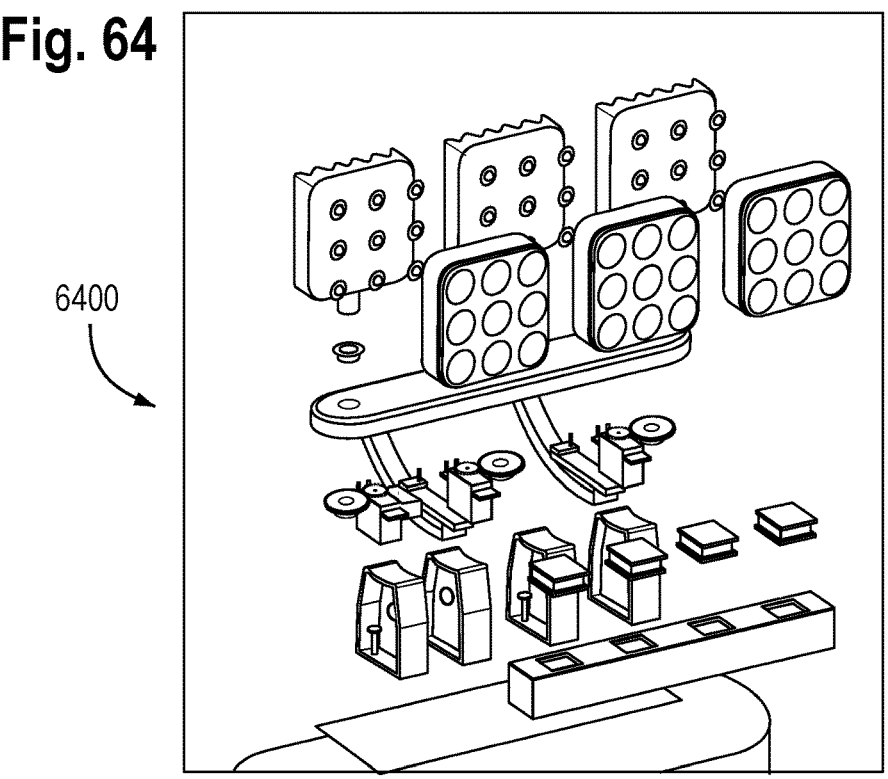
FIGS. 64-70 are perspective views of components of portable light panels, according to an embodiment of the present invention.
Figure 65:
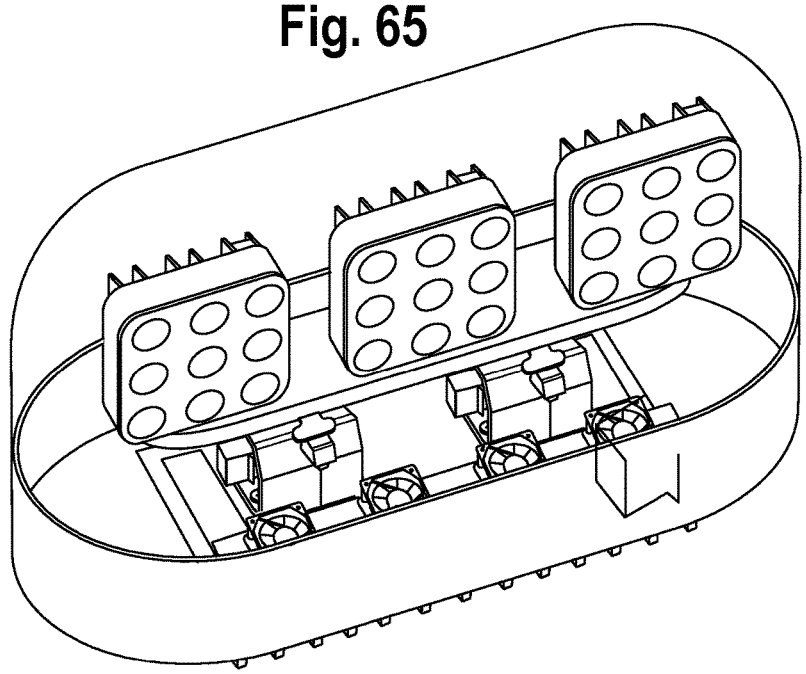
Figure 66:
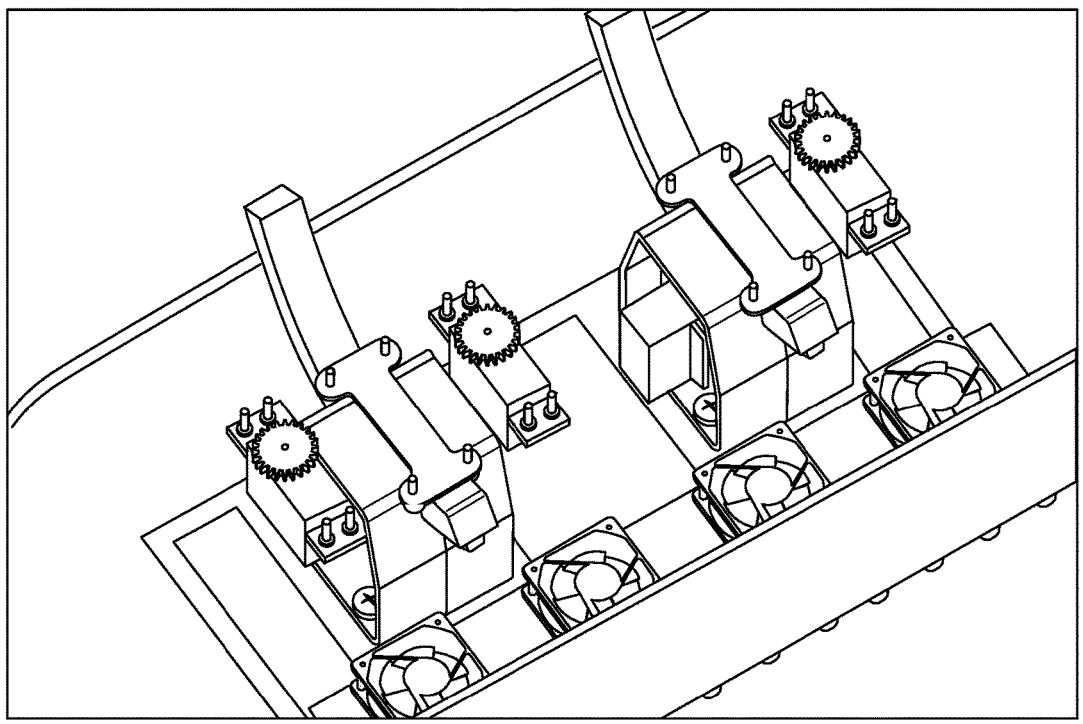
Figure 67:
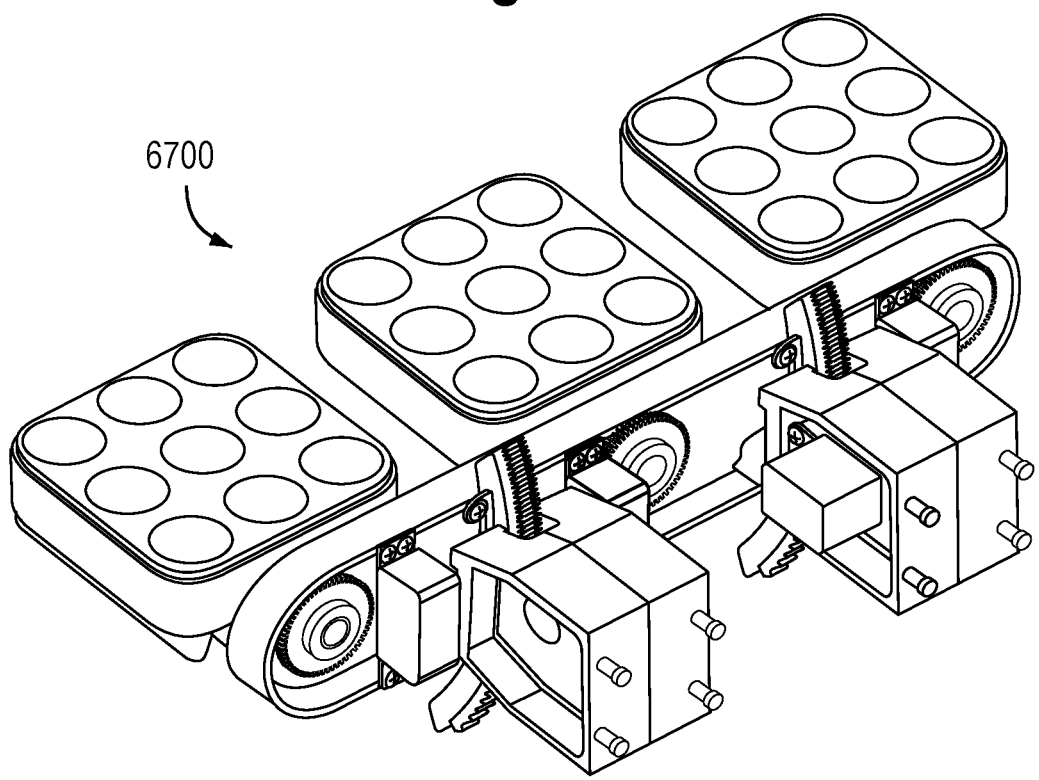
Figure 68:
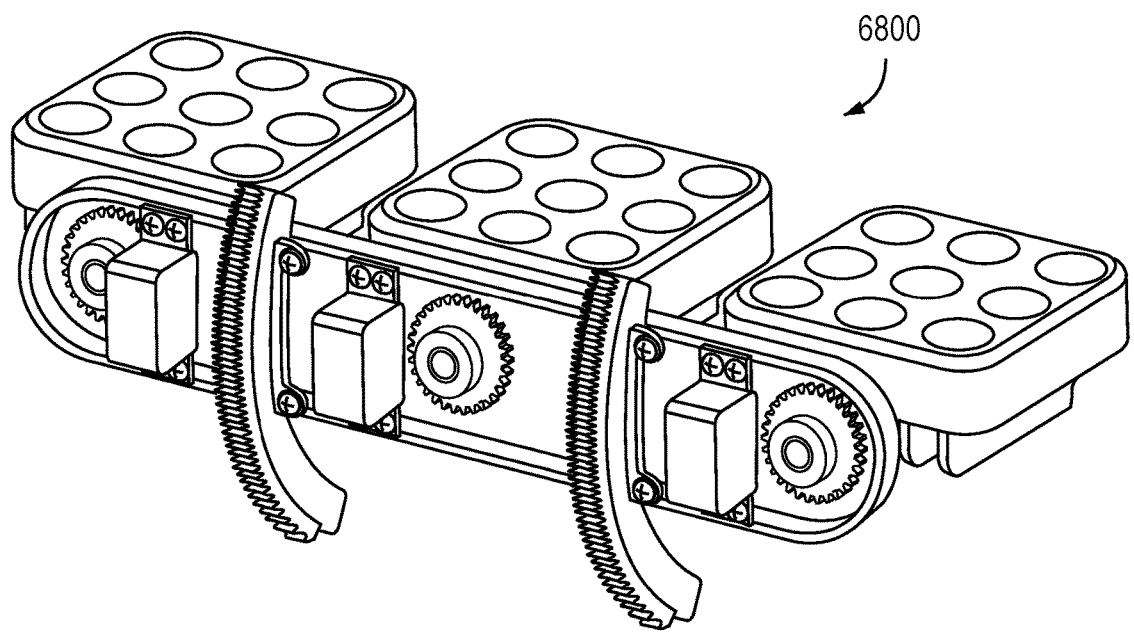

According to an embodiment of the present invention, retrofitting installations will now be discussed along with views of 6100, 6200, and 6300 FIGS. 61-63. The systems can be retrofitted into various enclosures on the market by gutting the existing enclosure and inserting and attaching the internal assemblies and circuits of the lighting system of the present invention into the existing enclosure to be retrofitted. A series of different mounting collars of various dimensions may be used to mate into the enclosure being retrofitted, having each their proper gasket and seal technologies to make the systems weather proof and to maintain or exceed any certification and/or quality standard. View 6100 shows one rotating light panel-eye-ball type assembly being independently manipulated from the other light panels. View 6200 shows one rotating light panel-eye-ball type assembly being independently manipulated from the other light panels. View 6300 shows one rotating light panel-eye-ball type assembly being independently manipulated from the other light panels.

According to an embodiment of the present invention, a mobile/portable configuration will now be discussed with reference to views 6400, 6500, 6600, 6700, and 6800 of FIGS. 64-68. View 6400 shows inner components of a mobile/portable version of the proposed lighting systems showing LED light panels, rocker arms, stepper motors, fans, and various support structures. Induction can be utilized to power the LED modules as they spin about in their rotational orbits which can rotate a full 360 degrees horizontally and a certain angular vertical direction as might be desired through incremental control and movement of the rocker arms shown through an additional stepper or solenoid control. View 6500 shows one version of a mobile/portable lighting system with the functionalities included in the specification. Other variations of this model include adding various sensors, cameras, microphones, and other components on the moveable light panels or on various sides of the enclosure desirable in a mobile/portable lighting system model.

View 6600 shows a perspective view of a mobile/portable enclosure containing stepper motors and fan assemblies. View 6700 shows a perspective view containing rotatable light panels connected to stepper motors that can move the LED light panels in a 360 degree horizontal motion and also having a rocker plate having rocker arms that are actuated by rocker arm steppers or servos that can be mounted inside of an enclosure through bolts shown at the bottom. View 6800 shows a perspective view of rotatable light panels connected to stepper motors through gears that can move the LED light panels in a 360 degree horizontal motion and also showing rocker arms that are actuated by rocker arm steppers.

Figure 69:
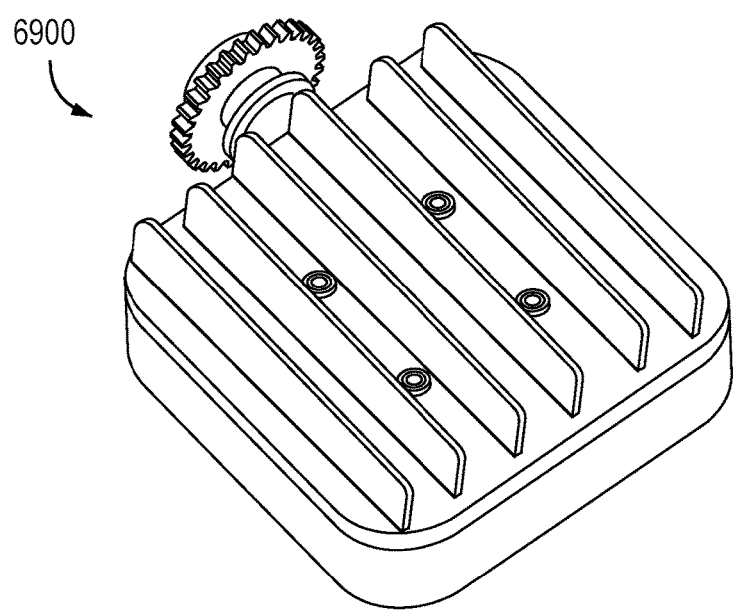
Figure 70:
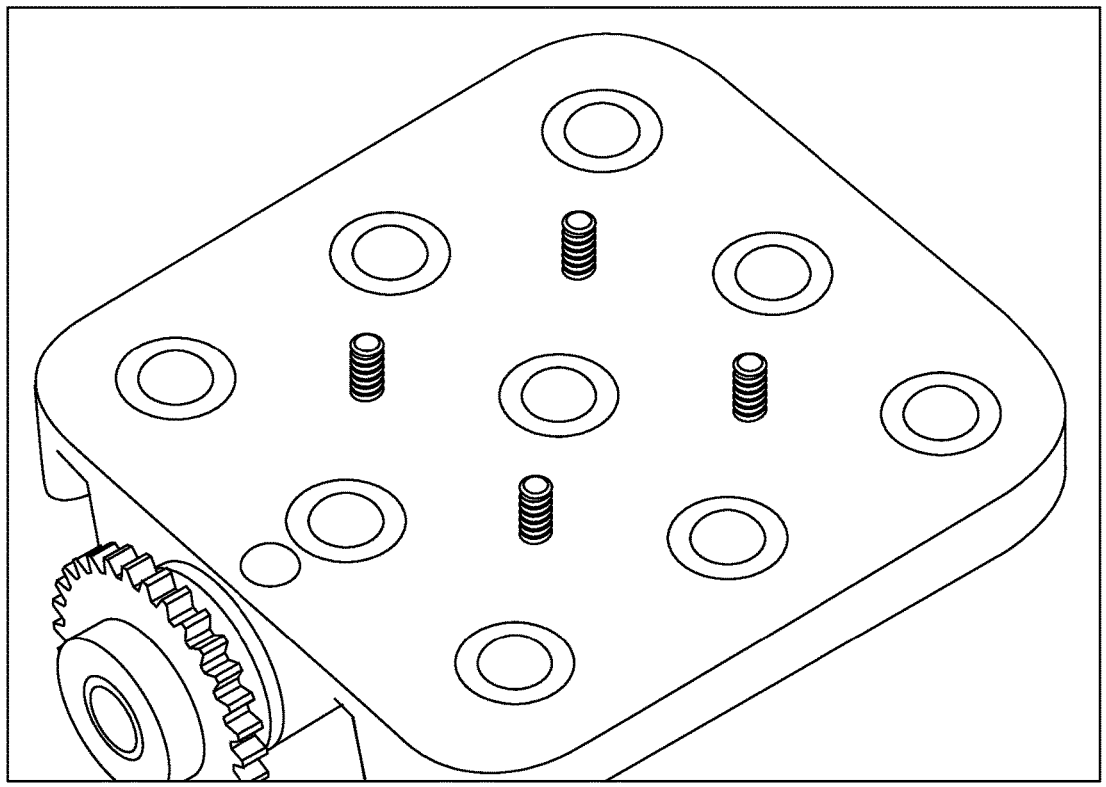

With reference to views 6900 and 7000 of FIGS. 69-70, the rotatable LED panels will be discussed in greater detail. View 6900 shows the back side of a rotatable LED light panel with a gear that interfaces for motion control with a stepper or servo motor. View 7000 shows the front side of a rotatable LED light panel showing various numbers of LEDs populated unto the light panels with a gear that interfaces for motion control with a stepper or servo motor.

Figure 71:
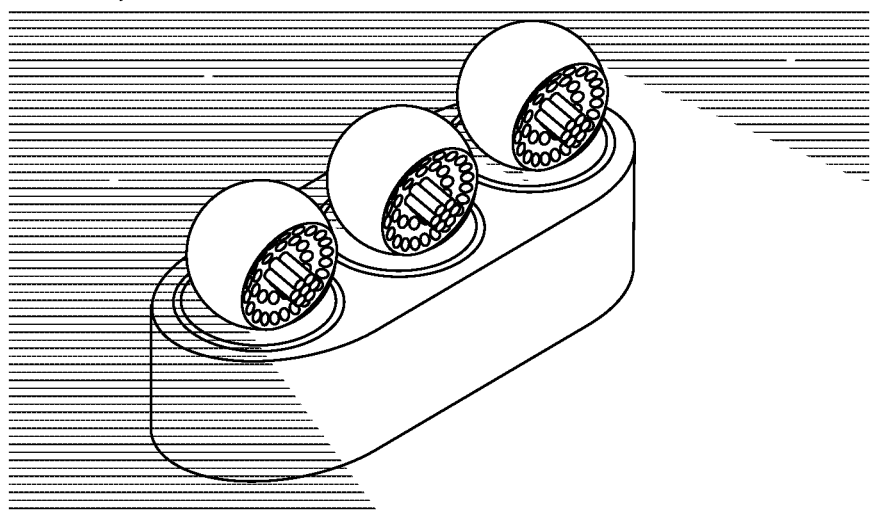
FIGS. 71-72 are perspective views of portable and rotatable light panels, according to an embodiment of the present invention.
Figure 72:
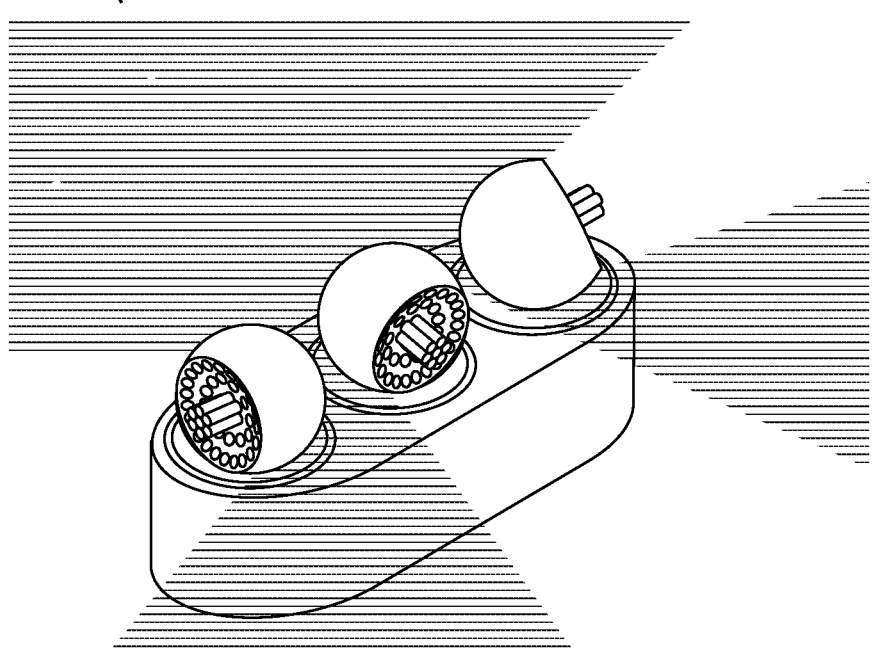

With reference to views 7100 and 7200 of FIGS. 71-72, additional versions of a mobile/portable LED lighting system using an eyeball-type rotating light panel assembly showing the eyeball-type light panels in different positions. In one embodiment, a liquid cooled system may be included with an optional liquid pump for circulating and/or cooling the proposed rotatable light panels in the embodiments discussed throughout this disclosure. Various liquids can be used, including water-cooled, part water and part antifreeze or other coolants, liquid silicone coolant, or other liquids that can be utilized to enhance cooling.

Some systems where fan cooling is not adequate may include at least one water-cooled or liquid-cooled system with an optional heat pump system designed to eliminate heat from the rotatable eyeball/light panel structures and relieve heat from the other portions of the fixture. The preferred embodiment may have at least one such water-cooled or liquid-cooled system with an optional heat pump within each fixture or luminaire. Various liquids can be selected to operate within the preferred liquid-cooled heat-pump, where water, water and anti-freeze, or other coolant-specific liquids are utilized and are designed to operate in such a heat-pump mechanism. This may advantageously increase the efficiency of the design to provide greater lumen capabilities and increase system operating life spans, while greatly reducing failure and maintenance costs.

An embodiment of the present invention relating to heat-pump liquid-cooled systems will now be discussed, with reference to flowchart 3200 of FIG. 32. A liquid cooled heat pump may be added to virtually any embodiment for cooling the proposed rotatable light panels in the preferred embodiments shown throughout this patent application. Some systems where fan cooling is not adequate may also contain at least one water-cooled heat pump system to eliminate heat from the rotatable eyeball/light panel structures and to relieve heat from the other portions of the fixture. One or more such water-cooled or liquid-cooled heat pump system may be installed within each fixture or luminaire. Various liquids can operate within the liquid-cooled heat-pump, where water, water and anti-freeze, or other coolant-specific liquids are utilized and are designed to operate in such a heat-pump mechanism.

Flowchart 3200 of FIG. 32 shows an illustrative operational flow chart that shows the logical operation for the exclusively designed advanced liquid cooled heat pump logic that serves to create a functional thermal shock avoidance system designed to increase system life, decrease maintenance cost, and create the optimum operating temperature for the system.

Thermal management block diagram 3200 shows an illustrative technique for creating an optimum thermal operating environment. The technique may include warming a wired mesh heating element attached to or embedded in the lens filter, secondary optics, or where one or more heating elements are otherwise placed within the enclosure to provide heat. Lens filters may be composed of conductive glass that would allow a current to pass through it, generating heat to eliminate fog or thaw the lens or other optics from ice formations.

Directional motion sensors may provide an appropriate resolution and coverage. Additional features and options may be embedded in circuit designs and controllers Features included with handheld, including touch panels, can be added to smart phones, RF transmitters, and remote control devices for a given application.

Various lighting systems may include various elements and features described throughout this disclosure, virtually providing over a decillion number of combinations of options chosen and added to the circuit board to design various functional circuits, controllers, updatable logic, firmware, and software used in controlling stepper/servo motors, light sources, sensors, cameras, microphones, computers, network communication links, lasers, and other devices. These combinations may be derived by using FPGAs, Gate Arrays, PROMS, ROMS, EEPROMS, drivers, security algorithms, interfaces, transceivers, transponders, amplifiers, repeaters, power supplies, thermal shock avoidance algorithmic circuits, dynamic power supplies, surge protection circuits, drone recharging circuits and systems, and drone charging platforms.

Figure 73:
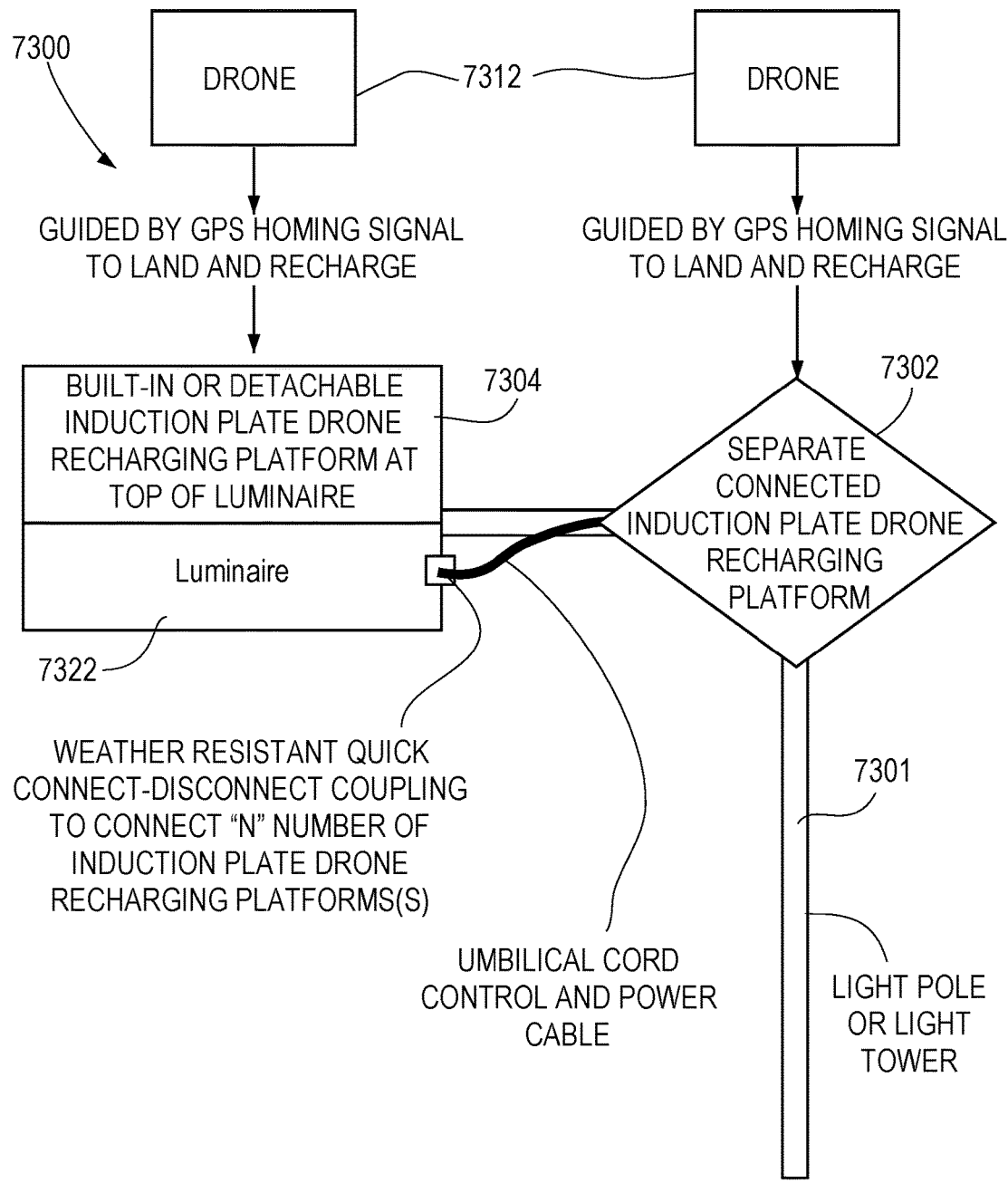
FIG. 73 is a block diagram illustrating a luminaire with a drone charging plate, according to an embodiment of the present invention.
Figure 74:
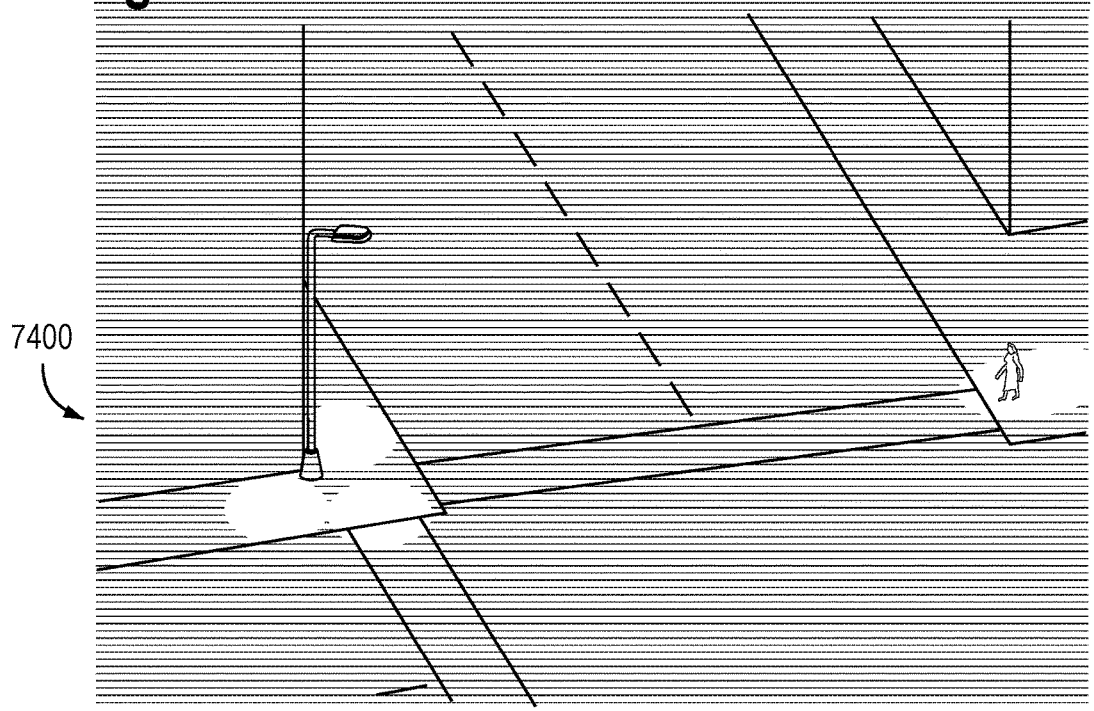
FIGS. 74-79 are drawings to illustrate the auto-tracking feature, according to an embodiment of the present invention.
Figure 75:
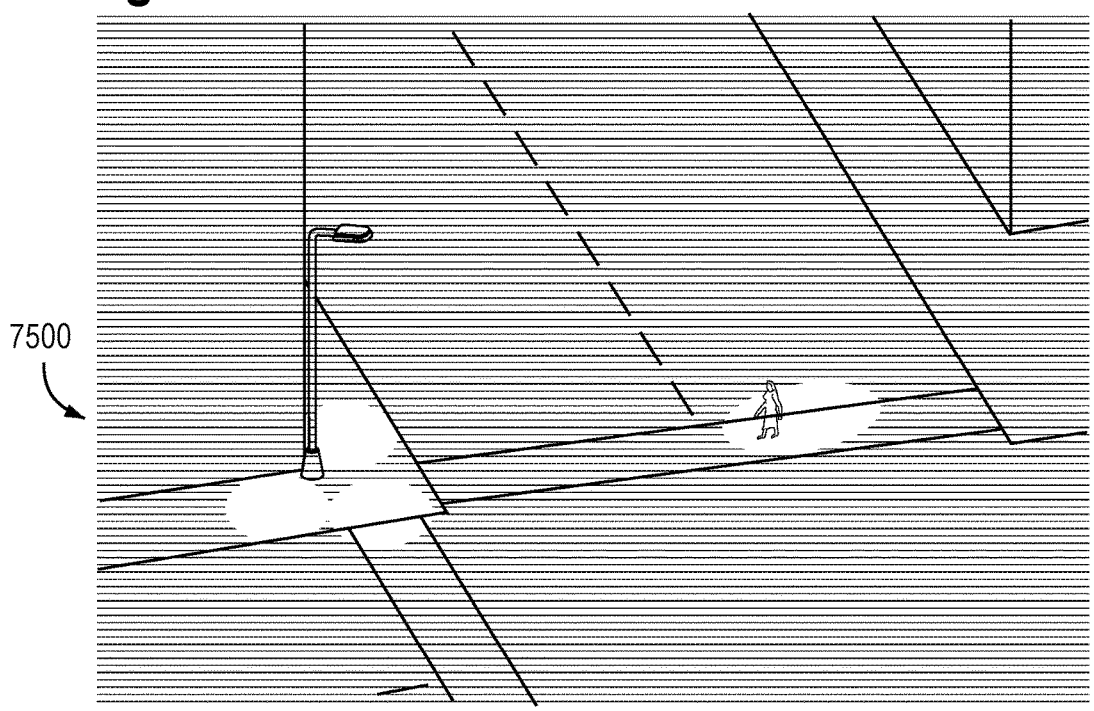
Figure 76:
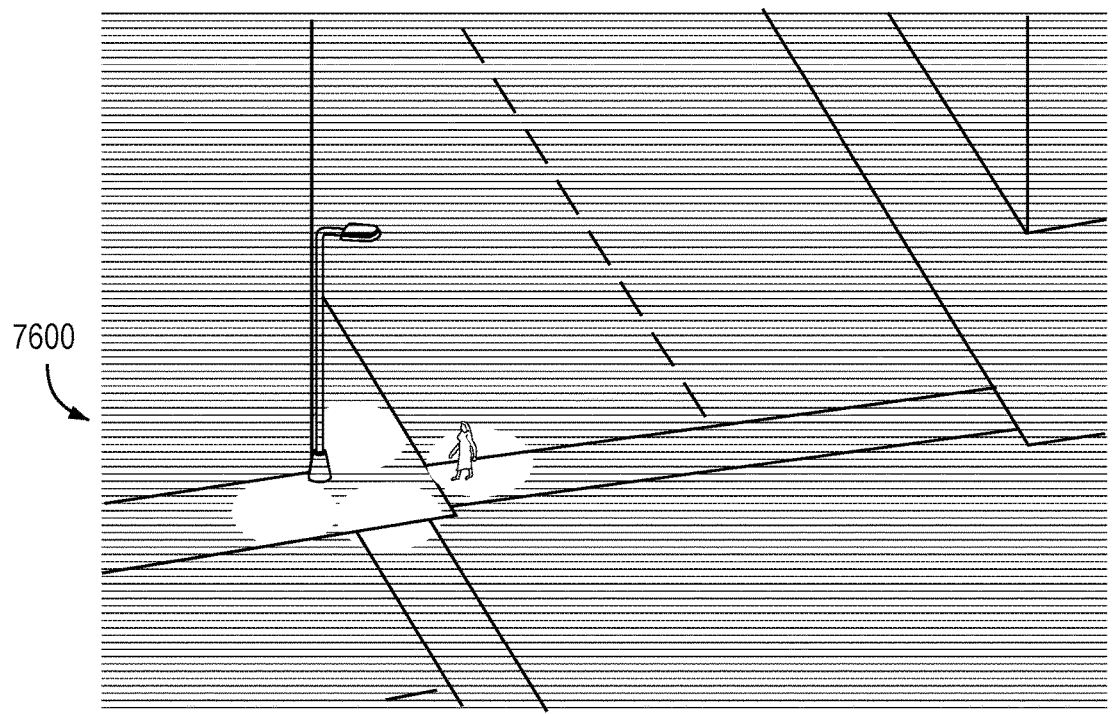
Figure 77:
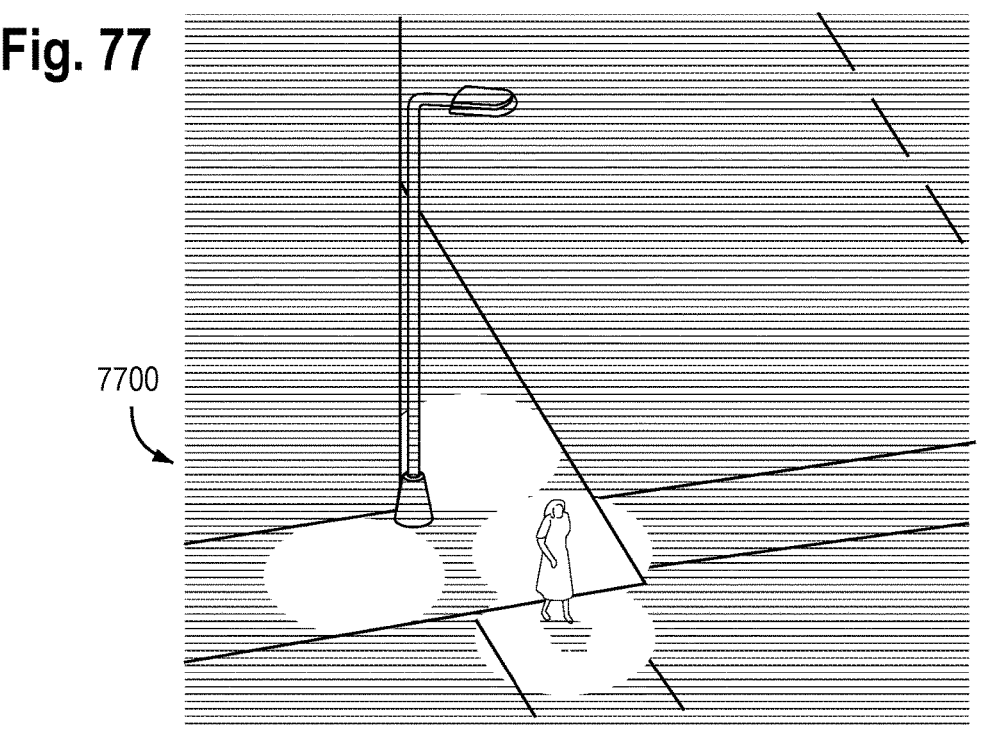
Figure 78:
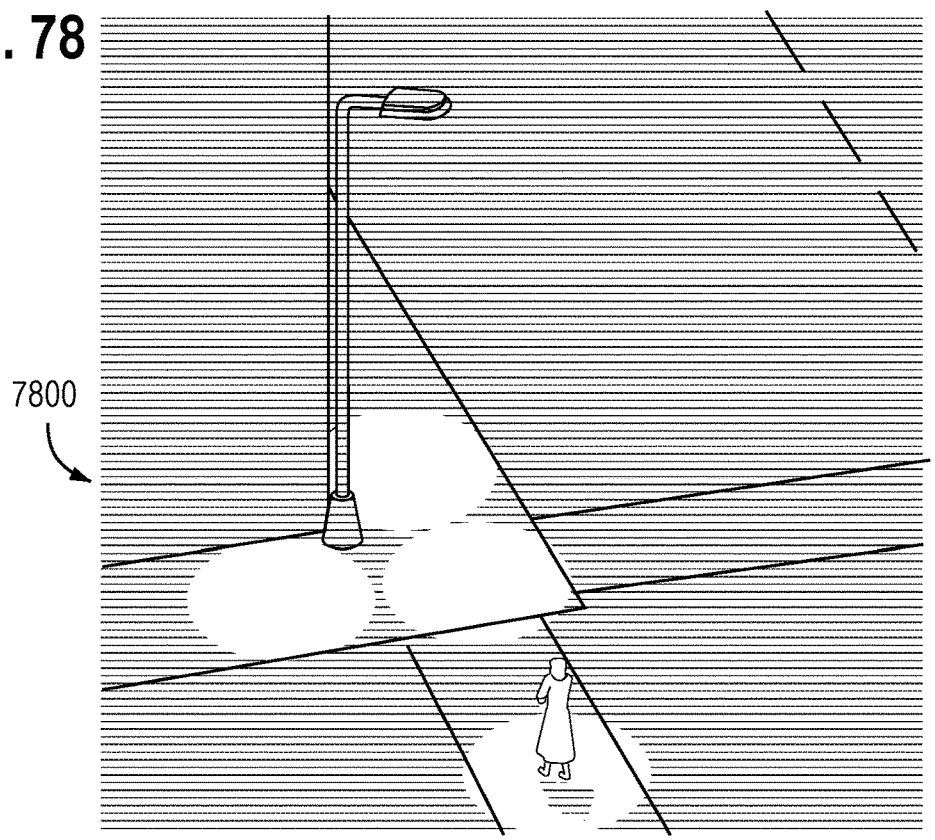
Figure 79:
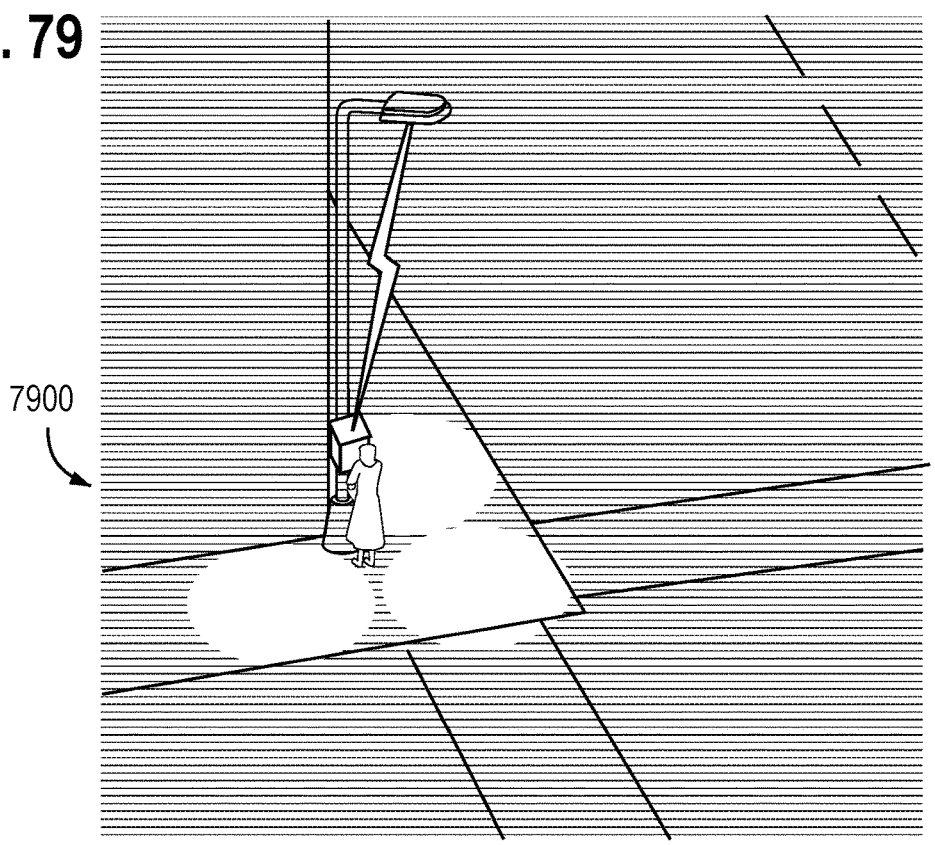

An embodiment of the present invention with a drone locking mechanism will now be discussed in greater detail with reference to block diagram 7300 of FIG. 73. The lighting system may include an induction panel plate 7302 or 7304 situated at the top of the enclosure or a suitable location where it can be physically mounted and controlled by the lighting system fixture. This can recharge a landing drone 7312. Further, the light fixture can have external connectors to allow the induction plate-recharging platform to be physically connected to it or be mounted elsewhere on the structure with wired or wireless couplings.

A drone may sense a substantially continuously transmitting homing signal generated by the induction panel circuit through a transponder or transmitter. A code may be transmitted through WiFi or other repeaters to virtually any drones in the vicinity, which may identify the recharging platform and its GPS coordinates. The drones 7312 may locate the panels 7302, 7304 and land to recharge. When the platform is occupied by a drone, the recharging platform may stop the homing signal to indicate that it can no longer accept a drone for charging until the platform is free.

Communication with the drone may include specification of electronic needs for recharging by the drone and dynamic power logic may subsequently set the proper current and voltage required to charge the drone.

The drone may dock itself via a permanent magnet or electromagnet, which can be located either on the drone or on the fixture, with a ferrous metal on the other device. This may secure the drone from falling off the charging platform(s) before it is fully recharged. Upon a substantially full charge to the drone, the magnet or electromagnet may deactivate, releasing the drone. An alternative code can be sent by the drone operator to keep the electromagnet in the luminaire 7322 functional and the drone 7312 secured until it activates for flight. This circuit may operate like a toggle switch to allow the drone operator to turn the electromagnet on or off.

The drone may execute diagnostics to detect a status of operation, such as whether repair may be necessary. The drone can communicate status information via the communication system discussed above. If a drone detects a status that is not in compliance with an expected status, or example and error or mechanical problem, the drone may remove itself from an operating location and relocate itself to a maintenance facility for maintenance. This relocation can be conducted by the drone substantially autonomously. Similarly, a drone may move itself from a maintenance or storage facility to an operating location substantially autonomously. This autonomous relocation advantageously ensures that an operating location is not rendered nonfunctional due to lack of a drone. When adding all luminaire/sensing features to drones connecting to platforms across cities and nations the drones can serve as a virtual presence device, where a drone might be outfitted with a computer display to show live feeds of audio and video of the person sending the drone, and where the drone can view its environment through cameras and sensors and listen to its environment through one or more microphones and respond back to its environment through the drone's computer display and speakers, and where the drone may also interface wirelessly to audio and or visual inputs of stereo systems to communicate in an enhanced way.

A non-magnetic locking mechanism may be included to send a signal through a controller or computer to unlock the luminaire or to unlock the induction plate recharging platform from its installed position so the drone can lift the luminaire or the induction plate recharging platform off the light pole or light tower where it is installed. Then, the technician can take it to a shop to perform maintenance or repair the luminaire or the induction platform. This avoids other practices of removing the luminaire for service. The reverse operation can be used to reconnect the luminaire or the induction plate drone recharging platform to the pole or tower. The drone or user can enter a secure code to unlock the luminaire or charging platform and to disconnect or connect power and control couplings as desired from a light pole or from a light tower so a drone can lift and remove a luminaire or a charging platform and transport it to the ground or to a truck or to a tow hitch vehicle accessory so that it can be transported to a service center for maintenance.

Further, the enclosure can have a connection mechanism built at the top, which may allow attachment of different sized docking platforms containing induction plates for charging drones of various sizes. The luminaire can also connect and control one or more drone recharging docking platforms additionally installed on a light pole 7301 or tower 7302, where a single tower or building may have a multiple luminaire systems on it, each with their own drone recharging docking platforms. The enclosure can be modified in shape and form to accommodate interest for ornamental luminaires, or for specific functional uses such as: use on satellites, aerospace vehicles, rockets, planes, jets, helicopters, birds of prey, drones, boats, ships, yachts, commercial cruise ships, cargo ships, oil tankers, commercial airlines, etc.

An embodiment of the induction plate mechanism/circuit with dynamic power supply with selective power delivery circuit will now be discussed. A pressure pad matrix composed of at least one pressure sensor can be attached to the top of the light fixture that can sense when a drone has landed and alert the light fixture's induction plate drone recharging circuit. The luminaire's induction plate drone recharging platform may occasionally check the battery levels of any landed drone to determine if a drone needs a charge. A signal can be sent from a drone to the recharging platform to assist the drone for docking operations. An induction plate recharging platform can be mounted separately onto a vehicle, or to a lamp post or to a light tower without connecting to the luminaire having all the appropriate functioning circuits. The induction plate drone recharging platform can be constructed of any size, and in any shape that might be suitable for docking and recharging a large number of different sized and or shaped drones. The drone can also dock and securely put itself in rest mode with or without charging, where the battery is checked occasionally during longer rest periods to keep the battery at optimum charged levels and where the drone can be later activated when desired while the drone might wait to fly again when weather gets better.

The drone recharging platform may act as a charging device, which is an exclusive feature of the luminaire systems that allows drone recharging where the drone recharging platform is a sub-system of the luminaire. The sub-system may be controlled by the luminaire master control system(s), logic built into controllers, software, and other logic where the devices might be controlled and data might be transmitted through wireless and or wired media. The sub-system may also include laser communication of data and control signals, sensing, or other laser operations, through laser sending and laser receiving systems attached as a built in system as part of the main luminaire system(s) or such laser devices can be made to communicate one-way or bi-directionally with the systems.

The drones may have legs or other stabilizing or connecting structures. Drones, the lighting system luminaries, and/or the induction plate drone recharging platform may be designed to allow the drone to physically wrap its legs or other members around the luminaire or induction plate drone recharging platform. The legs may insert themselves into connecting points in the luminaire, the induction plate drone recharging platform, or other docking and securing mechanisms. These mechanisms may substantially secure the drone in high winds or otherwise receive the drone so that the drone does not fall off the induction plate drone recharging platform while resting or charging.

Mobile versions of the lighting systems can be mounted on squad or patrol cars, fire and emergency vehicles, heavy equipment, military vehicles, or on SUVs, jeeps, cars, farm equipment, and other vehicles each having similar connections. Induction plates and drone landing platforms may additionally be included on boats, ships, yachts, submarine, helicopters, balloons, blimps, other buoyant devices, and virtually any other land, nautical, or aviation vehicle. In some applications, multiple drone platforms may be installed on a location or vehicle, each of which may be synchronized with the location, vehicle, or other platforms. For example, a yacht may have multiple drone platforms, which may receive and charge a drone. The drone may then detach from the platforms and survey, illuminate, sense, provide communication, or otherwise interact with the environment. The drones may synchronize to gather information with greater resolution and/or detail. The lighting system may include multiple drone platforms where each platform can charge or dock one or more drones simultaneously.

An embodiment including opaqueing will now be discussed without limitation. Utilizing ON/OFF GLASS where the GLASS has the ability to turn from transparent to opaque, in certain applications, the lens filters on certain units we are providing may have the ability to turn from clear to opaque, depending on operating environments that may allow the ON/OFF GLASS to function, to produce a light diffusion effect.

The lighting system may provide light at different frequencies that can be specifically chosen through control logic. This can be used to produce lighting in different color temperatures. The diffused effect of opaqueing may facilitate light therapy, setting Circadian body rhythms to overcome jet lag, re-setting the human body clock, mood lighting, entertainment lighting, and setting the color temperatures desired for grow lighting. Examples colors for of grow lighting may include various reds, blues, white, and other areas of the light spectrum including dark or rest cycles. These effects can be programmed and controlled with date and time stamps for each color frequency to increase budding and vegetative growth for crop, orchard, vineyard, greenhouse, hydroponics, and/or outdoor control of increasing vegetative and crop yields in high acreage production applications, where greater budding, fruiting, and vegetative growth is desired and/or needs to be controlled.

A user can choose one or more color temperatures as desired and assign how long (a programmed time) the lighting system may shine light at that chosen color temperature before switching off or before changing to another color that might be programmed or selected to turn on next for a programmed period or for a selected time.

A large list of color temperatures may be saved in memory through controller software, where the user can select various operating properties for the colors chosen, which would include order of color activation, duration, intensity, and ON/OFF GLASS transparency.

An additional embodiment of the present invention with auto-tracking functionality will now be discussed with reference to view 7400, 7500, 7600, 7700, 7800, and 7900 of FIGS. 74-79. This embodiment may include various versions of firmware where each version enables one or more circuits, functionalities and features placed on one or more circuit boards; interfaces and connectors; one or more induction plate(s) for drone or "other device" charging added to the top of the enclosure, or connected to the luminaire through power and control connections; an enclosure; a sensor dome; sensors in the sensor dome, or adding of sensors on various portions of the light fixture enclosure or sensors of various types mounted on the movable light panel(s)/eyeball-type electromechanical assemblies; and directional motion sensors, other types of sensors depending on application, this can include LIDAR, RADAR, sonar, ultrasonic, RF, and other types of sensors. This embodiment may additionally include rotating light panel/eyeball-type electromechanical assemblies; dynamic power supplies and control logic; LEDs; stepper motors, or servo motors; stepper motor or servo motor drivers; transponders, transceivers; WiFi circuitry; ON/OFF transparent to opaque electronically activated GLASS and associated control circuitry; Directional Motion Sensors; and other types of custom sensors. The embodiment may further include Lens Filters composed of glass, tempered glass, bullet resistant glass, polycarbonate, bullet resistant polycarbonate, or other transparent materials that might also have the ability to be electronically changed to become opaque from a transparent state upon electronic activation; reflectors; GPS reporting circuitry; serial number reporting circuitry; status reporting circuitry; Sensor Data Reporting Circuitry; External Sensor Linking Circuitry, that uses Bluetooth and/or other Transponder/Transceiver Circuits to connect any type of sensor to the lighting systems and to its Sensor Data Reporting Circuitry; External Circuit Trigger System that activates a Specifically Chosen and attached Circuit when a certain Sensor Threshold (Programmable) or Event takes place; camera(s); laser, infrared, RF, ultrasonic, photocell, or other frequency counters; laser communication circuits; satellite communication circuits; amplifiers, repeaters; heat sinks; and at least one liquid cooled system (with an optional heat pump).

The views of FIGS. 74-79 illustrate how the electromechanically rotatable light panels, which may be eye-ball type rotatable light panels, can be manipulated to provide auto-tracking functionality that is also exclusive to the lighting system of the present invention. View 7400 shows directional motion sensor data being used to direct one of the rotatable light panel-eye ball assemblies to point its light beam towards the subject crossing the street at the sidewalk location. View 7500 shows directional motion sensor data being used to direct one of the rotatable light panel-eye ball assemblies to point its light beam towards the subject crossing the middle of the street. View 7600 shows directional motion sensor data being used to direct one of the rotatable light panel-eye ball assemblies to point its light beam towards the subject crossing the street just before advancing to the sidewalk on the other side of the street.

View 7700 shows directional motion sensor data being used to direct another one of the multiple rotatable light panel-eye ball assemblies in the light fixture to point its light beam towards the subject advancing to cross the other side of the street. View 7800 shows directional motion sensor data being used to direct another one of the multiple rotatable light panel-eye ball assemblies in the light fixture to point its light beam towards the subject advancing to cross the middle of the other side of the street. In times of heavy pedestrian traffic, the sensors may analyze pedestrian flow by receiving sensor input from concurrently activated sensors to determine when there is an event of heavy pedestrian traffic. When heavy traffic is sensed and analyzed, the stepper/servo motors in the lighting systems may direct the light panels, or the eyeball-type assemblies to direct light beams in a spread out fanned-out configuration to spread out light to the maximum extent possible through one or more light panels being manipulated or they may direct each light panel to light the center of the street to provide maximum light coverage of the entire area. View 7900 shows a citizen communicating for city or emergency help.

An embodiment with savable and recallable light position settings will now be discussed. Various light beam position settings can be saved and later recalled by the system's internal memory through an ergonomic controller interface where a user can select to position a light beam of one of the rotatable light panels or eyeball-type rotatable light panels to selectively throw light in one or more positions as desired. It is also possible to save multiple programmable or preselected scan patterns where the light beams of each light panel or eyeball-type light panel can be programmed to proceed from one saved setting to the next as desired. This may include adjusting the speed of the scan from one position to another where a light panel is incrementally rotated to move from one position to the next chosen position as desired. Multiple positions can be stored in the system to include the functionality to re-arrange the order of the saved positions from a wide range of saved settings in the order desired or chosen by selecting the order of positions. An option may exist to use an eyeball-panel with one or more sensor, camera, and/or microphone in place of the LED.

An embodiment with brightness constancy feature will now be discussed. LEDs with higher than the lumen output available than an application may require can be set to initially operate at less then their total lumen output capability. As lifetime of the light LED diminishes and lumen values may fall under a threshold level, which may be sensed by a lumen output sensor, the reserve capacity of the LEDs may be used by increasing the lumen output brightness. The reserve capacity of the LEDs can be gradually incremented as the lumen life of the LEDs diminishes. As light output diminishes from the older age of the LED module(s), an algorithm may increase brightness of the LEDs to compensate for the lumen lost output capacity and keep the relative brightness approximately.

An embodiment with a white light constancy feature will now be discussed. When changing white to RGB-type multicolor LEDs in a system, the brightness of white light LEDs may be varied to increase their brightness when using and/or selecting other colors of the lighting spectrum. This increase may help elevate brightness to the desired intensity. In an embodiment with a light panel with at least one multicolor or RGB LED, such as with an eyeball-type light panel, an array of such LEDs may change to programmed colors substantially automatically upon a detected or satisfied condition. Programming of colors may be added, modified, and saved consistent with the techniques discussed throughout this disclosure. The color programming may be activated by a logic circuit, which may include updatable firmware. The multicolor or RGB LEDs may also provide a visual indication of operational status by producing lights of various colors, which may be determined via logic that some operation is occurring. Examples of triggering operations may include, without limitation, drone charging, docking, conditions detected by sensors, maintenance needs, replacement needs, or other activities. The colors may be chosen and/or programmed by a user, determined during design or manufacturing, or otherwise established.

In one embodiment of the lighting system, the logic may include an ability to turn on and/or control circuits and sub-circuits of the system. Control may be provide via dip switches, firmware, software, updatable embedded logic, kills-witches, and other control techniques that would be apparent to a person of skill in the art. The remote controlling aspects may advantageously protect circuits from damage, reduce abusive operation of the device, or otherwise provide enhanced control.

An embodiment with an external display interface will now be discussed. A Bluetooth or RF interface may be provided to include transceivers, transponders and other bidirectional data communication that allows the lighting system luminaire and any attached sensors to provide sensor data or to activate certain circuits to display text messages, symbols, or images on externally linked display devices. This may include display status, sensor data, and visual or audible warning that provides relevant alerts, such as the words "FED XING" being displayed on a display panel hanging from a traffic signal pole assembly to warn cars in the crosswalk that a pedestrian is crossing the intersection. It is further contemplated that messages can be sent to vehicle communication systems to alert drivers internally in their vehicles of such or other events.

An embodiment with an external sensor interface will now be discussed. A sensor can be attached through a Bluetooth or RF interface provided with appropriate technologies to include transceivers, transponders and other bidirectional data communication that allows a lighting system luminaire to connect to wireless and to wired attached sensors where sensors can look for certain stimuli to activate messages stored or programmed by the user to be displayed on an externally connected display. In this scenario, for example, a sensor may be placed on a wall of a drive through restaurant that senses a turn signal that is flashing on and off on the vehicle. The luminaire attached to the drive through system, can sense the turn signal as it is flashing and provide an alert to the drive through attendant that a vehicle is trying to get their attention to add or change their order. The drive through attendant can then use the intercom ordering system to interface with the customer and to revise or update a customer's order.

An embodiment with a sleep mode circuit will now be discussed. A mode may be built into the lighting system to put a lighting system luminaire into STANDBY MODE where substantially no light or a low light, like a night light or an emergency light used to back up normal lighting systems, is produced by the LEDs until motion detection sensors are activated that may activate logic circuits to prime, energize, and test the system for thermal shock avoidance. After the system adjusts for the proper thermal operating temperature is at the proper optimum thermal operating temperature, the LED may active. When motion is not detected for a specified programmable amount of time adjusted by the user, then the system powers down and places itself in STANDBY MODE for energy savings.

An embodiment with an optional fan-breathing sensor will now be discussed. In applications where threat sensors may be used for specialized lighting and sensing applications, or air is being monitored for contaminants such as smoke, $CO_2$, or other contaminant, a fan may be located near and draw air to the sensors in the sensor dome. Increased air to the sensors may produce more accurate and quick reading for air sample contamination detection and advantageously produce the earliest warnings and reports of contamination possible.

An embodiment with an audio anomaly detection system will now be discussed. Audio-microphone, sensor, and camera data may be stored in the system as data and compared to discover anomalies indicative of a particular signal. The lighting-sensing luminaire may continually detect conditions and compare stored data and signals with external audio, visual, and or sensor findings of the environment. The internal logic or software can analyze and compare the stored data samples with environmental data to create a textual, audible or visual warning that is sent to further devices, computer(s) or to a controller when an anomaly is detected by the luminaire's microphone-sound sampling, sensor, or camera circuits, logic, and comparator(s). As an example, alerts can be created for explosions, blown gaskets, blown seals, or other industrial sounds. Additionally, in high threat environments, the system can substantially continually listen and create warnings for contamination, radioactive, chemical and/or biological threats; gunshots; explosions; high winds; lightning; hail damage; or other measurable audio-based, sensor-based, or camera-based events.

An illustrative embodiment of the lighting system with sensor circuits and sensor data continuation will now be discussed along with FIGS. 80-85, without limitation. The system may have a sensor interface to connect to virtually any type of sensor circuit device, for example, a camera, sensor, or microphone. The sensor circuit device may be connected through couplings added in manufacture that facilitate physical or wireless connections via the sensor interface. The sensor interface may use Bluetooth wireless connections, WiFi, repeaters, signal amplifiers, other RF types of devices, satellite, cellular phone tower connectivity, bi-directional communication, and telemetry.

Each sensor circuit device may be mounted to a circuit card that can be clipped into place by a user or technician during or after manufacture. The circuit car may be permanently connected through a soldered connection or removable via a clipped connector. Each sensor circuit device may have its own logic code that can be communicated to respective device, activating the logic to allow them to receive data at the thresholds set by the user or the factory through programmable logic of the system.

Once an identification code is read by the logic attached to a sensor or array of sensors, a logic circuit may match a coded signal stored in memory to identify the device. This code may include sensor information, including physical thresholds corresponding to data stored in the system. Sample stored data may include thresholds for alerts or text messages for each threshold to be measured. The data may be edited through a controller. Once a threshold of interest has been met, a text message may be sent to a controller or computer interface via wired or wireless communication.

The controller may be updated to selectively toggle activation of operative features. Updatable firmware may be embedded in the logic of the system to store many sensor circuit device data (e.g., camera, sensor, and microphone) for activation and proper operation. The firmware may include stored codes and user defined thresholds that make the sensor circuit device function. Enabling of circuits can occur through switches, internal logic, or configurable software. Software or firmware can be updated through secure Bluetooth, WiFi, RF, and equivalent communication connections. Alternatively, software or firmware can be updated by modifying the sensor logic board. The S.A.L.T. luminaire can function with an endless number of cameras, sensors, and microphones, where the list of which being similarly updatable.

Figure 80:
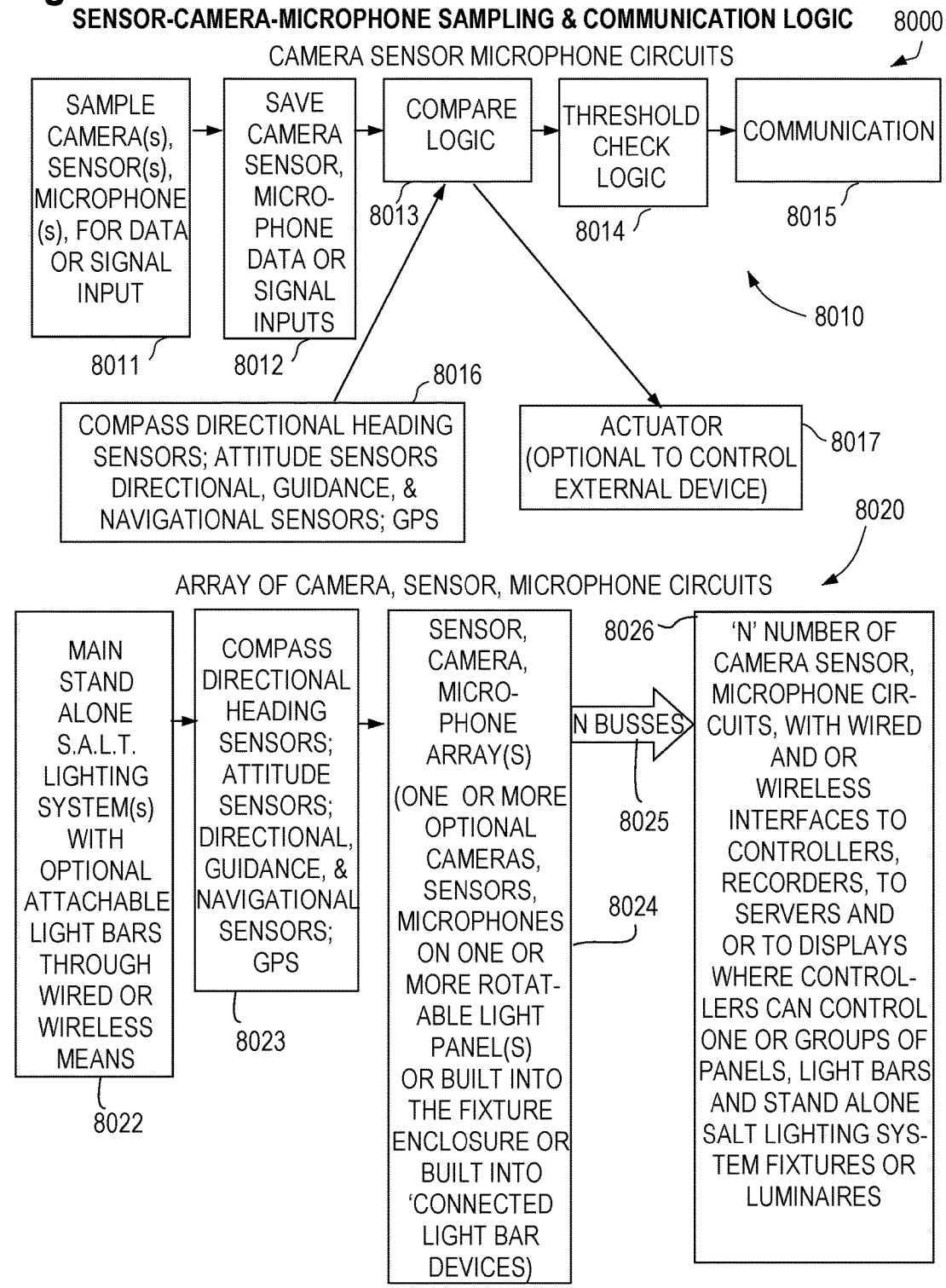
FIG. 80 is a flowchart of an illustrative sensor-camera-microphone sampling operation, according to an embodiment of the present invention.

Referring now to flowchart 8000 of FIG. 80, an illustrative connective operation for sensor-camera-microphone sampling and communication will be discussed. The illustrative system 8000 may include camera, sensor, and microphone circuits 8010 and an array of circuits 8020.

The camera, sensor, and microphone circuits 8010 begin by sampling camera, sensor, and microphones for data or signal input. (Block 8011). The system may then save the camera, sensor, or microphone data or signal inputs. (Block 8012). The system may operate compare logic to analyze the data or signal inputs. (Block 8013). Threshold check logic may be executed at Block 8014. The system may then communicate the results of the logic, for example, by issuing a control signal. (Block 8015). Compass directional heading sensors; attitude sensors; directional, guidance, and navigation sensors; and/or GPS may detect data or signal input. (Block 8016). This information may also be analyzed by compare logic at Block 8013. This result of this analysis may actuate or optionally control an external device. (Block 8017).

The array of camera, sensor, and microphone circuits 8020 may poll main stand-alone S.A.L.T. lighting systems with optional attachable light bars through wired or wireless connection. (Block 8022). Compass directional heading sensors, attitude sensors, directional guidance, navigation sensors, and GPS may also be polled. (Block 8023). Data and signal input information may be gathered from sensor, camera, or microphone arrays, which may include one or more optional cameras, sensors, or microphones on one or more rotatable light panel. (Block 8024). Alternatively, the sensors circuit devices of Block 8024 may be built into a fixture enclosure or connected light bar device. The signal input and data may be transmitted via one or more data bus. (Block 8025). "N" cameras, sensors, microphone circuits may be controlled and/or affected by connected servers, controllers, or other control devices independently, as a group, and/or selectively within the array. (Block 8026). For moving objects such as vehicles, boats and flying objects, luminaires may include GPS, attitude, compass heading and directional circuits, to be sent to satellites, networks, and other devices along with sensor data.

Figure 81:
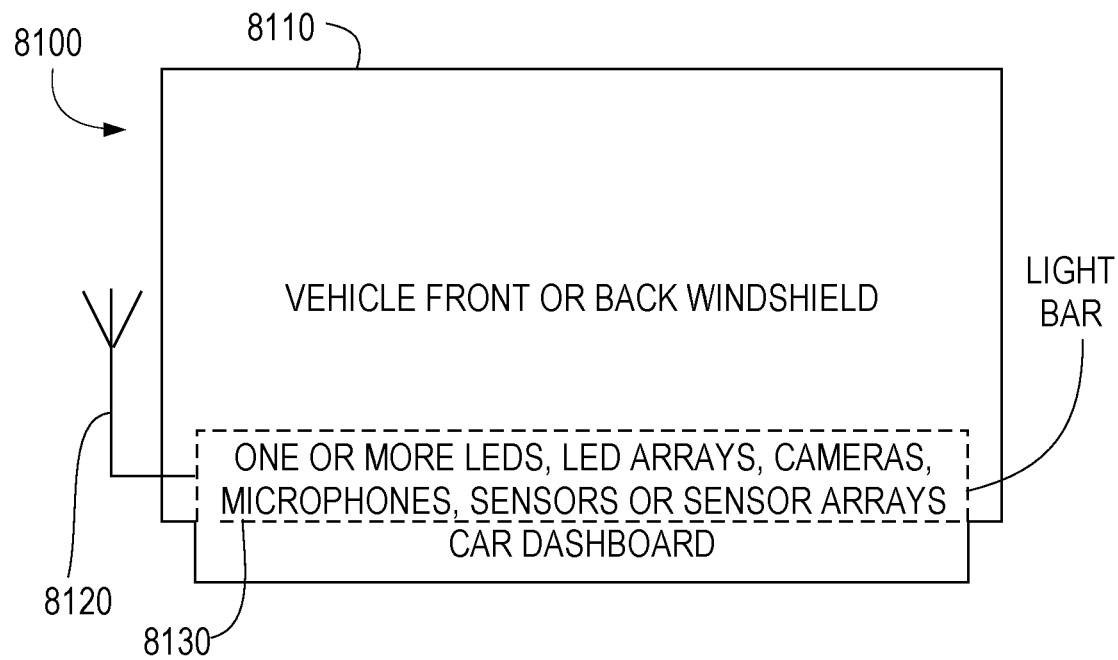
FIG. 81 is a block diagram of a light bar with interchangeable components, according to an embodiment of the present invention.

Referring now to block diagram 8100 of FIG. 81, an illustrative light bar with interchangeable streaming microphones, cameras, and sensors will be discussed without limitation. The light bar 8130 may be mounted or located adjacent to vehicle windshield 8110. The light bar 8130 may include one or more LED, LED array, camera, microphone, sensor, or sensor array. A communication connection may be connected to the light bar, for example, including an antenna 8120 for wireless communication. The light bar may include RGB, multicolor, or polychromatic LEDs and sensors with or without reflectors and secondary optics to shine through a windshield. The light bar may attach near the drivers or passengers side. Data may be transmitted through a windshield.

The light bars 8130 and the luminaires either can interconnect through wireless or wired connections with external sensors, microphones, cameras and devices. The light bars 8130 of block diagram 8100 may communicate and stream sensor data, video and still images, audio data, GPS data, or add light to areas as might be desired. It may communicate through phones, cellular towers, satellites, servers and connected devices in networks, intranets, the internet or the cloud. Furthermore, light bars might be positioned near a top of the door and at the bottom of the window inside the vehicle, in vertical and or horizontal positions. The light bar can also be attached on the sides or on the roof of a vehicle outside the vehicle. Skilled artisans will appreciate additional locations to attach the light bar.

A plurality of light bars containing cameras, microphones, sensors, and LEDs or other light sources can be positioned in any positions where connections can be physically made. This can form a surveillance system that can draw data from its surroundings from virtually every direction surrounding a vehicle. These light bar systems can be mounted on virtually any type of vehicle including but not limited to: cars, SUVs, vans, pick up trucks, recreational vehicles, busses, motorcycles, trucks, ships, boats, yachts, forklifts, snowmobiles, heavy machinery, farm equipment, road construction equipment, emergency vehicles, planes, jets, aerospace vehicles, satellites, rockets, etc.

Various optional circuits can be included in the light bar such as, but not be limited to, directional heading sensors, attitude sensors, guidance, navigational sensors, GPS circuits and logic that would send data to the mobile/vehicular/portable luminaires and to data collecting devices. These circuits can be added to send data wirelessly to other mobile/vehicular/portable luminaires.

Figure 82A:
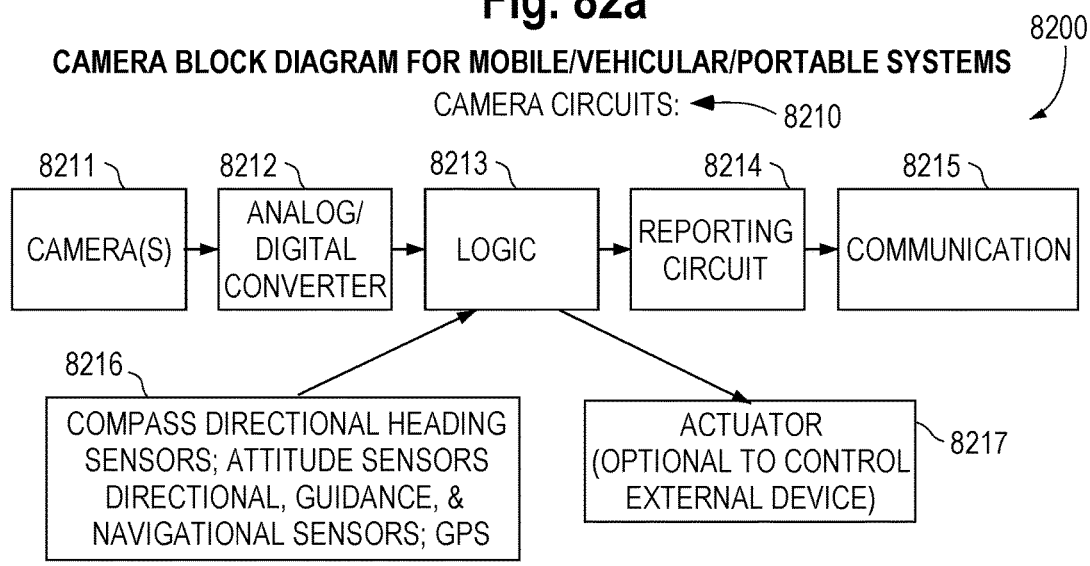
FIGS. 82A-82B are a flowchart of an illustrative camera sampling operation, according to an embodiment of the present invention.
Figure 82B:
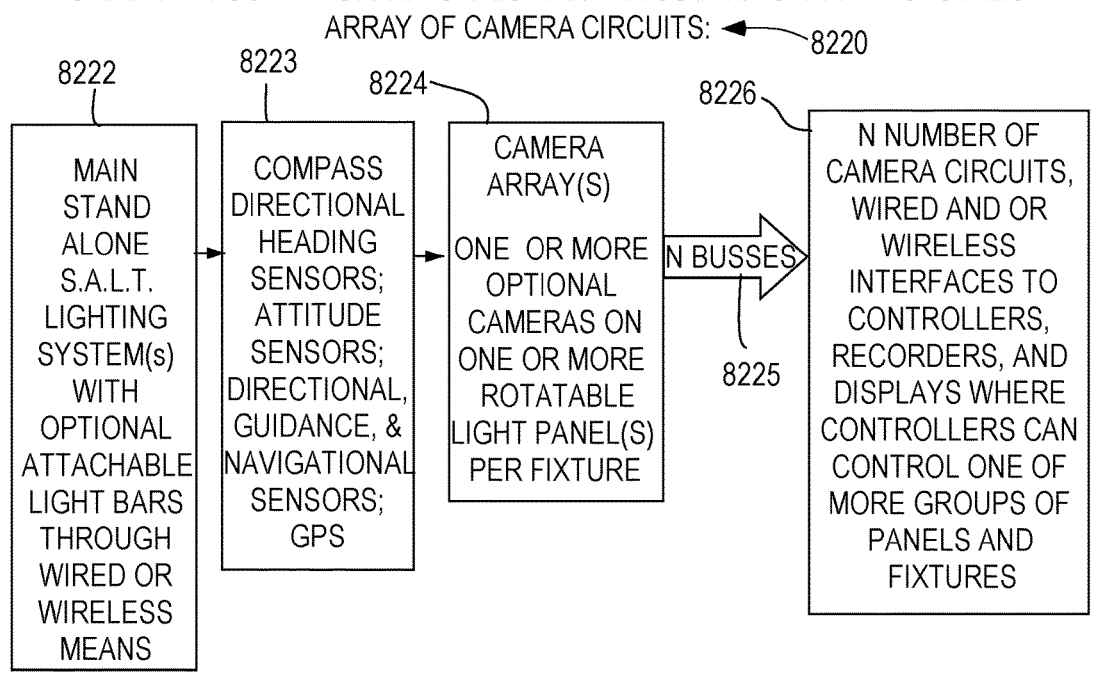

Referring now to flowchart 8200 of FIGS. 82A-82B, an illustrative connective operation for camera sampling and communication will be discussed. The illustrative system 8200 may include camera circuits 8210 and an array of camera circuits 8220.

The camera circuits 8210 begin by sampling cameras for data or signal input. (Block 8211). The system may then process the camera data or signal input via an analog/digital converter. (Block 8212). The system may operate compare logic to analyze the converted data or signal inputs. (Block 8213). Reporting circuit logic may be executed at Block 8214. The system may then communicate the results of the logic, for example, by issuing a control signal. (Block 8215). Compass directional heading sensors; attitude sensors; directional, guidance, and navigation sensors; and/or GPS may detect data or signal input. (Block 8216). This information may also be analyzed by compare logic at Block 8213. This result of this analysis may actuate or optionally control an external device. (Block 8217).

The array of camera circuits 8220 may poll main standalone S.A.L.T. lighting systems with optional attachable light bars through wired or wireless connection. (Block 8222). Compass directional heading sensors, attitude sensors, directional guidance, navigation sensors, and GPS may also be polled. (Block 8223). Data and signal input information may be gathered from the cameras, which may include one or more optional cameras on one or more rotatable light panel. (Block 8224). Alternatively, the sensors circuit devices of Block 8224 may be built into a fixture enclosure or connected light bar device. The signal input and data may be transmitted via one or more data bus. (Block 8225). "N" cameras circuits may be controlled and/or affected by connected servers, controllers, or other control devices independently, as a group, and/or selectively within the array. (Block 8226). For moving objects such as vehicles, boats and flying objects, luminaires may include GPS, attitude, compass heading and directional circuits, to be sent to satellites, networks, and other devices along with sensor data.

Referring now to flowchart 8300 of FIG. 83, an illustrative connective operation for sensor sampling and communication will be discussed. The illustrative system 8300 may include sensor circuits 8310 and an array of sensor circuits 8320.

The sensor circuits 8310 begin by sampling sensors for data or signal input. (Block 8311). The system may then process the sensor data or signal input via an analog/digital converter. (Block 8312). The system may operate compare logic to analyze the converted data or signal inputs. (Block 8313). Reporting circuit logic may be executed at Block 8314. The system may then communicate the results of the logic, for example, by issuing a control signal. (Block 8315). Compass directional heading sensors; attitude sensors; directional, guidance, and navigation sensors; and/or GPS may detect data or signal input. (Block 8316). This information may also be analyzed by compare logic at Block 8313. This result of this analysis may actuate or optionally control an external device. (Block 8317).

The array of sensor circuits 8320 may poll main standalone S.A.L.T. lighting systems with optional attachable light bars through wired or wireless connection. (Block 8322). Compass directional heading sensors, attitude sensors, directional guidance, navigation sensors, and GPS may also be polled. (Block 8323). Data and signal input information may be gathered from the sensor array. (Block 8324). The signal input and data may be transmitted via one or more data bus. (Block 8325). "N" sensors circuits may be controlled and/or affected by connected servers, controllers, or other control devices independently, as a group, and/or selectively within the array. (Block 8326).

Figure 85B:
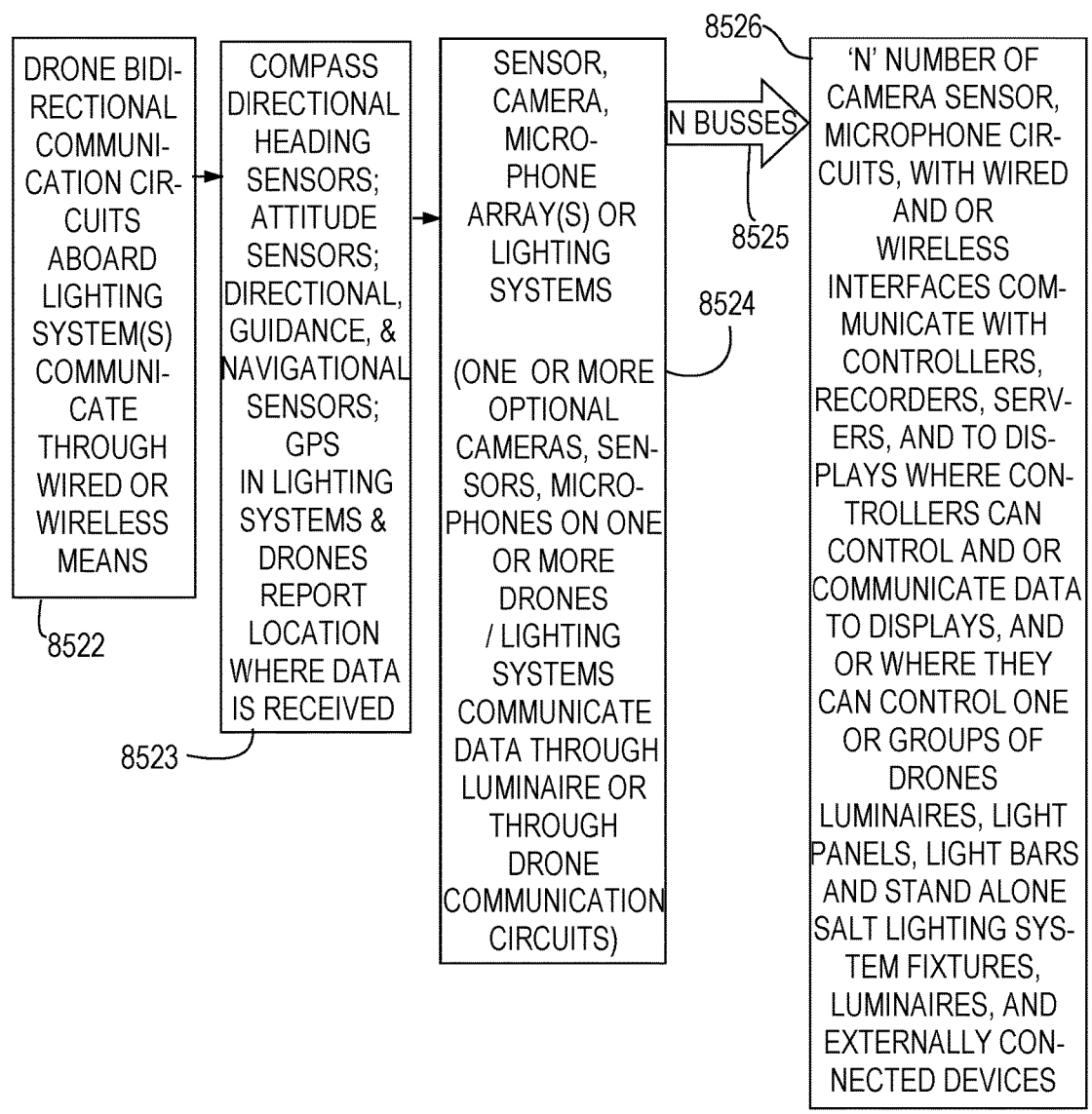

The actuator described along with FIGS. 80, 82A-82B, 83 can receive data via WiFi or RF. The actuator may automatically set other luminaire devices or a user can manually sample sensor, camera, microphone or other data for monitoring. FIGS. 84, 85A-85B illustrate how these external devices may connect within the luminaires to uplink data through WiFi or RF, to external displays, computers, networks, satellites, cellular towers, radio networks, military and intelligence frequencies, and networks or to other systems.

Referring now to flowchart 8400 of FIG. 84, an illustrative connective operation for external connected device sampling and communication will be discussed. The illustrative system 8400 may include sensor, camera, and/or microphone circuits 8410.

The external and/or internal circuits 8410 begin by sampling sensors, camera, and microphones for data or signal input. (Block 8411). The system may establish and transmit data via a wired and/or wireless connection to the luminaires. (Block 8412) The system may then process the data or signal input via an analog/digital converter. (Block 8413). The system may operate compare logic to analyze the converted data or signal inputs. (Block 8414). Reporting circuit logic may be executed at Block 8415. The system may then communicate the results of the logic, for example, by issuing a control signal. (Block 8416). Compass directional heading sensors; attitude sensors; directional, guidance, and navigation sensors; and/or GPS may detect data or signal input. (Block 8417). This information may also be analyzed by compare logic at Block 8414. This result of this analysis may actuate or optionally control an external device. (Block 8417) via an actuator.

"N" devices may be connected to the system to operate and control additional external devices, such as products, machines, and devices that can be turned on, turned, off, or otherwise controlled via a signal. (Block 8426). The additional devices may include cameras, sensors, microphones, circuits, recorders, communication and control circuits, computers, displays, and/or other devices. The system may control the additional devices in response to a condition detected or noncompliance with a threshold level defined within a controller or other controlling device.

Users can view data of connected external devices communicating through the luminaire circuits and communicate bi-directionally through the devices of this disclosure, including but not limited to: a) external sensor circuits with or without GPS to report the location of other sensor data, b) external cameras with or without GPS to report the location of camera data, c) external microphones with or without GPS to report the location of audio data, d) external devices designed to interface and communicate bi-directionally or one-way through the luminaires and or drones that might be connected wirelessly or through wired means with the luminaires and devices depicted throughout this application, e) external speakers with or without GPS to report the location where audio is sent, f) displays with or without GPS to report the location of where displayed data is sent, g) dog or canine vests incorporating sensors, cameras, microphones or speaker systems for one-way and or bidirectional communication, h) drone communications that incorporate and transmit external sensor, camera, microphone/speaker or audio data in a one or bi-directional way through the communication circuits of the luminaires, i) visual electronic display goggles or display glasses, binoculars, telescopes, helmets, and hearing devices that are worn or used by law enforcement, emergency responders, special forces, intelligence or military personnel.

Referring now to flowchart 8500 of FIGS. 85A-85B, an illustrative connective operation for drone sensor-camera-microphone sampling and communication will be discussed. The illustrative system 8500 may include drone camera, sensor, and microphone circuits 8510 and an array of drone circuits 8520.

The drone camera, sensor, and microphone circuits 8510 begin by sampling camera, sensor, and microphones for data or signal input. (Block 8511). The system may then save the camera, sensor, or microphone data or signal inputs detected by the drone. (Block 8512). The system may operate compare logic to analyze the data or signal inputs. (Block 8513). Threshold check logic may be executed at Block 8514. The system may then communicate the results of the logic, for example, by engaging a bi-directional communication through drone and luminaire WiFi, RF, satellite, cellular, or other communication interface. (Block 8515). Compass directional heading sensors; attitude sensors; directional, guidance, and navigation sensors; and/or GPS may detect data or signal input. (Block 8516). This information may also be analyzed by compare logic at Block 8513. This result of this analysis may actuate or optionally control an external device. (Block 8517).

Once the drone has received the camera, sensor, or microphone data or input signal, it may decide at Block 8518 whether to control an additional device. If it is determined that another device may be controlled, the drone may engage the actuator to initiate control, as described along with Block 8517. If it is determined at Block 8518 that no external device may be controlled, the operation may return to Block 8511, where the drone continues to receive detect conditions in its environment.

The array of camera, sensor, and microphone circuits 8520 may poll the drone through wired or wireless connection. (Block 8522). Compass directional heading sensors, attitude sensors, directional guidance, navigation sensors, and GPS may also be polled. (Block 8523). The drone may also report a location where data is received at Block 8523. Data and signal input information may be gathered from sensor, camera, or microphone arrays, which may include one or more optional cameras, sensors, or microphones on one or more rotatable light panel. (Block 8524). Alternatively, the sensors circuit devices of Block 8524 may be built into a fixture enclosure or connected light bar device. The signal input and data may be transmitted via one or more data bus. (Block 8525). "N" cameras, sensors, microphone circuits may be controlled and/or affected by connected servers, controllers, drones, lighting systems, S.A.L.T. systems, or other control devices independently, as a group, and/or selectively within the array. (Block 8526).

According to an embodiment of the present invention, a user can connect to virtually any URL address of a particular attached luminaire or device communicating through the luminaire using the device's GPS location, or an identification code via RF, WiFi, Bluetooth, satellite, cellular tower, radio wave communications, or through other wired or wireless means through one-way or through bi-directional communication.

External and third party devices can be connected wirelessly, through wireless means to connect to the S.A.L.T. lighting and sensing systems to access cameras, sensors and microphones in the luminaires for retrieval of data that the luminaires might transmit through secure or public access circuits. The luminaires could re-transmit data through secure or public access circuits to desired networks, computers, handheld devices, satellites, cellular towers, other vehicles, radios or to other devices. This is useful to emergency personnel, law enforcement, and or to any party of interest that might be connected.

Sensors in the luminaires can use a battery and backup circuit with the appropriate logic that can sense and report-communicate different power status alerts such as a complete power outage, a brown-out, or surge activity that a particular luminaire device might experience. The system's logic may also report an identification code or the GPS location of the luminaire or connected devices. Other sensors can monitor these devices and report status alerts of device failure as mentioned in other parts of this application. Batteries can be used to energize lighting, sensing, camera, microphone, standby circuits, and other circuits contained in the luminaires.

Programmable settings and data may be stored and collected from cameras, sensors, and microphones in the lighting systems and sensors provided in this application for later transmission when a sensor threshold has been met or to report status and operating information. Memory and data storage may be expandable, allowing additional memory and/or storage to be installed. This may benefit applications with high memory and storage requirements to also allow for adding additional sensors, cameras, microphones, charging device(s), like the exclusive drone recharging sub-system controlled by the luminaire master control system(s).

The luminaire enclosure may be a special proprietary design, where the enclosure can be adjusted for various components used in the system. Some S.A.L.T. models can have a section of the enclosure which would include one or more connectors for different power sources, including direct solar interface; batteries; AC; secondary, tertiary, and further power sources; array of solar panels; kinetic energy collection devices; or other energy producing or harvesting devices. Energy can be stored in a battery contained in or connected to the luminaire so a lighting system can be put in standby mode. Power may be taken from the battery or other power sources to drive motion or other sensors that can activate lighting or other actuating control circuits and software interfaces that can be controlled by computers and handheld devices. Once a motion sensor is activated, the system can then automatically switch from battery to its main electrical connection to energize and turn the luminaire on. Further, the luminaire can allow the connection of external devices that work with each other.

One such connection can allow a technician or user to attach an umbilical wire harness to connect other devices to the luminaire such as mentioned in this patent application such as to control a drone recharging platform, which is a further sub-system of the main luminaire design. A portion of the enclosure can also include a port to connect one or more sensors through an interface jack built into the enclosure.

An embodiment of the present invention may be adapted for, as an example, border control and Homeland Security enforcement. Various models of lighting system luminaires can be designed with more features of the current lighting system described in this application, which can include circuits for auto-tracking; laser one-way and or bidirectional communications from one luminaire to another for transmission and reception of control data from any attached or targeted devices, external wireless apparel sensors, apparel cameras, apparel microphones, apparel displays and apparel speaker systems that can be mounted in wearable apparel, such as a human vest, helmet, dog vest, collar, or other wearable article. In the interest of clarity, the wearable apparel will be discussed in the context of a dog vest or collar, without limiting the type of apparel worn or wearer of the apparel. Devices of this embodiment can send data, images, video or audio to monitor the dog's health, the dog's actions, stress levels or is otherwise engaged, and to provide data around and about the dog's patrol environment for surveillance and patrol intelligence in a desired area. One use of laser communication would be where a squad car can uplink or downlink communication and control signals through a laser beam up to or down from a luminaire that might be installed on a street light or light tower to connect to special secure law enforcement and intelligence channels, or where border control agents can also talk securely to drone platforms and drones to receive special data from drone sensor, microphone, and camera memory banks after drones return and dock for charging or to report mission findings from their routine, custom, manual, or preset surveillance patrols.

It is further contemplated that a sensor can be placed in a pocket to determine if the seal of a pocket has been opened by a hand that might enter the pocket, where when said event occurs electronics provide a control signal where logic activates an audio or visual signal that can alert someone that a pocket has been entered into. Further, it is also contemplated that a microphone can be added to apparel that can listen for words like: "light", or "light on" or "light" or "light off" to toggle a light source on or off through voice commands.

Such a dog vest may be a sub-system of the main luminaire master control circuits. The vest can facilitate command of the dog by receiving certain audible or inaudible signals to prompt them into action through the appropriate secure channels utilized through communication circuits in the luminaires that receive dog vest transmissions through the luminaire's WiFi, satellite, RF, and cellular tower communication circuits. Law enforcement, intelligence operatives, military personnel and border control management forces can control canine forces at border control interest areas, and as such systems might be desired in high security facilities where drone protection and capabilities for perimeter monitoring might be desired. This application may work together with vehicular systems, patrols on foot, and other instances where operators can control canine forces through the sub-system communication capability of the dog vests to communicate with the exclusive luminaires where certain audio and other signals sent to the dog through the speakers of the dog vest can control or command a well trained dog.

This embodiment may additionally be adapted for drones, where sensors, cameras, microphones, displays and or speaker systems can be mounted that can send such data bi-directionally using the luminaire's communication circuits for surveillance and patrol intelligence in a desired area. Furthermore, this embodiment may be adapted for external devices designed to interface and communicate bi-directionally or one-way through the luminaires and or drones that might be connected wirelessly or through wired means with the luminaires and devices depicted throughout this application.

According to an embodiment of the present invention, the circuit boards can be able to activate only the features desired by a customer. It is also further contemplated that software and hardware can be added during the manufacturing process or added later by a customer or a technician where the customer or technician adds the appropriate chips and circuit board(s) to the lighting system after the manufacturing process to enable the features or to update the features desired.

Firmware may activate one, more, or all features possible contained in the circuit board(s) of the lighting system can be updated by replacing one or more chips containing the firmware or by updating the software/firmware through secure WiFi, RF, or other wireless or wired communication channels.

Some of the features/applications include, without limitation, lighting systems that can be designed and configured include but are not limited to the following applications: tunnels & bridges; parking lot lighting; exterior building lighting; golf course lighting; outdoor lighting; street lighting; neighborhood lighting; neighborhood park lighting; amusement park lighting; truck docking; intermodal lighting; rail docking; patio lighting; canopy lighting; billboards & roadway sign lighting; traffic sign lighting; emergency lighting; security-surveillance-monitoring lighting; secure facility lighting; borders-secure perimeters-fence lighting; pathways-walkways-hallways; driveway lighting; deck lighting; pool lighting; airport lighting; grow lighting; retail metrics; theatrical and stage lighting; nightclub and disco lighting; stadium lighting; auditorium lighting; photographic lighting; arena lighting; flood lighting; portable water-resistant lighting; portable waterproof lighting; medical-surgical-dental lighting; mood lighting; light therapy; RGB variable spectrum multicolor commercial, retail, advertising, or event application lighting; RGB variable spectrum Christmas, holiday, special celebration, or other multicolor applications; indoor lighting; vehicular lighting; mobile lighting; portable lighting; special purpose lighting; enhanced pedestrian safety LED lighting; threat monitoring LED lighting; sensor monitoring LED lighting; LED lighting with area surveillance reporting; high security or secure facility lighting; hazard sensor enabled LED lighting; weather, seismographic sensor enabled lighting; city security, protection, & communication LED lighting grid lighting; parking garage lighting; advertising-event lighting; LED lighting with directable communications & control technology; business productivity, business process LED lighting; food chain, food contamination, food sanitation sensor metrics enabled LED lighting; intercom-communications enabled LED lighting; drive-through LED lighting management systems; robotics LED lighting, with multi-sensing, multi-camera, with optional multi-laser metrics; black eye infrared LED/camera night vision stealth options; retail metrics, multi-sensor, multi-camera, multi-laser enabled with WiFi, GPS, & data communication LED lighting; ultraviolet LED systems for various applications including water filtration; engineering & scientific multi-sensor, multi-camera, multi-laser enabled LED lighting; manufacturing, industrial & quality control metrics, multi-sensor, multi-camera, multi-laser enabled LED lighting; warehousing RFID multi-sensor, multi-camera, multi-laser inventory controlled enabled LED lighting; ecological sensor enabled LED lighting; multi-color LED lighting; mood LED lighting; light therapy LED lighting; marine LED lighting; S.A.L.T. solar free energy lighting. Additional custom application may include sensor enabled LED lighting dancing S.A.L.T., with oscillating, flashing, programmable color change capability for stadium, concert hall, auditorium, theatrical, stage & nightclub, home entertainment LED lighting According to an embodiment of the present invention, one or more eyeball-type light panels, or other rotatable panels within an enclosure with or without any lens filters can be developed per the single or multiple configurations of this disclosure. The panels can rotate sensors apart from light sources. A panel may move a camera, or a sensor, or an array of sensors, or microphones, or lasers, or other communicating, control, and illuminating devices in any singular or plural, or to any number configuration and combination thereof, with sub-systems and communication devices included.

Features of the lighting systems or luminaires and the many functional features of the proposed systems can be further controlled, deactivated, or activated by setting or resetting physical DIP Switches within the luminaire, through controllers communicating with the luminaire through wireless or wired connections, and or by changing the firmware required to operate or control the systems.

Virtually any TEXT MESSAGE can be entered, edited, saved or deleted in the luminaire's memory that can function to send a message, or report the status of sensor readings with sensor reporting circuits designed to communicate sensor data. It is understood that when a particular sensor threshold is met, editable and saved TEXT MESSAGES can then be reported to controllers, to computers, to computer networks, to satellites, to cellular towers, to hand held devices, to displays, and to other devices through wired or wireless means when one or more sensor thresholds or sensor level threshold of interest is met from one or more sensor(s) of similar or different types.

Multiple controllers can be developed to allow a user to program, save, delete, select, and recall automatic and manual scan modes that can move the luminaire's rotatable light panels from one point to another where multiple scans may be saved and edited as desired or be selected by the user.

The software used on touch screen or software based controllers, including smart-phone applications, to operate the lighting system, can use a graphical user interface to allow a user to operate and control only the features found in the firmware of each configured system. Depending on the features chosen by a customer, the user can configure the software to display only the graphical user interface(s) to control the configured features of the lighting system that a user ordered. The software that is used in the lighting system can be designed to operate a large variety of different systems. For example, the lighting systems might be configured or manufactured to operate luminaires each having a different number of rotatable light panels and or having sensors, cameras, microphones, speakers, and other devices. These can be mounted on rotatable light panels or on the lighting system's enclosures in configurations including a luminaire with anywhere from one to many rotatable panel(s).

The controllers, graphical user interfaces, and software used in the lighting system of the present invention can operate a variety of different systems. For example, the lighting systems might be configured and or manufactured to operate luminaires having a different number of rotatable light panels and/or having varying sensors, cameras, microphones, speakers, and other devices mounted on rotatable light panels or said devices mounted in or on the lighting system's enclosures. Example configurations include a luminaire with 1, 2, 3, 4, 5, 6, 7, 8, 9, 10, 11, 12, 13, 14, or more rotatable panel, directionally controlled light panels, sensors, cameras, microphones, lasers, and/or other devices. The sensors, cameras, microphones, and other devices mounted on one or more rotatable panels, or mounted in a sensor dome on the luminaire, or otherwise mounted on, or in an enclosure.

Touch screens with graphical user interfaces and software can be used in the lighting systems to control and operate the features of the lighting systems. Physical buttons, knobs, switches, membrane switches, joysticks, electronic ribbon controllers, displays, scroll bars, and other tactile or electromechanical interfaces can also be used in lieu of a touch screen. The interface may include appropriate logic and software to enable, control, exit from, cancel, operate, program, save, delete, and or select manual and automatic features, sub-features, functions, and sub-functions of lighting and sensing features found throughout this patent application. Expandable memory and expandable data storage circuitry where memory and or data storage chips can also be utilized to integrate and function to accommodate the features mentioned.

The Luminaire of this disclosure also has an option to channel and provide power from energy harvesting devices such as solar power and kinetic energy interface power channeling technology, where circuits transfer power generated from external devices such as wave-energy harvesting from ocean currents, micro-hydro power systems, dams and hydroelectric power, river hydroelectric power, solar, and kinetic energy harvesting devices, and other energy harvesting devices, as such become available, into the city's power grid, or back to power companies for energy credits.

The enclosures and any lens filters may be designed to minimize glare and reflectivity problems, and where flicker rate may be >200 Hz. This may enhance human safety even though many LED sources today already have built in safety features. The manufacturing of the devices must ensure that the appropriate safety features are in place, including any fuses, reset buttons, circuit breakers, or other such devices. All parameters may depend upon which LEDs will be used for each individual application. Even street lights in different locales may use different LEDs and corresponding parameters.

CCR (Constant Current Reduction) may be used to reduce EMP generation and flicker. However, both CCR, PWM (pulse width modulation), and other methods as might arise, have their intended application, where one mode of driving LEDs might be preferred over another for a particular application, and where the systems can use either, and any further developed drivers or driverless LEDs.

Other Embodiments

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A drone receiving apparatus comprising:
   a landing area on which a drone is receivable, the landing area comprising a platform, a lighting system, and/or a surface;
   a charging plate for providing electrical power to the drone received by the landing area;
   a communication system;
   a signal communicable by the communication system to exchange data with the drone that is within a communicable proximity to the communication system;

wherein the drone is communicable with additional drones to exchange the data at least partially relating to status to coordinate operation of the drone; and wherein the data comprises diagnostic information and/or charging information relating to the drone.

2. The apparatus of claim 1, wherein the signal comprises a homing signal to communicate location information about the drone and the landing area, wherein the homing signal is detectable by the drone, and wherein GPS coordinates are includable by the location information.

3. The apparatus of claim 2, wherein the homing signal is temporarily disabled for the landing area that has received the drone, and wherein the homing signal is selectively enabled for the landing area that has not received the drone.

4. The apparatus of claim 1, wherein specifications comprising voltage levels and current levels are communicable by the drone to the communication system, and wherein the voltage levels and the current levels of the charging plate are adjustable to accommodate the drone in response to at least part of the specifications received from the drone.

5. The apparatus of claim 1, wherein the platform is installable on a light pole, the lighting system, and/or the surface.

6. The apparatus of claim 1, wherein the charging plate provides the electrical power at least partially via induction.

7. The apparatus of claim 1, further comprising:
a locking mechanism to interface with power couplings between the charging plate and the drone that is located on the landing area; and
wherein the drone is temporarily lockable and/or attracted to the charging plate.

8. The apparatus of claim 7, wherein the locking mechanism comprises magnetic, electromechanical, and/or mechanical docking components.

9. The apparatus of claim 1, wherein the landing area is detectable by a sensor of the drone and/or a communication circuit.

10. The apparatus of claim 1, wherein the landing area comprises:
a sensor and/or a communication circuit to detect when the drone has been received by the landing area and affect operation of the charging plate; and
a charge level of the drone being intermittently determinable to affect whether the drone is provided the electrical power to at least partially charge the drone.

11. The apparatus of claim 1, wherein at least part of the data is transmittable using a communication circuit.

12. A drone receiving apparatus comprising:
a landing area comprising a platform installable on a light pole, lighting system, and/or a surface on which a drone is receivable;
a charging plate for providing electrical power to the drone received by the landing area;
a signal communicable by a communication system to exchange data with the drone that is within a communicable proximity to the communication system;
wherein the signal comprises a homing signal to communicate location information about the drone and the landing area, wherein the homing signal is detectable by the drone, and wherein GPS coordinates are includable by the location information;
wherein specifications comprising voltage levels and current levels are communicable by the drone to the communication system; and
wherein the voltage levels and the current levels of the charging plate are adjustable to accommodate the drone in response to at least part of the specifications received from the drone.

13. The apparatus of claim 12, wherein the drone is communicable with additional drones to exchange the data at least partially relating to status to coordinate operation of the drone and the charging plate;
wherein the data comprises diagnostic information, charging information, and/or identifying information relating to the drone; and
wherein at least part of the data indicates whether the landing area is available to receive the drone.

14. The apparatus of claim 12, further comprising:
a locking mechanism to interface with power couplings between the charging plate and the drone that is located on the landing area;
wherein the drone is temporarily lockable to and being engaged with the charging plate; and
wherein the locking mechanism comprises magnetic, electromechanical, and/or mechanical docking components.

15. A method for receiving a drone comprising:
(a) communicating a signal by a communication system to exchange data with the drone that is within a communicable proximity to the communication system;
(b) receiving the drone by a landing area comprising a platform, lighting system, and/or a surface;
(c) selectively providing electrical power to the drone received by the landing area via a charging plate;
(d) communicating specifications comprising voltage levels and current levels by the drone to the communication system;
(e) adjusting the charging plate to accommodate the drone in response to at least part of the specifications received from the drone; and
wherein the signal comprises a homing signal to communicate location information about the drone and the landing area, wherein the homing signal is detectable by the drone, and wherein GPS coordinates are includable by the location information.

16. The method of claim 15, wherein the platform is installable on a light pole or lighting system.

17. The method of claim 15, further comprising after step (b):
(f) interfacing with power couplings between the charging plate and the drone that is located on the landing area via a locking mechanism;
(g) providing the electric power to the drone via the charging plate;
(h) disengaging from the power couplings between the charging plate and the drone that is located on the landing area via the locking mechanism; and
wherein the drone is temporarily lockable and/or attracted to the charging plate.

* * * * *